US012689538B2

(12) United States Patent
Lee et al.

(10) Patent No.: US 12,689,538 B2
(45) Date of Patent: Jul. 21, 2026

(54) BROADCAST SIGNAL TRANSMISSION DEVICE AND BROADCAST SIGNAL TRANSMISSION METHOD WHICH USE BROADCAST SIGNAL FRAME FOR SIGNALING REDUCED CARRIER COEFFICIENT

(71) Applicant: ELECTRONICS AND TELECOMMUNICATIONS RESEARCH INSTITUTE, Daejeon (KR)

(72) Inventors: Jae-Young Lee, Daejeon (KR); Sun-Hyoung Kwon, Daejeon (KR); Sung-Ik Park, Daejeon (KR); Nam-Ho Hur, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 332 days.

(21) Appl. No.: 18/551,978

(22) PCT Filed: Mar. 8, 2022

(86) PCT No.: PCT/KR2022/003319
§ 371 (c)(1),
(2) Date: Sep. 22, 2023

(87) PCT Pub. No.: WO2022/203248
PCT Pub. Date: Sep. 29, 2022

(65) Prior Publication Data
US 2024/0187273 A1      Jun. 6, 2024

(30) Foreign Application Priority Data

Mar. 24, 2021    (KR) ........................ 10-2021-0037950
Mar. 4, 2022    (KR) ........................ 10-2022-0028185

(51) Int. Cl.
*H04L 12/18*        (2006.01)

(52) U.S. Cl.
CPC .................................. *H04L 12/189* (2013.01)

(58) Field of Classification Search
CPC .................................................... H04L 12/189
(Continued)

(56) References Cited

U.S. PATENT DOCUMENTS 8,798,096 B2      8/2014  Park et al.
10,855,507 B2    12/2020  Baek et al.
(Continued)

FOREIGN PATENT DOCUMENTS

KR      10-2011-0070771 A      6/2011
KR      10-2019-0040503 A      4/2019
(Continued)

OTHER PUBLICATIONS

Guidelines for the Physical Layer Protocol. Doc. A/327:2021 Jan. 25, 2021.*
(Continued)

*Primary Examiner* — Sibte H Bukhari
(74) *Attorney, Agent, or Firm* — NSIP Law

(57) ABSTRACT

An apparatus for transmitting a broadcast signal according to an embodiment of the present invention includes a bootstrap generation unit for generating a bootstrap for signaling a system bandwidth field, corresponding to a system bandwidth for a post-bootstrap, and a baseband sampling rate coefficient; a preamble generation unit for generating a preamble located immediately following the bootstrap in a broadcast signal frame; and a payload generation unit for generating one or more subframes located immediately following the preamble in the broadcast signal frame. Here, the preamble may include L1 signaling data, and the L1 signaling data may include a reduced carrier coefficient.

17 Claims, 64 Drawing Sheets

(58) Field of Classification Search
USPC ......................................................... 370/312
See application file for complete search history.

(56)                          References Cited

U.S. PATENT DOCUMENTS

| | | |
|---|---|---|
| 11,032,114 B2 | 6/2021 | Kim et al. |
| 11,153,056 B2 | 10/2021 | Simon |
| 11,653,058 B2 | 5/2023 | Okada et al. |
| 2019/0082228 A1 | 3/2019 | Park et al. |

FOREIGN PATENT DOCUMENTS

| | | | |
|---|---|---|---|
| KR | 10-2004835 B1 | 7/2019 | |
| KR | 10-2020-0018423 A | 2/2020 | |
| KR | 102154532 B1 * | 9/2020 | ........... H04L 27/265 |

OTHER PUBLICATIONS

Advanced Television Systems Committee, "ATSC Standard: Physical Layer Protocol (A/322)," Doc. A/322, Feb. 9, 2017, (262 Pages in English).
Advanced Television Systems Committee, "ATSC Recommended Practice: Guidelines for the Physical Layer Protocol," Doc. A/327 Jan. 25, 2021, (138 Pages in English).

* cited by examiner

| BOOTSTRAP | L1 SIGNAL | COMMON PLP | CORE LAYER DATA PLPS (UPPER LAYER) |
| | | | ENHANCED LAYER DATA PLPS (LOWER LAYER) |

LDM FRAME

| BOOTSTRAP | L1 SIGNAL | COMMON PLP | CORE LAYER DATA PLPS, TYPE 1 | CORE LAYER DATA PLPS, TYPE 2 |
| | | | ENHANCED LAYER DATA PLPS, TYPE 1 | ENHANCED LAYER DATA PLPS, TYPE 2 |

LDM FRAME

| BOOTSTRAP | L1 SIGNAL | PLP (1,1): COMMON PLP | PLP (2,1): SINGLE-LAYER DATA PLP | PLP (3,1): CORE LAYER DATA PLP |
| | | | | PLP (3,2): ENHANCED LAYER DATA PLP |

← LDM FRAME →

| BOOTSTRAP | L1 SIGNAL | PLP (1,1): COMMON PLP | PLP (2,1): ROBUST AUDIO SERVICE | PLP (3,1): INDOOR / MOBILE SERVICE |
| | | | PLP (2,2): HIGH DATA RATE SERVICE | PLP (3,2): HIGH DATA RATE SERVICE |

← LDM FRAME →

FIG. 30

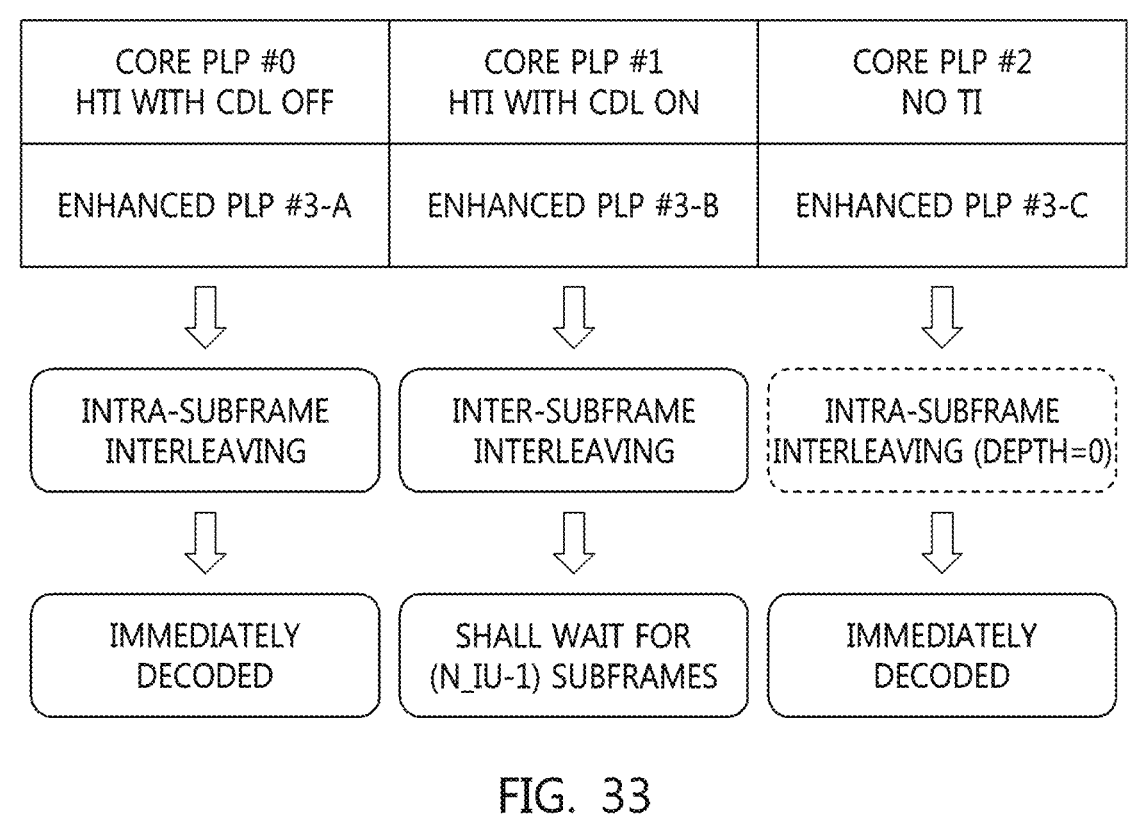

| CORE PLP #0 HTI WITH CDL OFF | CORE PLP #1 HTI WITH CDL ON | CORE PLP #2 NO TI |
|---|---|---|
| ENHANCED PLP #3-A | ENHANCED PLP #3-B | ENHANCED PLP #3-C |

| INTRA-SUBFRAME INTERLEAVING | INTER-SUBFRAME INTERLEAVING | INTRA-SUBFRAME INTERLEAVING (DEPTH=0) |
|---|---|---|
| IMMEDIATELY DECODED | SHALL WAIT FOR (N_IU-1) SUBFRAMES | IMMEDIATELY DECODED |

FIG. 33

| CORE PLP #0<br>HTI WITH CDL ON<br>(N_IU = 2) | CORE PLP #1<br>HTI WITH CDL ON<br>(N_IU = 4) | CORE PLP #2<br>HTI WITH CDL ON<br>(N_IU = 3) |
|---|---|---|
| ENHANCED PLP #3-A | ENHANCED PLP #3-B | ENHANCED PLP #3-C |

| INTER-SUBFRAME<br>INTERLEAVING | INTER-SUBFRAME<br>INTERLEAVING | INTER-SUBFRAME<br>INTERLEAVING |
|---|---|---|

| SHALL WAIT FOR<br>1 SUBFRAME | SHALL WAIT FOR<br>3 SUBFRAMES | SHALL WAIT FOR<br>2 SUBFRAMES |
|---|---|---|

FIG. 35

Virtual FEC cells are skipped during reading processing

FIG. 42

* X : virtual cells

<Writing in TBI memory>
- column-wise

<Reading from TBI memory>
- Diagonal-wise

<Output from TBI memory>
- Virtual cells are included

| 16 | 8 | 0 |
|----|---|---|
| 17 | 9 | 1 |
| 18 | 10 | 2 |
| 19 | 11 | 3 |
| 20 | 12 | 4 |
| 21 | 13 | 5 |
| 22 | 14 | 6 |
| 23 | 15 | 7 |

<Reading from TBDI memory removing virtual cells>

<Writing in TBDI memory>

\* X : virtual cells

<Writing in TBI memory>
- column-wise

<Reading from TBI memory>
- Diagonal-wise

<Output from TBI memory>
- Virtual cells are not included

<Rx. CDL memory state including virtual cells>
"Virtual cells come together"

<Writing order to TBDI memory>

| 16 | 17 | 18 | 19 | 20 | 21 | 22 | 23 |
| 8 | 9 | 10 | 11 | 12 | 13 | 14 | 15 |
| 0 | 1 | 2 | 3 | 4 | 5 | 6 | 7 |

<Reading from TBDI memory removing virtual cells>

| 16 | 17 | 18 | 19 | 20 | 21 | 22 | 23 |
| 8 | 9 | 10 | 11 | 12 | 13 | 14 | 15 |
| 0 | 1 | 2 | 3 | 4 | 5 | 6 | 7 |
| X | X | X | X | X | X | X | X |
| X | X | X | X | X | X | X | X |

<Writing in TBDI memory>

| 20 | 10 | 15 | 18 | 23 | 4 | 16 | 21 |
| 11 | 1 | 6 | 9 | 14 | 17 | 22 | 12 |
| 2 | 7 | 19 | 0 | 5 | 8 | 13 | 3 |

FIG. 50

| CL:  PLP #0 | |
| EL:  PLP #1 | EL:  PLP #2 |

FIG. 53

| CL:  PLP0 #0 |
| EL:  PLP #1 + PLP #2 (mixed) |

BROADCAST SIGNAL TRANSMISSION DEVICE AND BROADCAST SIGNAL TRANSMISSION METHOD WHICH USE BROADCAST SIGNAL FRAME FOR SIGNALING REDUCED CARRIER COEFFICIENT

CROSS REFERENCE TO RELATED APPLICATIONS

This application is a U.S. National Stage Application of International Application No. PCT/KR2022/003319, filed on Mar. 8, 2022, which claims the benefit under 35 USC 119 (a) and 365(b) of Korean Patent Application No. 10-2021-0037950, filed on Mar. 24, 2021, and Korean Patent Application No. 10-2022-0028185, filed on Mar. 4, 2022, in the Korean Intellectual Property Office, the entire disclosures of which are incorporated herein by reference for all purposes.

TECHNICAL FIELD

The present invention relates generally to broadcast signal transmission/reception technology used in broadcast systems, and more particularly to a broadcast signal transmission/reception system for signaling a reduced carrier coefficient.

BACKGROUND ART

Bit-Interleaved Coded Modulation (BICM) is bandwidth-efficient transmission technology, and takes a form in which an error-correction coder, a bit-by-bit interleaver, and a high-order modulator are combined.

BICM uses a Low-Density Parity Check (LDPC) coder or a turbo coder as an error-correction coder, thereby providing excellent performance with a simple structure. Also, BICM provides a high level of flexibility because it is able to variously select a modulation order, the length and the code rate of an error-correction code, and the like. Because of such advantages, BICM is being used in broadcast standards, such as DVB-T2 and DVB-NGH, and is also highly likely to be used in other next-generation broadcast systems.

In order to support a plurality of multi-services at the same time, multiplexing, which is a process of mixing multiple signals, is required. As currently widely used techniques, among such multiplexing techniques, there are Time-Division Multiplexing (TDM), which segments time resources and uses the same, and Frequency-Division Multiplexing (FDM), which segments frequency resources and uses the same. That is, TDM is a method of assigning time segments to respective services, and FDM is a method of assigning frequency resource segments to respective services and using the same. These days, a new multiplexing technique applicable to next-generation broadcast systems that provides a higher level of flexibility and performance superior to that of TDM and FDM is urgently required.

Meanwhile, the demand for convergence of broadcasting and communication is increasing day by day, but because broadcast standards, such as ATSC 3.0 and the like, and communication standards, such as LTE, 5G and the like, are independent of each other, mismatch of system frequencies thereof often occurs.

When a broadcast system, such as ATSC 3.0 or the like, and a communication system, such as 4G/5G or the like, use different system frequency bands, some frequency bands cannot be used when service in which broadcasting and communication converge is provided, whereby frequency efficiency is decreased.

Accordingly, what is urgently required is new technology capable of preventing frequency efficiency from decreasing even when service in which a broadcast system and a communication system converge is provided.

DISCLOSURE

Technical Problem

An object of the present invention is to enable a system frequency band used in a broadcast system to cover a system frequency band used in a communication system for a service based on convergence of a broadcast system and a communication system.

Also, another object of the present invention is to provide a new broadcast-signal signaling technique that is compatible with broadcast signal transmission/reception systems according to existing broadcast standards while making a new system frequency band available.

Technical Solution

In order to accomplish the above objects, an apparatus for transmitting a broadcast signal according to the present invention includes a bootstrap generation unit for generating a bootstrap for signaling a system bandwidth field, corresponding to a system bandwidth for a post-bootstrap, and a baseband sampling rate coefficient; a preamble generation unit for generating a preamble located immediately following the bootstrap in a broadcast signal frame; and a payload generation unit for generating one or more subframes located immediately following the preamble in the broadcast signal frame. Here, the preamble may include L1 signaling data, and the L1 signaling data may include a reduced carrier coefficient.

Here, the preamble generation unit may set the reduced carrier coefficient based on the ratio of occupied bandwidth to system bandwidth.

Here, the reduced carrier coefficient may include 5 and 6 for the case in which the system bandwidth is 5 MHz.

Here, the reduced carrier coefficient may include an integer that is equal to or greater than 0 and is equal to or less than 6.

Here, the occupied bandwidth may be calculated based on the number of carriers, which is calculated by subtracting the product of the reduced carrier coefficient and a carrier unit from the maximum number of carriers.

Here, the bootstrap generation unit may assign 0 and 00 to the baseband sampling rate coefficient and the system bandwidth field, respectively, for the case in which the system bandwidth is 5 MHz.

Here, the bootstrap generation unit may assign 11 to the system bandwidth field for the case in which the system bandwidth is greater than 8 MHz.

Here, the bootstrap generation unit may assign 14 to the baseband sampling rate coefficient for the case in which the system bandwidth is 10 MHz, assign 29 to the baseband sampling rate coefficient for the case in which the system bandwidth is 15 MHz, assign 44 to the baseband sampling rate coefficient for the case in which the system bandwidth is 20 MHz, assign 59 to the baseband sampling rate coefficient for the case in which the system bandwidth is 25 MHz, and assign 74 to the baseband sampling rate coefficient for the case in which the system bandwidth is 30 MHz.

Also, in order to accomplish the above objects, a method for transmitting a broadcast signal according to the present invention includes generating one or more subframes, generating a preamble corresponding to the one or more subframes, and generating a bootstrap for signaling a system bandwidth field, corresponding to a system bandwidth for a post-bootstrap, and a baseband sampling rate coefficient. Here, the preamble may include L1 signaling data, and the L1 signaling data may include a reduced carrier coefficient.

Here, generating the preamble may comprise setting the reduced carrier coefficient such that the ratio of occupied bandwidth to system bandwidth is equal to or greater than 0.92 and is less than 0.98.

Here, the reduced carrier coefficient may include 5 and 6 for the case in which the system bandwidth is 5 MHz.

Here, the reduced carrier coefficient may include an integer that is equal to or greater than 0 and is equal to or less than 6.

Here, the occupied bandwidth may be calculated based on the number of carriers, which is calculated by subtracting the product of the reduced carrier coefficient and a carrier unit from the maximum number of carriers.

Here, generating the bootstrap may comprise assigning 0 and 00 to the baseband sampling rate coefficient and the system bandwidth field, respectively, for the case in which the system bandwidth is 5 MHz.

Here, generating the bootstrap may comprise assigning 11 to the system bandwidth field for the case in which the system bandwidth is greater than 8 MHz.

Here, generating the bootstrap may comprise assigning 14 to the baseband sampling rate coefficient for the case in which the system bandwidth is 10 MHz, assigning 29 to the baseband sampling rate coefficient for the case in which the system bandwidth is 15 MHz, assigning 44 to the baseband sampling rate coefficient for the case in which the system bandwidth is 20 MHz, assigning 59 to the baseband sampling rate coefficient for the case in which the system bandwidth is 25 MHz, and assigning 74 to the baseband sampling rate coefficient for the case in which the system bandwidth is 30 MHz.

Also, in order to accomplish the above objects, an apparatus for receiving a broadcast signal according to the present invention includes a bootstrap restoration unit for restoring a bootstrap for signaling a system bandwidth field, corresponding to a system bandwidth for a post-bootstrap, and a baseband sampling rate coefficient; a preamble restoration unit for restoring a preamble located immediately following the bootstrap in a broadcast signal frame; and a payload restoration unit for restoring one or more subframes located immediately following the preamble in the broadcast signal frame. Here, the preamble may include L1 signaling data, and the L1 signaling data may include a reduced carrier coefficient.

Here, the reduced carrier coefficient may be set such that the ratio of occupied bandwidth to system bandwidth is equal to or greater than 0.92 and is less than 0.98.

Here, the reduced carrier coefficient may include 5 and 6 for the case in which the system bandwidth is 5 MHz.

Here, the reduced carrier coefficient may include an integer that is equal to or greater than 0 and is equal to or less than 6.

Advantageous Effects

According to the present invention, a system frequency band used in a broadcast system may cover a system frequency band used in a communication system for a service based on convergence of a broadcast system and a communication system.

Also, the present invention may provide a new broadcast-signal signaling technique that is compatible with broadcast signal transmission/reception systems according to existing broadcast standards while making a new system frequency band available.

DESCRIPTION OF DRAWINGS

FIG. 30 is a view illustrating insertion of enhanced-layer dummy values when an HTI mode is used along with layered-division multiplexing.

FIG. 33 is a view illustrating the case in which intra-subframe interleaving and inter-subframe interleaving are simultaneously used.

FIG. 35 is a view illustrating the case in which different time-interleaving units are simultaneously used.

FIG. 42 is a view illustrating an example of operation of the twisted block interleaver illustrated in FIG. 38.

FIG. 43 is a view illustrating an example of operation of the convolutional delay line illustrated in FIG. 38.

FIG. 44 is a view illustrating an example of a decoding process corresponding to the operation illustrated in FIG. 43.

FIG. 46 is a view illustrating another example of operation of the twisted block interleaver illustrated in FIG. 38.

FIG. 47 is a view illustrating another example of operation of the convolutional delay line illustrated in FIG. 38.

FIG. 48 is a view illustrating an example of a decoding process corresponding to the operation illustrated in FIG. 47.

FIG. 50 is a view illustrating the initialization values of FIFO registers included in a convolutional delay line.

FIG. 53 is a view illustrating layered-division-multiplexed physical-layer pipes before time interleaving.

FIG. 54 is a view illustrating layered-division-multiplexed physical-layer pipes after time interleaving.

BEST MODE

Figure 1:
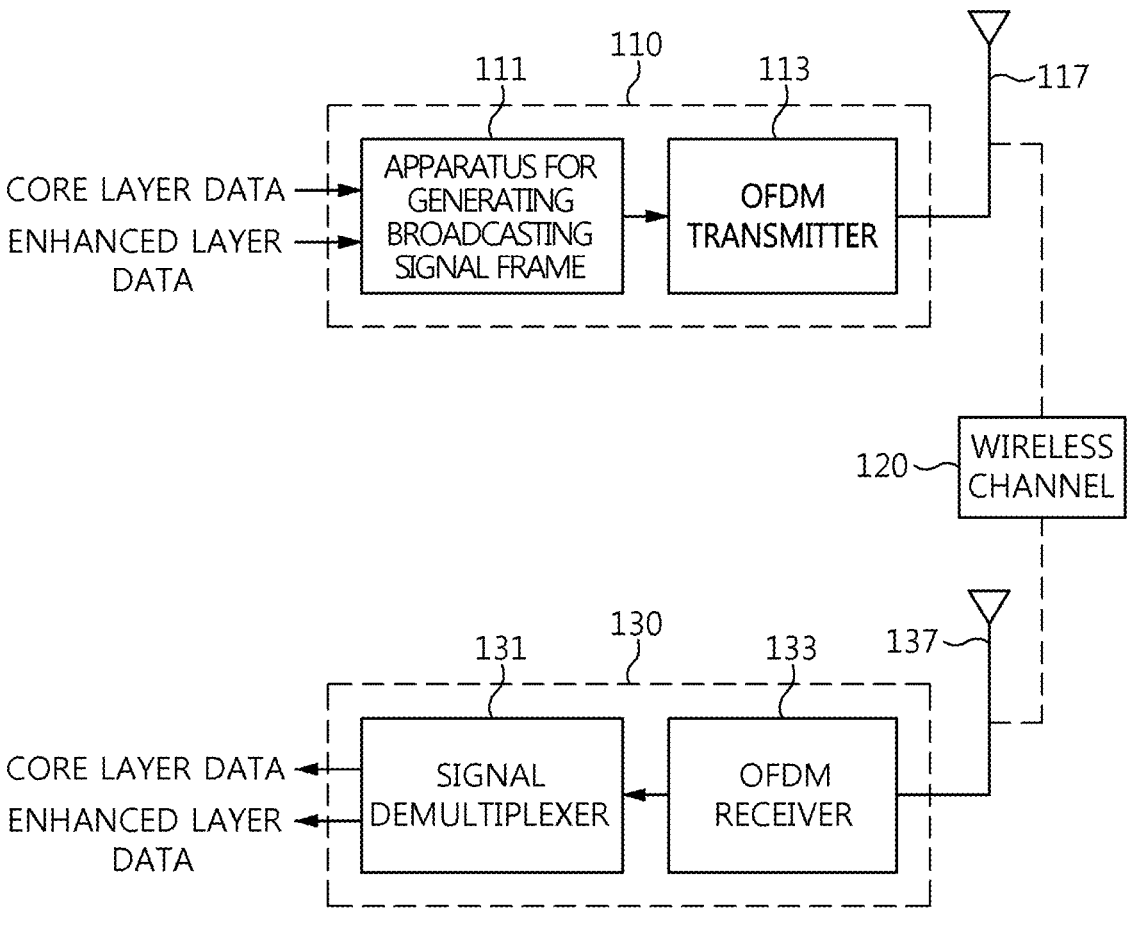
FIG. 1 is a block diagram illustrating a broadcast signal transmission/reception system according to an embodiment of the present invention.

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

FIG. 1 is a block diagram illustrating a broadcast signal transmission/reception system according to an embodiment of the present invention.

Referring to FIG. 1, the broadcast signal transmission/reception system according to an embodiment of the present invention includes a broadcast signal transmission apparatus 110, a wireless channel 120, and a broadcast signal reception apparatus 130.

The broadcast signal transmission apparatus 110 includes a broadcast signal frame generation device 111, which generates a broadcast signal frame by multiplexing core-layer data and enhanced-layer data, and an OFDM transmitter 113.

The broadcast signal frame generation device 111 combines a core-layer signal, corresponding to core-layer data, with an enhanced-layer signal, corresponding to enhanced-layer data, performs power normalizing for reducing power of the combined signal to power corresponding to the core-layer signal, and performs time interleaving after power normalizing, thereby generating a time-interleaved signal. Here, the core-layer signal and the enhanced-layer signal may be combined at different power levels. Here, time interleaving may be applied both to the core-layer signal and to the enhanced-layer signal. Here, the broadcast signal frame generation device 111 may generate a broadcast signal frame, including a bootstrap and a preamble, using the time-interleaved signal. Here, the broadcast signal frame may be an ATSC 3.0 frame.

Here, the preamble may be used to signal the start position information and the size information of each of Physical-Layer Pipes (PLPs).

Here, the Physical-Layer Pipes (PLPs) may include a core-layer physical-layer pipe corresponding to the core-layer signal and an enhanced-layer physical-layer pipe corresponding to the enhanced-layer signal.

Here, injection-level information corresponding to the enhanced-layer signal may be signaled so as to correspond to the enhanced-layer physical-layer pipe.

According to an embodiment, the broadcast signal frame generation device 111 may generate a broadcast signal frame by performing time interleaving on a single-layer signal (a BICM output signal), rather than combining signals of two layers.

Here, the preamble may be used to signal a time-interleaving mode corresponding to a time interleaver for each of all physical-layer pipes.

Here, the physical-layer pipes may include a single enhanced-layer physical-layer pipe and multiple core-layer physical-layer pipes, which are layered-division-multiplexed with the single enhanced-layer physical-layer pipe.

Here, a time-interleaving mode corresponding to the enhanced-layer physical-layer pipe may be the same as time-interleaving modes corresponding to the core-layer physical-layer pipes, with which the enhanced-layer physical-layer pipe is layered-division-multiplexed.

Here, all of the time-interleaving modes corresponding to the core-layer physical-layer pipes, with which the enhanced-layer physical-layer pipe is layered-division-multiplexed, may be a mode in which no time interleaving is performed or a hybrid time-interleaving mode.

Here, when all of the time-interleaving modes corresponding to the core-layer physical-layer pipes, with which the enhanced-layer physical-layer pipe is layered-division-multiplexed, are hybrid time-interleaving modes, all of the core-layer physical-layer pipes may use an intra-subframe interleaving mode.

Here, when all of the time-interleaving modes corresponding to the core-layer physical-layer pipes, with which the enhanced-layer physical-layer pipe is layered-division-multiplexed, are modes in which no time interleaving is performed, each of the core-layer physical-layer pipes may be formed of an integer number of FEC blocks in each subframe.

Here, the subframe may be generated by first filling all of available data cells thereof with dummy modulation values and overwriting the dummy modulation values with actual physical-layer pipe data.

Here, the dummy modulation values may be generated using a scrambling sequence, which is generated using a generator polynomial corresponding to $1+X+X^3+X^6+X^7+X^{11}+X^{12}+X^{13}+X^{16}$.

Here, the dummy modulation values may be generated by mapping the value of the scrambling sequence to one of two phases that are separated by 180 degrees.

Here, the scrambling sequence may be generated using 8 bits generated using the third-bit output $x^{14}$, the fourth-bit output $x^{13}$, the fifth-bit output $x^{12}$, the sixth-bit output $x^{11}$, the tenth-bit output $x^7$, the thirteenth-bit output $x^4$, the fourteenth-bit output $x^3$, and the sixteenth-bit output x of a shift register, which is initialized to a value of 0xF180.

Here, the physical-layer pipes may include multiple core-layer physical-layer pipes corresponding to one complete delivered product, and the core-layer physical-layer pipes may not be layered-division-multiplexed.

Here, each of the core-layer physical-layer pipes may use any one of a mode in which no time interleaving is performed and a hybrid time-interleaving mode, and may not use a convolutional time-interleaving mode.

Here, when all of the time-interleaving modes corresponding to the core-layer physical-layer pipes are hybrid time-interleaving modes, all of the core-layer physical-layer pipes may use an intra-subframe interleaving mode or an inter-subframe interleaving mode.

Here, when all of the time-interleaving modes corresponding to the core-layer physical-layer pipes are hybrid time-interleaving modes, all of the core-layer physical-layer pipes may have the same value as the value of L1D_plp_HTI_inter_subframe.

Here, when all of the time-interleaving modes corresponding to the core-layer physical-layer pipes are hybrid time-interleaving modes and when all of the core-layer physical-layer pipes use an inter-subframe interleaving mode, the core-layer physical-layer pipes may use the same time-interleaving unit $N_{IU}$.

Here, when at least one of the time-interleaving modes corresponding to the core-layer physical-layer pipes is a mode in which no time interleaving is performed, all of the core-layer pipes configured to use a hybrid time-interleaving mode, among the core-layer pipes, may use an intra-subframe interleaving mode.

Here, one complete delivered product may correspond to one or more subframes, and the subframes may be generated by first filling all of available data cells thereof with dummy modulation values and overwriting the dummy modulation values with actual physical-layer pipe data.

Here, time interleaving uses one of time interleaver groups, and the boundary between the time interleaver groups may be the boundary between the Physical-Layer Pipes (PLPs) of the core layer corresponding to the core-layer signal. That is, one of the boundaries between the physical-layer pipes of the core layer may be the boundary between the time interleaver groups.

Here, enhanced-layer data corresponding to one of the time interleaver groups may include dummy values.

Here, the dummy values may be inserted after the actual data cells of the last Enhanced PLP in a PLP group such that the total number of enhanced-layer cells in the PLP group becomes equal to the total number of core-layer cells in the PLP group.

Here, the dummy values may not be inserted into the core-layer data.

Here, the dummy values may be inserted after core-layer BICM and enhanced-layer BICM are completed and before the core-layer signal and the enhanced-layer signal are combined.

Here, the dummy values may correspond to a preset scrambling sequence.

Here, the scrambling sequence may be modulated using the constellation mapping that was used for the last enhanced PLP.

Here, the dummy values may have the same power as the last enhanced PLP.

Here, the scrambling sequence may be generated using a 16-bit shift register corresponding to a preset generator polynomial.

Here, the scrambling sequence may be generated using a generator polynomial corresponding to $1+X+X^3+X^6+X^7+X^{11}+X^{12}+X^{13}+X^{16}$.

Here, the scrambling sequence may be generated using 8 bits generated using the third-bit output $x^{14}$, the fourth-bit output $x^{13}$, the fifth-bit output $x^{12}$, the sixth-bit output $x^{11}$, the tenth-bit output $x^7$, the thirteenth-bit output $x^4$, the fourteenth-bit output $x^3$, and the sixteenth-bit output x of the shift register, which is initialized to a value of 0xF180 (1111 0001 1000 0000).

The OFDM transmitter 113 transmits the generated broadcast signal frame using an OFDM communication method via an antenna 117 such that the transmitted OFDM signal is received via the antenna 137 of the broadcast signal reception apparatus 130 through the wireless channel 120.

The broadcast signal reception apparatus 130 includes an OFDM receiver 133 and a signal-demultiplexing device 131. When the signal transmitted through the wireless channel 120 is received via the antenna 137, the OFDM receiver 133 receives the OFDM signal through synchronization, channel estimation, and equalization processes.

Here, the OFDM receiver 133 may demodulate a bootstrap by detecting the same in the OFDM signal, demodulate a preamble using information included in the bootstrap, and demodulate a superimposed payload using information included in the preamble.

The signal-demultiplexing device 131 first restores core-layer data from the signal (the superimposed payload) received through the OFDM receiver 133, and restores enhanced-layer data through cancellation of the restored core-layer data. Here, the signal-demultiplexing device 131 may first generate a broadcast signal frame, restore a bootstrap from the broadcast signal frame, restore a preamble using information included in the bootstrap, and use signaling information included in the preamble in order to restore a data signal. Here, the signaling information may be L1 signaling information, and may include injection-level information, normalizing factor information, and the like.

Here, the preamble may include a time-interleaving mode corresponding to a time interleaver for each of all physical-layer pipes.

Here, the preamble may include PLP identification information for identifying the Physical-Layer Pipes (PLPs) and layer identification information for identifying layers corresponding to division of layers.

Here, the PLP identification information and the layer identification information may be included in the preamble as separate fields.

Here, time interleaver information may be included in the preamble based on a core layer.

Here, the preamble may selectively include injection-level information corresponding to an injection-level controller depending on the result of comparing the layer identification information with a preset value for each of the physical-layer pipes.

Here, the preamble may include the type information, the start position information, and the size information of the physical-layer pipes.

Here, the type information may be used to identify any one of a first type, corresponding to a non-dispersed physical-layer pipe, and a second type, corresponding to a dispersed physical-layer pipe.

Here, the non-dispersed physical-layer pipe may be assigned for contiguous data cell indices, and the dispersed physical-layer pipe may be formed of two or more subslices.

Here, the type information may be selectively signaled depending on the result of comparing the layer identification information with a preset value for each of the physical-layer pipes.

Here, the type information may be signaled only for the core layer.

Here, the start position information may be set to be the same as the index corresponding to the first data cell of the physical-layer pipe.

Here, the start position information may indicate the start position of the physical-layer pipe using a cell-addressing scheme.

Here, the start position information may be included in the preamble for each of the physical-layer pipes without evaluation of a conditional statement corresponding to the layer identification information.

Here, the size information may be set based on the number of data cells assigned to the physical-layer pipe.

Here, the size information may be included in the pre-amble for each of the physical-layer pipes without evaluation of a conditional statement corresponding to the layer identification information.

Here, the time interleaver information may be signaled based on the core layer.

Here, the time interleaver may be a hybrid time interleaver. Here, the Physical-Layer Pipes (PLPs) of the core layer and the enhanced layer may include only complete FEC blocks.

Here, when the boundary between time interleaver groups does not match the boundary between FEC blocks of the enhanced layer, the preamble may be used to signal information for identifying the portion of the FEC block of the enhanced layer corresponding to the boundary between the time interleaver groups.

Here, the information for identifying the portion of the FEC block may include one or more of start position information of the physical-layer pipe of the core layer, start position information of the physical-layer pipe of the enhanced layer, modulation information corresponding to the enhanced layer, or FEC-type information corresponding to the enhanced layer, or a combination thereof.

Here, the start position information of the physical-layer pipe may correspond to the index of the first data cell of the physical-layer pipe.

Here, the modulation information may be signaled only when the FEC-type information satisfies preset conditions.

Here, an enhanced-layer signal may correspond to enhanced-layer data, which is restored based on cancellation corresponding to restoration of core-layer data corresponding to the core-layer signal.

Here, the time interleaver may correspond to a convolutional time interleaver, the time interleaver groups may include a Physical-Layer Pipe (PLP) including an incomplete FEC block, and the preamble may be used to signal the start position information of a first complete FEC block in the physical-layer pipe.

Here, the time interleaver may perform interleaving using one of multiple operation modes.

Here, the operation modes may include a first mode for skipping time interleaving, a second mode for performing convolutional time interleaving, and a third mode for performing hybrid time interleaving.

Here, the preamble may include a field indicating the start position of the first complete FEC block corresponding to the current physical-layer pipe for the first and second modes, but may not include a field indicating the start position of the first FEC block for the third mode. Here, the field indicating the start position may indicate the start position of the first FEC block that starts within the current physical-layer pipe during the current subframe.

Here, the field indicating the start position of the first FEC block may be any one of a first field used in the first mode and a second field used in the second mode, and the first field and the second field may have different lengths.

Here, the length of the second field may be greater than the length of the first field.

Here, the length of the first field may be determined based on the length of an LDPC codeword and a modulation order, and the length of the second field may be determined by further considering the depth of the convolutional time interleaver, as well as the length of the LDPC codeword and the modulation order.

Here, the length of the first field may be 15 bits, and the length of the second field may be 22 bits.

Here, the first field and the second field may be signaled separately for each of the core layer, corresponding to the core-layer signal, and the enhanced layer, corresponding to the enhanced-layer signal.

Although described later, the broadcast signal frame generation device 111 illustrated in FIG. 1 may include a combiner for generating a multiplexed signal by combining a core-layer signal with an enhanced-layer signal, a power normalizer for performing power normalizing for reducing the power of the multiplexed signal to power corresponding to the core-layer signal, a time interleaver for generating a time-interleaved signal by performing time interleaving after power normalizing is performed, and a frame builder for generating a broadcast signal frame including a preamble for signaling start position information and size information of each of Physical-Layer Pipes (PLPs). Here, the physical-layer pipes may include a core-layer physical-layer pipe, corresponding to the core-layer signal, and an enhanced-layer physical-layer pipe, corresponding to the enhanced-layer signal. Here, injection-level information corresponding to the enhanced-layer signal may be signaled so as to correspond to the enhanced-layer physical-layer pipe. Here, the time interleaver may use one of time interleaver groups, and enhanced-layer data corresponding to one of the time interleaver groups may include dummy values. Here, the broadcast signal transmission apparatus 110 illustrated in FIG. 1 can be seen as including a combiner for generating a multiplexed signal by combining a core-layer signal with an enhanced-layer signal, a power normalizer for performing power normalizing for reducing the power of the multiplexed signal to power corresponding to the core-layer signal, a time interleaver for generating a time-interleaved signal by performing time interleaving after power normalizing is performed, a frame builder for generating a broadcast signal frame including a preamble for signaling start position information and size information of each of Physical-Layer Pipes (PLPs), and an OFDM transmitter for transmitting the broadcast signal frame using an OFDM communication method via an antenna. Here, the physical-layer pipes may include a core-layer physical-layer pipe, corresponding to the core-layer signal, and an enhanced-layer physical-layer pipe, corresponding to the enhanced-layer signal. Here, injection-level information corresponding to the enhanced-layer signal may be signaled so as to correspond to the enhanced-layer physical-layer pipe. Here, the time interleaver may use one of time interleaver groups, and enhanced-layer data corresponding to one of the time interleaver groups may include dummy values.

According to an embodiment, the broadcast signal frame generation device 111 illustrated in FIG. 1 may alternatively include a time interleaver, for generating a time-interleaved signal by performing time interleaving on a BICM output signal in the case of a single layer, and a frame builder, for generating a broadcast signal frame including a preamble for signaling start position information and size information of each of Physical-Layer Pipes (PLPs). Here, the physical-layer pipes may include a core-layer physical-layer pipe, corresponding to the core-layer signal, and an enhanced-layer physical-layer pipe, corresponding to the enhanced-layer signal. Here, injection-level information corresponding to the enhanced-layer signal may be signaled so as to correspond to the enhanced-layer physical-layer pipe. Here, the BICM output signal may be a signal output from the BICM device to be described later. Here, the broadcast signal transmission apparatus 110 illustrated in FIG. 1 can be seen as including a time interleaver for generating a time-interleaved signal by performing time interleaving on a BICM output signal, a frame builder for generating a broadcast signal frame including a preamble for signaling start position information and size information of each of Physical-Layer Pipes (PLPs), and an OFDM transmitter for transmitting the broadcast signal frame using an OFDM communication method via an antenna. Here, the physical-layer pipes may include a core-layer physical-layer pipe, corresponding to the core-layer signal, and an enhanced-layer physical-layer pipe, corresponding to the enhanced-layer signal. Here, injection-level information corresponding to the enhanced-layer signal may be signaled so as to correspond to the enhanced-layer physical-layer pipe.

The signal-demultiplexing device illustrated in FIG. 1, which will be described in detail later, may include a time deinterleaver for generating a time-deinterleaved signal by applying time deinterleaving to a received signal corresponding to a broadcast signal frame, a de-normalizer for increasing the power of the received signal or the time-deinterleaved signal by the magnitude of the power reduction performed by the power normalizer of a transmitter, a core-layer BICM decoder for restoring core-layer data from the signal, the power of which is adjusted by the de-normalizer, an enhanced-layer symbol extractor for extracting an enhanced-layer signal by performing cancellation corresponding to the core-layer data for the signal, the power of which is adjusted by the de-normalizer, using the output signal of the core layer FEC decoder of the core-layer BICM decoder, a de-injection-level controller for increasing the power of the enhanced-layer signal by the magnitude of the power reduction performed by the injection-level controller of the transmitter, and an enhanced-layer BICM decoder for restoring enhanced-layer data using the output signal of the de-injection-level controller. Here, the broadcast signal reception apparatus 130 illustrated in FIG. 1 can be seen as including an OFDM receiver for generating a received signal by performing one or more of synchronization, channel estimation, or equalization, or a combination thereof for a transmitted signal corresponding to a broadcast signal frame, a time deinterleaver for generating a time-deinterleaved signal by applying time deinterleaving to the received signal, a de-normalizer for increasing the power of the received signal or the time-deinterleaved signal by the magnitude of the power reduction performed by the power normalizer of a transmitter, a core-layer BICM decoder for restoring core-layer data from the signal, the power of which is adjusted by the de-normalizer, an enhanced-layer symbol extractor for extracting an enhanced-layer signal by performing cancellation corresponding to the core-layer data for the signal, the power of which is adjusted by the de-normalizer, using the output signal of the core layer FEC decoder of the core-layer BICM decoder, a de-injection-level controller for increasing the power of the enhanced-layer signal by the magnitude of the power reduction performed by the injection-level controller of the transmitter, and an enhanced-layer BICM decoder for restoring enhanced-layer data using the output signal of the de-injection-level controller.

Here, the time deinterleaver may use one of time interleaver groups, and enhanced-layer data corresponding to one of the time interleaver groups may include dummy values.

Here, the time deinterleaver may correspond to a time-interleaving mode.

Here, a preamble may include a time-interleaving mode corresponding to a time interleaver for each of all physical-layer pipes.

Although not explicitly illustrated in FIG. 1, the broadcast signal transmission/reception system according to an embodiment of the present invention may multiplex/demultiplex one or more pieces of extension-layer data in addition to core-layer data and enhanced-layer data. Here, the extension-layer data may be multiplexed at a power level lower than the power levels of the core-layer data and the enhanced-layer data. Furthermore, when two or more extension layers are included, the injection power level of the second extension layer may be lower than the injection power level of the first extension layer, and the injection power level of the third extension layer may be lower than the injection power level of the second extension layer.

Figure 2:
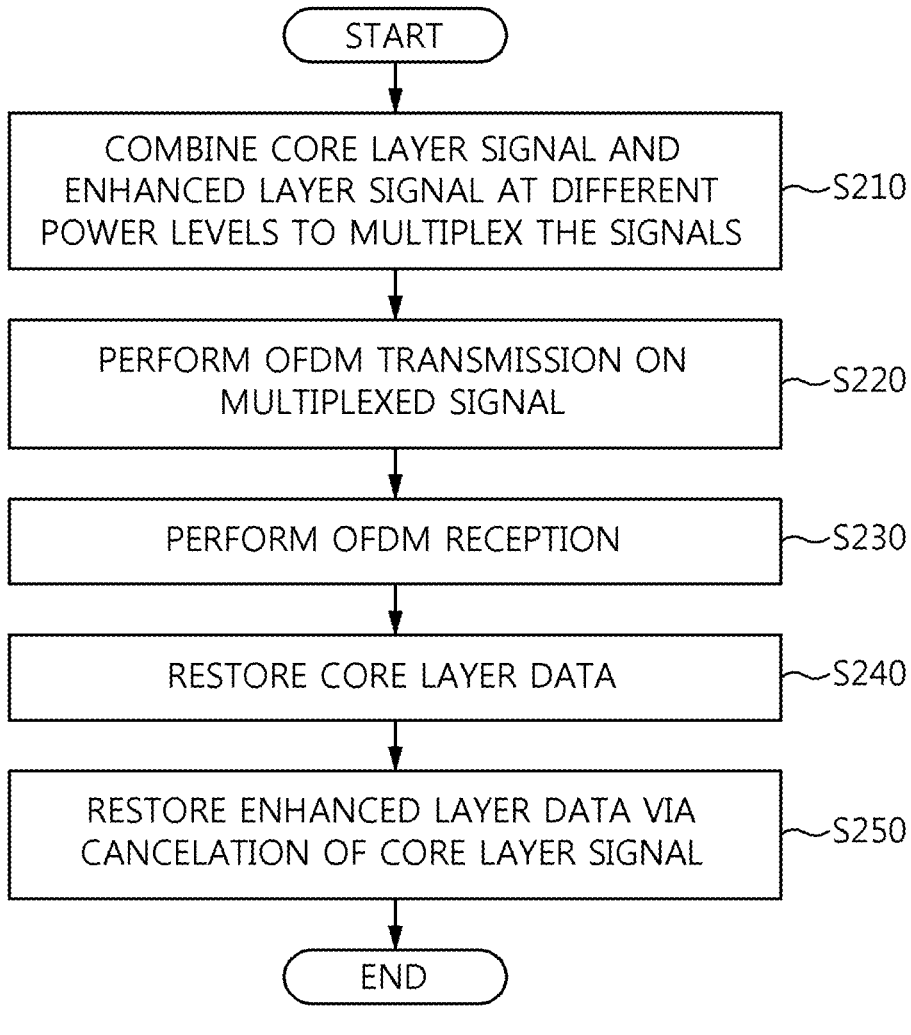
FIG. 2 is a flowchart illustrating a broadcast signal transmission/reception method according to an embodiment of the present invention.

FIG. 2 is a flowchart illustrating a method for transmitting/receiving a broadcast signal according to an embodiment of the present invention.

Referring to FIG. 2, in the method for transmitting/receiving a broadcast signal according to an embodiment of the present invention, a core-layer signal and an enhanced-layer signal are combined and multiplexed, whereby a broadcast signal frame is generated at step S210. Here, the core-layer signal and the enhanced-layer signal may be combined at different power levels. Here, the broadcast signal frame may be generated by performing time interleaving, and a preamble may include a time-interleaving mode corresponding to time interleaving for each of all physical-layer pipes. According to an embodiment, at step S210, a time-interleaved signal may be generated by performing time interleaving on a BICM output signal, and a broadcast signal frame including a preamble for signaling a time-interleaving mode corresponding to time interleaving for each of all physical-layer pipes may be generated.

Here, the preamble may be used to signal the start position information and the size information of each of the Physical-Layer Pipes (PLPs). Here, the physical-layer pipes may include a core-layer physical-layer pipe, corresponding to the core-layer signal, and an enhanced-layer physical-layer pipe, corresponding to the enhanced-layer signal.

Here, the physical-layer pipes may include multiple core-layer physical-layer pipes corresponding to one complete delivered product, and the core-layer physical-layer pipes may not be layered-division-multiplexed.

Here, each of the core-layer physical-layer pipes may use any one of a mode in which no time interleaving is performed and a hybrid time-interleaving mode, and may not use a convolutional time-interleaving mode.

Here, when all of the time-interleaving modes corresponding to the core-layer physical-layer pipes are hybrid time-interleaving modes, all of the core-layer physical-layer pipes may use an intra-subframe interleaving mode or an inter-subframe interleaving mode.

Here, when all of the time-interleaving modes corresponding to the core-layer physical-layer pipes are hybrid time-interleaving modes, all of the core-layer physical-layer pipes may have the same value as the value of L1D_plp_HTI_inter_subframe.

Here, when all of the time-interleaving modes corresponding to the core-layer physical-layer pipes are hybrid time-interleaving modes and when all of the core-layer physical-layer pipes use an inter-subframe interleaving mode, the core-layer physical-layer pipes may use the same time-interleaving unit $N_{IU}$.

Here, when at least one of the time-interleaving modes corresponding to the core-layer physical-layer pipes is a mode in which no time interleaving is performed, all of the core layer pipes configured to use a hybrid time-interleaving mode, among the core-layer pipes, may use an intra-subframe interleaving mode.

Here, one complete delivered product may correspond to one or more subframes, and the subframes may be generated by first filling all of available data cells thereof with dummy modulation values and overwriting the dummy modulation values with actual physical-layer pipe data.

Here, the dummy modulation values may be generated using a scrambling sequence, which is generated using a generator polynomial corresponding to $1+X+X^3+X^6+X^7+X^{11}+X^{12}+X^{13}+X^{16}$.

Here, the dummy modulation values may be generated by mapping the value of the scrambling sequence to one of two phases that are separated by 180 degrees.

Here, the physical-layer pipes may include a single enhanced-layer physical-layer pipe and multiple core-layer physical-layer pipes, which are layered-division-multiplexed with the single enhanced-layer physical-layer pipe.

Here, a time-interleaving mode corresponding to the enhanced-layer physical-layer pipe may be the same as time-interleaving modes corresponding to the core-layer physical-layer pipes, with which the enhanced-layer physical-layer pipe is layered-division-multiplexed.

Here, all of the time-interleaving modes corresponding to the core-layer physical-layer pipes, with which the enhanced-layer physical-layer pipe is layered-division-multiplexed, may be a mode in which no time interleaving is performed or a hybrid time-interleaving mode.

Here, when all of the time-interleaving modes corresponding to the core-layer physical-layer pipes, with which the enhanced-layer physical-layer pipe is layered-division-multiplexed, are hybrid time-interleaving modes, all of the core-layer physical-layer pipes may use an intra-subframe interleaving mode.

Here, when all of the time-interleaving modes corresponding to the core-layer physical-layer pipes, with which the enhanced-layer physical-layer pipe is layered-division-multiplexed, are modes in which no time interleaving is performed, each of the core-layer physical-layer pipes may be formed of an integer number of FEC blocks in each subframe.

Here, the subframe may be generated by first filling all of available data cells thereof with dummy modulation values and overwriting the dummy modulation values with actual physical-layer pipe data.

Here, the dummy modulation values may be generated using a scrambling sequence, which is generated using a generator polynomial corresponding to $1+X+X^3+X^6+X^7+X^{11}+X^{12}+X^{13}+X^{16}$.

Here, the dummy modulation values may be generated by mapping the value of the scrambling sequence to one of two phases that are separated by 180 degrees.

Here, the scrambling sequence may be generated using 8 bits generated using the third-bit output $x^{14}$, the fourth-bit output $x^{13}$, the fifth-bit output $x^{12}$, the sixth-bit output $x^{11}$, the tenth-bit output $x^7$, the thirteenth-bit output $x^4$, the fourteenth-bit output $x^3$, and the sixteenth-bit output x of a shift register, which is initialized to a value of 0xF180.

Here, the broadcast signal frame generated at step S210 may include a bootstrap, a preamble, and a superimposed payload. Here, one or more of the bootstrap, or the preamble, or a combination thereof may include L1 signaling information. Here, the L1 signaling information may include injection-level information and normalizing factor information.

Here, the preamble may include PLP identification information for identifying Physical-Layer Pipes (PLPs) and layer identification information for identifying layers corresponding to division of layers.

Here, the PLP identification information and the layer identification information may be included in the preamble as separate fields.

Here, time interleaver information may be included in the preamble based on a core layer.

Here, the preamble may selectively include injection-level information corresponding to an injection-level controller depending on the result of comparing the layer identification information with a preset value for each of the physical-layer pipes.

Here, the preamble may include the type information, the start position information, and the size information of the physical-layer pipes.

Here, the type information may be used to identify any one of a first type, corresponding to a non-dispersed physical-layer pipe, and a second type, corresponding to a dispersed physical-layer pipe.

Here, the non-dispersed physical-layer pipe may be assigned for contiguous data cell indices, and the dispersed physical-layer pipe may be formed of two or more subslices.

Here, the type information may be selectively signaled depending on the result of comparing the layer identification information with a preset value for each of the physical-layer pipes.

Here, the type information may be signaled only for the core layer.

Here, the start position information may be set to be the same as the index corresponding to the first data cell of the physical-layer pipe.

Here, the start position information may indicate the start position of the physical-layer pipe using a cell-addressing scheme.

Here, the start position information may be included in the preamble for each of the physical-layer pipes without evaluation of a conditional statement corresponding to the layer identification information.

Here, the size information may be set based on the number of data cells assigned to the physical-layer pipe.

Here, the size information may be included in the preamble for each of the physical-layer pipes without evaluation of a conditional statement corresponding to the layer identification information.

Here, the time interleaver information may be signaled based on the core layer.

Here, at the step of generating a time-interleaved signal, interleaving may be performed using a hybrid time interleaver. Here, the Physical-Layer Pipes (PLPs) of the core layer and the enhanced layer may include only complete FEC blocks.

Here, when the boundary between time interleaver groups does not match the boundary between FEC blocks of the enhanced layer, the preamble may be used to signal information for identifying the portion of the FEC block of the enhanced layer corresponding to the boundary between the time interleaver groups.

Here, the information for identifying the portion of the FEC block may include one or more of start position information of the physical-layer pipe of the core layer, start position information of the physical-layer pipe of the enhanced layer, modulation information corresponding to the enhanced layer, or FEC-type information corresponding to the enhanced layer, or a combination thereof.

Here, the start position information of the physical-layer pipe may correspond to the index of the first data cell of the physical-layer pipe.

Here, the modulation information may be signaled only when the FEC-type information satisfies preset conditions.

Here, the enhanced-layer signal may correspond to enhanced-layer data, which is restored based on cancellation corresponding to restoration of core-layer data corresponding to the core-layer signal.

Here, at the step of generating a time-interleaved signal, interleaving may be performed using a convolutional time interleaver, the time interleaver groups may include a Physical-Layer Pipe (PLP) including an incomplete FEC block, and the preamble may be used to signal the start position information of a first complete FEC block in the physical-layer pipe.

Here, interleaving uses one of the time interleaver groups, and enhanced-layer data corresponding to one of the time interleaver groups may include dummy values.

Here, the dummy values may be inserted after the actual data cells of the last Enhanced PLP in a PLP group such that the total number of enhanced-layer cells in the PLP group becomes equal to the total number of core-layer cells in the PLP group.

Here, the dummy values may not be inserted into the core-layer data.

Here, the dummy values may be inserted after core-layer BICM and enhanced-layer BICM are completed and before the core-layer signal and the enhanced-layer signal are combined.

Here, the dummy values may correspond to a preset scrambling sequence.

Here, the scrambling sequence may be modulated using the constellation mapping that was used for the last enhanced PLP.

Here, the dummy values may have the same power as the last enhanced PLP.

Here, the scrambling sequence may be generated using a 16-bit shift register corresponding to a preset generator polynomial.

Here, the scrambling sequence may be generated using a generator polynomial corresponding to $1+X+X^3+X^6+X^7+X^{11}+X^{12}+X^{13}+X^{16}$.

Here, the scrambling sequence may be generated using 8 bits generated using the third-bit output $x^{14}$, the fourth-bit output $x^{13}$, the fifth-bit output $x^{12}$, the sixth-bit output $x^{11}$, the tenth-bit output $x^7$, the thirteenth-bit output $x^4$, the fourteenth-bit output $x^3$, and the sixteenth-bit output x of the shift register, which is initialized to a value of 0xF180.

Here, interleaving may be performed using one of multiple operation modes.

Here, the operation modes may include a first mode for skipping time interleaving, a second mode for performing convolutional time interleaving, and a third mode for performing hybrid time interleaving.

Here, the preamble may include a field indicating the start position of the first complete FEC block corresponding to the current physical-layer pipe for the first and second modes, but may not include a field indicating the start position of the first FEC block for the third mode.

Here, the field indicating the start position of the first FEC block may be any one of a first field used in the first mode and a second field used in the second mode, and the first field and the second field may have different lengths.

Here, the length of the second field may be greater than the length of the first field.

Here, the length of the first field may be determined based on the length of an LDPC codeword and a modulation order, and the length of the second field may be determined by further considering the depth of the convolutional time interleaver, as well as the length of the LDPC codeword and the modulation order.

Here, the length of the first field may be 15 bits, and the length of the second field may be 22 bits.

Here, the first field and the second field may be signaled separately for each of the core layer, corresponding to the core-layer signal, and the enhanced layer, corresponding to the enhanced-layer signal.

Also, in the method for transmitting/receiving a broadcast signal according to an embodiment of the present invention, the broadcast signal frame is transmitted based on OFDM at step S220.

Also, in the method for transmitting/receiving a broadcast signal according to an embodiment of the present invention, the transmitted signal is received based on OFDM at step S230.

Here, at step S230, synchronization, channel estimation, and equalization processes may be performed.

Here, at step S230, a bootstrap may be restored, a preamble may be restored using a signal included in the restored bootstrap, and a data signal may be restored using signaling information included in the preamble.

Also, in the method for transmitting/receiving a broadcast signal according to an embodiment of the present invention, core-layer data is restored from the received signal at step S240.

Also, in the method for transmitting/receiving a broadcast signal according to an embodiment of the present invention, enhanced-layer data is restored through cancellation of a core-layer signal at step S250.

Particularly, step S240 and step S250 illustrated in FIG. 2 may be a demultiplexing operation corresponding to step S210.

Although described later, step S210 illustrated in FIG. 2 can be seen as including generating a time-interleaved signal by performing time interleaving on a BICM output signal in the case of a single layer and generating a broadcast signal frame including a preamble for signaling a time-interleaving mode corresponding to time interleaving for each of all physical-layer pipes. Here, the broadcast signal transmission method of step S210 and step S220 can be seen as including generating a time-interleaved signal by performing time interleaving on a BICM output signal in the case of a single layer, generating a broadcast signal frame including a preamble for signaling a time-interleaving mode corresponding to time interleaving for each of all physical-layer pipes, and transmitting the broadcast signal frame using an OFDM communication method via an antenna.

Although described later, step S210 illustrated in FIG. 2 may include generating a multiplexed signal by combining a core-layer signal with an enhanced-layer signal, performing power normalizing for reducing the power of the multiplexed signal to power corresponding to the core-layer signal, generating a time-interleaved signal by performing time interleaving after power normalizing is performed, and generating a broadcast signal frame including a preamble for signaling a time-interleaving mode corresponding to time interleaving for each of all physical-layer pipes. Here, time interleaving uses one of time interleaver groups, and enhanced-layer data corresponding to one of the time interleaver groups may include dummy values. Here, the broadcast signal transmission method of step S210 and step S220 can be seen as including generating a multiplexed signal by combining a core-layer signal with an enhanced-layer signal, performing power normalizing for reducing the power of the multiplexed signal to power corresponding to the core-layer signal, generating a time-interleaved signal by performing time interleaving after power normalizing is performed, generating a broadcast signal frame including a preamble for signaling a time-interleaving mode corresponding to time interleaving for each of all physical-layer pipes, and transmitting the broadcast signal frame using an OFDM communication method via an antenna. Here, time interleaving uses one of time interleaver groups, and enhanced-layer data corresponding to one of the time interleaver groups may include dummy values.

Although described later, steps S240 and S250 illustrated in FIG. 2 may include generating a time-deinterleaved signal by applying time deinterleaving to a received signal corresponding to a broadcast signal frame, increasing the power of the received signal or the time-deinterleaved signal by the magnitude of the power reduction performed by the power normalizer of a transmitter, restoring core-layer data from the signal, the power of which is adjusted, extracting an enhanced-layer signal by performing cancellation corresponding to the core-layer data for the signal, the power of which is adjusted, increasing the power of the enhanced-layer signal by the magnitude of the power reduction performed by the injection-level controller of the transmitter, and restoring enhanced-layer data using the enhanced-layer signal, the power of which is adjusted. Here, the broadcast signal reception method according to an embodiment of the present invention can be seen as including generating a received signal by performing one or more of synchronization, channel estimation, or equalization, or a combination thereof for a transmitted signal corresponding to a broadcast signal frame, generating a time-deinterleaved signal by applying time deinterleaving to the received signal, increasing the power of the received signal or the time-deinterleaved signal by the magnitude of the power reduction performed by the power normalizer of a transmitter, restoring core-layer data from the signal, the power of which is adjusted, extracting an enhanced-layer signal by performing cancellation corresponding to the core-layer data for the signal, the power of which is adjusted, increasing the power of the enhanced-layer signal by the magnitude of the power reduction performed by the injection-level controller of the transmitter, and restoring enhanced-layer data using the enhanced-layer signal, the power of which is adjusted.

Here, time deinterleaving may correspond to a time-interleaving mode.

Here, a preamble may include a time-interleaving mode corresponding to time interleaving for each of all physical-layer pipes.

Here, time deinterleaving may perform deinterleaving using one of multiple operation modes.

Here, time deinterleaving uses one of time interleaver groups, and enhanced-layer data corresponding to one of the time interleaver groups may include dummy values.

Figure 3:
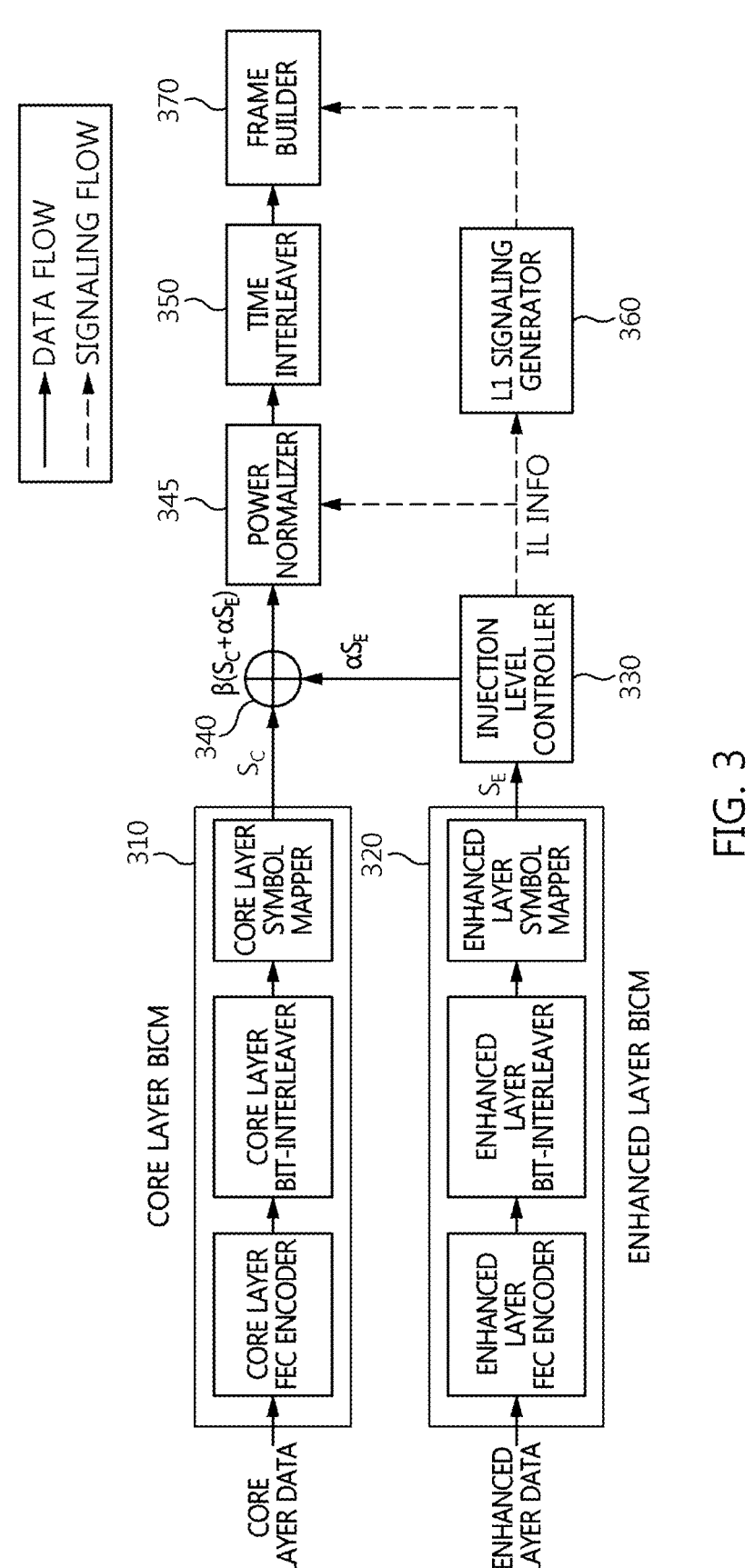
FIG. 3 is a block diagram illustrating an example of the broadcast signal frame generation device illustrated in FIG. 1.

FIG. 3 is a block diagram illustrating an example of the broadcast signal frame generation device illustrated in FIG. 1.

Referring to FIG. 3, the broadcast signal frame generation device according to an embodiment of the present invention may include a core-layer BICM unit 310, an enhanced-layer BICM unit 320, an injection-level controller 330, a combiner 340, a power normalizer 345, a time interleaver 350, a signaling generator 360, and a frame builder 370.

Generally, a Bit-interleaved Coded Modulation (BICM) device includes an error-correction coder, a bit interleaver, and a symbol mapper, and each of the core-layer BICM unit 310 and the enhanced-layer BICM unit 320 illustrated in FIG. 3 may also include an error-correction coder, a bit interleaver, and a symbol mapper. Particularly, each of the error-correction coders (the core layer FEC encoder and the enhanced layer FEC encoder illustrated in FIG. 3) may take a form in which a BCH encoder and an LDPC encoder are connected in series. Here, the input of the error-correction coder is input to the BCH encoder, the output of the BCH encoder is input to the LDPC encoder, and the output of the LDPC encoder may be the output of the error-correction coder.

As illustrated in FIG. 3, core-layer data and enhanced-layer data are combined through the combiner 340 after respectively passing through different BICM units. That is, in the present invention, Layered-Division Multiplexing (LDM) may mean combining multiple layers into a single layer using a power difference and transmitting the same.

That is, core-layer data passing through the core-layer BICM unit 310 and enhanced-layer data passing through the injection-level controller 330 after passing through the enhanced-layer BICM unit 320 are combined by the combiner 340. Here, the enhanced-layer BICM unit 320 may perform BICM encoding that is different from that performed by the core-layer BICM unit 310. That is, the enhanced-layer BICM unit 320 may perform error-correction coding or symbol mapping corresponding to a higher bit rate than that in the core-layer BICM unit 310. Also, the enhanced-layer BICM unit 320 may perform error-correction coding or symbol mapping that are less robust than those in the core-layer BICM unit 310.

For example, the bit rate of the core-layer error-correction coder may be lower than that of the enhanced-layer error-correction coder. Here, the enhanced-layer symbol mapper may be less robust than the core-layer symbol mapper.

The combiner 340 can be seen as combining a core-layer signal and an enhanced-layer signal. Here, the combiner 340 may combine the core-layer signal and the enhanced-layer signal at different power levels. According to an embodiment, power level adjustment may alternatively be performed on the core-layer signal, rather than on the enhanced-layer signal. Here, the power of the core-layer signal may be adjusted so as to be higher than the power of the enhanced-layer signal.

While core-layer data uses a Forward-Error-Correction (FEC) code of a low code rate for robust reception, enhanced-layer data may use an FEC code of a high code rate for a high data transmission rate.

That is, core-layer data may have wider coverage in the same reception environment, compared to enhanced-layer data.

The enhanced-layer data passing through the enhanced-layer BICM unit 320 is combined with the core-layer data by the combiner 340 after the gain (power) thereof is adjusted by the injection-level controller 330.

That is, the injection-level controller 330 generates a power-reduced enhanced-layer signal by reducing the power of the enhanced-layer signal. Here, the magnitude of the signal adjusted by the injection-level controller 330 may be determined depending on an injection level. Here, the injection level in the case in which signal B is injected into signal A may be defined as shown in Equation (1) below:

$$\text{Injection level(dB)} = -10\log_{10}\left(\frac{\text{Signal Power of } B}{\text{Signal Power of } A}\right) \tag{1}$$

For example, assuming that an injection level is 3 dB when an enhanced-layer signal is injected into a core-layer signal, this indicates that the enhanced-layer signal has a power magnitude corresponding to half the power magnitude of the core-layer signal.

Here, the injection-level controller 300 may adjust the power level of the enhanced-layer signal from 0 dB to 25.0 dB in increments of 0.5 dB or 1 dB.

Generally, the transmission power assigned to a core layer is greater than the transmission power assigned to an enhanced layer, whereby the core layer may be preferentially decoded in a receiver.

Here, the combiner 340 can be seen as generating a multiplexed signal by combining the core-layer signal and the power-reduced enhanced-layer signal.

The signal combined by the combiner 340 is provided to the power normalizer 345 in order to decrease the power by a power increase caused by combining the core-layer signal and the enhanced-layer signal, whereby power adjustment is performed. That is, the power normalizer 345 decreases the power of the signal multiplexed by the combiner 340 to the power level corresponding to the core-layer signal. Because the level of the combined signal is higher than the level of a single-layer signal, power normalizing by the power normalizer 345 is required in order to prevent amplitude clipping in the remaining parts of the broadcast signal transmission/reception system.

Here, the power normalizer 345 multiplies the magnitude of the combined signal by the normalizing factor of Equation (2) below, thereby adjusting the same to a suitable signal magnitude. The injection-level information used to solve Equation (2) below may be transferred to the power normalizer 345 through signaling flow.

$$\text{Normalizing factor} = \left( \sqrt{1 + 10^{-InjectionLevel(dB)/10}} \right)^{-1} \quad (2)$$

Assuming that the power levels of the core-layer signal and the enhanced-layer signal are normalized to 1 when the enhanced-layer signal $S_E$ is injected into the core-layer signal $S_c$ at a preset injection level, the combined signal may be represented as $S_c + \alpha S_E$.

Here, $\alpha$ denotes a scaling factor corresponding to any of various injection levels. That is, the injection-level controller 330 may correspond to the scaling factor.

For example, when the injection level of the enhanced layer is 3 dB, the combined signal may be represented as $$s_c + \sqrt{\frac{1}{2}} s_E.$$

Because the power of the combined signal (multiplexed signal) is increased compared to the core-layer signal, the power normalizer 345 has to mitigate the power increase.

The output of the power normalizer 345 may be represented as $\beta(S_c + \alpha S_E)$.

Here, $\beta$ denotes a normalizing factor depending on any of various injection levels of the enhanced layer.

When the injection level of the enhanced layer is 3 dB, the power increase of the combined signal relative to the core-layer signal is 50%. Accordingly, the output of the power normalizer 345 may be represented as $$\sqrt{\frac{2}{3}} \left( s_c + \sqrt{\frac{1}{2}} s_E \right).$$

Table 1 below shows a scaling factor $\alpha$ and a normalizing factor $\beta$ depending on various injection levels (CL: Core Layer, EL: Enhanced layer). The relationship between the injection level, the scaling factor $\alpha$, and the normalizing factor $\beta$ may be defined as shown below.

$$\begin{cases} \alpha = 10^{\left( \frac{-Injection\ level}{20} \right)} \\ \beta = \dfrac{1}{\sqrt{1 + \alpha^2}} \end{cases} \quad (3)$$

TABLE 1

| EL Injection level relative to CL | Scaling factor $\alpha$ | Normalizing factor $\beta$ |
|---|---|---|
| 3.0 dB | 0.7079458 | 0.8161736 |
| 3.5 dB | 0.6683439 | 0.8314061 |
| 4.0 dB | 0.6309573 | 0.8457262 |
| 4.5 dB | 0.5956621 | 0.8591327 |
| 5.0 dB | 0.5623413 | 0.8716346 |
| 5.5 dB | 0.5308844 | 0.8832495 |
| 6.0 dB | 0.5011872 | 0.8940022 |
| 6.5 dB | 0.4731513 | 0.9039241 |
| 7.0 dB | 0.4466836 | 0.9130512 |
| 7.5 dB | 0.4216965 | 0.9214231 |
| 8.0 dB | 0.3981072 | 0.9290819 |
| 8.5 dB | 0.3758374 | 0.9360712 |
| 9.0 dB | 0.3548134 | 0.9424353 |
| 9.5 dB | 0.3349654 | 0.9482180 |
| 10.0 dB | 0.3162278 | 0.9534626 |

According to an embodiment, the injection level may have a value ranging from 0 dB to 25 dB. When the injection level is 0 dB, the core-layer signal and the enhanced-layer signal may be combined with each other with the same power. Here, the scaling factor may be 1, and the normalizing factor may be 0.7071068. That is, the power normalizer 345 corresponds to the normalizing factor, and can be seen as decreasing the power of the multiplexed signal by the increase made by the combiner 340.

Here, each of the normalizing factor and the scaling factor may be a rational number greater than 0 and less than 1.

Here, the scaling factor may decrease as the power reduction performed by the injection-level controller 330 increases, and the normalizing factor may increase as the power reduction performed by the injection-level controller 330 increases.

The power-normalized signal is passed through the time interleaver 350 for dispersing a burst error occurring in a channel.

Here, the time interleaver 350 can be seen as performing interleaving on both the core-layer signal and the enhanced-layer signal. That is, the core layer and the enhanced layer share the time interleaver, whereby unnecessary use of memory may be prevented and latency at a receiver may be reduced.

Although described later, the enhanced-layer signal may correspond to enhanced-layer data restored based on cancellation corresponding to restoration of core-layer data corresponding to the core-layer signal, and the combiner 340 may combine one or more extension-layer signals, which have a lower power level than the core-layer signal and the enhanced-layer signal, along with the core-layer signal and the enhanced-layer signal.

Meanwhile, L1 signaling information including injection-level information is encoded in the signaling generator 360, including BICM that is exclusively used for signaling. Here, the signaling generator 360 may generate an L1 signaling signal by being provided with the injection-level information (IL INFO) from the injection-level controller 330.

The term 'L1' of L1 signaling refers to Layer-1, which is the lowest layer in the ISO 7 layer model. Here, L1 signaling may alternatively be included in a preamble.

Generally, L1 signaling may include an FFT size, a guard interval size, and the like, which are the main parameters of an OFDM transmitter, along with a channel code rate, modulation information, and the like, which are the main parameters of BICM. Such an L1 signaling signal is combined with a data signal, thereby forming a broadcast signal frame.

The frame builder 370 generates a broadcast signal frame by combining the L1 signaling signal and the data signal. Here, the frame builder 370 may generate a broadcast signal frame including a preamble for signaling time interleaver information, shared between the core-layer signal and the enhanced-layer signal, and size information of Physical-Layer Pipes (PLPs) using the time-interleaved signal. Here, the broadcast signal frame may further include a bootstrap.

Here, the frame builder 370 may generate a broadcast signal frame including a preamble for signaling start position information and size information of each of Physical-Layer Pipes (PLPs). Here, the physical-layer pipes may include a core-layer physical-layer pipe, corresponding to the core-layer signal, and an enhanced-layer physical-layer pipe, corresponding to the enhanced-layer signal. Here, injection-level information corresponding to the enhanced-layer signal may be signaled so as to correspond to the enhanced-layer physical-layer pipe.

That is, the injection-level information is not signaled for the core-layer physical-layer pipe, and is signaled only for the enhanced-layer physical-layer pipe.

Here, when the core-layer physical-layer pipe is layered-division-multiplexed with two or more enhanced-layer physical-layer pipes, the physical-layer pipes may include the two or more enhanced-layer physical-layer pipes, and the two or more enhanced-layer physical-layer pipes may have the same injection-level information (L1D_plp_ldm_injection_level).

Here, the injection-level information may be a value 3 dB greater than the required SNR corresponding to the core-layer signal before LDM combining, as described with reference to Equation (10).

Here, the physical-layer pipes may be multiplexed by Frequency-Division Multiplexing (FDM), and signaling information corresponding to frequency-division multiplexing may signaled only for the core-layer physical-layer pipes, and may not be signaled for the enhanced-layer physical-layer pipes.

Here, the signaling information corresponding to frequency-division multiplexing may include one or more of physical-layer pipe type information (L1D_plp_type), physical-layer pipe subslice interval information (L1D_plp_subslice_interval), or information about the number of physical-layer pipe subslices (L1D_plp_num_subslices), or a combination thereof.

Here, when it is frequency-division multiplexed, the enhanced-layer physical-layer pipe may follow a cell-writing order of signaling information corresponding to frequency-division multiplexing of the core-layer physical-layer pipe, which is layered-division-multiplexed.

Here, the frequency-division-multiplexed enhanced-layer physical-layer pipes may have a size that does not exceed a total of 220 cells.

Also, when the enhanced-layer physical-layer pipe is layered-division-multiplexed with two or more core-layer physical-layer pipes, the physical-layer pipes may include the two or more core-layer physical-layer pipes, and a time-interleaving mode corresponding to the time interleaver may be either a hybrid time-interleaving mode or a mode in which no time interleaving is performed.

Here, the two or more core-layer physical-layer pipes may include an integer number of FEC blocks when the mode in which no time interleaving is performed is used.

Here, the two or more core-layer physical-layer pipes may have time-interleaving block sizes that are equal to each other or have a difference therebetween less than a preset value when the hybrid time-interleaving mode is used.

Also, the physical-layer pipes may have start position information and size information set such that duration that is not layered-division-multiplexed is not present in the core-layer physical-layer pipe that is layered-division-multiplexed with the enhanced-layer physical-layer pipe.

Here, the core-layer physical-layer pipe may be modulated using any one scheme among QPSK, 16 QAM, and 64 QAM, and may be encoded with a maximum code rate of 7/15 when 64 QAM is used.

Here, a maximum of four physical-layer pipes may be used for one complete delivered product.

Here, start position information and size information for the enhanced-layer physical-layer pipe may be generated in a manner different from the manner in which start position information and size information for the core-layer physical-layer pipe are generated.

Here, the start position information and the size information for the core-layer physical-layer pipe may be generated based on a first reference time, and the start position information and the size information for the enhanced-layer physical-layer pipe may be generated based on a second reference time, which is different from the first reference time.

Here, the first reference time may be a time after time interleaving, and the second reference time may correspond to a time before time interleaving.

Here, the start position information and the size information for the enhanced-layer physical-layer pipe may be defined before time interleaving.

Here, the start position information and the size information for the core-layer physical-layer pipe may be defined within the current subframe.

Here, the start position information and the size information for the core-layer physical-layer pipe may be defined after time interleaving.

Here, the size information may be set based on the number of data cells assigned to each of the physical-layer pipes.

Here, the start position information may be set so as to be the same as an index corresponding to the first data cell of each of the physical-layer pipes.

Here, the start position information and the size information may be included in the preamble for each of the physical-layer pipes without evaluation of a conditional statement corresponding to layer identification information.

Here, the frame builder 370 can be seen as generating a broadcast signal frame including a preamble for signaling a time-interleaving mode corresponding to the time interleaver 350.

Here, the time-interleaving mode may be signaled for each of all physical-layer pipes.

Here, the physical-layer pipes may include a single enhanced-layer physical-layer pipe and multiple core-layer physical-layer pipes, which are layered-division-multiplexed with the single enhanced-layer physical-layer pipe.

Here, a time-interleaving mode corresponding to the enhanced-layer physical-layer pipe may be the same as time-interleaving modes corresponding to the core-layer physical-layer pipes, with which the enhanced-layer physical-layer pipe is layered-division-multiplexed.

Here, all of the time-interleaving modes corresponding to the core-layer physical-layer pipes, with which the enhanced-layer physical-layer pipe is layered-division-multiplexed, may be modes in which no time interleaving is performed or hybrid time-interleaving modes.

Here, when all of the time-interleaving modes corresponding to the core-layer physical-layer pipes, with which the enhanced-layer physical-layer pipe is layered-division-multiplexed, are hybrid time-interleaving modes, all of the core-layer physical-layer pipes may use an intra-subframe interleaving mode.

Here, when all of the time-interleaving modes corresponding to the core-layer physical-layer pipes, with which the enhanced-layer physical-layer pipe is layered-division-multiplexed, are modes in which no time interleaving is performed, each of the core-layer physical-layer pipes may be formed of an integer number of FEC blocks in each subframe.

Here, the subframe may be generated by first filling all of available data cells thereof with dummy modulation values and overwriting the dummy modulation values with actual physical-layer pipe data.

Here, the dummy modulation values may be generated using a scrambling sequence, which is generated using a generator polynomial corresponding to $1+X+X^3+X^6+X^7+X^{11}+X^{12}+X^{13}+X^{16}$.

Here, the dummy modulation values may be generated by mapping the value of the scrambling sequence to one of two phases that are separated by 180 degrees.

Here, the scrambling sequence may be generated using 8 bits generated using the third-bit output $x^{14}$, the fourth-bit output $x^{13}$, the fifth-bit output $x^{12}$, the sixth-bit output $x^{11}$, the tenth-bit output $x^7$, the thirteenth-bit output $x^4$, the fourteenth-bit output $x^3$, and the sixteenth-bit output x of a shift register, which is initialized to a value of 0xF180.

In the case of a single layer, the enhanced-layer BICM unit 320, the injection-level controller 330, the combiner 340, and the power normalizer 345 may be omitted. Here, the time interleaver 350 may generate a time-interleaved signal by performing time interleaving on the BICM output signal of the core-layer BICM unit 310. Also, the frame builder 370 may generate a broadcast signal frame including a preamble for signaling a time-interleaving mode corresponding to the time interleaver 350 for each of all physical-layer pipes.

Here, the physical-layer pipes may include multiple core-layer physical-layer pipes corresponding to one complete delivered product, and the core-layer physical-layer pipes may not be layered-division-multiplexed.

Here, each of the core-layer physical-layer pipes may use any one of a mode in which no time interleaving is performed and a hybrid time-interleaving mode, and may not use a convolutional time-interleaving mode.

Here, when all of the time-interleaving modes corresponding to the core-layer physical-layer pipes are hybrid time-interleaving modes, all of the core-layer physical-layer pipes may use an intra-subframe interleaving mode or an inter-subframe interleaving mode.

Here, when all of the time-interleaving modes corresponding to the core-layer physical-layer pipes are hybrid time-interleaving modes, all of the core-layer physical-layer pipes may have the same value as the value of L1D_plp_HTI_inter_subframe.

Here, when all of the time-interleaving modes corresponding to the core-layer physical-layer pipes are hybrid time-interleaving modes and when all of the core-layer physical-layer pipes use an inter-subframe interleaving mode, the core-layer physical-layer pipes may use the same time-interleaving unit $N_{IU}$.

Here, when at least one of the time-interleaving modes corresponding to the core-layer physical-layer pipes is a mode in which no time interleaving is performed, all of the core-layer pipes configured to use a hybrid time-interleaving mode, among the core-layer pipes, may use an intra-subframe interleaving mode.

Here, one complete delivered product may correspond to one or more subframes, and the subframes may be generated by first filling all of available data cells thereof with dummy modulation values and overwriting the dummy modulation values with actual physical-layer pipe data.

Here, the dummy modulation values may be generated using a scrambling sequence, which is generated using a generator polynomial corresponding to $1+X+X^3+X^6+X^7+X^{11}+X^{12}+X^{13}+X^{16}$.

Here, the dummy modulation values may be generated by mapping the value of the scrambling sequence to one of two phases that are separated by 180 degrees.

Here, the time interleaver 350 uses one of time interleaver groups, and the boundary between the time interleaver groups may be the boundary between the Physical-Layer Pipes (PLPs) of the core layer, corresponding to the core-layer signal. That is, one of the boundaries between the physical-layer pipes of the core layer may be the boundary between the time interleaver groups.

Here, enhanced-layer data corresponding to one of the time interleaver groups may include dummy values.

Here, the dummy values may be inserted after the actual data cells of the last Enhanced PLP in a PLP group such that the total number of enhanced-layer cells in the PLP group becomes equal to the total number of core-layer cells in the PLP group. Here, the dummy values may not be inserted into the core-layer data.

Here, the dummy values may be inserted after core-layer BICM and enhanced-layer BICM are completed and before the core-layer signal and the enhanced-layer signal are combined.

Here, the dummy values may correspond to a preset scrambling sequence.

Here, the scrambling sequence may be modulated using the constellation mapping that was used for the last enhanced PLP.

Here, the dummy values may have the same power as the last enhanced PLP.

Here, the scrambling sequence may be generated using a 16-bit shift register corresponding to a preset generator polynomial.

Here, the scrambling sequence may be generated using a generator polynomial corresponding to $1+X+X^3+X^6+X^7+X^{11}+X^{12}+X^{13}+X^{16}$.

Here, the scrambling sequence may be generated using 8 bits generated using the third-bit output $x^{14}$, the fourth-bit output $x^{13}$, the fifth-bit output $x^{12}$, the sixth-bit output $x^{11}$, the tenth-bit output $x^7$, the thirteenth-bit output $x^4$, the fourteenth-bit output $x^3$, and the sixteenth-bit output x of the shift register, which is initialized to a value of 0xF180.

Here, the time interleaver information may be signaled based on the core layer.

According to an embodiment, a part of the time interleaver information is signaled based on the core layer, and another part of the time interleaver information may be signaled regardless of the layer.

That is, the time interleaver information may be signaled based on layer identification information corresponding to the core layer.

Here, the time interleaver 350 may correspond to a hybrid time interleaver. Here, the physical-layer pipes of the core layer and the enhanced layer may include only complete FEC blocks.

Here, when the boundary between the time interleaver groups does not match the boundary between FEC blocks of the enhanced layer, the preamble may be used to signal information for identifying the portion of the FEC block of the enhanced layer corresponding to the boundary between the time interleaver groups.

Here, the information for identifying the portion of the FEC block may include one or more of start position information of the physical-layer pipe of the core layer, start position information of the physical-layer pipe of the enhanced layer, modulation information corresponding to the enhanced layer, or FEC-type information corresponding to the enhanced layer, or a combination thereof.

Here, the start position information of the physical-layer pipe may correspond to the index of the first data cell of the physical-layer pipe.

Here, the modulation information may be signaled only when the FEC-type information satisfies preset conditions.

Here, the enhanced-layer signal may correspond to enhanced-layer data, which is restored based on cancellation corresponding to restoration of core-layer data corresponding to the core-layer signal.

Here, the time interleaver 350 may correspond to a convolutional time interleaver, the time interleaver groups may include a Physical-Layer Pipe (PLP) including an incomplete FEC block, and the preamble may be used to signal the start position information of a first complete FEC block in the physical-layer pipe.

Here, the time interleaver 350 may perform interleaving using one of multiple operation modes.

Here, the operation modes may include a first mode (L1D_plp_TI_mode=00) for skipping time interleaving, a second mode (L1D_plp_TI_mode=01) for performing convolutional time interleaving, and a third mode (L1D_plp_TI_mode=10) for performing hybrid time interleaving.

Here, the preamble may include a field indicating the start position of the first complete FEC block corresponding to the current physical-layer pipe for the first and second modes, but may not include a field indicating the start position of the first FEC block for the third mode.

Here, the field indicating the start position of the first FEC block is any one of a first field (L1D_plp_fec_block_start) used in the first mode (L1D_plp_TI_mode=00) and a second field (L1D_plp_CTI_fec_block_start) used in the second mode (L1D_plp_TI_mode=01), and the first field and the second field may have different lengths. Here, the first field (L1D_plp_fec_block_start) may indicate the start position of the first FEC block that starts within the current physical-layer pipe during the current subframe, and the second field (L1D_plp_CTI_fec_block_start) may indicate the start position of the first complete FEC block of the current physical-layer pipe leaving the convolutional time interleaver in current or subsequent subframes. Here, all of the first field (L1D_plp_fec_block_start) and the second field (L1D_plp_CTI_fec_block_start) may be signaled based on information after interleaving. Particularly, when the second field (L1D_plp_CTI_fec_block_start) is signaled based on information after interleaving, the number of bits required for signaling may increase.

Here, the length of the second field may be greater than the length of the first field.

Here, the length of the first field may be determined based on the length of an LDPC codeword and a modulation order, and the length of the second field may be determined by further considering the depth of the convolutional time interleaver, as well as the length of the LDPC codeword and the modulation order.

Here, the length of the first field may be 15 bits, and the length of the second field may be 22 bits.

Here, the first field and the second field may be signaled separately for each of the core layer corresponding to the core-layer signal and the enhanced layer corresponding to the enhanced-layer signal.

Here, the frame builder 370 may include a bootstrap generator for generating a bootstrap, a preamble generator for generating a preamble, and a superimposed payload generator for generating a superimposed payload corresponding to the time-interleaved signal.

Here, the bootstrap may be shorter than the preamble, and may have a fixed length.

Here, the bootstrap may include a symbol indicating the structure of the preamble.

The symbol may correspond to a fixed-length bit string representing a combination of the modulation-method/code-rate of the preamble, an FFT size, a guard interval length, and a pilot pattern.

Here, the symbol may correspond to a lookup table in which a preamble structure corresponding to a second FFT size, which is smaller than a first FFT size, is assigned in preference to a preamble structure corresponding to the first FFT size when the same modulation-method/code-rate is given and in which a preamble structure corresponding to a second guard interval length, greater than a first guard interval length, is assigned in preference to a preamble structure corresponding to the first guard interval length when the same modulation-method/code-rate and the same FFT size are given.

A broadcast signal frame is transmitted via an OFDM transmitter, which is robust to multi-path and a Doppler effect. Here, the OFDM transmitter can be seen as serving to generate a signal to be transmitted in next-generation broadcast systems.

Here, the preamble may include PLP identification information for identifying Physical-Layer Pipes (PLPs) and layer identification information for identifying layers corresponding to division of layers.

Here, the PLP identification information and the layer identification information may be included in the preamble as separate fields.

Here, the time interleaver information may be included in the preamble based on the core layer.

Here, the preamble may selectively include injection-level information corresponding to the injection-level controller depending on the result of comparing the layer identification information with a preset value (IF (j>0)) for each of the physical-layer pipes.

Here, the preamble may include the type information, the start position information, and the size information of the physical-layer pipes.

Here, the type information may be used to identify any one of a first type, corresponding to a non-dispersed physical-layer pipe, and a second type, corresponding to a dispersed physical-layer pipe.

Here, the non-dispersed physical-layer pipe may be assigned for contiguous data cell indices, and the dispersed physical-layer pipe may formed of two or more subslices.

Here, the type information may be selectively signaled depending on the result of comparing the layer identification information with a preset value for each of the physical-layer pipes.

Here, the type information may be signaled only for the core layer.

Here, the start position information may be set to be the same as the index corresponding to the first data cell of the physical-layer pipe.

Here, the start position information may indicate the start position of the physical-layer pipe using a cell-addressing scheme.

Here, the start position information may be included in the preamble for each of the physical-layer pipes without evaluation of a conditional statement corresponding to the layer identification information.

Here, the size information may be set based on the number of data cells assigned to the physical-layer pipe.

Here, the size information may be included in the preamble for each of the physical-layer pipes without evaluation of a conditional statement corresponding to the layer identification information.

Figure 4:
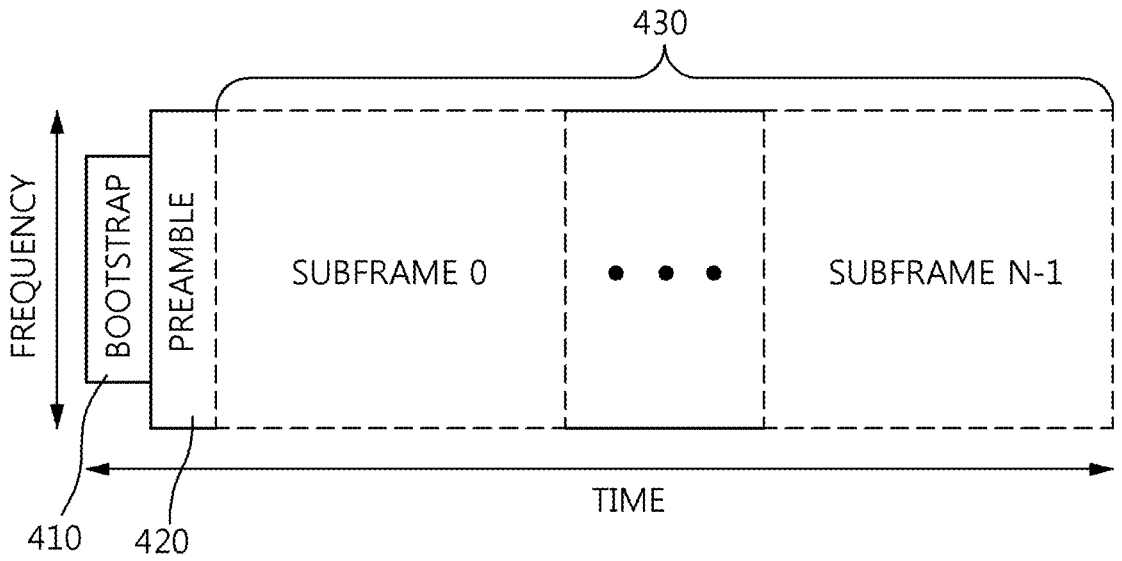
FIG. 4 is a view illustrating an example of the structure of a broadcast signal frame.

FIG. 4 is a view illustrating an example of the structure of a broadcast signal frame.

Referring to FIG. 4, a broadcast signal frame includes a bootstrap 410, a preamble 420, and a superimposed payload 430.

The frame illustrated in FIG. 4 may be included in a super-frame.

Here, the broadcast signal frame may be formed of one or more OFDM symbols. The broadcast signal frame may include a reference symbol or a pilot symbol.

The frame structure to which Layered-Division Multiplexing (LDM) is applied includes a bootstrap 410, a preamble 420, and a superimposed payload 430, as illustrated in FIG. 4.

Here, the bootstrap 410 and the preamble 420 can be seen as two hierarchical preambles.

Here, the bootstrap 410 may have a shorter length than the preamble 420 for fast acquisition and detection. Here, the bootstrap 410 may have a fixed length. Here, the bootstrap 410 may include a symbol having a fixed length. For example, the bootstrap 410 is formed of four OFDM symbols, each having a length of 0.5 msec, thereby having a fixed time length of 2 msec.

Here, the bootstrap 410 may have a fixed bandwidth, and the preamble 420 and the superimposed payload 430 may have a variable bandwidth that is wider than that of the bootstrap 410.

The preamble 420 uses a robust LDPC code, thereby transmitting detailed signaling information. Here, the preamble 420 may have a variable length depending on the signaling information.

Here, the bootstrap 410 and the payload 430 can be seen as corresponding to a common signal shared by various layers.

The superimposed payload 430 may correspond to a multiplexed signal formed by multiplexing signals of two or more layers. Here, the superimposed payload 430 may be a combination of a core-layer payload and an enhanced-layer payload at different power levels. Here, an in-band signaling section may be included in the core-layer payload. Here, the in-band signaling section may include signaling information for an enhanced-layer service.

Here, the bootstrap 410 may include a symbol indicating a preamble structure.

Here, the symbol that is included in the bootstrap in order to indicate the preamble structure may be set as shown in Table 2 below.

TABLE 2

| preamble_structure | L1-Basic Mode | FFT Size | GI Length (samples) | Pilot Pattern ($D_X$) |
|---|---|---|---|---|
| 0 | L1-Basic Mode 1 | 8192 | 2048 | 3 |
| 1 | L1-Basic Mode 1 | 8192 | 1536 | 4 |
| 2 | L1-Basic Mode 1 | 8192 | 1024 | 3 |
| 3 | L1-Basic Mode 1 | 8192 | 768 | 4 |
| 4 | L1-Basic Mode 1 | 16384 | 4096 | 3 |
| 5 | L1-Basic Mode 1 | 16384 | 3648 | 4 |
| 6 | L1-Basic Mode 1 | 16384 | 2432 | 3 |
| 7 | L1-Basic Mode 1 | 16384 | 1536 | 4 |
| 8 | L1-Basic Mode 1 | 16384 | 1024 | 6 |
| 9 | L1-Basic Mode 1 | 16384 | 768 | 8 |
| 10 | L1-Basic Mode 1 | 32768 | 4864 | 3 |
| 11 | L1-Basic Mode 1 | 32768 | 3648 | 3 |
| 12 | L1-Basic Mode 1 | 32768 | 3648 | 8 |
| 13 | L1-Basic Mode 1 | 32768 | 2432 | 6 |
| 14 | L1-Basic Mode 1 | 32768 | 1536 | 8 |
| 15 | L1-Basic Mode 1 | 32768 | 1024 | 12 |
| 16 | L1-Basic Mode 1 | 32768 | 768 | 16 |
| 17 | L1-Basic Mode 2 | 8192 | 2048 | 3 |
| 18 | L1-Basic Mode 2 | 8192 | 1536 | 4 |
| 19 | L1-Basic Mode 2 | 8192 | 1024 | 3 |
| 20 | L1-Basic Mode 2 | 8192 | 768 | 4 |
| 21 | L1-Basic Mode 2 | 16384 | 4096 | 3 |
| 22 | L1-Basic Mode 2 | 16384 | 3648 | 4 |
| 23 | L1-Basic Mode 2 | 16384 | 2432 | 3 |
| 24 | L1-Basic Mode 2 | 16384 | 1536 | 4 |
| 25 | L1-Basic Mode 2 | 16384 | 1024 | 6 |
| 26 | L1-Basic Mode 2 | 16384 | 768 | 8 |
| 27 | L1-Basic Mode 2 | 32768 | 4864 | 3 |
| 28 | L1-Basic Mode 2 | 32768 | 3648 | 3 |
| 29 | L1-Basic Mode 2 | 32768 | 3648 | 8 |
| 30 | L1-Basic Mode 2 | 32768 | 2432 | 6 |
| 31 | L1-Basic Mode 2 | 32768 | 1536 | 8 |

TABLE 2-continued

| preamble_structure | L1-Basic Mode | FFT Size | GI Length (samples) | Pilot Pattern ($D_X$) |
|---|---|---|---|---|
| 32 | L1-Basic Mode 2 | 32768 | 1024 | 12 |
| 33 | L1-Basic Mode 2 | 32768 | 768 | 16 |
| 34 | L1-Basic Mode 3 | 8192 | 2048 | 3 |
| 35 | L1-Basic Mode 3 | 8192 | 1536 | 4 |
| 36 | L1-Basic Mode 3 | 8192 | 1024 | 3 |
| 37 | L1-Basic Mode 3 | 8192 | 768 | 4 |
| 38 | L1-Basic Mode 3 | 16384 | 4096 | 3 |
| 39 | L1-Basic Mode 3 | 16384 | 3648 | 4 |
| 40 | L1-Basic Mode 3 | 16384 | 2432 | 3 |
| 41 | L1-Basic Mode 3 | 16384 | 1536 | 4 |
| 42 | L1-Basic Mode 3 | 16384 | 1024 | 6 |
| 43 | L1-Basic Mode 3 | 16384 | 768 | 8 |
| 44 | L1-Basic Mode 3 | 32768 | 4864 | 3 |
| 45 | L1-Basic Mode 3 | 32768 | 3648 | 3 |
| 46 | L1-Basic Mode 3 | 32768 | 3648 | 8 |
| 47 | L1-Basic Mode 3 | 32768 | 2432 | 6 |
| 48 | L1-Basic Mode 3 | 32768 | 1536 | 8 |
| 49 | L1-Basic Mode 3 | 32768 | 1024 | 12 |
| 50 | L1-Basic Mode 3 | 32768 | 768 | 16 |
| 51 | L1-Basic Mode 4 | 8192 | 2048 | 3 |
| 52 | L1-Basic Mode 4 | 8192 | 1536 | 4 |
| 53 | L1-Basic Mode 4 | 8192 | 1024 | 3 |
| 54 | L1-Basic Mode 4 | 8192 | 768 | 4 |
| 55 | L1-Basic Mode 4 | 16384 | 4096 | 3 |
| 56 | L1-Basic Mode 4 | 16384 | 3648 | 4 |
| 57 | L1-Basic Mode 4 | 16384 | 2432 | 3 |
| 58 | L1-Basic Mode 4 | 16384 | 1536 | 4 |
| 59 | L1-Basic Mode 4 | 16384 | 1024 | 6 |
| 60 | L1-Basic Mode 4 | 16384 | 768 | 8 |
| 61 | L1-Basic Mode 4 | 32768 | 4864 | 3 |
| 62 | L1-Basic Mode 4 | 32768 | 3648 | 3 |
| 63 | L1-Basic Mode 4 | 32768 | 3648 | 8 |
| 64 | L1-Basic Mode 4 | 32768 | 2432 | 6 |
| 65 | L1-Basic Mode 4 | 32768 | 1536 | 8 |
| 66 | L1-Basic Mode 4 | 32768 | 1024 | 12 |
| 67 | L1-Basic Mode 4 | 32768 | 768 | 16 |
| 68 | L1-Basic Mode 5 | 8192 | 2048 | 3 |
| 69 | L1-Basic Mode 5 | 8192 | 1536 | 4 |
| 70 | L1-Basic Mode 5 | 8192 | 1024 | 3 |
| 71 | L1-Basic Mode 5 | 8192 | 768 | 4 |
| 72 | L1-Basic Mode 5 | 16384 | 4096 | 3 |
| 73 | L1-Basic Mode 5 | 16384 | 3648 | 4 |
| 74 | L1-Basic Mode 5 | 16384 | 2432 | 3 |
| 75 | L1-Basic Mode 5 | 16384 | 1536 | 4 |
| 76 | L1-Basic Mode 5 | 16384 | 1024 | 6 |
| 77 | L1-Basic Mode 5 | 16384 | 768 | 8 |
| 78 | L1-Basic Mode 5 | 32768 | 4864 | 3 |
| 79 | L1-Basic Mode 5 | 32768 | 3648 | 3 |
| 80 | L1-Basic Mode 5 | 32768 | 3648 | 8 |
| 81 | L1-Basic Mode 5 | 32768 | 2432 | 6 |
| 82 | L1-Basic Mode 5 | 32768 | 1536 | 8 |
| 83 | L1-Basic Mode 5 | 32768 | 1024 | 12 |
| 84 | L1-Basic Mode 5 | 32768 | 768 | 16 |
| 85 | L1-Basic Mode 6 | 8192 | 2048 | 3 |
| 86 | L1-Basic Mode 6 | 8192 | 1536 | 4 |
| 87 | L1-Basic Mode 6 | 8192 | 1024 | 3 |
| 88 | L1-Basic Mode 6 | 8192 | 768 | 4 |
| 89 | L1-Basic Mode 6 | 16384 | 4096 | 3 |
| 90 | L1-Basic Mode 6 | 16384 | 3648 | 4 |
| 91 | L1-Basic Mode 6 | 16384 | 2432 | 3 |
| 92 | L1-Basic Mode 6 | 16384 | 1536 | 4 |
| 93 | L1-Basic Mode 6 | 16384 | 1024 | 6 |
| 94 | L1-Basic Mode 6 | 16384 | 768 | 8 |
| 95 | L1-Basic Mode 6 | 32768 | 4864 | 3 |
| 96 | L1-Basic Mode 6 | 32768 | 3648 | 3 |
| 97 | L1-Basic Mode 6 | 32768 | 3648 | 8 |
| 98 | L1-Basic Mode 6 | 32768 | 2432 | 6 |
| 99 | L1-Basic Mode 6 | 32768 | 1536 | 8 |
| 100 | L1-Basic Mode 6 | 32768 | 1024 | 12 |
| 101 | L1-Basic Mode 6 | 32768 | 768 | 16 |
| 102 | L1-Basic Mode 7 | 8192 | 2048 | 3 |
| 103 | L1-Basic Mode 7 | 8192 | 1536 | 4 |
| 104 | L1-Basic Mode 7 | 8192 | 1024 | 3 |
| 105 | L1-Basic Mode 7 | 8192 | 768 | 4 |
| 106 | L1-Basic Mode 7 | 16384 | 4096 | 3 |
| 107 | L1-Basic Mode 7 | 16384 | 3648 | 4 |

TABLE 2-continued

| preamble_structure | L1-Basic Mode | FFT Size | GI Length (samples) | Pilot Pattern (D$_X$) |
|---|---|---|---|---|
| 108 | L1-Basic Mode 7 | 16384 | 2432 | 3 |
| 109 | L1-Basic Mode 7 | 16384 | 1536 | 4 |
| 110 | L1-Basic Mode 7 | 16384 | 1024 | 6 |
| 111 | L1-Basic Mode 7 | 16384 | 768 | 8 |
| 112 | L1-Basic Mode 7 | 32768 | 4864 | 3 |
| 113 | L1-Basic Mode 7 | 32768 | 3648 | 3 |
| 114 | L1-Basic Mode 7 | 32768 | 3648 | 8 |
| 115 | L1-Basic Mode 7 | 32768 | 2432 | 6 |
| 116 | L1-Basic Mode 7 | 32768 | 1536 | 8 |
| 117 | L1-Basic Mode 7 | 32768 | 1024 | 12 |
| 118 | L1-Basic Mode 7 | 32768 | 768 | 16 |
| 119 | Reserved | Reserved | Reserved | Reserved |
| 120 | Reserved | Reserved | Reserved | Reserved |
| 121 | Reserved | Reserved | Reserved | Reserved |
| 122 | Reserved | Reserved | Reserved | Reserved |
| 123 | Reserved | Reserved | Reserved | Reserved |
| 124 | Reserved | Reserved | Reserved | Reserved |
| 125 | Reserved | Reserved | Reserved | Reserved |
| 126 | Reserved | Reserved | Reserved | Reserved |
| 127 | Reserved | Reserved | Reserved | Reserved |

For example, in order to represent the preamble structure in Table 2 above, a fixed symbol of 7 bits may be assigned. L1-Basic Mode 1, L1-Basic Mode 2, and L1-Basic Mode 3 in Table 2 above may correspond to QPSK and 3/15 LDPC.

L1-Basic Mode 4 in Table 2 above may correspond to 16-Non-Uniform-Constellation (NUC) and 3/15 LDPC.

L1-Basic Mode 5 in Table 2 above may correspond to 64-Non-Uniform-Constellation (NUC) and 3/15 LDPC.

L1-Basic Mode 6 and L1-Basic Mode 7 in Table 2 above may correspond to 256-Non-Uniform-Constellation (NUC) and 3/15 LDPC. A modulation-method/code-rate described below indicates a combination of a modulation method and a code rate, such as QPSK and 3/15 LDPC.

The FFT size in Table 2 above may indicate the size of Fast Fourier Transform.

The GI length in Table 2 above indicates a guard interval length, and may indicate the length of a guard interval, which is not data, in a time domain. Here, the greater the length of the time interval, the more robust the system.

The pilot pattern in Table 2 above may indicate Dx of the pilot pattern. Although not explicitly written in Table 2, Dy may be 1 in all of the examples in Table 2. For example, Dx=3 may indicate that a pilot for channel estimation is included in one in every three positions in an x-axis direction. For example, Dy=1 may indicate that a pilot is included in every position in a y-axis direction.

As shown in the example of Table 2, a preamble structure corresponding to a second modulation-method/code-rate, which is more robust than a first modulation-method/code-rate, may be assigned in preference to a preamble structure corresponding to the first modulation-method/code-rate in the lookup table.

Here, preferential assignment may indicate being stored so as to correspond to a lower index in the lookup table.

Also, when the same modulation-method/code-rate is given, a preamble structure corresponding to a second FFT size, which is less than a first FFT size, may be assigned in preference to a preamble structure corresponding to the first FFT size in the lookup table.

Also, when the same modulation-method/code-rate and the same FFT size are given, a preamble structure corresponding to a second guard interval, which is greater than a first guard interval, may be assigned in preference to a preamble structure corresponding to the first guard interval in the lookup table.

As shown in Table 2, the sequence in which the preamble structures are assigned in the lookup table is set, whereby identification of a preamble structure using a bootstrap may be more efficiently performed.

Figure 5:
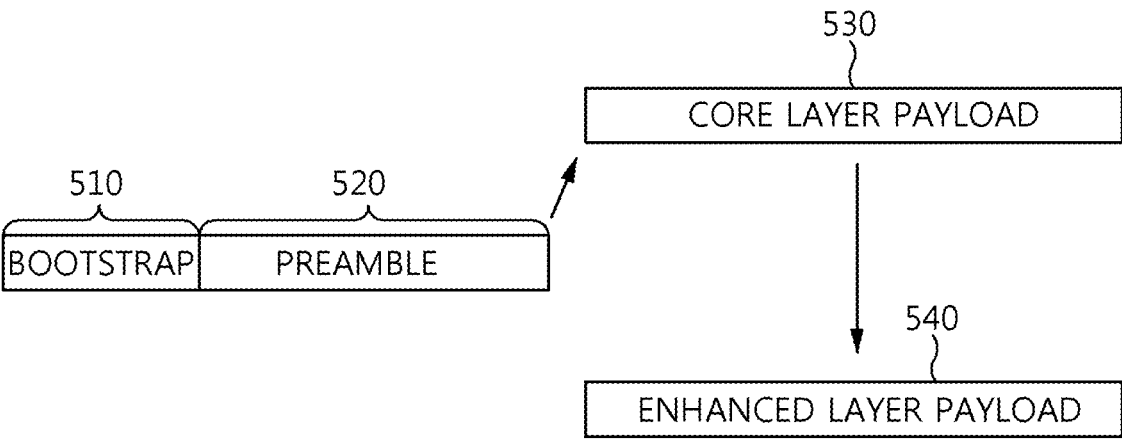
FIG. 5 is a view illustrating an example of a process in which the broadcast signal frame illustrated in FIG. 4 is received.

FIG. 5 is a view illustrating an example of a process whereby the broadcast signal frame illustrated in FIG. 4 is received.

Referring to FIG. 5, a bootstrap 510 is detected and demodulated, and a preamble 520 is demodulated using the demodulated information, whereby signaling information is restored.

Using the signaling information, core-layer data 530 is demodulated, and an enhanced-layer signal is demodulated through a cancellation process corresponding to the core-layer data. Here, cancellation corresponding to the core-layer data will be described in more detail later.

Figure 6:
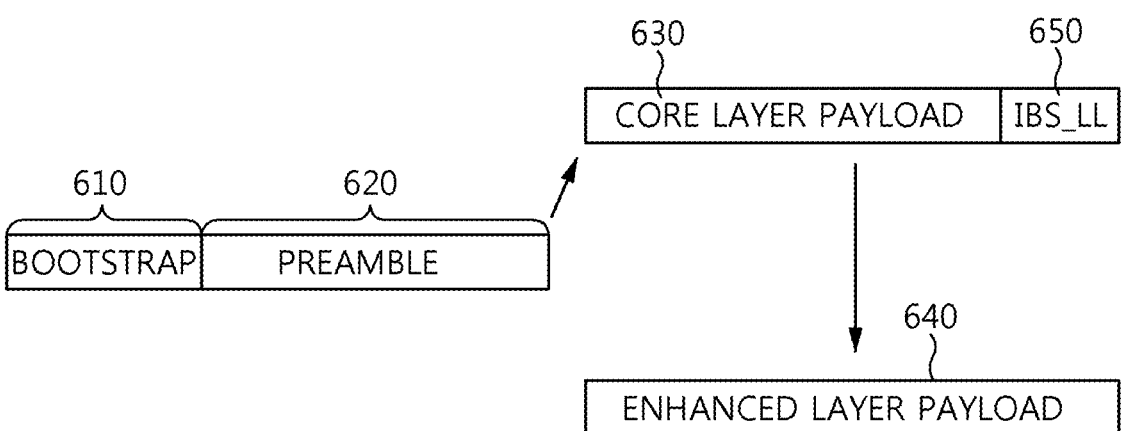
FIG. 6 is a view illustrating another example of a process in which the broadcast signal frame illustrated in FIG. 4 is received.

FIG. 6 is a view illustrating another example of the process whereby the broadcast signal frame illustrated in FIG. 4 is received.

Referring to FIG. 6, a bootstrap 610 is detected and demodulated, and a preamble 620 is demodulated using the demodulated information, whereby signaling information is restored.

Core-layer data 630 is demodulated using the signaling information. Here, the core-layer data 630 includes an in-band signaling section 650. The in-band signaling section 650 includes signaling information for an enhanced-layer service. Through the in-band signaling section 650, more efficient use of bandwidth is possible. Here, it is desirable for the in-band signaling section 650 to be included in a core layer, which is more robust than an enhanced layer.

In the example illustrated in FIG. 6, basic signaling information and information for a core-layer service are transferred through the preamble 620, and signaling information for an enhanced-layer service may be transferred through the in-band signaling section 650.

An enhanced-layer signal is demodulated through a cancellation process corresponding to the core-layer data.

Here, the signaling information may be Layer-1 (L1) signaling information. The L1 signaling information may include information required for configuring physical layer parameters.

Referring to FIG. 4, a broadcast signal frame includes an L1 signaling signal and a data signal. For example, the broadcast signal frame may be an ATSC 3.0 frame.

Figure 7:
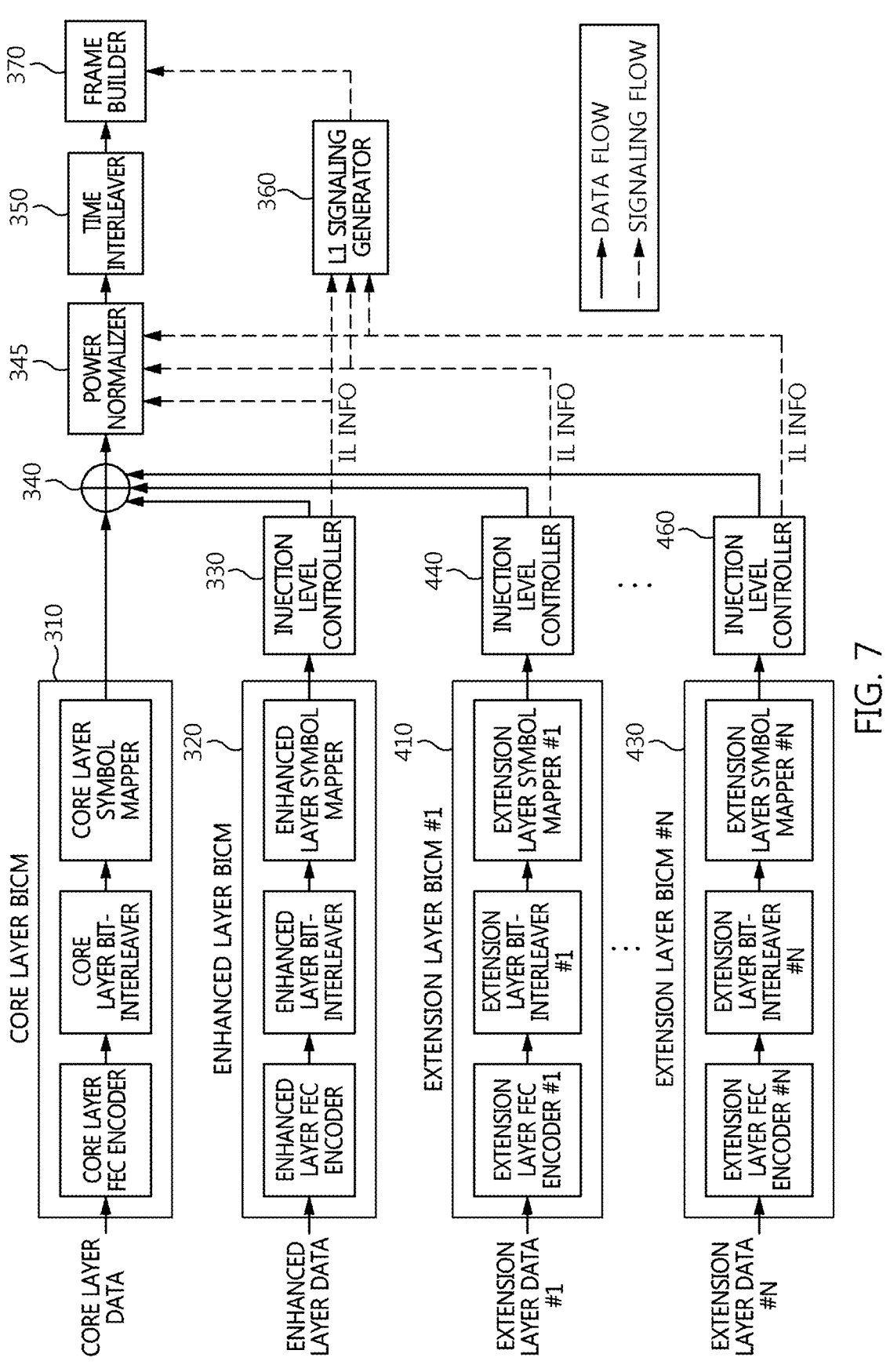
FIG. 7 is a block diagram illustrating another example of the broadcast signal frame generation device illustrated in FIG. 1.

FIG. 7 is a block diagram illustrating another example of the broadcast signal frame generation device illustrated in FIG. 1.

Referring to FIG. 7, it can be seen that the broadcast signal frame generation device multiplexes data corresponding to N extension layers, in addition to core-layer data and enhanced-layer data (N being a natural number equal to or greater than 1).

That is, the broadcast signal frame generation device illustrated in FIG. 7 includes N extension layer BICM units 410, . . . , 430 and injection-level controllers 440, . . . , 460 in addition to a core-layer BICM unit 310, an enhanced-layer BICM unit 320, an injection-level controller 330, a combiner 340, a power normalizer 345, a time interleaver 350, a signaling generator 360, and a frame builder 370.

The core-layer BICM unit 310, the enhanced-layer BICM unit 320, the injection-level controller 330, the combiner 340, the power normalizer 345, the time interleaver 350, the signaling generator 360, and the frame builder 370 illustrated in FIG. 7 have been described in detail with reference to FIG. 3.

The N extension layer BICM units 410, . . . , 430 individually perform BICM encoding, and the injection-level controllers 440, . . . , 460 perform power reduction corresponding to the respective extension layers, so that the power-reduced extension-layer signals are combined with signals of other layers through the combiner 340.

Here, the error-correction coder of each of the extension layer BICM units 410, . . . , 430 may take a form in which a BCH encoder and an LDPC encoder are connected in series.

Particularly, it is desirable for the power reduction performed by each of the injection-level controllers 440, . . . , 460 to be greater than the power reduction performed by the injection-level controller 330. That is, among the injection-level controllers 330, 440, . . . , 460, the injection-level controller illustrated as being located at a lower position in FIG. 7 may correspond to a greater power reduction.

Injection-level information provided from the injection-level controllers 330, 440, and 460 illustrated in FIG. 7 is transmitted to a receiver by being included in a broadcast signal frame by the frame builder 370 after passing through the signaling generator 360. That is, the injection level of each layer is transferred to the receiver by being contained in L1 signaling information.

In the present invention, power adjustment may be an increase or decrease in the power of an input signal, or may be an increase or decrease in the gain of the input signal.

The power normalizer 345 mitigates an increase in power that occurs because the combiner 340 combines signals of multiple layers.

In the example illustrated in FIG. 7, the power normalizer 345 may adjust signal power to a suitable signal magnitude by multiplying the magnitude of the signal acquired by combining the signals of the respective layers by a normalizing factor using Equation (4) below:

$$\text{Normalizing Factor} = \left( \sqrt{ \frac{\left(1 + 10^{-InjectionLevel\#1(dB)/10} + \right.}{10^{-InjectionLevel\#2(dB)/10} + \ldots + 10^{-InjectionLevel\#(N+1)(dB)/10}} \right)^{-1} \quad (4)$$

The time interleaver 350 performs interleaving on the signal combined by the combiner 340, thereby applying interleaving in common to the signals of the layers.

Figure 8:
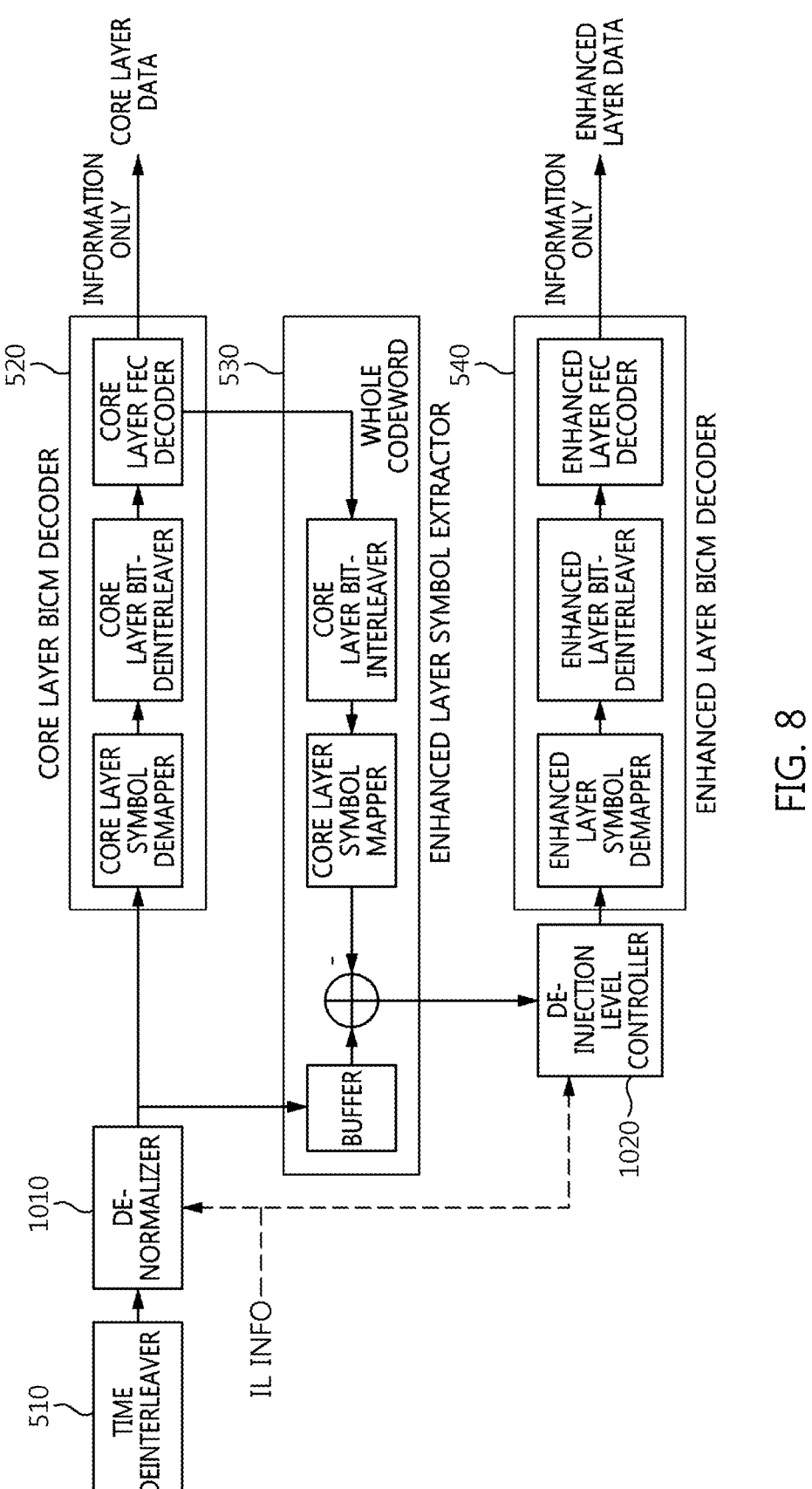
FIG. 8 is a block diagram illustrating an example of the signal-demultiplexing device illustrated in FIG. 1.

FIG. 8 is a block diagram illustrating an example of the signal-demultiplexing device illustrated in FIG. 1.

Referring to FIG. 8, a signal-demultiplexing device according to an embodiment of the present invention includes a time deinterleaver 510, a de-normalizer 1010, a core-layer BICM decoder 520, an enhanced-layer symbol extractor 530, a de-injection-level controller 1020, and an enhanced-layer BICM decoder 540.

Here, the signal-demultiplexing device illustrated in FIG. 8 may correspond to the broadcast signal frame generation device illustrated in FIG. 3.

The time deinterleaver 510 is provided with a received signal from an OFDM receiver, which performs operations such as time/frequency synchronization, channel estimation, equalization, and the like, and performs an operation for dispersion of a burst error occurring in a channel. Here, L1 signaling information is first decoded in the OFDM receiver, and is then used for data decoding. Particularly, injection-level information in the L1 signaling information may be transferred to the de-normalizer 1010 and the de-injection-level controller 1020. Here, after it decodes the received signal into a form of a broadcast signal frame (e.g., ATSC 3.0 frame), the OFDM receiver may extract a data symbol part from the frame and provide the same to the time deinterleaver 510. That is, the time deinterleaver 510 performs a deinterleaving process while making the data symbol pass therethrough, thereby dispersing a burst error occurring in the channel.

Here, the time deinterleaver 510 may perform operations corresponding to a time interleaver. Here, the time deinterleaver 510 may perform deinterleaving in one of multiple operation modes, and may perform deinterleaving using time interleaver information signaled in association with the operation of the time interleaver.

The de-normalizer 1010 corresponds to the power normalizer of a transmitter, and increases power by the magnitude of the power reduction performed by the power normalizer. That is the de-normalizer 1010 divides the received signal by the normalizing factor of Equation (2) above.

In the example illustrated in FIG. 8, the de-normalizer 1010 is illustrated as adjusting the power of the signal output from the time interleaver 510, but according to an embodiment, the de-normalizer 1010 is located ahead the time interleaver 510 such that power adjustment is performed before interleaving.

That is, the de-normalizer 1010 can be seen as serving to amplify the magnitude of a signal for LLR calculation by a core-layer symbol demapper or the like by being located upstream or downstream of the time interleaver 510.

The output of the time deinterleaver 510 (or the output of the de-normalizer 1010) is provided to the core-layer BICM decoder 520, and the core-layer BICM decoder 520 restores core-layer data.

Here, the core-layer BICM decoder 520 includes a core-layer symbol demapper, a core-layer bit deinterleaver, and a core-layer error-correction decoder. The core-layer symbol demapper calculates Log-Likelihood Ratio (LLR) values related to a symbol, the core-layer bit deinterleaver mixes the calculated LLR values so as to be robust to a burst error, and the core-layer error-correction decoder corrects an error occurring in a channel.

Here, the core-layer symbol demapper may calculate the LLR value for each bit using a predetermined constellation diagram. Here, the constellation diagram used in the core-layer symbol mapper may vary depending on a combination of the code rate and the modulation order used in a transmitter.

Here, the core-layer bit deinterleaver may perform deinterleaving for the calculated LLR values in units of LDPC codewords.

Particularly, the core-layer error-correction decoder may output only information bits, or may output all bits in which the information bits are combined with parity bits. Here, the core-layer error-correction decoder may output only the information bits as core-layer data, and may output all of the bits in which the parity bits are combined with the information bits to the enhanced-layer symbol extractor 530.

The core-layer error-correction decoder may take a form in which a core-layer LDPC decoder and a core-layer BCH decoder are connected in series. That is, the input of the core-layer error-correction decoder may be input to the core-layer LDPC decoder, the output of the core-layer LDPC decoder may be input to the core-layer BCH decoder, and the output of the core-layer BCH decoder may be the output of the core-layer error-correction decoder. Here, the LDPC decoder performs LDPC decoding, and the BCH decoder performs BCH decoding.

Further, an enhanced-layer error-correction decoder may also take a form in which an enhanced-layer LDPC decoder and an enhanced-layer BCH decoder are connected in series. That is, the input of the enhanced-layer error-correction decoder may be input to the enhanced-layer LDPC decoder, the output of the enhanced-layer LDPC decoder may be input to the enhanced-layer BCH decoder, and the output of the enhanced-layer BCH decoder may be the output of the enhanced-layer error-correction decoder.

The enhanced-layer symbol extractor 530 may be provided with all bits from the core-layer error-correction decoder of the core-layer BICM decoder 520, and may extract enhanced-layer symbols from the output signal of the time deinterleaver 510 or the de-normalizer 1010. According to an embodiment, the enhanced-layer symbol extractor 530 may be provided with LDPC information bits or BCH information bits, rather than being provided with all bits from the error-correction decoder of the core-layer BICM decoder 520.

Here, the enhanced-layer symbol extractor 530 includes a buffer, a subtractor, a core-layer symbol mapper, and a core-layer bit interleaver. The buffer stores the output signal of the time deinterleaver 510 or the de-normalizer 1010. The core-layer bit interleaver receives all bits (information bits+ parity bits) from the core-layer BICM decoder and performs core-layer bit interleaving in the same manner as in the transmitter. From the interleaved signal, the core-layer symbol mapper generates the same core-layer symbol as the transmitter does. The subtractor subtracts the output signal of the core-layer symbol mapper from the signal stored in the buffer, thereby acquiring an enhanced-layer symbol and transferring the same to the de-injection-level controller 1020. Particularly, when provided with LDPC information bits, the enhanced-layer symbol extractor 530 may further include a core-layer LDPC encoder. Also, when provided with BCH information bits, the enhanced-layer symbol extractor 530 may further include a core-layer BCH encoder as well as the core-layer LDPC encoder.

Here, the core-layer LDPC encoder, the core-layer BCH encoder, the core-layer bit interleaver, and the core-layer symbol mapper included in the enhanced-layer symbol extractor 530 may be the same as the LDPC encoder, the BCH encoder, the bit interleaver, and the symbol mapper of the core layer described with reference to FIG. 3.

The de-injection-level controller 1020 receives the enhanced-layer symbol and increases the power thereof by the magnitude of the power reduction performed by the injection-level controller of the transmitter. That is, the de-injection-level controller 1020 amplifies the input signal and provides the same to the enhanced-layer BICM decoder 540. For example, when an enhanced-layer signal, the power of which is 3 dB lower than the power of the core-layer signal, is combined with the core-layer signal in the transmitter, the de-injection-level controller 1020 serves to increase the power of the input signal by 3 dB.

Here, the de-injection-level controller 1020 can be seen as receiving injection-level information from the OFDM receiver and multiplying the extracted enhanced-layer signal by the enhanced-layer gain of Equation (5) below:

$$\text{Enhanced Layer Gain} = \left( \sqrt{10^{-InjectionLevel(dB)/10}} \right)^{-1} \qquad (5)$$

The enhanced-layer BICM decoder 540 receives the enhanced-layer symbol, the power of which is increased by the de-injection controller 1020, and restores enhanced-layer data.

Here, the enhanced-layer BICM decoder 540 may include an enhanced-layer symbol demapper, an enhanced-layer bit deinterleaver, and an enhanced-layer error-correction decoder. The enhanced-layer symbol demapper calculates Log-Likelihood Ratio (LLR) values related to an enhanced-layer symbol, the enhanced-layer bit deinterleaver mixes the calculated LLR values so as to be robust to a burst error, and the enhanced-layer error-correction decoder corrects an error occurring in a channel.

The enhanced-layer BICM decoder 540 performs a task similar to that of the core-layer BICM decoder 520, but an enhanced-layer LDPC decoder generally performs LDPC decoding for a code rate equal to or greater than 6/15.

For example, a core layer may use an LDPC code having a code rate equal to or less than 5/15, and an enhanced layer may use an LDPC code having a code rate equal to or greater than 6/15. Here, in a reception environment in which decoding of enhanced-layer data is possible, core-layer data may be decoded using only a small number of LDPC decoding iterations. Using this characteristic, receiver hardware may be implemented such that the core layer and the enhanced layer share a single LDPC decoder, whereby hardware implementation costs may be reduced. Here, the core-layer LDPC decoder uses only some time resources (LDPC decoding iterations), and the enhanced-layer LDPC decoder may use most time resources.

The signal-demultiplexing device illustrated in FIG. 8 first restores core-layer data, leaves behind only enhanced-layer symbols by cancelling core-layer symbols in the received signal symbols, and increases the power of the enhanced-layer symbols, thereby restoring enhanced-layer data. As described above with reference to FIGS. 3 and 5, because signals corresponding to respective layers are combined at different power levels, data restoration with the smallest number of errors is achieved only when the signal combined at the highest power is restored first.

Consequently, the signal-demultiplexing device in the example illustrated in FIG. 8 may include a time deinterleaver 510 for generating a time-deinterleaved signal by applying time deinterleaving to a received signal, a de-normalizer 1010 for increasing the power of the received signal or the time-deinterleaved signal by the magnitude of the power reduction performed by the power normalizer of a transmitter, a core-layer BICM decoder 520 for restoring core-layer data from the signal, the power of which is adjusted by the de-normalizer 1010, an enhanced-layer symbol extractor 530 for extracting an enhanced-layer signal by performing cancellation corresponding to the core-layer data for the signal, the power of which is adjusted by the de-normalizer 1010, using the output signal of the core layer FEC decoder of the core-layer BICM decoder 520, a de-injection-level controller 1020 for increasing the power of the enhanced-layer signal by the magnitude of the power reduction performed by the injection-level controller of the transmitter, and an enhanced-layer BICM decoder 540 for restoring enhanced-layer data using the output signal of the de-injection-level controller 1020.

Here, the enhanced-layer symbol extractor may receive a whole codeword from the core-layer LDPC decoder of the core-layer BICM decoder, and may immediately perform bit interleaving thereon.

Here, the enhanced-layer symbol extractor may receive information bits from the core-layer LDPC decoder of the core-layer BICM decoder, perform core-layer LDPC encoding on the information bits, and perform bit interleaving.

Here, the enhanced-layer symbol extractor may receive information bits from the core-layer BCH decoder of the core-layer BICM decoder, perform core-layer BCH encoding and core-layer LDPC encoding on the information bits, and perform bit interleaving.

Here, the de-normalizer and the de-injection-level controller may be provided with injection-level information (IL INFO), which is provided based on L1 signaling, and may perform power control based on the injection-level information.

Here, the core-layer BICM decoder has a lower bit rate than the enhanced-layer BICM decoder, and may be more robust than the enhanced-layer BICM decoder.

Here, the de-normalizer may correspond to the reciprocal of the normalizing factor.

Here, the de-injection-level controller may correspond to the reciprocal of the scaling factor.

Here, enhanced-layer data may be restored based on cancellation corresponding to restoration of core-layer data corresponding to the core-layer signal.

Here, the signal-demultiplexing device may further include one or more extension-layer symbol extractors for extracting an extension-layer signal by performing cancellation corresponding to data of a previous layer, one or more de-injection-level controllers for increasing the power of the extension-layer signal by the magnitude of the power reduction performed by the injection-level controller of a transmitter, and one or more extension-layer BICM decoders for restoring one or more pieces of extension-layer data using the output signals of the one or more de-injection-level controllers.

Through the configuration illustrated in FIG. 8, it can be seen that a signal-demultiplexing method according to an embodiment of the present invention includes generating a time-deinterleaved signal by applying time deinterleaving to a received signal, increasing the power of the received signal or the time-deinterleaved signal by the magnitude of the power reduction performed by the power normalizer of a transmitter, restoring core-layer data from the power-adjusted signal, extracting an enhanced-layer signal by performing cancellation corresponding to the core-layer data for the power-adjusted signal, increasing the power of the enhanced-layer signal by the magnitude of the power reduction performed by the injection-level controller of the transmitter, and restoring enhanced-layer data using the power-adjusted enhanced-layer signal.

Here, extracting the enhanced-layer signal may comprise receiving a whole codeword from the core-layer LDPC decoder of the core-layer BICM decoder and immediately performing bit interleaving thereon.

Here, extracting the enhanced-layer signal may comprise receiving information bits from the core-layer LDPC decoder of the core-layer BICM decoder, performing core-layer LDPC encoding on the information bits, and performing bit interleaving.

Here, extracting the enhanced-layer signal may comprise receiving information bits from the core-layer BCH decoder of the core-layer BICM decoder, performing core-layer BCH encoding and core-layer LDPC encoding on the information bits, and performing bit interleaving.

Figure 9:
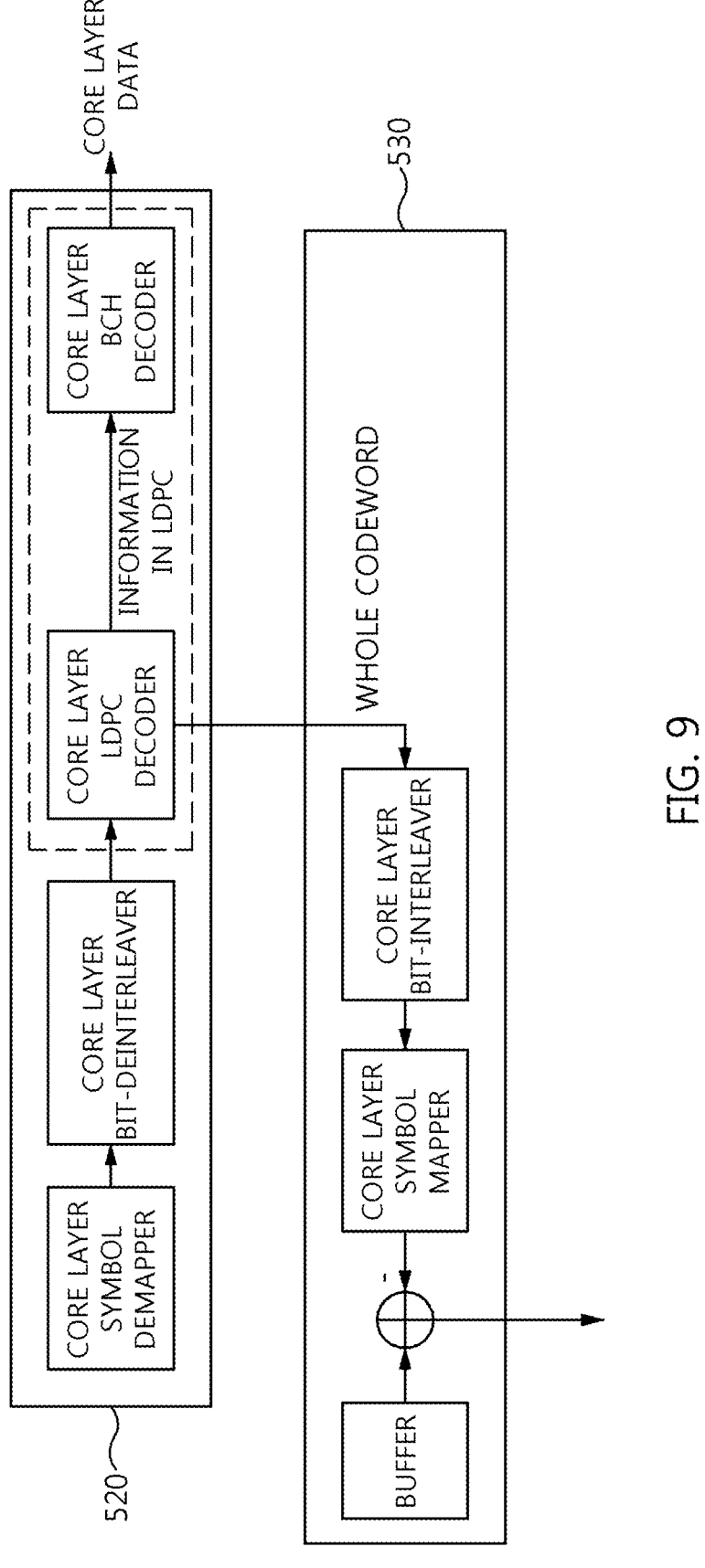
FIG. 9 is a block diagram illustrating an example of the core-layer BICM decoder and the enhanced-layer symbol extractor illustrated in FIG. 8.

FIG. 9 is a block diagram illustrating an example of the core-layer BICM decoder 520 and the enhanced-layer symbol extractor 530 illustrated in FIG. 8.

Referring to FIG. 9, the core-layer BICM decoder 520 includes a core-layer symbol demapper, a core-layer bit deinterleaver, a core-layer LDPC decoder, and a core-layer BCH decoder.

That is, in the example illustrated in FIG. 9, a core-layer error-correction decoder includes the core-layer LDPC decoder and the core-layer BCH decoder.

Also, in the example illustrated in FIG. 9, the core-layer LDPC decoder provides a whole codeword, including parity bits, to the enhanced-layer symbol extractor 530. That is, an LDPC decoder generally outputs only information bits of the whole LDPC codeword, but is able to output the whole codeword.

In this case, a simple enhanced-layer symbol extractor 530 may be implemented because it does not have to include a core-layer LDPC encoder or a core-layer BCH encoder, but there is the possibility of residual errors remaining in the LDPC code parity part.

Figure 10:
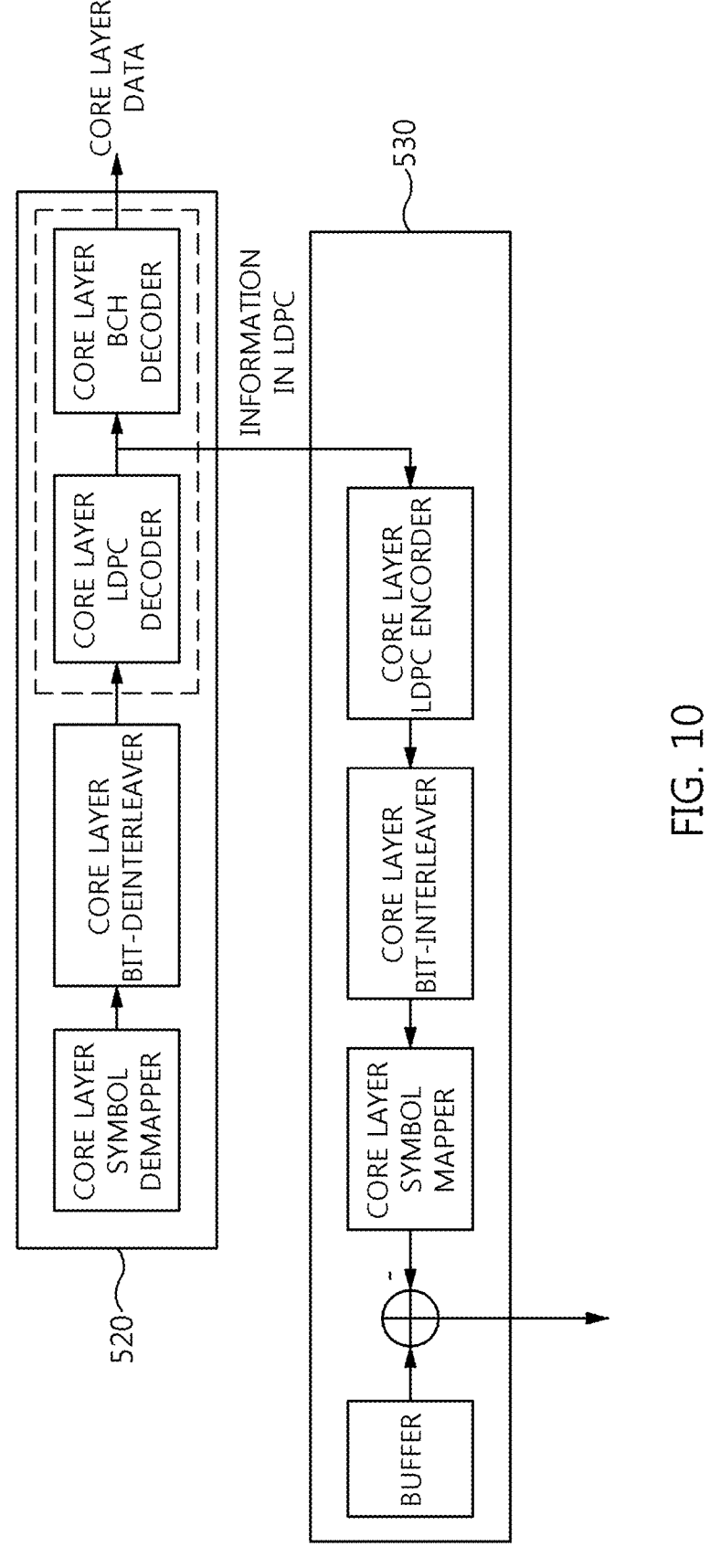
FIG. 10 is a block diagram illustrating another example of the core-layer BICM decoder and the enhanced-layer symbol extractor illustrated in FIG. 8.

FIG. 10 is a block diagram illustrating another example of the core-layer BICM decoder 520 and the enhanced-layer symbol extractor 530 illustrated in FIG. 8.

Referring to FIG. 10, the core-layer BICM decoder 520 includes a core-layer symbol demapper, a core-layer bit deinterleaver, a core-layer LDPC decoder, and a core-layer BCH decoder.

That is, in the example illustrated in FIG. 10, a core-layer error-correction decoder includes the core-layer LDPC decoder and the core-layer BCH decoder.

Also, in the example illustrated in FIG. 10, the core-layer LDPC decoder provides information bits in which no parity bits are included to the enhanced-layer symbol extractor 530.

In this case, the enhanced-layer symbol extractor 530 does not have to include a core-layer BCH encoder, but has to include a core-layer LDPC encoder.

When compared with the example illustrated in FIG. 9, the example illustrated in FIG. 10 makes it possible to remove residual errors that can remain in the LDPC code parity part.

Figure 11:
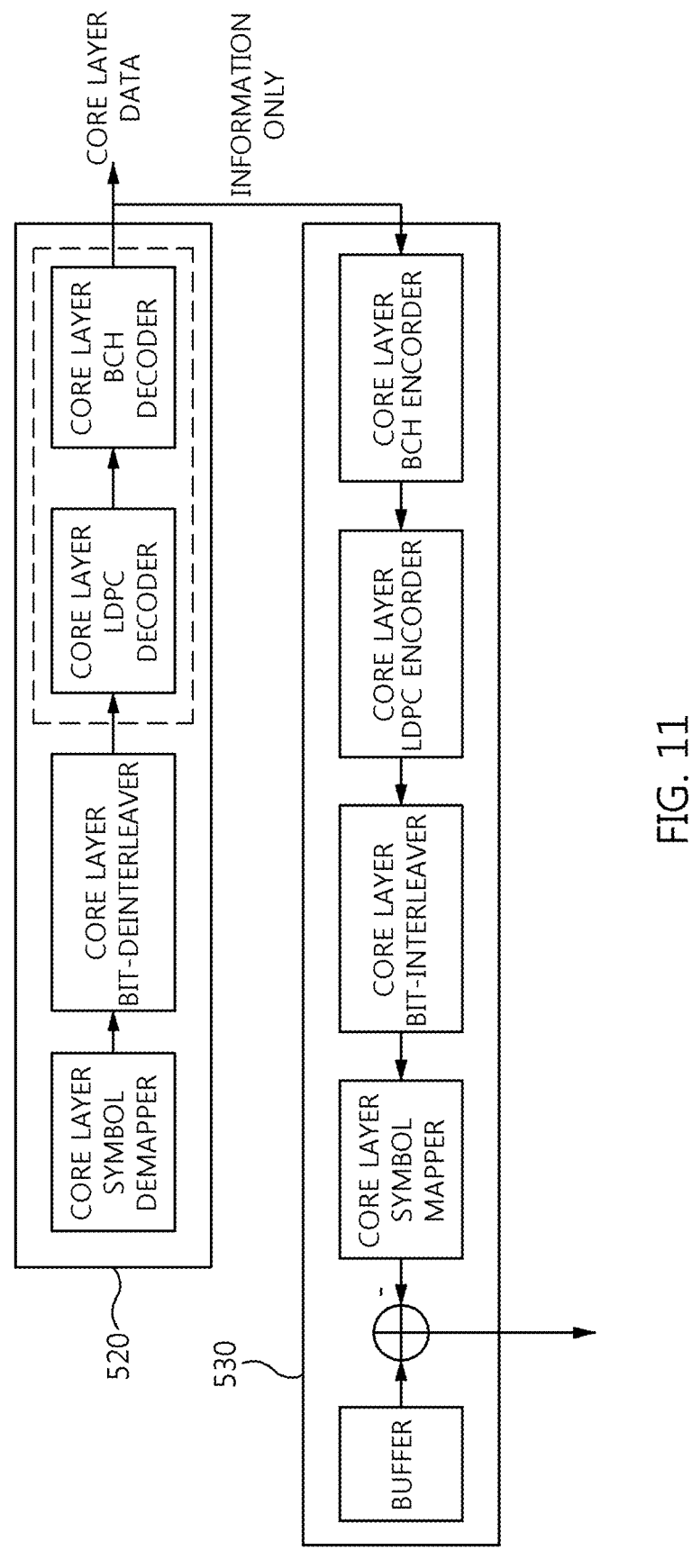
FIG. 11 is a block diagram illustrating a further example of the core-layer BICM decoder and the enhanced-layer symbol extractor illustrated in FIG. 8.

FIG. 11 is a block diagram illustrating a further example of the core-layer BICM decoder 520 and the enhanced-layer symbol extractor 530 illustrated in FIG. 8.

Referring to FIG. 11, the core-layer BICM decoder 520 includes a core-layer symbol demapper, a core-layer bit deinterleaver, a core-layer LDPC decoder, and a core-layer BCH decoder.

That is, in the example illustrated in FIG. 11, a core-layer error-correction decoder includes the core-layer LDPC decoder and the core-layer BCH decoder.

In the example illustrated in FIG. 11, the output of the core-layer BCH decoder, corresponding to core-layer data, is provided to the enhanced-layer symbol extractor 530.

In this case, the enhanced-layer symbol extractor 530 has high complexity because it has to include all of the core-layer LDPC encoder and the core-layer BCH encoder, but ensures the highest performance when compared with the examples of FIG. 9 and FIG. 10.

Figure 12:
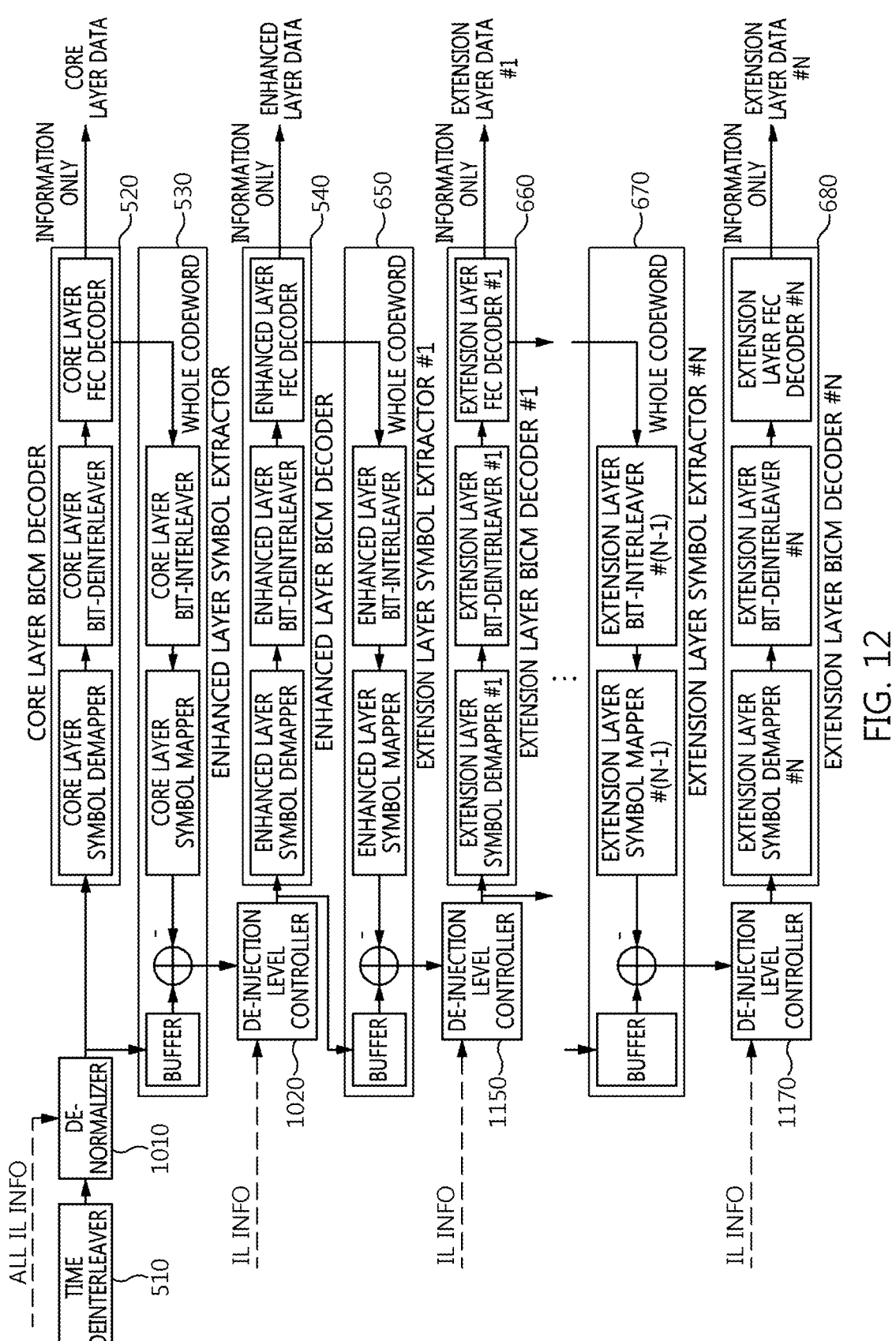
FIG. 12 is a block diagram illustrating another example of the signal-demultiplexing device illustrated in FIG. 1.

FIG. 12 is a block diagram illustrating another example of the signal-demultiplexing device illustrated in FIG. 1.

Referring to FIG. 12, the signal-demultiplexing device according to an embodiment of the present invention includes a time deinterleaver 510, a de-normalizer 1010, a core-layer BICM decoder 520, an enhanced-layer symbol extractor 530, an enhanced-layer BICM decoder 540, one or more extension-layer symbol extractors 650 and 670, one or more extension-layer BICM decoders 660 and 680, and de-injection-level controllers 1020, 1150, and 1170.

Here, the signal-demultiplexing device illustrated in FIG. 12 may correspond to the broadcast signal frame generation device illustrated in FIG. 7.

The time deinterleaver 510 is provided with a received signal from an OFDM receiver, which performs operations such as synchronization, channel estimation, equalization, and the like, and performs operations for dispersion of a burst error occurring in a channel. Here, L1 signaling information is preferentially decoded in the OFDM receiver, thereby being used for data decoding. Particularly, injection-level information in the L1 signaling information may be transferred to the de-normalizer 1010 and the de-injection-level controllers 1020, 1150, and 1170.

Here, the de-normalizer 1010 may acquire injection-level information pertaining to all layers, calculate a de-normalizing factor using Equation (6) below, and multiply the same by an input signal.

$$\text{De}-\text{Normalizing factor} = (\text{Normalizing factor})^{-1} = \qquad (6)$$

$$\left( \sqrt{ \begin{array}{c} \left(1 + 10^{-InjectionLevel\#1(dB)/10} + \right. \\ 10^{-InjectionLevel\#2(dB)/10} + ... + 10^{-InjectionLevel\#(N+1)(dB)/10} \end{array} } \right)$$

That is, the de-normalizing factor is the reciprocal of the normalizing factor represented using Equation (4) above.

According to an embodiment, when both injection-level information and normalizing factor information are included in L1 signaling, the de-normalizer 1010 may calculate the de-normalizing factor simply by taking the reciprocal of the normalizing factor, without the need to calculate the de-normalizing factor using the injection level.

The de-normalizer 1010 corresponds to the power normalizer of a transmitter, and increases power by the magnitude of the power reduction performed by the power normalizer.

In the example illustrated in FIG. 12, the de-normalizer 1010 is illustrated as adjusting the power of the signal output from the time interleaver 510, but according to an embodiment, the de-normalizer 1010 is located ahead the time interleaver 510 such that power adjustment is performed before interleaving.

That is, the de-normalizer 1010 can be seen as serving to amplify the magnitude of a signal for LLR calculation by a core-layer symbol demapper or the like by being located upstream or downstream of the time interleaver 510.

The output of the time deinterleaver 510 (or the output of the de-normalizer 1010) is provided to the core-layer BICM decoder 520, and the core-layer BICM decoder 520 restores core-layer data.

Here, the core-layer BICM decoder 520 includes a core-layer symbol demapper, a core-layer bit deinterleaver, and a core-layer error-correction decoder. The core-layer symbol demapper calculates Log-Likelihood Ratio (LLR) values related to a symbol, the core-layer bit deinterleaver mixes the calculated LLR values so as to be robust to a burst error, and the core-layer error-correction decoder corrects an error occurring in a channel.

Particularly, the core-layer error-correction decoder may output only information bits, or may output all bits in which the information bits are combined with parity bits. Here, the core-layer error-correction decoder may output only the information bits as core-layer data, and may output all of the bits in which the parity bits are combined with the information bits to the enhanced-layer symbol extractor 530.

The core-layer error-correction decoder may take a form in which a core-layer LDPC decoder and a core-layer BCH decoder are connected in series. That is, the input of the core-layer error-correction decoder may be input to the core-layer LDPC decoder, the output of the core-layer LDPC decoder may be input to the core-layer BCH decoder, and the output of the core-layer BCH decoder may be the output of the core-layer error-correction decoder. Here, the LDPC decoder performs LDPC decoding, and the BCH decoder performs BCH decoding.

The enhanced-layer error-correction decoder may also take a form in which an enhanced-layer LDPC decoder and an enhanced-layer BCH decoder are connected in series. That is, the input of the enhanced-layer error-correction decoder may be input to the enhanced-layer LDPC decoder, the output of the enhanced-layer LDPC decoder may be input to the enhanced-layer BCH decoder, and the output of the enhanced-layer BCH decoder may be the output of the enhanced-layer error-correction decoder.

Further, the extension-layer error-correction decoder may also take a form in which an extension-layer LDPC decoder and an extension-layer BCH decoder are connected in series. That is, the input of the extension-layer error-correction decoder may be input to the extension-layer LDPC decoder, the output of the extension-layer LDPC decoder may be input to the extension-layer BCH decoder, and the output of the extension-layer BCH decoder may be the output of the extension-layer error-correction decoder.

Particularly, the trade-off between complexity in implementation and performance, which is determined depending on which output of the error-correction decoder described with reference to FIG. 9, FIG. 10, and FIG. 11 is to be used, applies not only to the core-layer BICM decoder 520 and the enhanced-layer symbol extractor 530 but also to the extension-layer symbol extractors 650 and 670 and the extension-layer BICM decoders 660 and 680 in FIG. 12.

The enhanced-layer symbol extractor 530 may be provided with all bits from the core-layer error-correction decoder of the core-layer BICM decoder 520, and may extract enhanced-layer symbols from the output signal of the time deinterleaver 510 or the de-normalizer 1010. According to an embodiment, the enhanced-layer symbol extractor 530 may be provided with LDPC information bits or BCH information bits, rather than being provided with all bits from the error-correction decoder of the core-layer BICM decoder 520.

Here, the enhanced-layer symbol extractor 530 includes a buffer, a subtractor, a core-layer symbol mapper, and a core-layer bit interleaver. The buffer stores the output signal of the time deinterleaver 510 or the de-normalizer 1010. The core-layer bit interleaver receives all bits (information bits+ parity bits) from the core-layer BICM decoder and performs core-layer bit interleaving in the same manner as in the transmitter. From the interleaved signal, the core-layer symbol mapper generates the same core-layer symbol as the transmitter does. The subtractor subtracts the output signal of the core-layer symbol mapper from the signal stored in the buffer, thereby acquiring an enhanced-layer symbol and transferring the same to the de-injection-level controller 1020.

Here, the core-layer bit interleaver and the core-layer symbol mapper included in the enhanced-layer symbol extractor 530 may be the same as the bit interleaver and the symbol mapper of the core layer illustrated in FIG. 7.

The de-injection-level controller 1020 receives the enhanced-layer symbol and increases the power thereof by the magnitude of the power reduction performed by the injection-level controller of the transmitter. That is, the de-injection-level controller 1020 amplifies the input signal and provides the same to the enhanced-layer BICM decoder 540.

The enhanced-layer BICM decoder 540 receives the enhanced-layer symbol, the power of which is increased by the de-injection controller 1020, and restores enhanced-layer data.

Here, the enhanced-layer BICM decoder 540 may include an enhanced-layer symbol demapper, an enhanced-layer bit deinterleaver, and an enhanced-layer error-correction decoder. The enhanced-layer symbol demapper calculates Log-Likelihood Ratio (LLR) values related to an enhanced-layer symbol, the enhanced-layer bit deinterleaver mixes the calculated LLR values so as to be robust to a burst error, and the enhanced-layer error-correction decoder corrects an error occurring in a channel.

Particularly, the enhanced-layer error-correction decoder may output only information bits, or may output all bits in which the information bits are combined with parity bits. Here, the enhanced-layer error-correction decoder may output only the information bits as enhanced-layer data, and may output all of the bits in which the parity bits are combined with the information bits to the extension-layer symbol extractor 650.

The extension-layer symbol extractor 650 is provided with all bits from the enhanced-layer error-correction decoder of the enhanced-layer BICM decoder 540 and extracts extension-layer symbols from the output signal of the de-injection-level controller 1020.

Here, the de-injection-level controller 1020 may amplify the power of the output signal of the subtractor of the enhanced-layer symbol extractor 530.

Here, the extension-layer symbol extractor 650 includes a buffer, a subtractor, an enhanced-layer symbol mapper, and an enhanced-layer bit interleaver. The buffer stores the output signal of the de-injection-level controller 1020. The enhanced-layer bit interleaver receives all bits (information bits+parity bits) from the enhanced-layer BICM decoder and performs enhanced-layer bit interleaving in the same manner as in the transmitter. From the interleaved signal, the enhanced-layer symbol mapper generates the same enhanced-layer symbol as the transmitter does. The subtractor subtracts the output signal of the enhanced-layer symbol mapper from the signal stored in the buffer, thereby acquiring an extension-layer symbol and transferring the same to the de-injection-level controller 1150.

Here, the enhanced-layer bit interleaver and the enhanced-layer symbol mapper included in the extension-layer symbol extractor 650 may be the same as the bit interleaver and the symbol mapper of the enhanced layer illustrated in FIG. 7.

The de-injection-level controller 1150 increases power by the magnitude of the power reduction performed by the injection-level controller of the corresponding layer in the transmitter.

Here, the de-injection-level controller can be seen as performing an operation of multiplication of the extension layer gain of Equation (7) below. Here, the zeroth injection level may be regarded as 0 dB.

$$n\text{-}th \text{ Extension Layer Gain} = \frac{10^{-\text{Injection level\#}(n-1)(dB)/10}}{10^{-\text{Injection level\#}n(dB)/10}} \quad (7)$$

The extension-layer BICM decoder 660 receives the extension-layer symbol, the power of which is increased by the de-injection-level controller 1150, and restores extension-layer data.

Here, the extension-layer BICM decoder 660 may include an extension-layer symbol demapper, an extension-layer bit deinterleaver, and an extension-layer error-correction decoder. The extension-layer symbol demapper calculates Log-Likelihood Ratio (LLR) values related to an extension-layer symbol, the extension-layer bit deinterleaver mixes the calculated LLR values so as to be robust to a burst error, and the extension-layer error-correction decoder corrects an error occurring in a channel.

Particularly, two or more extension-layer symbol extractors and two or more extension-layer BICM decoders may be provided when there are two or more extension layers.

That is, in the example illustrated in FIG. 12, the extension-layer error-correction decoder of the extension-layer BICM decoder 660 may output only information bits, or may output all bits in which the information bits are combined with parity bits. Here, the extension-layer error-correction decoder may output only the information bits as extension-layer data, and may output all of the bits in which the parity bits are combined with the information bits to the subsequent extension-layer symbol extractor 670.

The structures and operations of the extension-layer symbol extractor 670, the extension-layer BICM decoder 680, and the de-injection-level controller 1170 may be easily understood from the structures and operations of the extension-layer symbol extractor 650, the extension-layer BICM decoder 660, and the de-injection-level controller 1150 described above.

Among the de-injection-level controllers 1020, 1150, and 1170, the de-injection-level controller illustrated as being located at a lower position in FIG. 12 may correspond to a greater power increase. That is, the de-injection-level controller 1150 may increase the power by a greater amount than the power increase achieved by the de-injection-level controller 1020, and the de-injection-level controller 1170 may increase the power by a greater amount than the power increase achieved by the de-injection-level controller 1150.

It can be seen that the signal-demultiplexing device illustrated in FIG. 12 first restores core-layer data, then restores enhanced-layer data by cancelling a core-layer symbol, and then restores extension-layer data by cancelling an enhanced-layer symbol. The extension layer may comprise two or more extension layers, in which case the extension layer combined at a higher power level is restored first.

Figure 13:
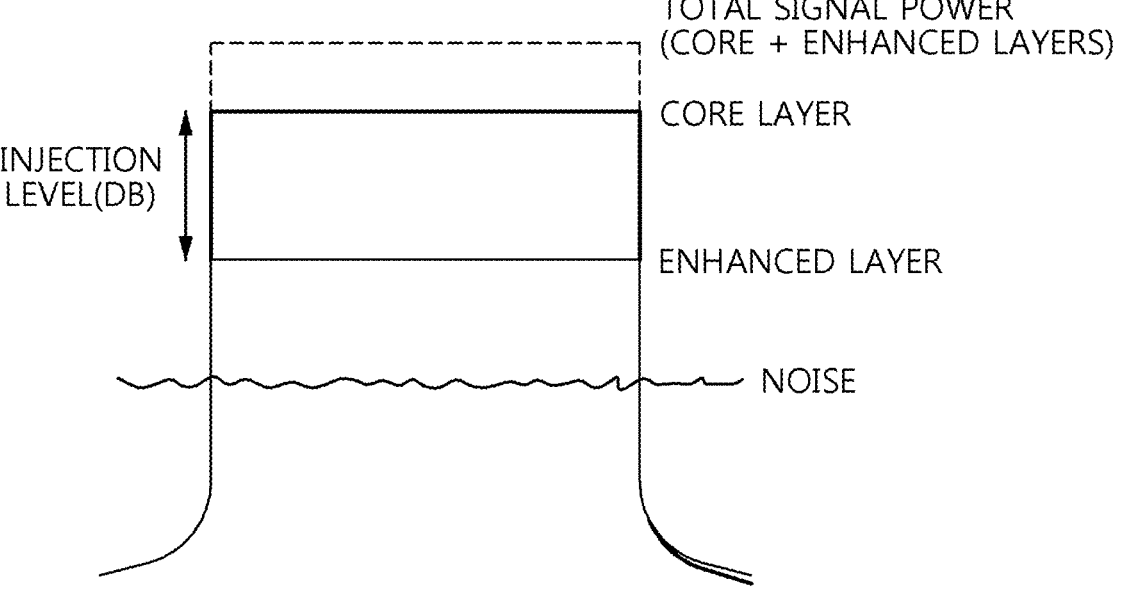
FIG. 13 is a view illustrating a power increase caused by a combination of a core-layer signal and an enhanced-layer signal.

FIG. 13 is a view illustrating a power increase resulting from a combination of a core-layer signal and an enhanced-layer signal.

Referring to FIG. 13, it can be seen that, when a multiplexed signal is generated by combining a core-layer signal with an enhanced-layer signal, the power of which is reduced by an injection level, the power level of the multiplexed signal is higher than the power level of the core-layer signal or that of the enhanced-layer signal.

Here, the injection level adjusted by the injection-level controller illustrated in FIG. 3 and FIG. 7 may be adjusted from 0 dB to 25.0 dB in increments of 0.5 dB or 1 dB. When the injection level is 3.0 dB, the power of the enhanced-layer signal is 3 dB lower than the power of the core-layer signal. When the injection level is 10.0 dB, the power of the enhanced-layer signal is 10 dB lower than the power of the core-layer signal. This relationship may apply between a core-layer signal and an enhanced-layer signal, between an enhanced-layer signal and an extension-layer signal, and between extension-layer signals.

The power normalizer illustrated in FIG. 3 and FIG. 7 adjusts a power level after combination of signals, thereby solving problems such as signal distortion resulting from a power increase caused by such combination, and the like.

Figure 14:
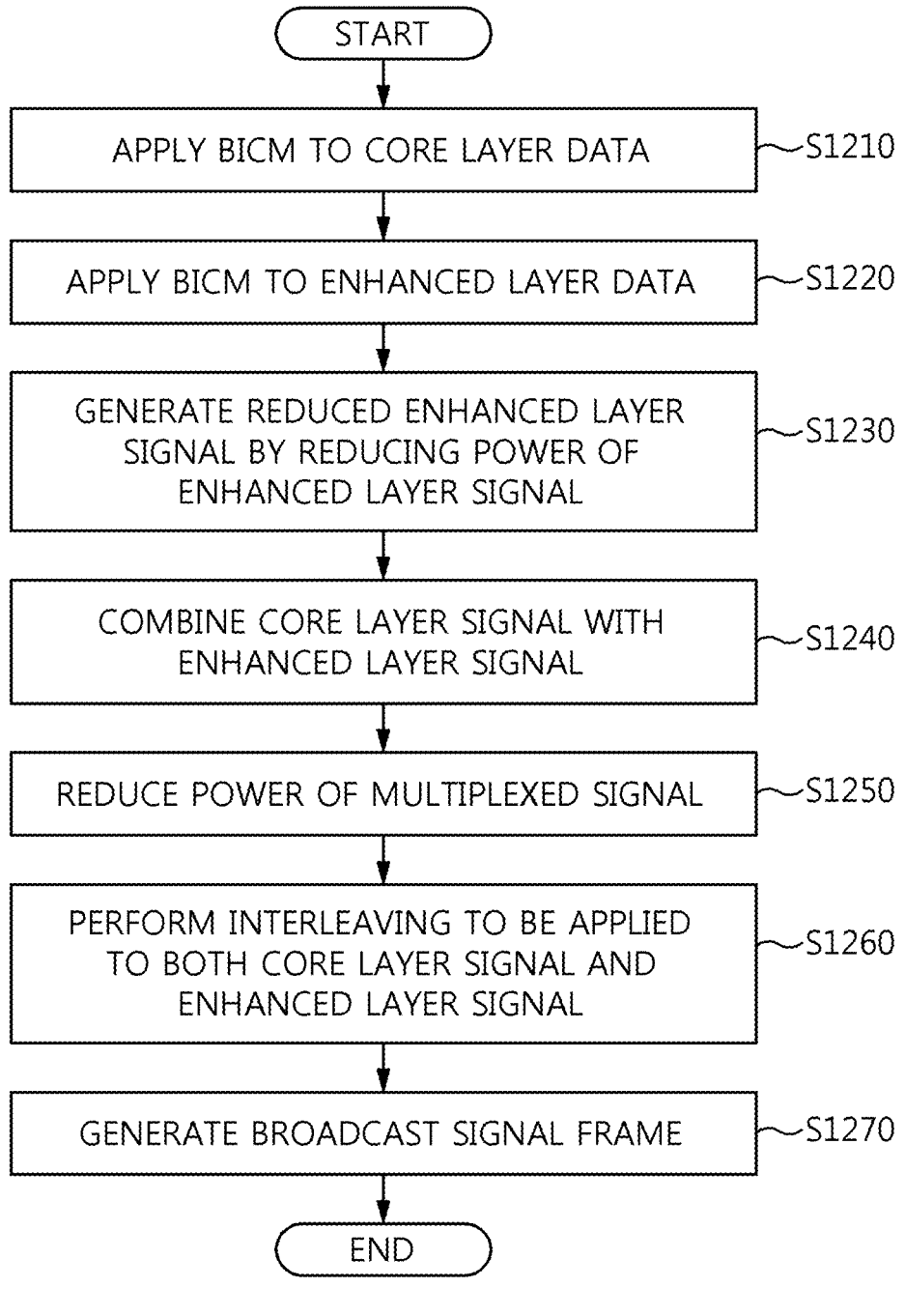
FIG. 14 is a flowchart illustrating a method for generating a broadcast signal frame according to an embodiment of the present invention.

FIG. 14 is a flowchart illustrating a method for generating a broadcast signal frame according to an embodiment of the present invention.

Referring to FIG. 14, in the method for generating a broadcast signal frame according to an embodiment of the present invention, BICM is applied to core-layer data at step S1210.

Also, in the method for generating a broadcast signal frame according to an embodiment of the present invention, BICM is applied to enhanced-layer data at step S1220.

The BICM applied at step S1220 may be different from the BICM applied at step S1210. Here, the BICM applied at step S1220 may be less robust than the BICM applied at step S1210. Here, the bit rate of the BICM applied at step S1220 may be greater than the bit rate applied at step S1210.

Here, an enhanced-layer signal may correspond to the enhanced-layer data restored based on cancellation corresponding to restoration of the core-layer data corresponding to a core-layer signal.

Also, in the method for generating a broadcast signal frame according to an embodiment of the present invention, a power-reduced enhanced-layer signal is generated by reducing the power of the enhanced-layer signal at step S1230.

Here, at step S1230, an injection level may be changed in a range from 0 dB to 25.0 dB in increments of 0.5 dB or 1 dB.

Also, in the method for generating a broadcast signal frame according to an embodiment of the present invention, the core-layer signal and the power-reduced enhanced-layer signal are combined, whereby a multiplexed signal is generated at step S1240.

Here, at step S1240, the core-layer signal and the enhanced-layer signal are combined at different power levels, and may be combined in the state in which the power level of the enhanced-layer signal is lower than the power level of the core-layer signal.

Here, at step S1240, one or more extension-layer signals having a power level lower than the power levels of the core-layer signal and the enhanced-layer signal may be combined with the core-layer signal and the enhanced-layer signal.

Also, in the method for generating a broadcast signal frame according to an embodiment of the present invention, power normalizing for reducing the power of the signal multiplexed at step S1250 is performed at step S1250.

Here, at step S1250, the power of the multiplexed signal may be reduced to the power of the core-layer signal. Here, at step S1250, the power of the multiplexed signal may be reduced by the magnitude of the power increase performed at step S1240.

Also, in the method for generating a broadcast signal frame according to an embodiment of the present invention, time interleaving is performed, whereby a time-interleaved signal is generated at step S1260.

Here, at step S1260, time interleaving applied both to the core-layer signal and to the enhanced-layer signal is performed, whereby the time-interleaved signal may be generated.

According to an embodiment, in the case of a single layer, a time-interleaved signal may be generated by performing time interleaving on a BICM output signal at step S1260.

Here, at step S1260, one of the time interleaver groups is used, and the boundary between the time interleaver groups may be the boundary between the Physical-Layer Pipes (PLPs) of a core layer corresponding to the core-layer signal.

Here, at step S1260, interleaving may be performed using a hybrid time interleaver. Here, the physical-layer pipes of the core layer and the enhanced layer may include only complete FEC blocks.

Here, at step S1260, interleaving may be performed using a convolutional time interleaver, the time interleaver groups may include a Physical-Layer Pipe (PLP) including an incomplete FEC block, and a preamble may be used to signal the start position information of a first complete FEC block within the physical-layer pipe.

Here, step S1260 may be performed using one of multiple operation modes.

Here, the operation modes may include a first mode for skipping time interleaving, a second mode for performing convolutional time interleaving, and a third mode for performing hybrid time interleaving.

Here, the operation mode may correspond to a time-interleaving mode.

Here, the time-interleaving mode corresponding to time interleaving may be signaled for each of all physical-layer pipes. Here, the time-interleaving mode may be included in the preamble.

Also, in the method for generating a broadcast signal frame according to an embodiment of the present invention, a broadcast signal frame including a preamble for signaling the time-interleaving mode corresponding to time interleaving for each of all physical-layer pipes is generated at step S1270.

Here, at step S1270, a broadcast signal frame including a preamble for signaling start position information and size information of each of the Physical-Layer Pipes (PLPs) may be generated. Here, the physical-layer pipes may include a core-layer physical-layer pipe corresponding to the core-layer signal and an enhanced-layer physical-layer pipe corresponding to the enhanced-layer signal.

Here, injection-level information corresponding to the enhanced-layer signal may be signaled so as to correspond to the enhanced-layer physical-layer pipe.

Here, when the core-layer physical-layer pipe is layered-division-multiplexed with two or more enhanced-layer physical-layer pipes, the physical-layer pipes may include the two or more enhanced-layer physical-layer pipes, and the two or more enhanced-layer physical-layer pipes may have the same injection-level information (L1D_plp_ldm_injection_level).

Here, the injection-level information may be a value 3 dB greater than the required SNR corresponding to the core-layer signal before LDM combining, as described with reference to Equation (10) above.

Here, the physical-layer pipes may be multiplexed by Frequency-Division Multiplexing (FDM), and signaling information corresponding to frequency-division multiplexing may be signaled only for the core-layer physical-layer pipes, and may not be signaled for the enhanced-layer physical-layer pipes.

Here, the signaling information corresponding to frequency-division multiplexing may include one or more of physical-layer pipe type information (L1D_plp_type), physical-layer pipe subslice interval information (L1D_plp_subslice_interval), or information about the number of physical-layer pipe subslices (L1D_plp_num_subslices), or a combination thereof.

Here, when it is frequency-division multiplexed, the enhanced-layer physical-layer pipe may follow a cell-writing order of signaling information corresponding to frequency-division multiplexing of the core-layer physical-layer pipe that is layered-division-multiplexed.

Here, the frequency-division-multiplexed enhanced-layer physical-layer pipes may have a size that does not exceed a total of 220 cells.

Also, when the enhanced-layer physical-layer pipe is layered-division-multiplexed with two or more core-layer physical-layer pipes, the physical-layer pipes may include the two or more core-layer physical-layer pipes, and a time-interleaving mode corresponding to the time interleaver may be either a hybrid time-interleaving mode or a mode in which no time interleaving is performed.

Here, the two or more core-layer physical-layer pipes may include an integer number of FEC blocks when the mode in which no time interleaving is performed is used.

Here, the two or more core-layer physical-layer pipes may have time-interleaving block sizes that are equal to each other or have a difference therebetween less than a preset value when the hybrid time-interleaving mode is used.

Also, the physical-layer pipes may have start position information and size information set such that duration that is not layered-division-multiplexed is not present in the core-layer physical-layer pipe that is layered-division-multiplexed with the enhanced-layer physical-layer pipe.

Here, the core-layer physical-layer pipe may be modulated using any one scheme among QPSK, 16 QAM, and 64 QAM, and may be encoded with a maximum code rate of 7/15 when 64 QAM is used.

Here, a maximum of four physical-layer pipes may be used for one complete delivered product.

Here, start position information and size information for the enhanced-layer physical-layer pipe may be generated in a manner different from the manner in which start position information and size information for the core-layer physical-layer pipe are generated.

Here, the start position information and the size information for the core-layer physical-layer pipe may be generated based on a first reference time, and the start position information and the size information for the enhanced-layer physical-layer pipe may be generated based on a second reference time, which is different from the first reference time.

Here, the first reference time may correspond to a time after time interleaving, and the second reference time may correspond to a time before time interleaving.

Here, the start position information and the size information for the enhanced-layer physical-layer pipe may be defined before time interleaving.

Here, the start position information and the size information for the core-layer physical-layer pipe may be defined within the current subframe.

Here, the start position information and the size information for the core-layer physical-layer pipe may be defined after time interleaving.

Here, the physical-layer pipes may include multiple core-layer physical-layer pipes corresponding to one complete delivered product, and the core-layer physical-layer pipes may not be layered-division-multiplexed.

Here, each of the core-layer physical-layer pipes may use any one of a mode in which no time interleaving is performed and a hybrid time-interleaving mode, and may not use a convolutional time-interleaving mode.

Here, when all of the time-interleaving modes corresponding to the core-layer physical-layer pipes are hybrid time-interleaving modes, all of the core-layer physical-layer pipes may use an intra-subframe interleaving mode or an inter-subframe interleaving mode.

Here, when all of the time-interleaving modes corresponding to the core-layer physical-layer pipes are hybrid time-interleaving modes, all of the core-layer physical-layer pipes may have the same value as the value of L1D_plp_HTI_inter_subframe.

Here, when all of the time-interleaving modes corresponding to the core-layer physical-layer pipes are hybrid time-interleaving modes and when all of the core-layer physical-layer pipes use an inter-subframe interleaving mode, the core-layer physical-layer pipes may use the same time-interleaving unit $N_{IU}$.

Here, when at least one of the time-interleaving modes corresponding to the core-layer physical-layer pipes is a mode in which no time interleaving is performed, all of the core-layer pipes configured to use a hybrid time-interleaving mode, among the core-layer pipes, may use an intra-subframe interleaving mode.

Here, one complete delivered product may correspond to one or more subframes, and the subframes may be generated by first filling all of available data cells thereof with dummy modulation values and overwriting the dummy modulation values with actual physical-layer pipe data.

Here, the dummy modulation values may be generated using a scrambling sequence, which is generated using a generator polynomial corresponding to $1+X+X^3+X^6+X^7+X^{11}+X^{12}+X^{13}+X^{16}$.

Here, the dummy modulation values may be generated by mapping the value of the scrambling sequence to one of two phases that are separated by 180 degrees.

Here, the physical-layer pipes may include a single enhanced-layer physical-layer pipe and multiple core-layer physical-layer pipes, which are layered-division-multiplexed with the single enhanced-layer physical-layer pipe.

Here, a time-interleaving mode corresponding to the enhanced-layer physical-layer pipe may be the same as time-interleaving modes corresponding to the core-layer physical-layer pipes with which the enhanced-layer physical-layer pipe is layered-division-multiplexed.

Here, all of the time-interleaving modes corresponding to the core-layer physical-layer pipes, with which the enhanced-layer physical-layer pipe is layered-division-multiplexed, may be a mode in which no time interleaving is performed or a hybrid time-interleaving mode.

Here, when all of the time-interleaving modes corresponding to the core-layer physical-layer pipes, with which the enhanced-layer physical-layer pipe is layered-division-multiplexed, are hybrid time-interleaving modes, all of the core-layer physical-layer pipes may use an intra-subframe interleaving mode.

Here, when all of the time-interleaving modes corresponding to the core-layer physical-layer pipes, with which the enhanced-layer physical-layer pipe is layered-division-multiplexed, are modes in which no time interleaving is performed, each of the core-layer physical-layer pipes may be formed of an integer number of FEC blocks in each subframe.

Here, the subframe may be generated by first filling all of available data cells thereof with dummy modulation values and overwriting the dummy modulation values with actual physical-layer pipe data.

Here, the dummy modulation values may be generated using a scrambling sequence, which is generated using a generator polynomial corresponding to $1+X+X^3+X^6+X^7+X^{11}+X^{12}+X^{13}+X^{16}$.

Here, the dummy modulation values may be generated by mapping the value of the scrambling sequence to one of two phases that are separated by 180 degrees.

Here, the scrambling sequence may be generated using 8 bits generated using the third-bit output $x^{14}$, the fourth-bit output $x^{13}$, the fifth-bit output $x^{12}$, the sixth-bit output $x^{11}$, the tenth-bit output $x^7$, the thirteenth-bit output $x^4$, the fourteenth-bit output $x^3$, and the sixteenth-bit output $x$ of a shift register, which is initialized to a value of 0xF180.

Here, the time interleaver information may be signaled based on the core layer.

Here, when the boundary between the time interleaver groups does not match the boundary between FEC blocks of the enhanced layer, the preamble may be used to signal information for identifying the portion of the FEC block of the enhanced layer corresponding to the boundary between the time interleaver groups.

Here, the information for identifying the portion of the FEC block may include one or more of start position information of the physical-layer pipe of the core layer, start position information of the physical-layer pipe of the enhanced layer, modulation information corresponding to the enhanced layer, or FEC-type information corresponding to the enhanced layer, or a combination thereof.

Here, the start position information of the physical-layer pipe may correspond to the index of the first data cell of the physical-layer pipe.

Here, the modulation information may be signaled only when the FEC-type information satisfies preset conditions.

Here, the enhanced-layer signal may correspond to enhanced-layer data, which is restored based on cancellation corresponding to restoration of core-layer data corresponding to the core-layer signal.

Here, step S1270 may include generating a bootstrap, generating a preamble, and generating a superimposed payload corresponding to the time-interleaved signal.

Here, the preamble may include PLP identification information for identifying Physical-Layer Pipes (PLPs) and layer identification information for identifying layers corresponding to division of layers.

Here, the PLP identification information and the layer identification information may be included in the preamble as separate fields.

Here, time interleaver information may be selectively included in the preamble depending on the result of comparing the layer identification information with a preset value (IF (j>0)) for each of the physical-layer pipes.

Here, the preamble may selectively include injection-level information corresponding to an injection-level controller depending on the result of comparing the layer identification information with a preset value (IF (j>0)) for each of the physical-layer pipes.

Here, the bootstrap may be shorter than the preamble, and may have a fixed length.

Here, the bootstrap may include a symbol indicating the structure of the preamble, and the symbol may correspond to a fixed-length bit string representing a combination of the modulation-method/code-rate of the preamble, an FFT size, a guard interval length, and a pilot pattern.

Here, the symbol may correspond to a lookup table in which a preamble structure corresponding to a second FFT size, which is smaller than a first FFT size, is assigned in preference to a preamble structure corresponding to the first FFT size when the same modulation-method/code-rate is given and in which a preamble structure corresponding to a second guard interval length, which is greater than a first guard interval length, is assigned in preference to a preamble structure corresponding to the first guard interval length when the same modulation-method/code-rate and the same FFT size are given.

Here, the broadcast signal frame may be an ATSC 3.0 frame.

Here, L1 signaling information may include injection-level information and/or normalizing factor information.

Here, the preamble may include the type information, the start position information, and the size information of the physical-layer pipes.

Here, the type information may be used to identify any one of a first type, corresponding to a non-dispersed physical-layer pipe, and a second type, corresponding to a dispersed physical-layer pipe.

Here, the non-dispersed physical-layer pipe may be assigned for contiguous data cell indices, and the dispersed physical-layer pipe may be formed of two or more subslices.

Here, the type information may be selectively signaled depending on the result of comparing the layer identification information with a preset value for each of the physical-layer pipes.

Here, the type information may be signaled only for the core layer.

Here, the start position information may be set to be the same as the index corresponding to the first data cell of the physical-layer pipe.

Here, the start position information may indicate the start position of the physical-layer pipe using a cell-addressing scheme.

Here, the start position information may be included in the preamble for each of the physical-layer pipes without evaluation of a conditional statement corresponding to the layer identification information.

Here, the size information may be set based on the number of data cells assigned to the physical-layer pipe.

Here, the size information may be included in the preamble for each of the physical-layer pipes without evaluation of a conditional statement corresponding to the layer identification information.

Here, the preamble may include a field indicating the start position of the first complete FEC block corresponding to the current physical-layer pipe for the first and second modes, but may not include a field indicating the start position of the first FEC block for the third mode.

Here, the field indicating the start position of the first FEC block may be any one of a first field used in the first mode and a second field used in the second mode, and the first field and the second field may have different lengths.

Here, the length of the second field may be greater than the length of the first field.

Here, the length of the first field may be determined based on the length of an LDPC codeword and a modulation order, and the length of the second field may be determined by further considering the depth of the convolutional time interleaver, as well as the length of the LDPC codeword and the modulation order.

Here, the length of the first field may be 15 bits, and the length of the second field may be 22 bits.

Here, the first field and the second field may be signaled separately for each of the core layer, corresponding to the core-layer signal, and the enhanced layer, corresponding to the enhanced-layer signal.

Although not explicitly illustrated in FIG. 14, the method for generating a broadcast signal frame may further include generating signaling information including injection-level information corresponding to step S1230. Here, the signaling information may be L1 signaling information.

The method for generating a broadcast signal frame illustrated in FIG. 14 may correspond to step S210 illustrated in FIG. 2.

Although not explicitly illustrated in FIG. 14, the method for generating a broadcast signal frame may further include inserting dummy values into the enhanced-layer data between step S1220 and step S1230.

Here, the dummy values may be inserted after the actual data cells of the last Enhanced PLP in a PLP group such that the total number of enhanced-layer cells in the PLP group becomes equal to the total number of core-layer cells in the PLP group.

Here, the dummy values may not be inserted into the core-layer data.

Here, the dummy values may be inserted after core-layer BICM and enhanced-layer BICM are completed and before the core-layer signal and the enhanced-layer signal are combined.

Here, the dummy values may correspond to a preset scrambling sequence.

Here, the scrambling sequence may be modulated using the constellation mapping that was used for the last enhanced PLP.

Here, the dummy values may have the same power as the last enhanced PLP.

Here, the scrambling sequence may be generated using a 16-bit shift register corresponding to a preset generator polynomial.

Here, the scrambling sequence may be generated using a generator polynomial corresponding to $1+X+X^3+X^6+X^7+X^{11}+X^{12}+X^{13}+X^{16}$.

Here, the scrambling sequence may be generated using 8 bits generated using the third-bit output $x^{14}$, the fourth-bit output $x^{13}$, the fifth-bit output $x^{12}$, the sixth-bit output $x^{11}$, the tenth-bit output $x^7$, the thirteenth-bit output $x^4$, the fourteenth-bit output $x^3$, and the sixteenth-bit output x of the shift register, which is initialized to a value of 0xF180.

Figure 15:
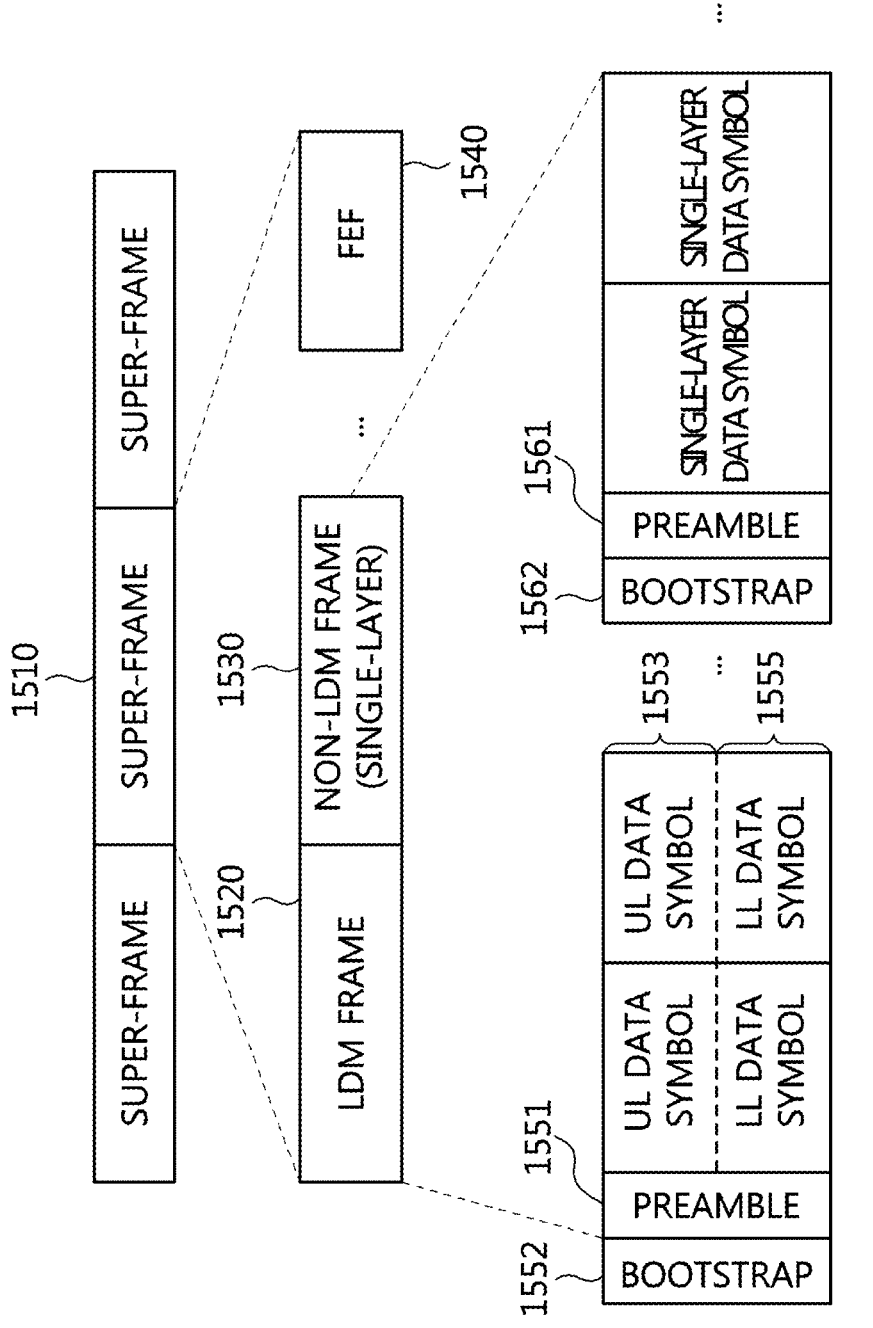
FIG. 15 is a view illustrating a super-frame structure including a broadcast signal frame according to an embodiment of the present invention.

FIG. 15 is a view illustrating the structure of a super-frame including a broadcast signal frame according to an embodiment of the present invention.

Referring to FIG. 15, it can be seen that a super-frame based on Layered-Division Multiplexing (LDM) is formed of one or more frames and that each frame is formed of one or more OFDM symbols.

Here, each of the OFDM symbols may start with one or more preamble symbols. Also, the frame may alternatively include a reference symbol or a pilot symbol.

The super-frame 1510 illustrated in FIG. 15 includes an LDM frame 1520, a non-LDM single-layer frame 1530, and a Future Extension Frame (FEF) 1540 for future extensibility, and may be formed using a Time-Division Multiplexing (TDM) method.

When two layers are applied, the LDM frame 1520 may be formed of an Upper Layer (UL) 1553 and a Lower Layer (LL) 1555.

Here, the upper layer 1553 may correspond to a core layer, and the lower layer 1555 may correspond to an enhanced layer.

Here, the LDM frame 1520, including the upper layer 1553 and the lower layer 1555, may include a bootstrap 1552 and a preamble 1551.

Here, data of the upper layer 1553 and data of the lower layer 1555 may share a time interleaver and use the same frame length and the same FFT size in order to reduce complexity and a memory size.

Also, the single-layer frame 1530 may also include a bootstrap 1562 and a preamble 1561.

Here, the single-layer frame 1530 may use an FFT size, a time interleaver, and a frame length that are different from those of the LDM frame 1520. Here, the single-layer frame 1530 can be seen as being multiplexed with the LDM frame 1520 within the super-frame 1510 using a TDM method.

Figures 16, 17:
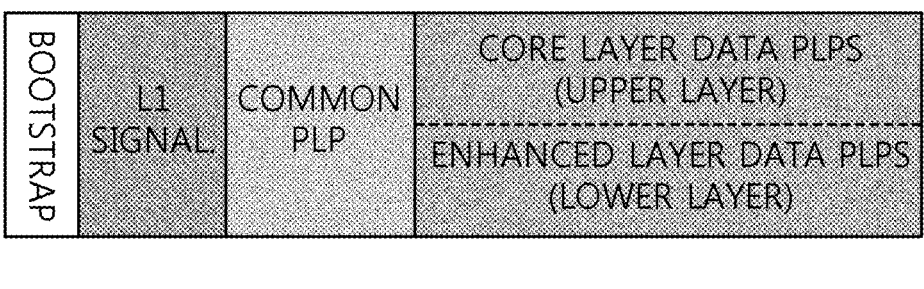
FIG. 16 is a view illustrating an example of an LDM frame to which LDM using two layers and multiple Physical-Layer Pipes (PLPs) are applied.
FIG. 17 is a view illustrating another example of an LDM frame to which LDM using two layers and multiple Physical-Layer Pipes (PLPs) are applied.

FIG. 16 is a view illustrating an example of an LDM frame to which LDM using two layers and multiple Physical-Layer Pipes (PLPs) are applied.

Referring to FIG. 16, it can be seen that an LDM frame starts with a bootstrap signal, including system version information or general signaling information. After the bootstrap, L1 signaling information, including a code rate, modulation information, information about the number of physical-layer pipes, and the like, may follow the bootstrap as a preamble.

After the preamble (L1 signal), a common Physical-Layer Pipe (PLP) in a burst form may be transmitted. Here, the common physical-layer pipe may be used to transmit data that can be shared with other physical-layer pipes within the frame.

After the common physical-layer pipe, multiple physical-layer pipes for providing different broadcast signals are transmitted using a method of LDM of two layers. Here, services (720p or 1080p HD) requiring robust reception, such as indoor/mobile services, may be transmitted through core-layer (upper-layer) data physical-layer pipes, and a fixed reception service (4K-UHD or multiple HD) requiring a high transmission rate may be transmitted through enhanced-layer (lower-layer) data physical-layer pipes.

When multiple physical-layer pipes are layered-division-multiplexed, this can be understood as an increase in the total number of physical-layer pipes.

Here, the core-layer-data physical-layer pipe and the enhanced-layer-data physical-layer pipe may share a time interleaver in order to reduce complexity and a memory size. Here, the core-layer-data physical-layer pipe and the enhanced-layer-data physical-layer pipe may have the same PLP size or different PLP sizes.

According to an embodiment, physical-layer pipes divided into layers may have different PLP sizes, in which case information for identifying the start positions of the PLPs or the sizes of the PLPs may be signaled.

FIG. 17 is a view illustrating another example of an LDM frame to which LDM using two layers and multiple Physical-Layer Pipes (PLPs) are applied.

Referring to FIG. 17, it can be seen that an LDM frame may include a common physical-layer pipe after a bootstrap and a preamble (L1 signal). After the common physical-layer pipe, core-layer-data physical-layer pipes and enhanced-layer-data physical-layer pipes may be transmitted using a 2-layer LDM method.

Particularly, the core-layer-data physical-layer pipes and the enhanced-layer-data physical-layer pipes illustrated in FIG. 17 may be either one of type 1 and type 2, and type 1 and type 2 may be defined as follows.

PLP of Type 1 being transmitted after a common PLP when the common PLP is present being transmitted in a burst form (one slice) within a frame PLP of Type 2 being transmitted after a PLP of type 1 when a PLP of type 1 is present being distributed in the form of two or more subslices within a frame and transmitted time diversity being increased with an increase in the number of subslices and having an effect of power consumption Here, a PLP of type 1 may correspond to a non-dispersed PLP, and a PLP of type 2 may correspond to a dispersed PLP. Here, the non-dispersed PLP may be assigned to contiguous data cell indices. Here, the dispersed PLP may be divided and assigned to two or more subslices.

Figures 18, 19:
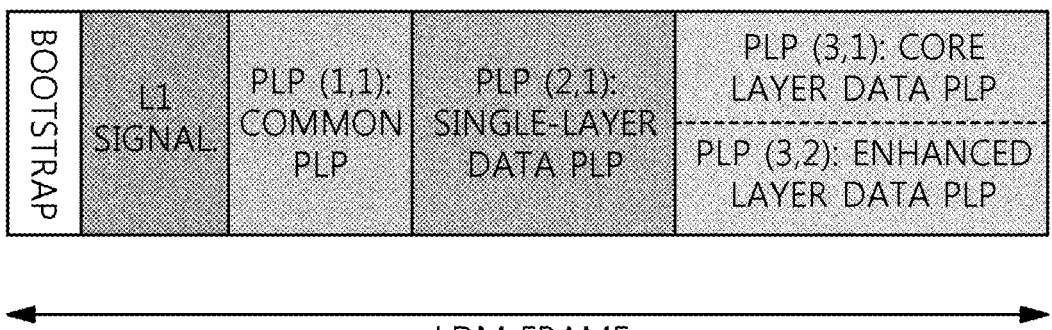
FIG. 18 is a view illustrating an example of use of an LDM frame to which LDM using two layers and multiple Physical-Layer Pipes (PLPs) are applied.
FIG. 19 is a view illustrating another example of use of an LDM frame to which LDM using two layers and multiple Physical-Layer Pipes (PLPs) are applied.

FIG. 18 is a view illustrating an example of the use of an LDM frame to which LDM using two layers and multiple Physical-Layer Pipes (PLPs) are applied.

Referring to FIG. 18, an LDM frame may include a common physical-layer pipe PLP(1,1) after a bootstrap and a preamble, and may include a data physical-layer pipe PLP(2,1) for robust audio service using a time-division method.

Also, a core-layer-data physical-layer pipe PLP(3,1) for mobile/indoor services (720p or 1080p HD) and an enhanced-layer-data physical-layer pipe PLP(3,2) for a high-data-rate service (4K-UHD or multiple-HD) may be transmitted using a 2-layer LDM method.

FIG. 19 is a view illustrating another example of the use of an LDM frame to which LDM using two layers and multiple physical-layer pipes are applied.

Referring to FIG. 19, an LDM frame may include a bootstrap, a preamble, and a common physical-layer pipe PLP(1,1). Here, a robust audio service and a mobile/indoor service (720p or 1080p HD) are separately transmitted using core-layer-data physical-layer pipes PLP(2,1) and PLP(3,1), and a high-data-rate service (4K-UHD or multiple-HD) may be transmitted using enhanced-layer-data physical-layer pipes PLP(2,2) and PLP(3,2).

Here, the core-layer-data physical-layer pipe and the enhanced-layer-data physical-layer pipe may use the same time interleaver.

Here, for the physical-layer pipes PLP(2,2) and PLP(3,2), which provide the same service, PLP_GROUP_ID indicating the same PLP group may be used to signal information indicating physical-layer pipes for providing the same service.

According to an embodiment, when physical-layer pipes having different sizes are used for respective LDM layers, a service may be identified based on the start position and the size of each of the physical-layer pipes, without PLP_GROUP_ID.

FIGS. 18 and 19 illustrate an example in which multiple physical-layer pipes and layers corresponding to layered-division multiplexing are identified using PLP(i, j), but PLP identification information and layer identification information may alternatively be signaled as separate fields.

According to an embodiment, PLPs having different sizes may be used in respective layers. In this case, each service may be identified using a PLP identifier.

When PLPs having different sizes are used in respective layers, the start position and the PLP length may be signaled for each PLP.

The pseudocode below illustrates an example of fields included in a preamble according to an embodiment of the present invention. Here, the pseudocode below may be included in L1 signaling information of the preamble.

```
[Pseudocode]

SUB_SLICES_PER_FRAME              (15 bits)
NUM_PLP                           (8 bits)
NUM_AUX                           (4 bits)
AUX_CONFIG_RFU                    (8 bits)
for i=0.. NUM_RF−1 {
  RF_IDX                          (3 bits)
  FREQUENCY                       (32 bits)
}
IF S2=='xxx1' {
  FEF_TYPE                        (4 bits)
  FEF_LENGTH                      (22 bits)
  FEF_INTERVAL                    (8 bits)
}
for i=0 .. NUM_PLP−1 {
  NUM_LAYER                       (2~3 bits)
    for j=0 .. NUM_LAYER−1{
    / * Signaling for each layer */
    PLP_ID (i, j)                 (8 bits)
    PLP_GROUP_ID                  (8 bits)
    PLP_TYPE                      (3 bits)
    PLP_PAYLOAD_TYPE              (5 bits)
    PLP_COD                       (4 bits)
    PLP_MOD                       (3 bits)
    PLP_SSD                       (1 bit)
    PLP_FEC_TYPE                  (2 bits)
    PLP_NUM_BLOCKS_MAX            (10 bits)
    IN_BAND_A_FLAG                (1 bit)
    IN_BAND_B_FLAG                (1 bit)
    PLP_MODE                      (2 bits)
    STATIC_PADDING_FLAG           (1 bit)
    IF (j > 0)
      LL_INJECTION_LEVEL          (3~8 bits)
    } / * End of NUM_LAYER loop */
  / * Common signaling for all layers */
  FF_FLAG                         (1 bit)
  FIRST_RF_IDX                    (3 bits)
  FIRST_FRAME_IDX                 (8 bits)
  FRAME_INTERVAL                  (8 bits)
  TIME_IL_LENGTH                  (8 bits)
  TIME_IL_TYPE                    (1 bit)
  RESERVED_1                      (11 bits)
  STATIC_FLAG                     (1 bit)
  PLP_START                       (24 bits)
  PLP_SIZE                        (24 bits)
} / * End of NUM_PLP loop */
FEF_LENGTH_MSB                    (2 bits)
RESERVED_2                        (30 bits)
for i=0 .. NUM_AUX−1 {
  AUX_STREAM_TYPE                 (4 bits)
  AUX_PRIVATE_CONF                (28 bits)
}
```

In the above pseudocode, NUM_LAYER may be configured with 2 bits or 3 bits. Here, NUM_LAYER may be a field used to indicate the number of layers within each of PLPs separated in time. Here, NUM_LAYER is defined in NUM_PLP loop, whereby respective PLPs separated in time may have different numbers of layers.

In the above pseudocode, LL_INJECTION_LEVEL may be configured with 3 to 8 bits. Here, LL_INJECTION_LEVEL may be a field for defining an injection level of a lower layer (enhanced layer). Here, LL_INJECTION_LEVEL may correspond to injection-level information.

Here, when there are two or more layers, LL_INJECTION_LEVEL may be defined from the second layer (j>0).

Fields such as PLP_ID (i,j), PLP_GROUP_ID, PLP_TYPE, PLP_PAYLOAD_TYPE, PLP_COD, PLP_MOD, PLP_SSD, PLP_FEC_TYPE, PLP_NUM_BLOCKS_MAX, IN_BAND_A_FLAG, IN_BAND_B_FLAG, PLP_MODE, STATIC_PADDING_FLAG, and the like are parameters defined for each layer, and may be defined in NUM_LAYER loop.

Here, PLP_ID (i, j) may correspond to PLP identification information and layer identification information. For example, i in PLP_ID (i, j) may correspond to PLP identification information, and j therein may correspond to layer identification information.

According to an embodiment, the PLP identification information and the layer identification information may be included in the preamble as separate fields.

Also, time interleaver information, such as TIME_IL_LENGTH, TIME_IL_TYPE, and the like, FRAME_INTERVAL or FF_FLAG related to a PLP size, and fields such as FIRST_RF_IDX, FIRST_FRAME_IDX, RESERVED_1, STATIC_FLAG, and the like may be defined outside NUM_LAYER loop and inside NUM_PLP loop.

Particularly, PLP_TYPE indicates the above-described type information of physical-layer pipes, and may be configured with one bit because it is necessary to identify only two types, namely a first type and a second type. In the above pseudocode, an example in which PLP_TYPE is included in the preamble without evaluation of a conditional statement corresponding to layer identification information (j) is described, but PLP_TYPE may be selectively signaled (transmitted only for a core layer) depending on the result of comparing the layer identification information (j) with a preset value (0) (if (j=0)).

In the above pseudocode, the case in which PLP_TYPE is defined in NUM_LAYER loop is illustrated as an example, but PLP_TYPE may be defined outside NUM_LAYER loop and inside NUM_PLP loop according to an embodiment.

In the above pseudocode, PLP_START indicates the start position of a corresponding physical-layer pipe. Here, PLP_START may indicate the start position using a cell-addressing scheme. Here, PLP_START may be the index corresponding to the first data cell of the corresponding PLP.

Particularly, PLP_START may be signaled for each of all physical-layer pipes, and may be used for identification of service using multiple physical-layer pipes, along with a field for signaling the size of a PLP, according to an embodiment.

In the above pseudocode, PLP_SIZE is size information of physical-layer pipes. Here, PLP_SIZE may be set to be equal to the number of data cells assigned to a corresponding physical-layer pipe.

That is, in the above pseudocode, PLP_TYPE is signaled in consideration of layer identification information, and PLP_SIZE and PLP_START can be seen as being signaled for all physical-layer pipes regardless of the layer identification information.

The combiner 340 illustrated in FIG. 3 and FIG. 7 functions to combine a core-layer signal with an enhanced-layer signal, and because the core-layer signal and the enhanced-layer signal share a single time interleaver, the combiner 340 may perform combination for each time interleaver group shared between the core-layer signal and the enhanced-layer signal.

Here, it is advantageous to set a time interleaver group based on a core layer from the aspect of memory efficiency or system efficiency.

However, when a time interleaver group is set based on a core layer, an FEC block segmented by the boundary between time interleaver groups may be present in an enhanced layer, and when such a segmented FEC block is present, it may be necessary to signal fields that are required for identifying the portion of the FEC block corresponding to the boundary between the time interleaver groups.

The time interleaver used for Layered-Division Multiplexing (LDM) may be a convolutional time interleaver (CTI) or a hybrid time interleaver (HTI). Here, the convolutional time interleaver may be used when a single physical-layer pipe is present in a core layer, and the hybrid time interleaver may be used when two or more physical-layer pipes are present in the core layer. When the hybrid time interleaver is used, the physical-layer pipes may include only complete FEC blocks.

Figure 20:
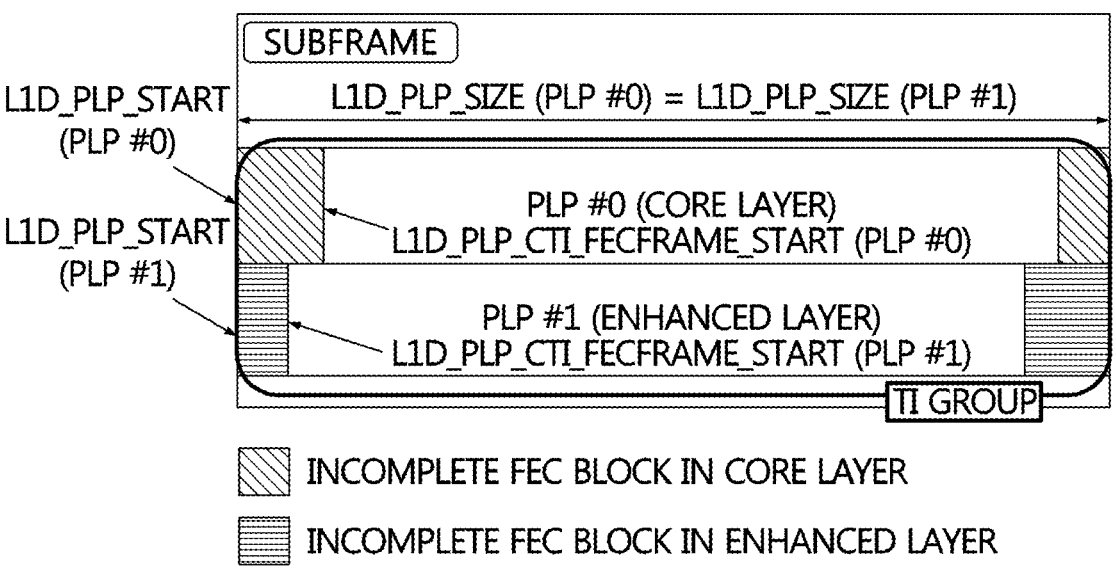
FIG. 20 is a view illustrating an example of the case in which a convolutional time interleaver is used.

FIG. 20 is a view illustrating an example of the case in which a convolutional time interleaver is used.

Referring to FIG. 20, it can be seen that a subframe includes two layers, namely a core layer and an enhanced layer.

In the example illustrated in FIG. 20, because a subframe includes only one physical-layer pipe PLP #0 in the core layer, the time interleaver corresponding to the subframe is a convolutional time interleaver. When such a convolutional time interleaver is used, a physical-layer pipe of each layer may include an incomplete FEC block.

Such an incomplete FEC block is located at the edge of a PLP, so may be identified using a field such as "L1D_plp_CTI_fec_block_start" indicating the position of the first complete FEC block in each PLP.

The example illustrated in FIG. 20 shows the case in which the start position and the size of the physical-layer pipe PLP #0 of the core layer are the same as those of the physical-layer pipe PLP #1 of the enhanced layer.

In the example illustrated in FIG. 20, it can be seen that a time interleaver group (TI Group) corresponds to the physical-layer pipe PLP #0 of the core layer. The time interleaver group is applied in common to the core layer and the enhanced layer, and it is advantageous to set the time interleaver group so as to correspond to the core layer from the aspect of memory or system efficiency.

Figure 21:
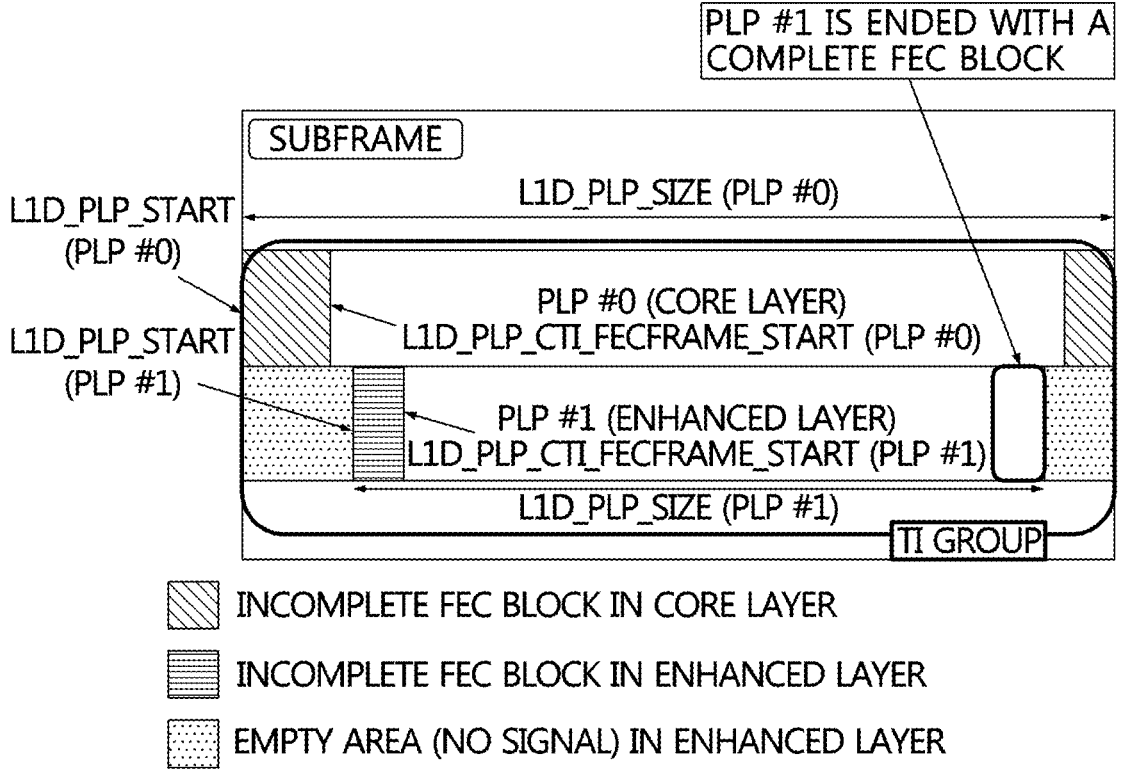
FIG. 21 is a view illustrating another example of the case in which a convolutional time interleaver is used.

FIG. 21 is a view illustrating another example of the case in which a convolutional time interleaver is used.

Referring to FIG. 21, it can be seen that the start position and the size of the physical-layer pipe of PLP #0 of a core layer are different from those of the physical-layer pipe PLP #1 of an enhanced layer.

When the start position and the size of the physical-layer pipe PLP #0 of the core layer are different from those of the physical-layer pipe PLP #1 of the enhanced layer, as described above, the enhanced layer may include an empty area.

As illustrated in FIG. 21, when such an empty area is included after the physical-layer pipe PLP #1 of the enhanced layer, the physical-layer pipe PLP #1 of the enhanced layer ends with a complete FEC block.

Figure 22:
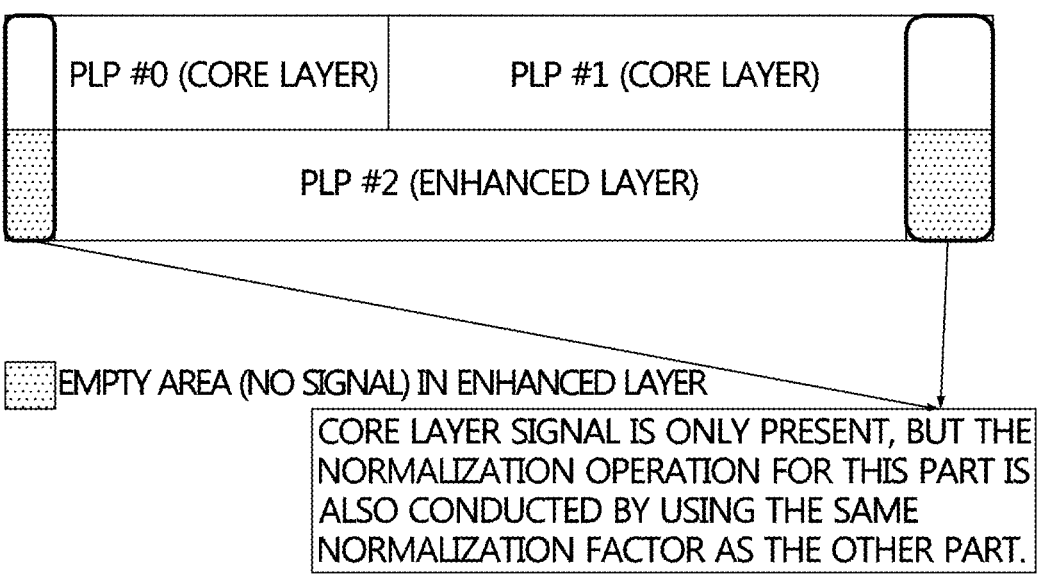
FIG. 22 is a view illustrating an example of the case in which a hybrid time interleaver is used.

FIG. 22 is a view illustrating an example of the case in which a hybrid time interleaver is used.

Referring to FIG. 22, it can be seen that a core layer includes two physical-layer pipes PLP #0 and PLP #1.

As such, when a core layer includes multiple physical-layer pipes, a hybrid time interleaver is used.

When a hybrid time interleaver is used, all of the physical-layer pipes of the core layer and the enhanced layer include only complete FEC blocks.

Here, some parts of the enhanced layer may be emptied for alignment with the boundary of the core layer.

Figure 23:
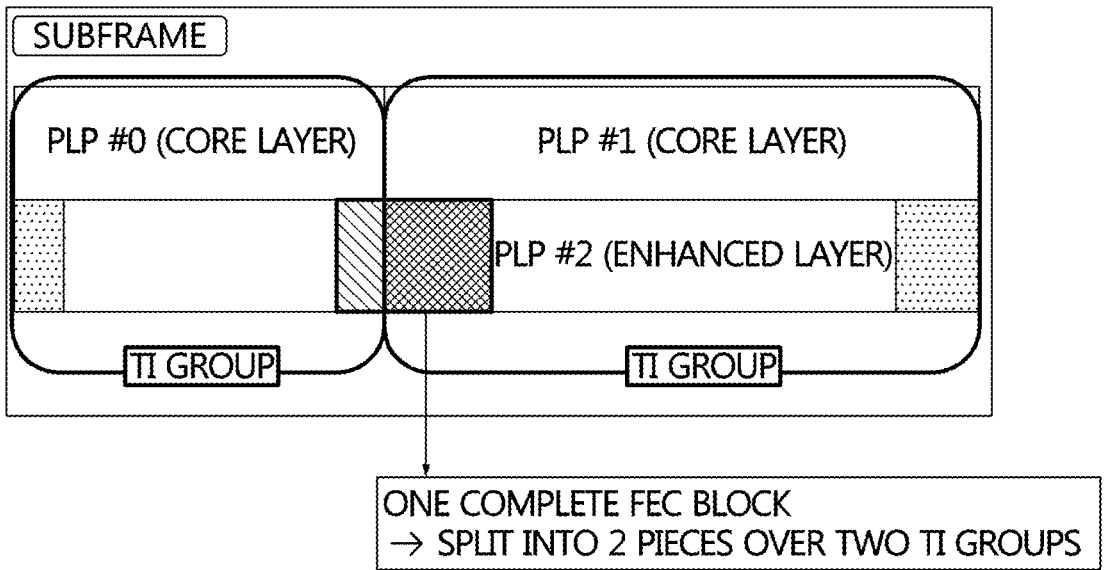
FIG. 23 is a view illustrating a time interleaver group in the example illustrated in FIG. 22.

FIG. 23 is a view illustrating a time interleaver group in the example illustrated in FIG. 22.

Referring to FIG. 23, it can be seen that the boundary between time interleaver groups is set so as to match the boundary between the physical-layer pipes of a core layer.

In FIG. 23, an example in which a time interleaver group includes only one core-layer physical-layer pipe is illustrated, but according to an embodiment, a time interleaver group may include two or more core-layer physical-layer pipes.

In the example illustrated in FIG. 23, one FEC block in the enhanced layer may be split by the boundary between the time interleaver groups.

This is because segmentation into time interleaver groups is performed based on the core layer, in which case information for identifying the incomplete FEC block of the enhanced layer corresponding to the boundary between the time interleaver groups may be signaled.

Figure 24:
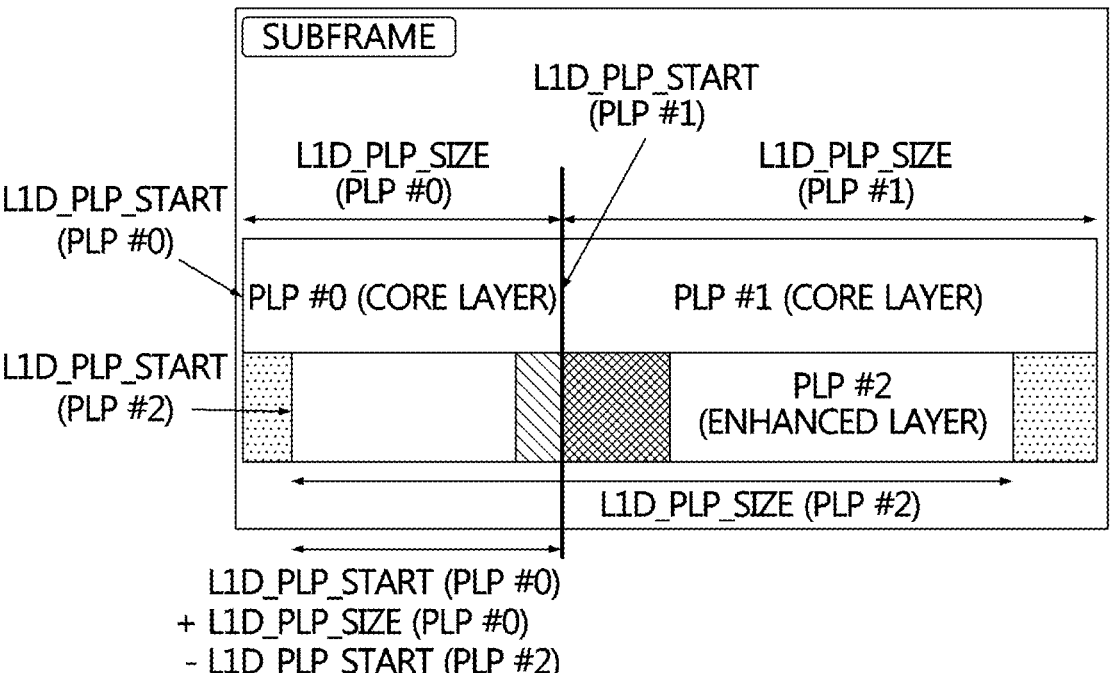
FIGS. 24 to 26 are views illustrating a process of calculating the size of an incomplete FEC block in the example illustrated in FIG. 23.
Figure 25:
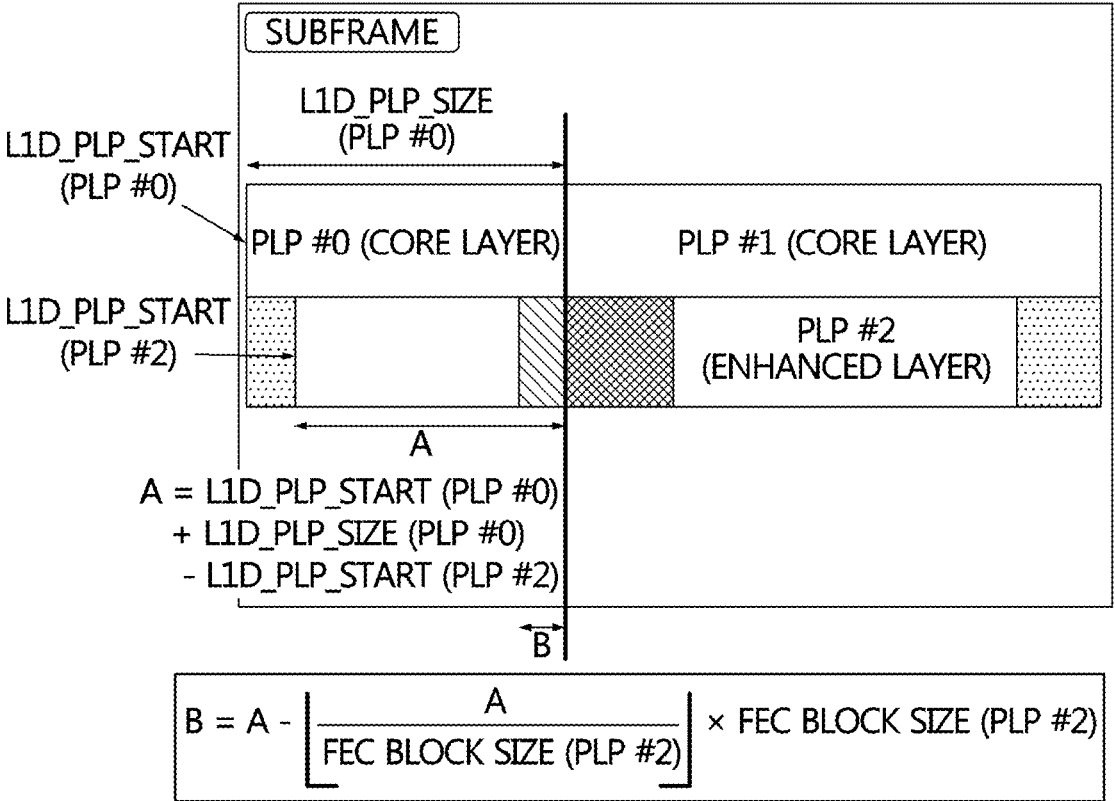
Figure 26:
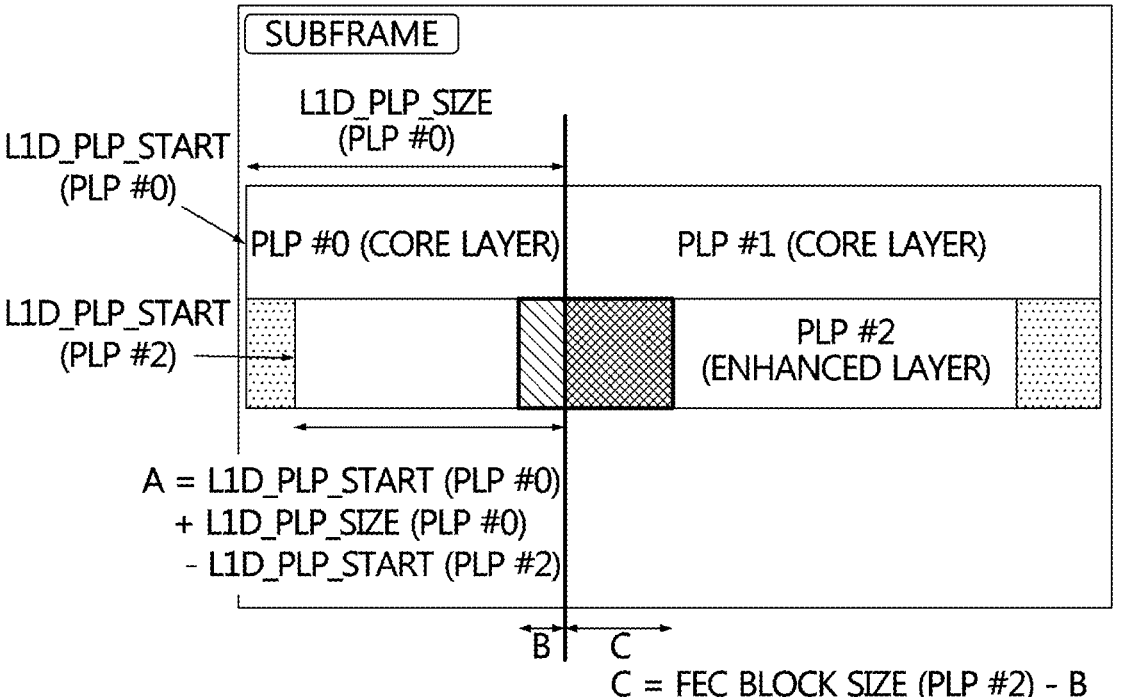

FIGS. 24 to 26 are views illustrating a process for calculating the size of the incomplete FEC block in the example illustrated in FIG. 23.

Referring to FIG. 24, it can be seen that distance A, which is the distance between the start position of the physical-layer pipe of an enhanced layer (L1D_plp_start (PLP #2)) and the boundary between the time interleaver groups, is calculated using the start position of the physical-layer pipe of a core layer (L1D_plp_start (PLP #0)), the size of the physical-layer pipe of the core layer (L1D_plp_size (PLP #0)), and the start position of the physical-layer pipe of the enhanced layer (L1D_plp_start (PLP #2)).

Referring to FIG. 25, it can be seen that distance B, which is the distance between the start position of the split FEC block and the boundary between the time interleaver groups, is calculated using the FEC block size of the enhanced layer.

Here, the FEC block size may be determined using modulation information (L1D_plp_mod) corresponding to the enhanced layer and FEC-type information (L1D_plp_fec_type) corresponding to the enhanced layer.

Referring to FIG. 26, it can be seen that part C, which is the portion of the FEC block of the enhanced layer corresponding to the boundary between the time interleaver groups, is identified.

Table 3 below illustrates an example of L1-Detail fields of a preamble according to an embodiment of the present invention.

The preamble according to an embodiment of the present invention may include L1-Basic and L1-Detail.

TABLE 3

| Syntax | # of bits |
| --- | --- |
| L1_Detail_signaling( ) { | |
|   L1D_version | 4 |
|   L1D_num_rf | 3 |
|   for L1D_rf_id=1 .. L1D_num_rf { | |
|     L1D_rf_frequency | 19 |
|   } | |
|   if ( L1B_time_info_flag != 00 ) { | |
|     L1D_time_sec | 32 |
|     L1D_time_msec | 10 |
|     if ( L1B_time_info_flag != 01 ) { | |
|       L1D_time_usec | 10 |
|       if ( L1B_time_info_flag != 10 ) { | |
|         L1D_time_nsec | 10 |
|       } | |
|     } | |
|   } | |
|   for i=0 .. L1B_num_subframes { | |
|     if (i > 0) { | |
|       L1D_mimo | 1 |
|       L1D_miso | 2 |

TABLE 3-continued

| Syntax | # of bits |
| --- | --- |
|     L1D_fft_size | 2 |
|     L1D_reduced_carriers | 3 |
|     L1D_guard_interval | 4 |
|     L1D_num_ofdm_symbols | 11 |
|     L1D_scattered_pilot_pattern | 5 |
|     L1D_scattered_pilot_boost | 3 |
|     L1D_sbs_first | 1 |
|     L1D_sbs_last | 1 |
|   } | |
|   if (L1B_num_subframes>0) { | |
|     L1D_subframe_multiplex | 1 |
|   } | |
|   L1D_frequency_interleaver | 1 |
|   L1D_num_plp | 6 |
|   for j=0 .. L1D_num_plp { | |
|     L1D_plp_id | 6 |
|     L1D_plp_lls_flag | 1 |
|     L1D_plp_layer | 2 |
|     L1D_plp_start | 24 |
|     L1D_plp_size | 24 |
|     L1D_plp_scrambler_type | 2 |
|     L1D_plp_fec_type | 4 |
|     if (L1D_plp_fec_type ∈ {0,1,2,3,4,5}) { | |
|       L1D_plp_mod | 4 |
|       L1D_plp_cod | 4 |
|     } | |
|     L1D_plp_TI_mode | 2 |
|     if ( L1D_plp_TI_mode=00) { | |
|       L1D_plp_fec_block_start | 15 |
|     } | |
|     if ( L1D_plp_TI_mode=01) { | |
|       L1D_plp_CTI_fec_block_start | 22 |
|     } | |
|     if (L1D_num_rf>0) { | |
|       L1D_plp_num_channel_bonded | 3 |
|       if (L1D_plp_num_channel_bonded>0) { | |
|         L1D_plp_channel_bonding_format | 2 |
|         for k=0 .. | |
|   L1D_plp_num_channel_bonded{ | |
|           L1D_plp_bonded_rf_id | 3 |
|         } | |
|       } | |
|     } | |
|     if (i=0 && L1B_first_sub_mimo=1) || (i >1 && | |
| L1D_mimo=1) { | |
|       L1D_plp_stream_combining | 1 |
|       L1D_plp_IQ_interleaving | 1 |
|       L1D_plp_PH | 1 |
|     } | |
|     if (L1D_plp_layer=0) { | |
|       L1D_plp_type | 1 |
|       if L1D_plp_type=1 { | |
|         L1D_plp_num_subslices | 14 |
|         L1D_plp_subslice_interval | 24 |
|       } | |
|       L1D_plp_TI_extended_interleaving | 1 |
|       if (L1D_plp_TI_mode=01) { | |
|         L1D_plp_CTI_depth | 3 |
|         L1D_plp_CTI_start_row | 11 |
|       } else if (L1D_plp_TI_mode=10) { | |
|         L1D_plp_HTI_inter_subframe | 1 |
|         L1D_plp_HTI_num_ti_blocks | 4 |
|         L1D_plp_HTI_num_fec_blocks_max | 12 |
|         if (L1D_plp_HTI_inter_subframe=0) { | |
|           L1D_plp_HTI_num_fec_blocks | 12 |
|         } else { | |
|           for (k=0.. | |
|   L1D_plp_HTI_num_ti_blocks) { | |
|           L1D_plp_HTI_num_fec_blocks | 12 |
|         } | |
|       } | |
|       L1D_plp_HTI_cell_interleaver | 1 |
|       } | |
|     } else { | |
|       L1D_plp_ldm_injection_level | 5 |
|     } | |
|   } | |
| } | |

TABLE 3-continued

| Syntax | # of bits |
|---|---|
| L1D_reserved | as needed |
| L1D_crc | 32 |
| } | |

In Table 3 above, all fields to which bits are assigned may correspond to an unsigned-integer most-significant-bit-first (uimsbf) format.

Among the fields in Table 3 above, L1D_plp_layer may indicate a layer corresponding to each physical-layer pipe. L1D_plp_start corresponds to the start position information of the current physical-layer pipe (current PLP), and may indicate the index of the first data cell of the current physical-layer pipe. L1D_plp_size corresponds to the size information of the current physical-layer pipe, and may indicate the number of data cells assigned to the current physical-layer pipe. Here, L1D_plp_size may be set to be greater than 0.

L1D_plp_fec_type corresponds to the FEC-type information of the current physical-layer pipe, and may indicate the Forward Error Correction (FEC) method used to encode the current physical-layer pipe.

For example, L1D_plp_fec_type="0000" may correspond to BCH and 16200 LDPC, L1D_plp_fec_type="0001" may correspond to BCH and 64800 LDPC, L1D_plp_fec_type="0010" may correspond to CRC and 16200 LDPC, L1D_plp_fec_type="0011" may correspond to CRC and 64800 LDPC, L1D_plp_fec_type="0100" may correspond to 16200 LDPC, and L1D_plp_fec_type="0101" may correspond to 64800 LDPC.

L1D_plp_mod may indicate modulation information of the current physical-layer pipe. Here, L1D_plp_mod may be signaled only when L1D_plp_fec_type satisfies a preset condition, as shown in Table 3 above.

For example, L1D_plp_mod="0000" may correspond to QPSK, L1D_plp_mod="0001" may correspond to 16QAM-NUC, L1D_plp_mod="0010" may correspond to 64QAM-NUC, L1D_plp_mod="0011" may correspond to 256QAM-NUC, L1D_plp_mod="0100" may correspond to 1024QAM-NUC, and L1D_plp_mod="0101" may correspond to 4096QAM-NUC. Here, L1D_plp_mod may be set to "0100" or "0101" only when L1D_plp_fec_type corresponds to 64800 LDPC.

L1D_plp_TI_mode indicates the time-interleaving mode of a PLP.

For example, L1D_plp_TI_mode="00" may indicate a mode that does not use a time interleaver, L1D_plp_TI_mode="01" may indicate a convolutional time-interleaving mode, and L1D_plp_TI_mode="10" may indicate a hybrid time-interleaving mode.

L1D_plp_fec_block_start may correspond to information about the start position of the first complete FEC block within a physical-layer pipe. L1D_plp_fec_block_start may be signaled only when L1D_plp_TI_mode="00" is satisfied.

When layered-division multiplexing is used, because the start positions of the first FEC blocks in respective layers may be different, L1D_plp_fec_block_start may be signaled for each of the layers.

L1D_plp_CTI_fec_block_start may correspond to information about the start position of the first complete block within a physical-layer pipe. L1D_plp_CTI_fec_block_start may be signaled only when L1D_plp_TI_mode="01" is satisfied.

Here, a greater number of bits may be assigned L1D_plp_CTI_fec_block_start than L1D_plp_fec_block_start.

As described above, when L1D_plp_TI_mode="10" is satisfied, because all PLPs include only complete FEC blocks, there is no need to signal the start position of the first FEC block.

L1D_plp_HTI_num_fec_blocks may correspond to the number of FEC blocks included in the current interleaving frame for a physical-layer pipe of a core layer.

Here, it can be seen that, when L1D_plp_layer is 0 (core layer), fields corresponding to convolutional time interleaving (L1D_plp_CTI_depth and L1D_plp_CTI_start_row) or fields corresponding to hybrid time interleaving (L1D_plp_HTI_inter_subframe, L1D_plp_HTI_num_ti_blocks, L1D_plp_HTI_num_fec_blocks_max, L1D_plp_HTI_num_fec_blocks, L1D_plp_HTI_cell_interleaver, and the like) are signaled as time interleaver information depending on whether L1D_plp_TI_mode is 01 or 10.

Here, L1D_plp_CTI_depth may indicate the number of rows used in a convolutional time interleaver, and L1D_plp_CTI_start_row may indicate the position of an interleaver selector at the start of a subframe.

Here, L1D_plp_HTI_inter_subframe may indicate a hybrid time-interleaving mode, L1D_plp_HTI_num_ti_blocks may indicate the number of TI blocks for each interleaving frame or the number of subframes for transmitting cells from one TI block, L1D_plp_HTI_num_fec_blocks_max may indicate one less than the maximum number of FEC blocks for each interleaving frame of the current physical-layer pipe, L1D_plp_HTI_num_fec_blocks may indicate one less than the number of FEC blocks included in the current interleaving frame of the current physical-layer pipe, and L1D_plp_HTI_cell_interleaver may indicate whether a cell interleaver is used.

Here, a field such as L1D_plp_TI_mode may be signaled separately from the time interleaver information signaled based on a core layer.

Figure 27:
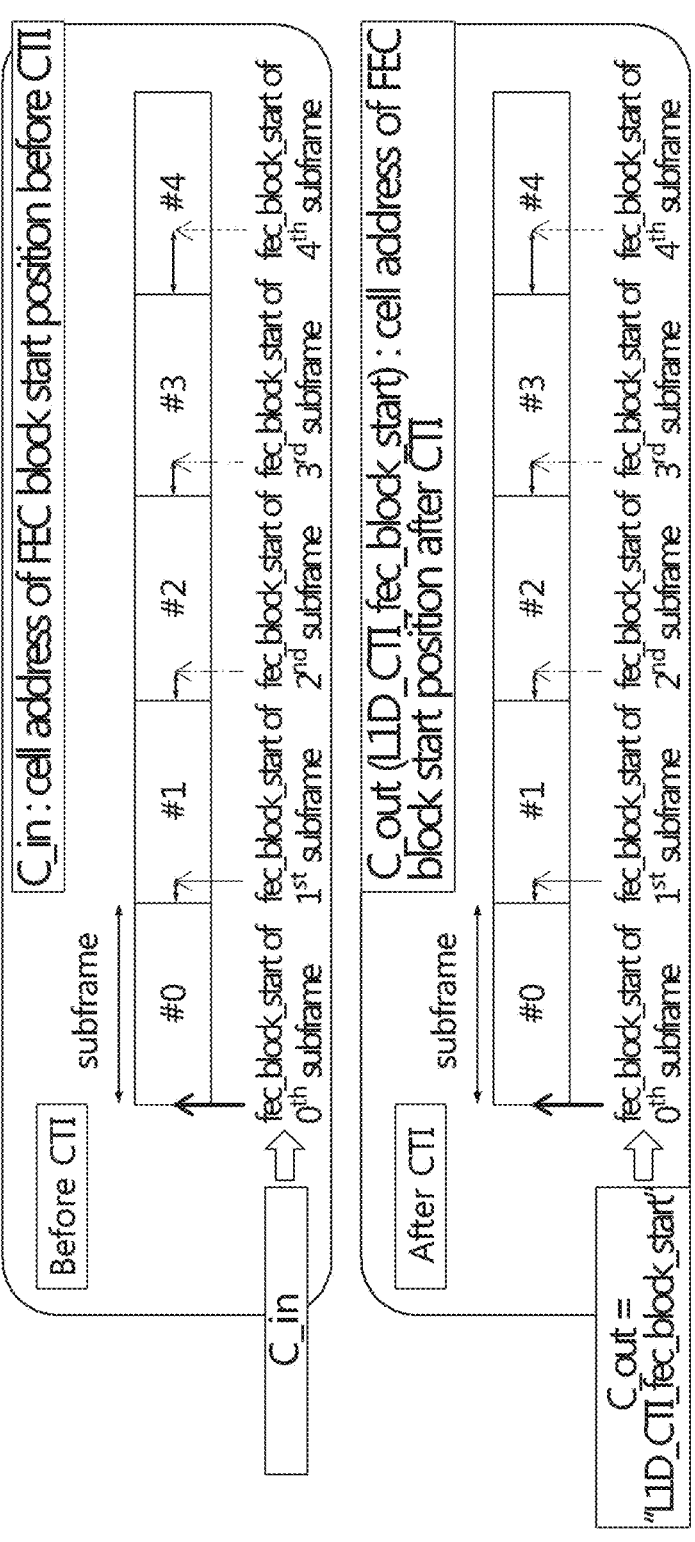
FIG. 27 is a view for explaining the number of bits required for L1D_plp_fec_block_start when L1D_plp_TI_mode="00" is satisfied.

FIG. 27 is a view for explaining the number of bits required for L1D_plp_fec_block_start when L1D_plp_TI_mode="00" is satisfied.

Referring to FIG. 27, it can be seen that, when L1D_plp_TI_mode="00" is satisfied (when time interleaving is skipped), the cell address of an FEC block start position before time interleaving (C_in) is the same as the cell address of the FEC block start position after time interleaving (C_out).

The case in which time interleaving is skipped, as in the case of FIG. 27, can be seen as convolutional interleaving performed with a depth of 0.

Here, because L1D_plp_fec_block_start is defined after time interleaving, C_out may be signaled as L1D_plp_fec_block_start for each physical-layer pipe in a subframe.

When an LDPC codeword is 16200 or 64800 and when a modulation order is 2, 4, 6, 8, 10, or 12, the longest FEC block may have a length of 64800/2=32400.

Because 32400 can be represented using 15 bits, when 15 bits are assigned for L1D_plp_fec_block_start, it may cover the case in which L1D_plp_TI_mode="00" is satisfied.

Figure 28:
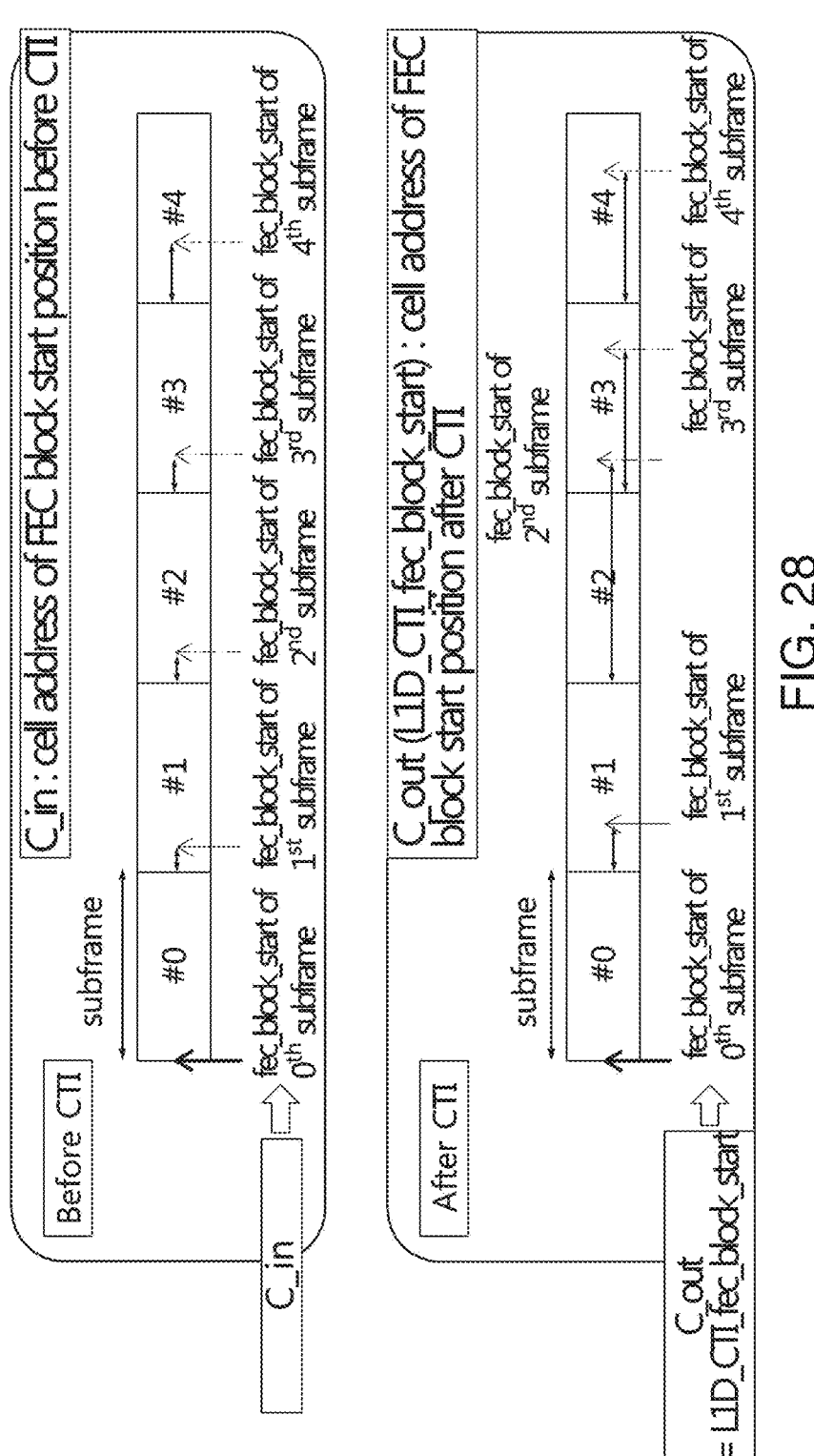
FIGS. 28 and 29 are views for explaining the number of bits required for L1D_plp_CTI_fec_block_start when L1D_plp_TI_mode="01" is satisfied.
Figure 29:
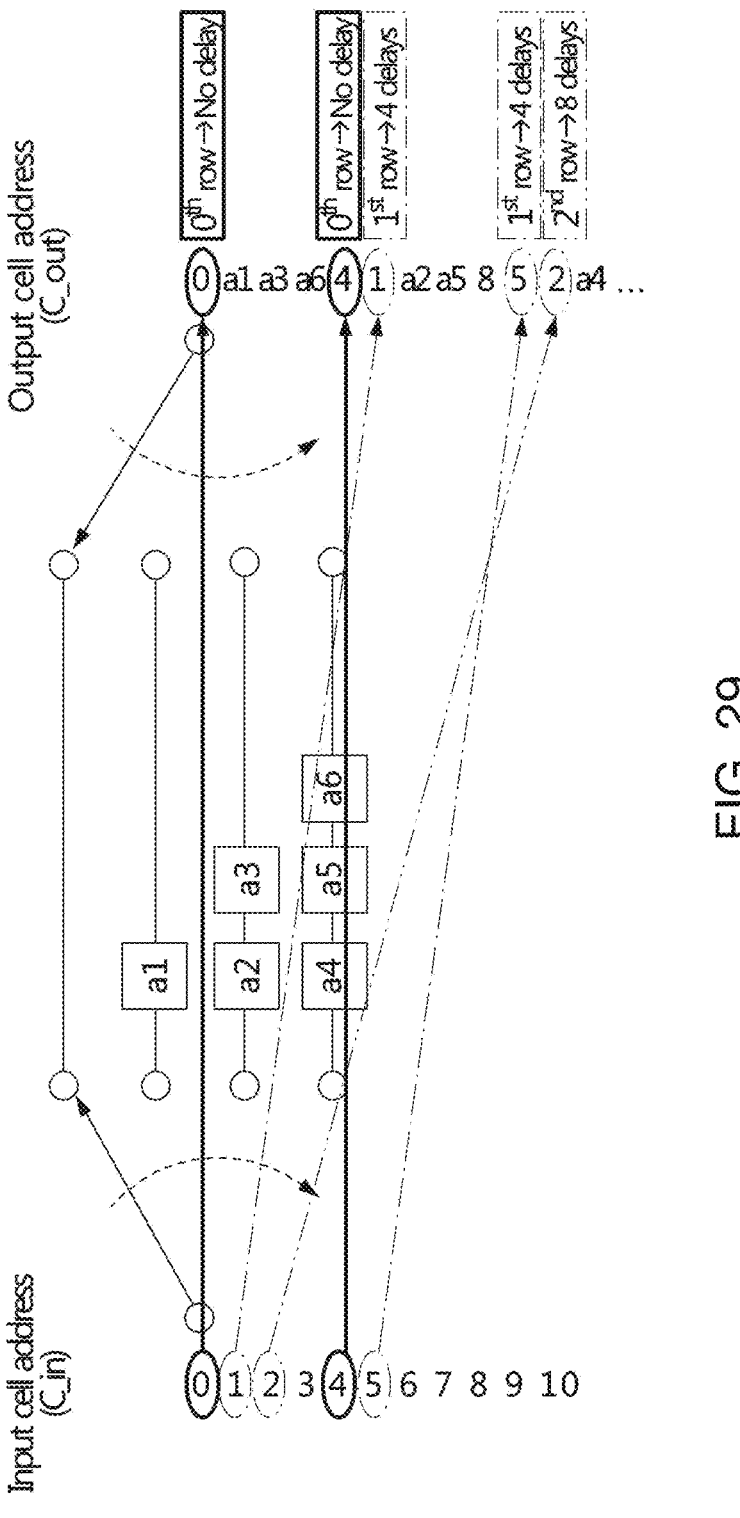

FIGS. 28 and 29 are views for explaining the number of bits required for L1D_plp_CTI_fec_block_start when L1D_plp_TI_mode="01" is satisfied.

Referring to FIG. 28, it can be seen that, when L1D_plp_TI_mode="01" is satisfied (convolutional time interleaving), the cell address of an FEC block start position before time interleaving (C_in) is different from the cell address of the FEC block start position after time interleaving (C_out) due to interleaving.

Here, because L1D_plp_CTI_fec_block_start is defined after time interleaving, C_out may be signaled as L1D_plp_CTI_fec_block_start for each physical-layer pipe in a subframe.

Referring to FIG. 29, it can be seen that a convolutional time interleaver having a depth of 4 operates by receiving C_in as input and outputting C_out.

Here, in the case of the input, 0 corresponds to the zeroth row, 1 corresponds to the first row, 2 corresponds to the second row, 3 corresponds to the third row, 4 corresponds to the zeroth row, 5 corresponds to the first row, 6 corresponds to the second row, 7 corresponds to the third row, 8 corresponds to the zeroth row, 9 corresponds to the first row, and 10 corresponds to the second row.

First, 0, 4, 8, etc. corresponding to the zeroth row are immediately output without delay.

1, 5, 9, etc. corresponding to the first row are output with a delay of 4.

2, 6, 10, etc. corresponding to the second row are output with a delay of 8.

3, 7, etc. corresponding to the third row are output with a delay of 12.

That is, it can be seen that a delay of (n×4) occurs in the n-th row.

In FIG. 29, the case in which a depth is 4 (the number of rows of a time interleaver being 4) is illustrated, but when the number of rows of the time interleaver is N_row, the input corresponding to the n-th row is delayed by (n×N_row).

Here, the cell address of an FEC block start position after time interleaving (L1D_plp_CTI_fec_block_start) may be calculated to be (C_in+(n×N_row)). Here, n is the row corresponding to C_in, and may be set based on L1D_CTI_start_row in the time-interleaving information signaled using L1-Detail. Here, n may be ((L1D_CTI_start_row+C_in) % N_row). Here, L1D_CTI_start_row may indicate the position of the interleaver selector at the start of the subframe.

That is, L1D_plp_CTI_fec_block_start may be calculated by adding delay, which is caused by time interleaving, to C_in.

In order to calculate the number of bits required for signaling L1D_plp_CTI_fec_block_start, the maximum value thereof is required. As shown above, the maximum value of C_in is 32400, the maximum value of n is N_row-1, and N_row may be a maximum of 1024 in the case of non-extended interleaving. Here, the maximum value of L1D_plp_CTI_fec_block_start is (32400+(1024−1)×1024)=1079952. 1079952 can be signaled using at least 21 bits.

N_row may be a maximum of 1448 in the case of extended interleaving. Here, the maximum value of L1D_plp_CTI_fec_block_start is (32400+(1448−1)×1448)=2127656. 2127656 can be signaled using at least 22 bits.

Consequently, because the maximum value of L1D_plp_fec_block_start is equal to the maximum value of C_in when L1D_plp_TI_mode="00" is satisfied and because the maximum value of L1D_plp_CTI_fec_block_start becomes a value acquired by adding delay, which is caused by interleaving, to the maximum value of C_in when L1D_plp_TI_mode="01" is satisfied, efficient signaling is possible only when the number of bits used for signaling L1D_plp_CTI_fec_block_start is greater than the number of bits used for signaling L1D_plp_fec_block_start.

When L1D_plp_TI_mode="10" is satisfied, because all of the physical-layer pipes of the core layer and the enhanced layer include only complete FEC blocks, the start positions of all of the physical-layer pipes are the start positions of the first complete FEC blocks, so there is no need to signal fields such as L1D_plp_fec_block_start or L1D_plp_CTI_fec_block_start.

Figure 30:
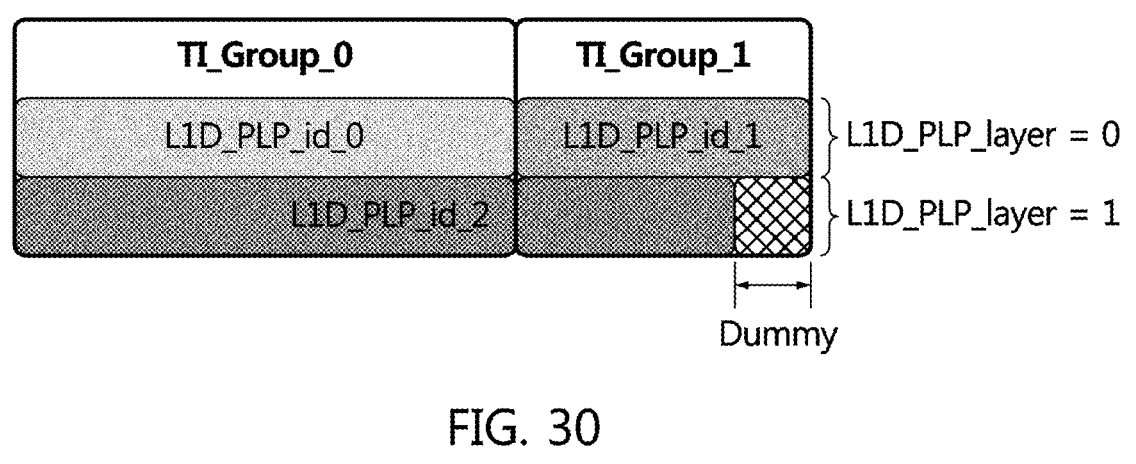

FIG. 30 is a view illustrating insertion of enhanced-layer dummy values when an HTI mode is used along with layered-division multiplexing.

Referring to FIG. 30, it can be seen that dummy values are inserted into enhanced-layer data (L1D_PLP_layer=1) of a time interleaver group (TI_Group_1).

Assume that a set of all PLPs related to a specific end product transferred to a receiver in a subframe is a PLP group.

When layered-division multiplexing is used, the PLP group may include at least one core PLP and one or more enhanced PLPs.

When time interleaving of an HTI mode, in which an integer number of FEC blocks are used for actual PLP data, is used, the total number of cells of the core PLP(s) may differ from the total number of cells of the enhanced PLP(s) depending on the ModCod configuration of each of the PLPs in a specific PLP group. In this case, enhanced-layer dummy values may be inserted after the actual data cells of the last enhanced PLP of the PLP group such that the total number of enhanced-layer cells in the PLP group becomes equal to the total number of core-layer cells. Because a time interleaver group is set based on core PLPs, the dummy values may not be inserted into the core layer.

Insertion of enhanced-layer dummy values may be performed after BICM steps and before combination of the core PLP(s) with the enhanced PLP(s). In order to generate enhanced-layer dummy values, a scrambling sequence is used, and this scrambling sequence may be reinitialized for each relevant PLP group. Also, this sequence may be modulated using the same constellation mapping as the constellation mapping used for the last enhanced PLP in the current PLP group.

The enhanced-layer dummy values may have the same power as the enhanced PLP immediately before the enhanced-layer dummy values in the same PLP group such that the same scaling factor and the same normalizing factor as those applied to the actual data are applied thereto.

Figure 31:
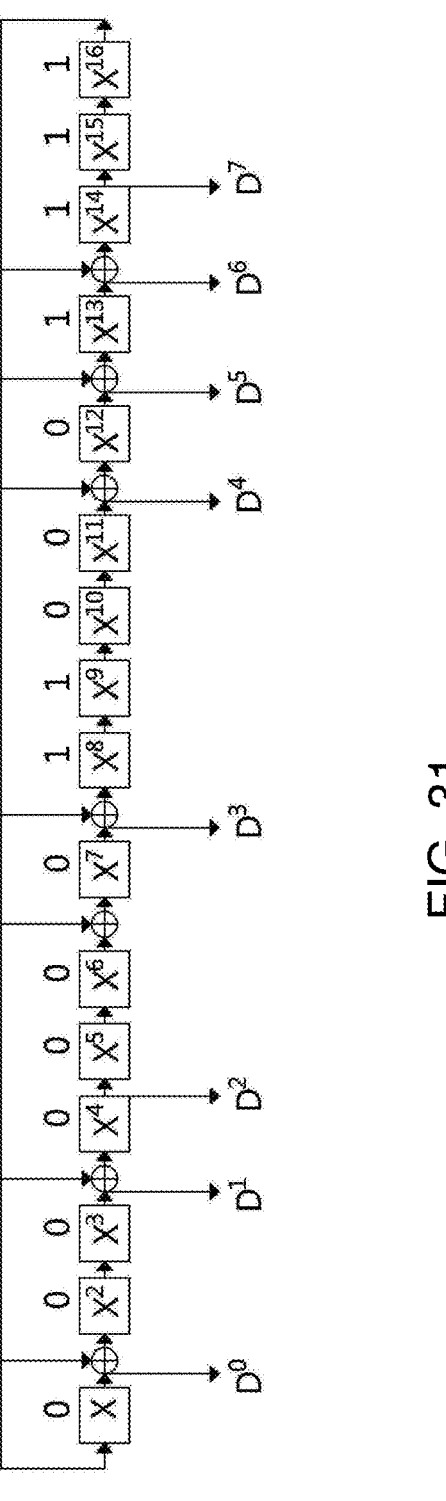
FIG. 31 is a view illustrating an example of a shift register used for generation of dummy values according to an embodiment of the present invention.

FIG. 31 is a view illustrating an example of a shift register used for generation of dummy values according to an embodiment of the present invention.

Referring to FIG. 31, it can be seen that a sequence is generated using a 16-bit shift register corresponding to the generator polynomial $1+X+X^3+X^6+X^7+X^{11}+X^{12}+X^{13}+X^{16}$.

The register illustrated in FIG. 31 may be initialized to an initial sequence of 0xF180 (1111 0001 1000 0000). As described above, reinitialization is performed for each relevant PLP group.

In the example illustrated in FIG. 31, the eight outputs of the shift register ($D^7$, $D^6$, ..., $D^0$) form output bits. After the output bits are output, the bits of the shift register are shifted once. After performing shifting once, 0 is stored in the register $X^{14}$ as the result of an exclusive OR operation performed on 1 and 1, 1 is stored in the register $X^{13}$ as the result of an exclusive OR operation performed on 1 and 0, 1 is stored in the register $X^{12}$ as the result of an exclusive OR operation performed on 1 and 0, 0 stored in the register $X^{10}$ is stored in the register $X^{11}$, 1 is stored in the register $X^7$ as the result of an exclusive OR operation performed on 1 and 0, 1 is stored in the register $X^4$ as the result of an exclusive OR operation performed on 1 and 0, 0 stored in the register $X^2$ is stored in $X^3$, and 1 stored in the register $X^{16}$ is stored in the register X.

Accordingly, in the example illustrated in FIG. 31, the output sequence (scrambling sequence) is 1100 0000 0110 1101 0011 1111 . . . (MSB first, or $D^7$, $D^6$, . . . . $D^0$, $D^7$, $D^6$, . . . ).

As described above, each physical-layer pipe may be configured using any one of a mode in which no time interleaving is performed, a convolutional time-interleaving mode, and a hybrid time-interleaving mode.

The time-interleaving mode of a PLP may be identified using L1D_plp_TI_mode, and the time-interleaving mode of an enhanced PLP is required to be the same as the time interleaver mode identified for the core PLP with which the enhanced layer is layered-division-multiplexed.

When a complete delivered product is formed of only one PLP having a constant cell rate or is formed of a core PLP having a constant cell rate and one or more enhanced PLPs having a constant cell rate and multiplexed with the core PLP, the PLPs forming the complete delivered product may be configured using one of a mode in which no time interleaving is performed, a convolutional time-interleaving mode, and a hybrid time-interleaving mode.

When a complete delivered product is formed of PLPs having characteristics different from the technical characteristics stated in the previous section, the PLPs forming the complete delivered product may be configured using one of a mode in which no time interleaving is performed and a hybrid time-interleaving mode.

Here, the complete delivered product may correspond to a single service. That is, the complete delivered product may include all PLP data required for the single service.

Time-interleaving mode(s) for PLPs of a particular complete delivered product may be configured independently of time-interleaving mode(s) for PLP(s) of any other delivered products transmitted over the same RF channel. When the particular delivered product includes multiple core PLPs and/or PLPs that are not layered-division-multiplexed, these PLPs may be configured using the same or different time-interleaving modes (e.g., a mode in which no time interleaving is performed and/or a hybrid time-interleaving mode) and/or the same or different time interleaver parameters.

Figure 32:
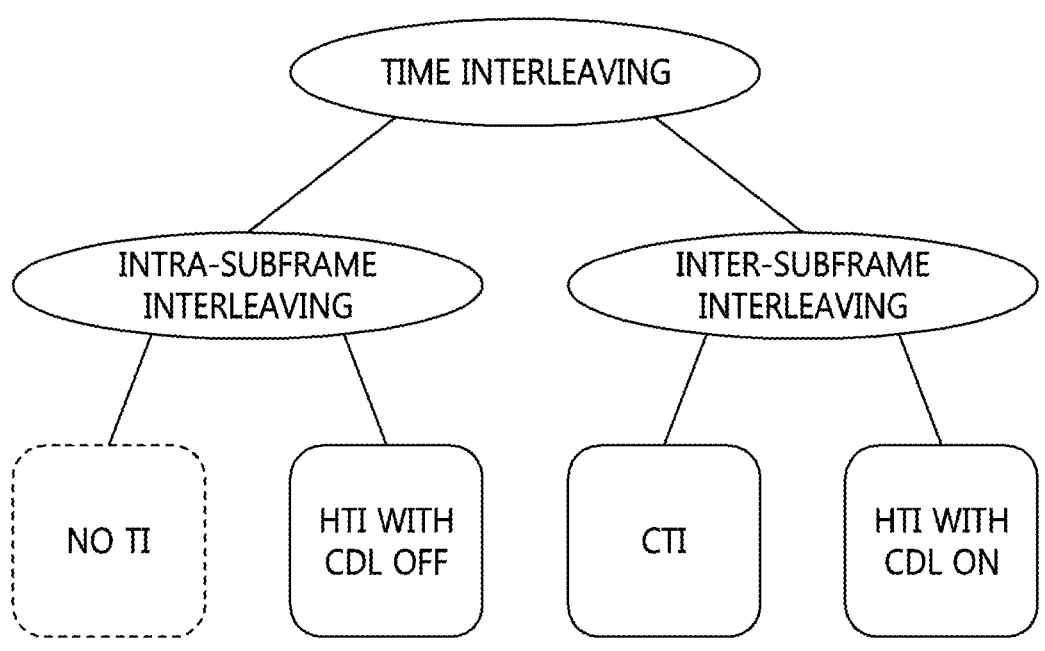
FIG. 32 is a view illustrating the types of time-interleaving modes.

FIG. 32 is a view illustrating types of time-interleaving modes.

Referring to FIG. 32, time-interleaving modes are broadly classified into intra-subframe interleaving and inter-subframe interleaving.

Intra-subframe interleaving corresponds to the case in which interleaving is performed within a subframe. Here, an interleaving frame is mapped to a single subframe. That is, when intra-subframe interleaving is performed, a decoder may decode a corresponding physical-layer pipe in the subframe.

Inter-subframe interleaving corresponds to the case in which interleaving falls out of the range of a single subframe. Here, an interleaving frame is mapped to multiple subframes. That is, when inter-subframe interleaving is performed, a decoder may need data not only of the single subframe but also of other subframes in order to decode a corresponding physical-layer pipe.

As illustrated in FIG. 32, a mode in which no time interleaving is performed (NO TI) corresponds to intra-subframe interleaving, and a convolutional time-interleaving mode (CTI) corresponds to inter-subframe interleaving. Here, the mode in which no time interleaving is performed (NO TI) may be regarded as an interleaving mode having an interleaving depth of 0.

A hybrid time-interleaving mode (HTI) may correspond to intra-subframe interleaving or inter-subframe interleaving, and it may correspond to intra-subframe interleaving when a Convolutional Delay Line (CDL) is turned off, and may correspond to inter-subframe interleaving when the CDL is turned on.

Whether the hybrid time-interleaving mode corresponds to intra-subframe interleaving or inter-subframe interleaving may be identified using the L1D_plp_HTI_inter_subframe field. For example, when L1D_plp_HTI_inter_subframe=0 is satisfied, the corresponding time-interleaving mode may be intra-subframe interleaving, whereas when L1D_plp_HTI_inter_subframe=1 is satisfied, the corresponding time-interleaving mode may be inter-subframe interleaving.

Because parameters related to a time-interleaving mode or time interleaving may be set for each core-layer physical-layer pipe, if a decoding process is not considered when the parameters related to a time-interleaving mode or time interleaving are set in the encoding process, some of multiple core-layer physical-layer pipes that are layered-division-multiplexed with a single enhanced-layer physical-layer pipe may use intra-subframe interleaving and others thereof may use inter-subframe interleaving.

FIG. 33 is a view illustrating the case in which intra-subframe interleaving and inter-subframe interleaving are simultaneously used.

Referring to FIG. 33, it can be seen that three core-layer physical-layer pipes CORE PLP #0, CORE PLP #1, and CORE PLP #2 are layered-division-multiplexed with a single enhanced-layer physical-layer pipe ENHANCED PLP #3.

The first core-layer physical-layer pipe CORE PLP #0 corresponds to intra-subframe interleaving because it uses an HTI mode with a CDL in an OFF state, the second core-layer physical-layer pipe CORE PLP #1 corresponds to inter-subframe interleaving because it uses an HTI mode with a CDL in an ON state, and the third core-layer physical-layer pipe CORE PLP #2 corresponds to intra-subframe interleaving because it uses a mode in which no time interleaving is performed (NO TI).

Accordingly, the first and third core-layer physical-layer pipes CORE PLP #0 and CORE PLP #2 can be immediately decoded, but the second core-layer physical-layer pipe CORE PLP #1 can be decoded only after it waits until a number of subframes ($N_{IU}$−1) corresponding to a time-interleaving unit $N_{IU}$ are decoded. Here, the time-interleaving unit $N_{IU}$ may be the number of subframes through which cells from one time-interleaving block are transmitted when inter-subframe interleaving is performed.

In the example illustrated in FIG. 33, the segments of the enhanced-layer physical-layer pipe have different decoding times, and this means that additional latency and buffers are required in order to decode the corresponding enhanced-layer physical-layer pipe.

Figure 34:
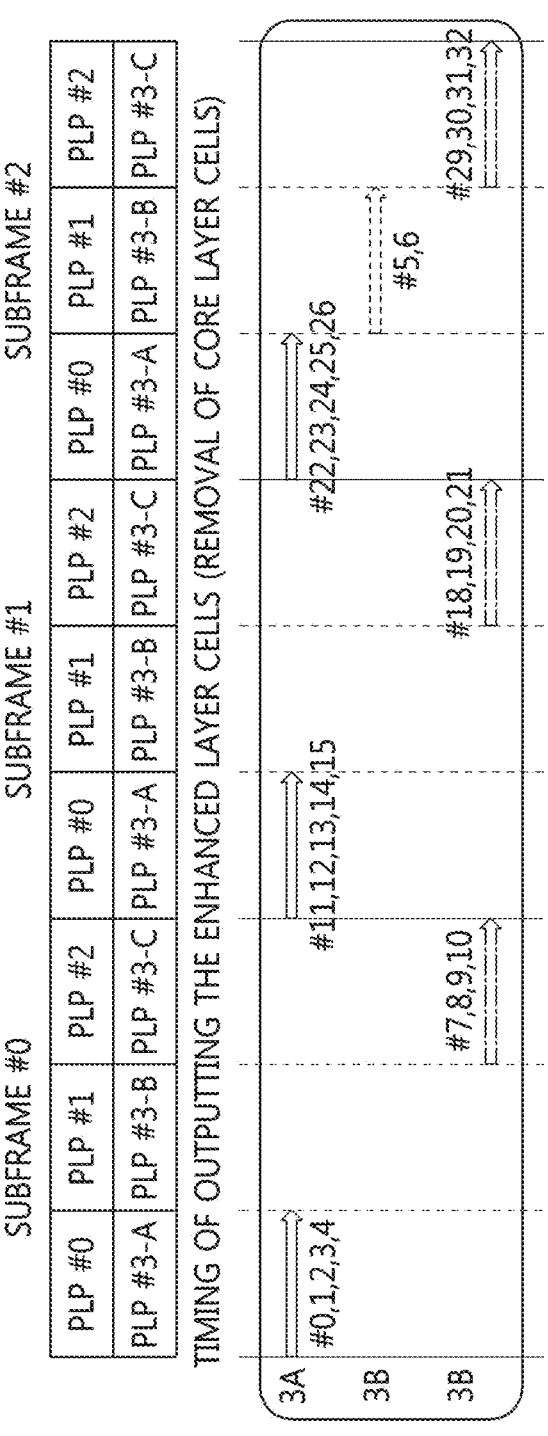
FIG. 34 is a view illustrating subframes in the case in which intra-subframe interleaving and inter-subframe interleaving are simultaneously used.

FIG. 34 is a view illustrating subframes when intra-subframe interleaving and inter-subframe interleaving are simultaneously used.

Referring to FIG. 34, it can be seen that three core-layer physical-layer pipes PLP #0, PLP #1, and PLP #2 are layered-division-multiplexed with a single enhanced-layer physical-layer pipe PLP #3 over three subframes.

Here, the respective segments of the enhanced-layer physical-layer pipe PLP #3-A, PLP #3-B, and PLP #3-C have five FEC blocks, two FEC blocks, and four FEC blocks, and the time-interleaving unit $N_{IU}$ of the core-layer physical-layer pipe PLP #1 may be 3. Here, the enhanced-layer physical-layer pipe PLP #3 has to wait until a number of subframes corresponding to the time-interleaving unit $N_{IU}$ are decoded.

In the example illustrated in FIG. 34, the sequence in which the enhanced-layer cells are output is #0, 1, 2, 3, 4, 7, 8, 9, 10, 11, 12, 13, 14, 15, 18, 19, 20, 21, 22, 23, 24, 25, 26, 5, 6, 29, 39, 31, 32, . . . . Accordingly, part (#5, #6) of the first subframe (SUBFRAME #0) is output after waiting for two subframes (SUBFRAME #1 and SUBFRAME #2), which causes a decoding timing problem.

In order to solve this decoding timing problem, when multiple core-layer physical-layer pipes are layered-division-multiplexed with a single enhanced-layer physical-layer pipe, it may be efficient for all of the core-layer physical-layer pipes to use intra-subframe interleaving or use inter-subframe interleaving in order to mitigate a decoding timing problem and decoding complexity related thereto.

When all of multiple core-layer physical-layer pipes that are layered-division-multiplexed with a single enhanced-layer PLP use inter-subframe interleaving, the time-interleaving units $N_{IU}$ of the core-layer physical-layer pipes may differ from each other.

However, decoding complexity may also increase when all of the core-layer physical-layer pipes layered-division-multiplexed with a single enhanced-layer physical-layer pipe use inter-subframe interleaving.

FIG. 35 is a view illustrating the case in which different time-interleaving units are simultaneously used.

Referring to FIG. 35, it can be seen that three core-layer physical-layer pipes CORE PLP #0, CORE PLP #1, and CORE PLP #2 are layered-division-multiplexed with a single enhanced-layer physical-layer pipe ENHANCED PLP #3.

Because all of the three core-layer physical-layer pipes CORE PLP #0, CORE PLP #1, and CORE PLP #2 use an HTI mode with a CDL in an ON state, they correspond to inter-subframe interleaving. However, the time-interleaving unit $N_{IU}$ of the first core-layer physical-layer pipe CORE PLP #0 is 2, the time-interleaving unit $N_{IU}$ of the second core-layer physical-layer pipe CORE PLP #1 is 4, and the time-interleaving unit $N_{IU}$ of the third core-layer physical-layer pipe CORE PLP #2 is 3.

Accordingly, the first core-layer physical-layer pipe CORE PLP #0 has to wait for one subframe, the second core-layer physical-layer pipe CORE PLP #1 has to wait for three subframes, and the third core-layer physical-layer pipe CORE PLP #2 has to wait for two subframes.

In the example illustrated in FIG. 35, the segments of the enhanced-layer physical-layer pipe have different decoding times, and this means that additional latency and buffers are required in order to decode the corresponding enhanced-layer physical-layer pipe.

Accordingly, it may be efficient for all of core-layer physical-layer pipes that are layered-division-multiplexed with a single enhanced-layer physical-layer pipe to use inter-subframe interleaving and to use the same time-interleaving unit in order to mitigate a decoding timing problem and decoding complexity related thereto.

However, even when all of multiple core-layer physical-layer pipes layered-division-multiplexed with a single enhanced-layer physical-layer pipe use inter-subframe interleaving and use the same time-interleaving unit, a decoding problem may occur depending on a subframe structure.

Figure 36:
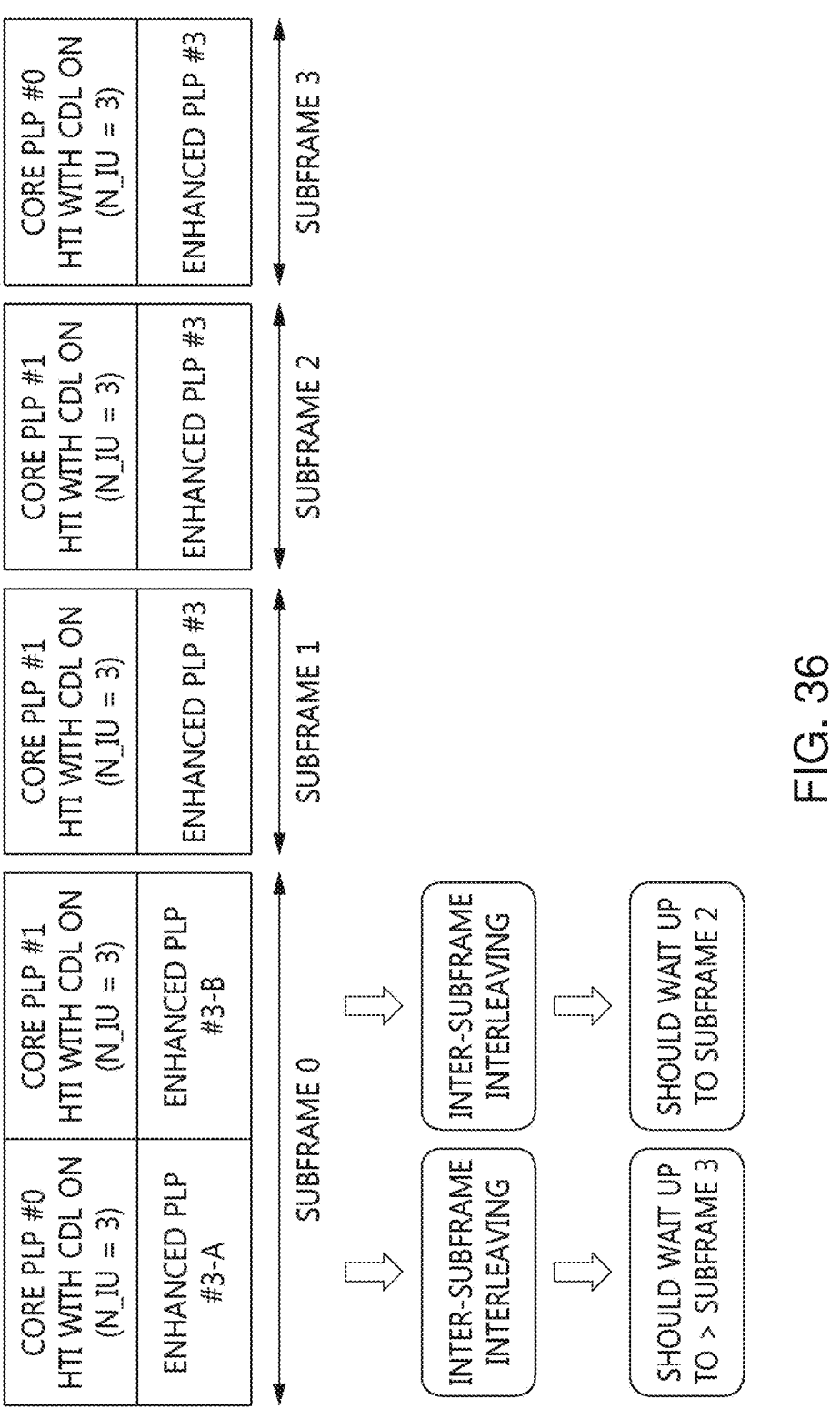
FIG. 36 is a view illustrating subframes in the case in which the same time-interleaving units are simultaneously used.

FIG. 36 is a view illustrating subframes when the same time-interleaving units are simultaneously used.

Referring to FIG. 36, it can be seen that two core-layer physical-layer pipes CORE PLP #0 and CORE PLP #1 are layered-division-multiplexed with a single enhanced-layer physical-layer pipe ENHANCED PLP #3 in the first subframe (SUBFRAME 0).

Also, a single core-layer physical-layer pipe CORE PLP #1 is layered-division-multiplexed with a single enhanced-layer physical-layer pipe ENHANCED PLP #3 in each of the second and third subframes (SUBFRAME 1 and SUB-FRAME 2).

Also, a single core-layer physical-layer pipe CORE PLP #0 is layered-division-multiplexed with a single enhanced physical-layer pipe ENHANCED PLP #3 in the fourth subframe (SUBFRAME 3).

Here, all of the two core-layer physical-layer pipes CORE PLP #0 and CORE PLP #1 in the first subframe correspond to inter-subframe interleaving and use the same time-interleaving unit ($N_{IU}$=3).

Here, the core-layer physical-layer pipe CORE PLP #1 only needs to wait until the third subframe (SUBFRAME 2), but the core-layer physical-layer pipe CORE PLP #0 has to wait until the fourth subframe (SUBFRAME 3). This is because the structures of the subframes after the first subframe (SUBFRAME 0) are different.

In the example illustrated in FIG. 36, the segments of the enhanced-layer physical-layer pipe have different decoding times despite the same time-interleaving unit, which means that additional latency and buffers are required in order to decode the corresponding enhanced-layer physical-layer pipe.

As described with reference to FIGS. 33 to 36, when multiple core-layer physical-layer pipes are layered-division-multiplexed with a single enhanced-layer physical-layer pipe, the segments of the enhanced-layer physical-layer pipe have different decoding times, which causes a decoding problem.

When a single enhanced-layer physical-layer pipe is spread over multiple time-interleaving groups, all of the core-layer physical-layer pipes related to the enhanced-layer physical-layer pipe may use the same time-interleaving mode. Here, all of the core-layer physical-layer pipes related to the enhanced-layer physical-layer pipe may use a hybrid time-interleaving mode or a mode in which no time inter-leaving is performed.

That is, in this case, all of the core-layer physical-layer pipes use the same time-interleaving mode, but may be prohibited from using a convolutional time-interleaving mode.

According to an embodiment, when all of the core-layer physical-layer pipes related to the enhanced-layer physical-layer pipe use a convolutional time-interleaving mode, the interleaving depths (L1D_plp_CTI_depth) of all of the core layers may be the same as each other.

Here, when all of the core-layer physical-layer pipes related to the enhanced-layer physical-layer pipe use a hybrid time-interleaving mode, the respective core-layer physical-layer pipes may use an intra-subframe interleaving mode (L1D_plp_HTI_inter_subframe=0). That is, when all of the core-layer physical-layer pipes related to the enhanced-layer physical-layer pipe use a hybrid time-inter-leaving mode, inter-subframe interleaving may be prohibited.

According to an embodiment, when the core-layer physi-cal-layer pipes corresponding to the enhanced-layer physi-cal-layer pipe use a hybrid time-interleaving mode corre-sponding to inter-subframe interleaving, all of the core-layer physical-layer pipes may use the same time-interleaving unit.

Here, when all of the core-layer physical-layer pipes related to the enhanced-layer physical-layer pipe use a mode in which no time interleaving is performed, the respective core-layer physical-layer pipes may be formed of an integer number of FEC blocks within the subframe.

Here, in order to satisfy the requirement for an integer number of FEC blocks in each subframe, dummy modula-tion values may be used.

Depending on the configuration of a subframe and physi-cal-layer-pipe-multiplexing parameters, available data cells of the subframe may be fully or partially occupied by physical-layer pipe data. When not all available data cells have physical-layer pipe data corresponding thereto, it is important to modulate the unoccupied data cells, rather than allowing the same to remain as null cells that are not modulated, in order to ensure constant transmission power. This may be achieved by assigning pseudo-random dummy modulation values to the unoccupied data cells.

Unoccupied data cells may be present anywhere in a subframe depending on the physical-layer-pipe-multiplex-ing parameters. Accordingly, all available data cells in a subframe are first filled with dummy modulation values, and the dummy modulation values in occupied data cells may be overwritten with actual physical-layer pipe data through a cell-multiplexing process. This approach may ensure that all available data cells in a subframe are modulated using a physical-layer pipe cell or dummy modulation values.

The total number of available data cells in a subframe is $N_{cell}$ when the data cells are indexed from 0 to $N_{cell}-1$, $d_i$ is a dummy modulation value for a data cell having an index of i $(0 \leq i < N_{cell})$, and $b_i$ $(0 \leq i < N_{cell})$ may indicate the i-th value of the scrambling sequence described with reference to FIG. 31.

Here, the real part of the dummy modulation value for the i-th data cell $(0 \leq i < N_{cell})$ may be $(1-2*b_i)$, and the imaginary part thereof may be 0. That is, the dummy modulation values may be generated by mapping the value of the scrambling sequence to one of two phases which are separated by 180 degrees.

Each of $N_{cell}$ available data cells in a subframe may have corresponding dummy modulation values before physical-layer pipe data is multiplexed in the subframe. After inser-tion of the dummy modulation values, physical-layer pipe data belonging to the current subframe is mapped to the data cells assigned to the physical-layer pipe data, and the dummy modulation values that were previously assigned to the data cells may be overwritten with the physical-layer pipe data.

Inconsistency in decoding times may be problematic not only in the case in which multiple core-layer physical-layer pipes are multiplexed with a single enhanced-layer physical-layer pipe but also in the case of core-layer physical-layer pipes to which layered-division multiplexing is not applied.

Figure 37:
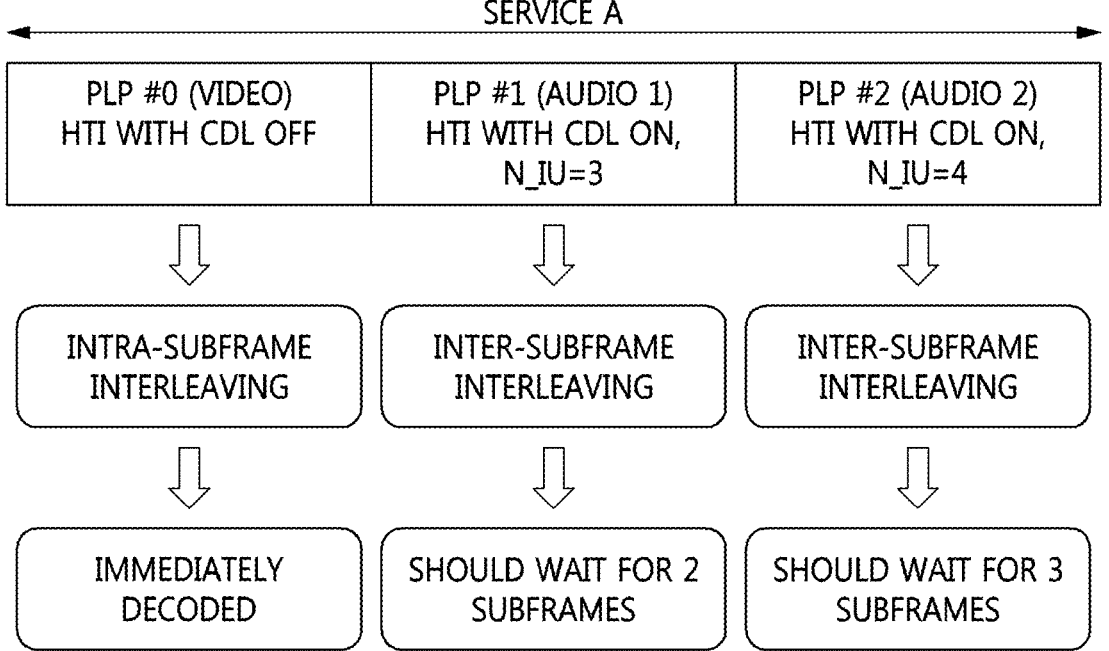
FIG. 37 is a view illustrating the case in which one complete delivered product is formed of multiple Physical-Layer Pipes (PLPs).

FIG. 37 is a view illustrating the case in which a single complete delivered product is formed of multiple physical-layer pipes.

Referring to FIG. 37, it can be seen that a single complete delivered product includes three core-layer physical-layer pipes PLP #0, PLP #1, and PLP #2. Here, the single complete delivered product may correspond to a single service (SERVICE A). Here, the core-layer physical-layer pipes PLP #0, PLP #1, and PLP #2 may not be layered-division-multiplexed.

Here, the first core-layer physical-layer pipe PLP #0 may correspond to video data of the single service (SERVICE A), the second core-layer physical-layer pipe PLP #1 may correspond to the first audio data of the service (SERVICE A), and the third core-layer physical-layer pipe PLP #2 may correspond to the second audio data of the service (SER-VICE A).

Because the core-layer physical-layer pipes forming the single complete delivered product have different data char-acteristics, the first core-layer physical-layer pipe PLP #0 may correspond to a hybrid time-interleaving mode with a CDL in an OFF state, the second core-layer physical-layer pipe PLP #1 may correspond to a hybrid time-interleaving mode with a CDL in an ON state, and the third core-layer physical-layer pipe PLP #2 may correspond to a time-interleaving mode with a CDL in an ON state. Here, as illustrated in FIG. 37, the time-interleaving unit $N_{IU}$ of the core-layer physical-layer pipe PLP #1 may be 3, and the time-interleaving unit $N_{IU}$ of the core-layer physical-layer pipe PLP #2 may be 4.

When some of core-layer physical-layer pipes forming a single complete delivered product correspond to intra-sub-frame interleaving and when others thereof correspond to inter-subframe interleaving, the core-layer physical-layer pipes corresponding to intra-subframe interleaving are immediately decoded, but the core-layer physical-layer pipes corresponding to inter-subframe interleaving may have to wait for other subframes.

Further, even when the core-layer physical-layer pipes use inter-subframe interleaving, if the time-interleaving units $N_{IU}$ of the core-layer physical-layer pipes are different, decoding times may be different.

In the example illustrated in FIG. 37, the first physical-layer pipe PLP #0 is immediately decoded because it cor-responds to intra-subframe interleaving, the second physi-cal-layer pipe PLP #1 has to wait for two subframes because it corresponds to inter-subframe interleaving and the time-interleaving unit $N_{IU}$ thereof is 3, and the third physical-layer pipe PLP #2 has to wait for three subframes because it corresponds to inter-subframe interleaving and the time-interleaving unit $N_{IU}$ thereof is 4.

In the example illustrated in FIG. 37, the three core-layer physical-layer pipes have different decoding times. Here, because the first core-layer physical-layer pipe PLP #0 and the second core-layer physical-layer pipe PLP #1 have to be synchronized with the third core-layer physical-layer pipe PLP #2 for the service (SERVICE A), they have to wait for three subframes, which causes unnecessary decoding com-plexity.

In order to reduce decoding complexity, when a particular complete delivered product includes multiple core-layer physical-layer pipes that are not layered-division-multi-plexed and when all of the core-layer physical-layer pipes use a hybrid time-interleaving mode, all of the core-layer physical-layer pipes may use an intra-subframe interleaving mode or an inter-subframe interleaving mode. That is, all of the core-layer physical-layer pipes may have the same value as the value of L1D_plp_HTI_inter_subframe (L1D_plp_HTI_inter_subframe=0 indicating intra-sub-frame interleaving and L1D_plp_HTI_inter_subframe=1 indicating inter-subframe interleaving).

When inter-subframe interleaving (L1D_plp_HTI_inter_subframe=1) is used for these core-layer physical-layer pipes, all of the core-layer physical-layer pipes may use the same time-interleaving unit $N_{IU}$.

When a particular complete physical-layer pipe includes multiple core-layer physical-layer pipes that are not layered-division-multiplexed and when at least one of these core-layer physical-layer pipes uses a mode in which no time interleaving is performed, all of the core-layer physical-layer pipes using a hybrid interleaving mode, among the core-layer physical-layer pipes, may use an intra-subframe interleaving mode (L1D_plp_HTI_inter_subframe=0). That is, when a particular complete physical-layer pipe includes multiple core-layer physical-layer pipes that are not layered-division-multiplexed and when at least one of the core-layer physical-layer pipes uses a mode in which no time interleaving is performed, all of the physical-layer pipes corresponding to a hybrid time-interleaving mode, among the core-layer physical-layer pipes, may be prohibited from using an inter-subframe interleaving mode.

Figure 38:
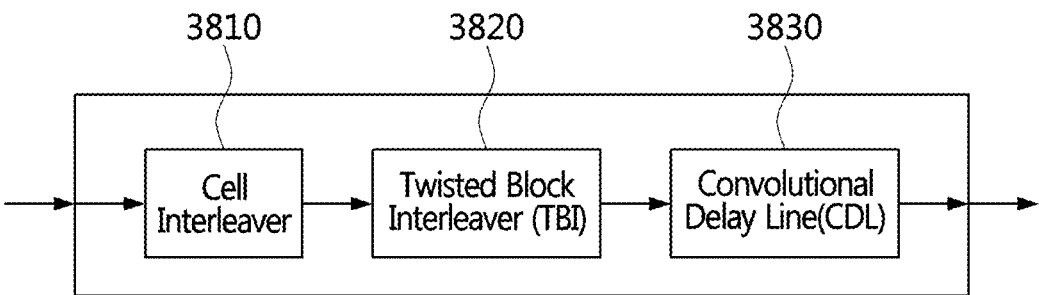
FIG. 38 is a block diagram illustrating an example of the time interleaver illustrated in FIG. 3 or FIG. 7.

FIG. 38 is a block diagram illustrating an example of the time interleaver illustrated in FIG. 3 or FIG. 7.

Referring to FIG. 38, a time interleaver according to an embodiment of the present invention includes a cell interleaver 3810, a twisted block interleaver 3820, and a convolutional delay line 3830.

The cell interleaver 3810 interleaves cells in a time-interleaving block.

Here, the cell interleaver 3810 may arrange the input cells of FEC blocks as time-interleaving blocks. Here, a time-interleaving block may be formed of one or more FEC blocks.

Here, the time-interleaving block may be a basic unit for the operations of the cell interleaver 3810, the twisted block interleaver 3820, and the convolutional delay line 3830.

Here, the time-interleaving blocks may include different numbers of FEC blocks.

Here, the cell interleaver 3810 may interleave cells in each FEC block.

Here, the cell interleaver 3810 writes an FEC block to memory and pseudo-randomly reads the same, thereby performing cell interleaving.

According to an embodiment, the cell interleaver 3810 may be omitted.

The twisted block interleaver 3820 performs intra-subframe interleaving corresponding to time-interleaving blocks.

The convolutional delay line 3830 performs inter-subframe interleaving using the output of the twisted block interleaver 3820. That is, the convolutional delay line 3830 spreads the block-interleaved time-interleaving blocks over multiple subframes.

Here, the twisted block interleaver 3820 may perform intra-subframe interleaving by performing a column-wise write operation and a diagonal read operation.

Here, the convolutional delay line 3830 may read only data cells, excluding virtual cells, from the twisted block interleaver 3820.

Here, the convolutional delay line 3830 may store new virtual cells after each row of the data cells read from the twisted block interleaver 3820 is written and before switches move to the subsequent branch.

Here, the number of new virtual cells may correspond to a value acquired by subtracting the number of FEC blocks ($N_{FEC\_TI}$) in a time-interleaving block of an interleaving frame from the maximum number of FEC blocks ($N_{FEC\_TI\_MAX}$) in the time-interleaving block of the interleaving frame in each branch.

Here, the new virtual cells may not be output as the output of the time-interleaving device.

Here, the convolutional delay line 3830 includes a number of branches corresponding to a time-interleaving unit $N_{IU}$, and remaining branches, excluding the first branch, among the branches, may include one or more FIFO registers.

Here, the convolutional delay line 3830 may output only some of initialization values stored in the FIFO register.

Here, some of the initialization values may correspond to one initialization cell for each of the remaining branches.

Figure 39:
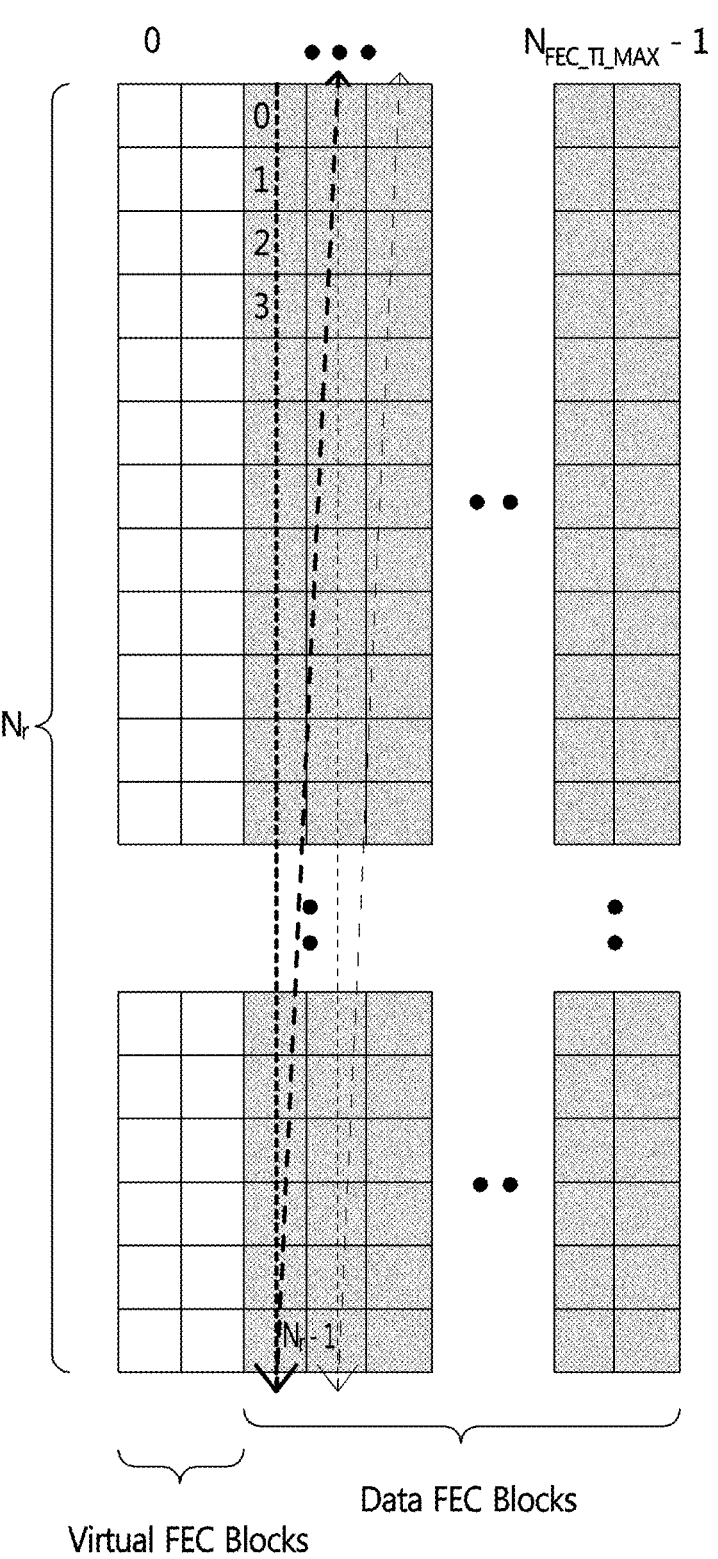
FIG. 39 is a view illustrating a write operation of the twisted block interleaver illustrated in FIG. 38.

FIG. 39 is a view illustrating a write operation of the twisted block interleaver illustrated in FIG. 38.

Referring to FIG. 39, it can be seen that the cells of FEC blocks included in a time-interleaving block are written to memory through a column-wise write operation.

Figure 40:
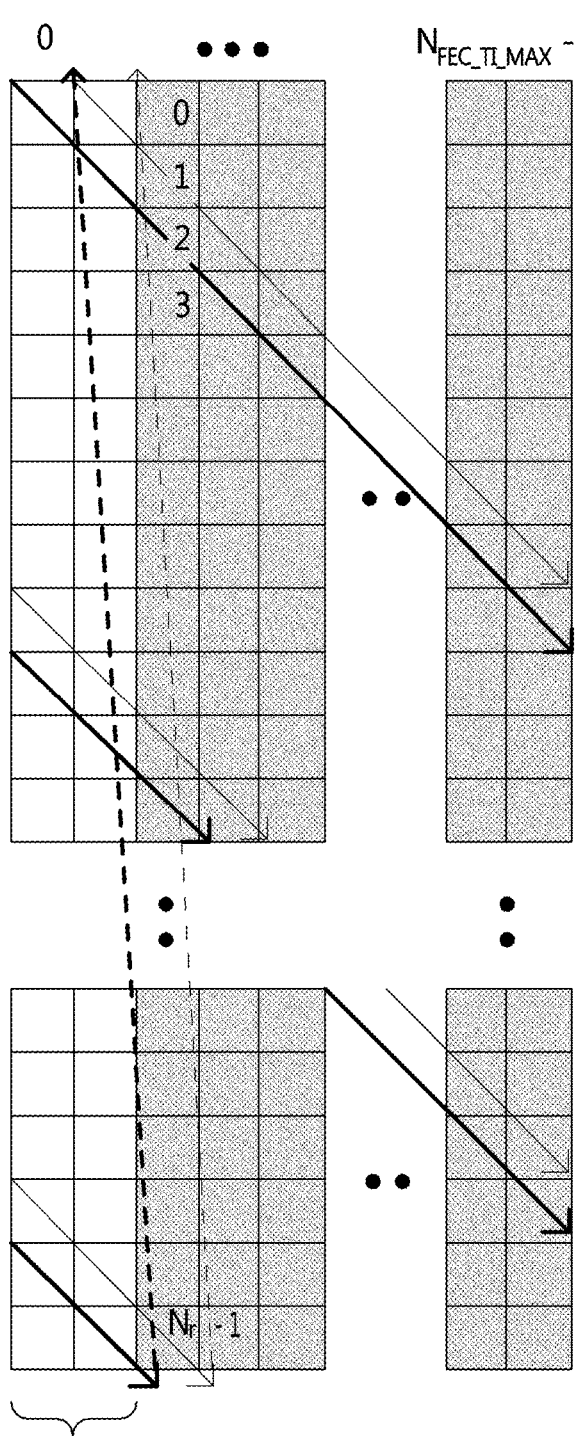
FIG. 40 is a view illustrating a read operation of the twisted block interleaver illustrated in FIG. 38.

FIG. 40 is a view illustrating a read operation of the twisted block interleaver illustrated in FIG. 38.

Referring to FIG. 40, it can be seen that the cells of FEC blocks included in a time-interleaving block are read from memory through a diagonal read operation.

In the examples illustrated in FIG. 39 and FIG. 40, $N_{FEC\_TI\_MAX}$ indicates the maximum number of FEC blocks in a time-interleaving block of an interleaving frame, and $N_r$ indicates the number of cells included in each FEC block.

As described above with reference to FIGS. 39 and 40, the twisted block interleaver performs a column-wise write operation and a diagonal read operation, thereby performing intra-subframe interleaving.

Here, the twisted block interleaver may skip virtual FEC cells during a reading process, as illustrated in FIG. 40.

Figure 41:
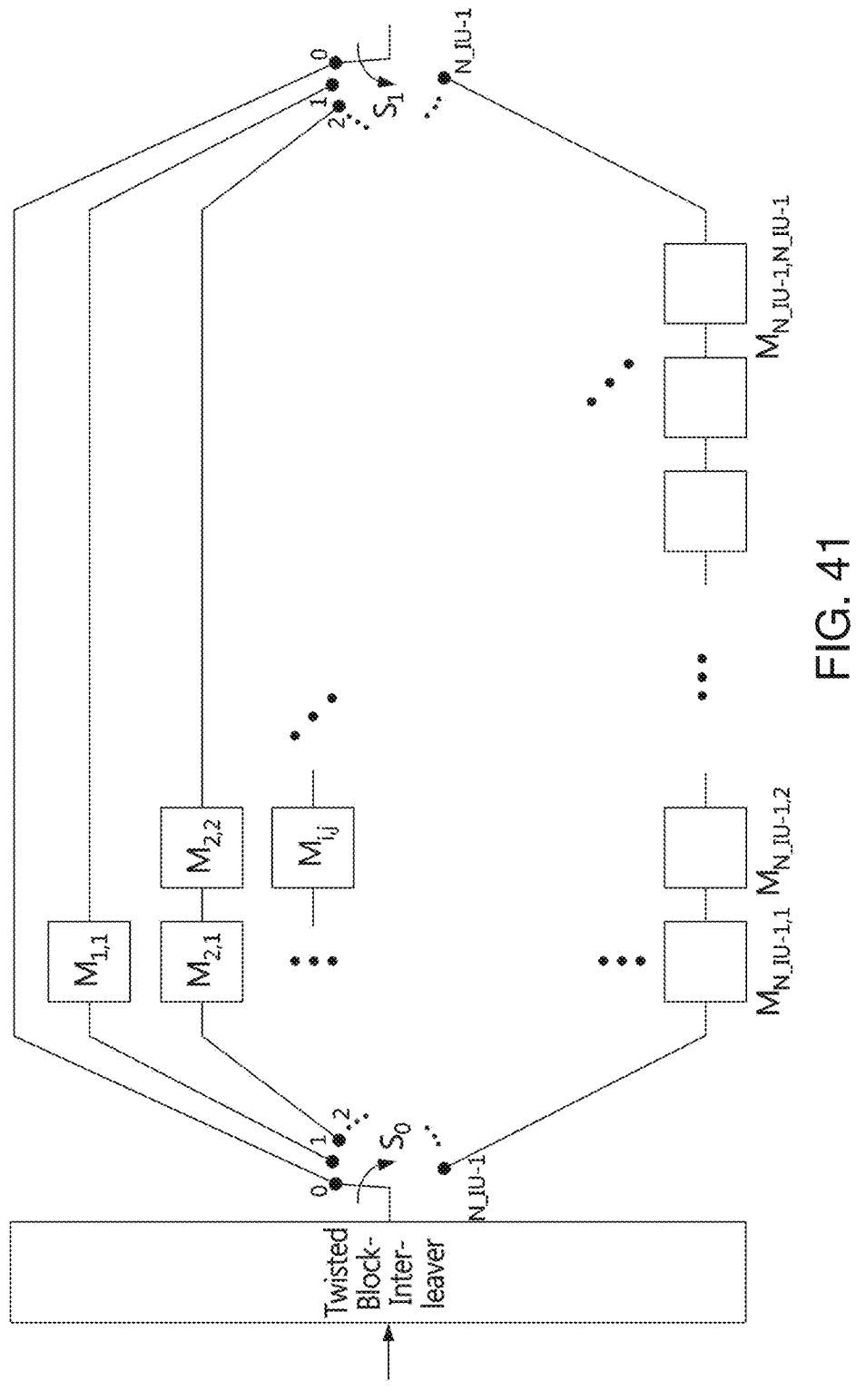
FIG. 41 is a block diagram illustrating an example of the convolutional delay line illustrated in FIG. 38.

FIG. 41 is a block diagram illustrating an example of the convolutional delay line illustrated in FIG. 38.

Referring to FIG. 41, a convolutional delay line according to an embodiment of the present invention is formed of $N_{IU}$ branches. That is, the convolutional delay line splits a time-interleaving block into $N_{IU}$ interleaving units and distributes these interleaving units over $N_{IU}$ subframes.

A switch $S_0$ may connect the twisted block interleaver to the convolutional delay line. A switch $S_1$ may connect the convolutional delay line to a framing block such as the frame builder illustrated in FIG. 3 or FIG. 7.

Here, the movement of the switches $S_0$ and $S_1$ may be synchronized. That is, the switches may always point to the same branches of the convolutional delay line.

The switches may move back to the first branch again from the last branch of the convolutional delay line.

When $N_{FEC\_TI\_MAX}$ cells, including $N_{FEC\_TI}$ data cells and ($N_{FEC\_TI\_MAX}-N_{FEC\_TI}$) virtual cells, are written to the convolutional delay line, the two switches $S_0$ and $S_1$ may move from branch n of the convolutional delay line to branch n+1 immediately subsequent thereto (n being an integer satisfying $0<=n<N_{IU}-1$). Here, $N_{FEC\_TI\_MAX}$ may indicate the maximum number of FEC blocks within a time-interleaving block of an interleaving frame, $N_{FEC\_TI}$ may indicate the number of FEC blocks corresponding to data within the time-interleaving block of the interleaving frame, and $N_{IU}$ may indicate a time-interleaving unit. Here, the ($N_{FEC\_TI\_MAX}-N_{FEC\_TI}$) virtual cells may be new virtual cells for the convolutional delay line, rather than being read from the twisted block interleaver. That is, the new virtual cells may be irrelevant to the twisted block interleaver, and may be newly generated in the convolutional delay line.

Here, the two switches $S_0$ and $S_1$ may be reset to the first branch (branch 0) of the convolutional delay line at the start of each subframe.

Here, virtual cells may not be read from the twisted block interleaver, and may not be transferred to the convolutional delay line.

However, after $N_{FEC\_TI}$ data cells read from the twisted block interleaver are written to the convolutional delay line, $(N_{FEC\_TI\_MAX}-N_{FEC\_TI})$ new virtual cells for the convolutional delay line may be input to the convolutional delay line before the switches $S_0$ and $S_1$ move to the next branch of the convolutional delay line.

Here, the virtual cells may not be used as the output of the time interleaver in the convolutional delay line, in addition to not being used in the twisted block interleaver.

Figure 42:
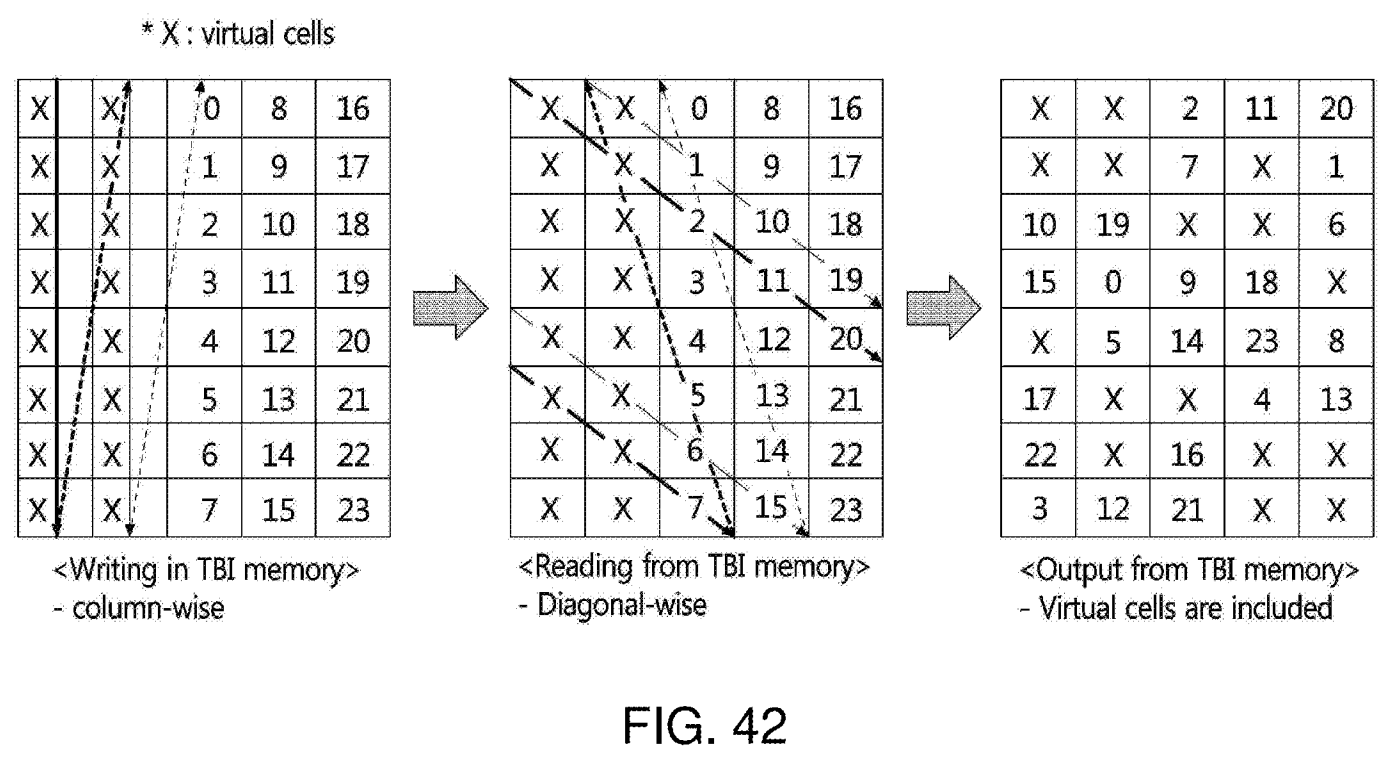

FIG. 42 is a view illustrating an example of operation of the twisted block interleaver illustrated in FIG. 38.

Referring to FIG. 42, it can be seen that an example in which the number of cells ($N_r$) included in FEC blocks is 8, $N_{FEC\_TI\_MAX}$ is 5, $N_{FEC\_TI}$ is 3, and $N_{IU}$ is 2 is illustrated.

In the example illustrated in FIG. 42, virtual cells corresponding to two columns are stored in a twisted block interleaver, and twisted block interleaving is performed through a column-wise write operation and a diagonal read operation.

In the example illustrated in FIG. 42, the output memory of the twisted block interleaver includes virtual cells.

Figure 43:
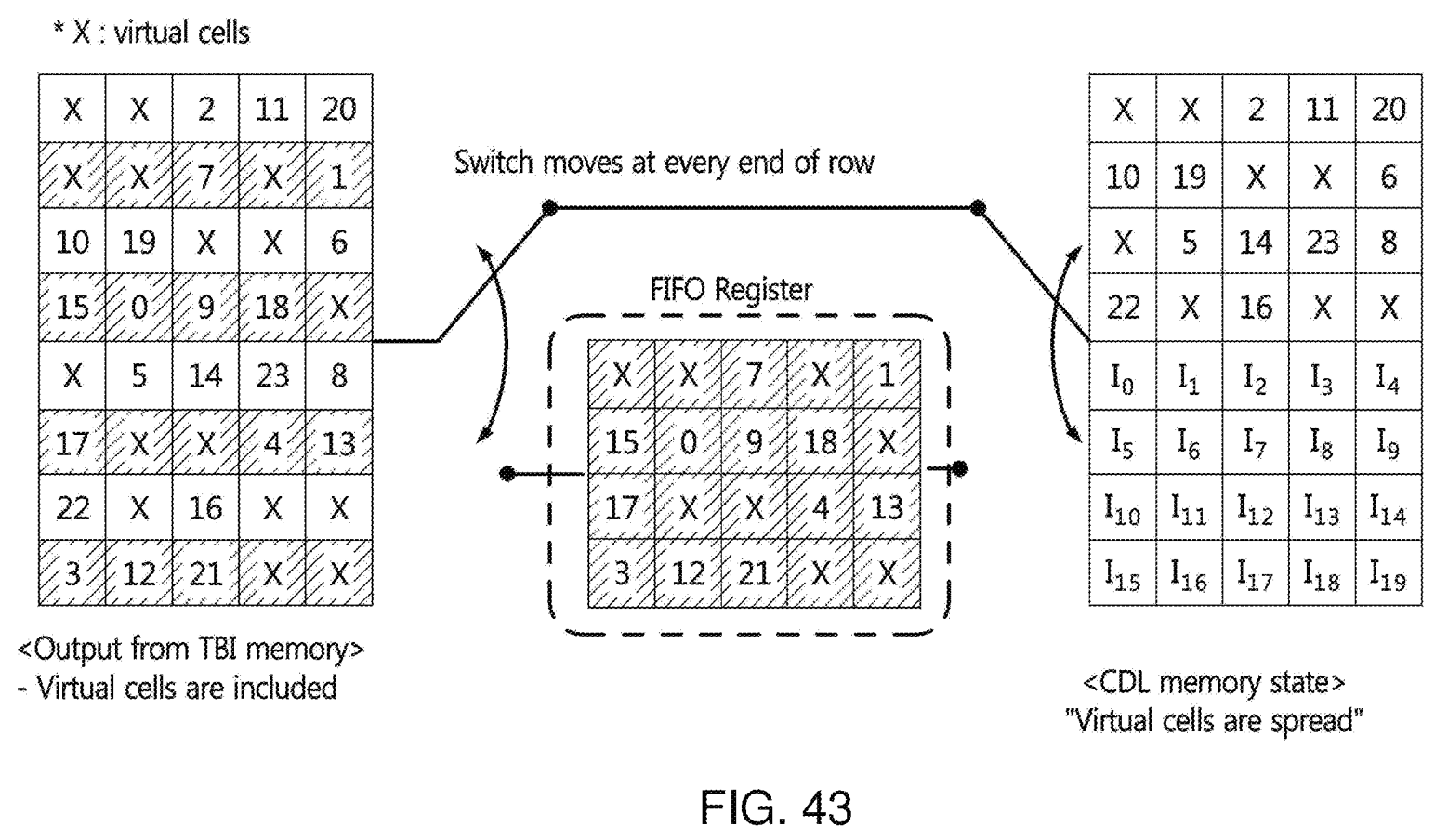

FIG. 43 is a view illustrating an example of operation of the convolutional delay line illustrated in FIG. 38.

Referring to FIG. 43, it can be seen that, because $N_{IU}$ is 2, two branches are present in the convolutional delay line, and the second branch includes a FIFO register.

In the example illustrated in FIG. 43, virtual cells read from the twisted block interleaver are transferred to the convolutional delay line.

Particularly, FIG. 43 illustrates the first subframe time when $N_{IU}$ is 2, and it can be seen that all of pieces of data corresponding to the second branch at this time are values stored in the FIFO register.

As described above, virtual cells may not be included in a transmission signal.

Accordingly, assuming that writing and reading start from the left side of the memory illustrated in FIG. 43, it can be seen that the first subframe (subframe #1) is used to transmit "2, 11, 20, 10, 19, 6, 5, 14, 23, 8, 22, 16", and that the second subframe (subframe #2) is used to transmit "7, 1, 15, 0, 9, 18, 17, 4, 13, 3, 12, 21".

In the example illustrated in FIG. 43, $I_0, I_1, \ldots, I_{19}$, which are stored in the FIFO register at the previous time and are then output, are illustrated as being stored in the lower side (the fifth to eighth rows) of the memory corresponding to the convolutional delay line, but may alternatively be stored in the second, fourth, sixth, and eighth rows of the memory corresponding to the convolutional delay line according to an embodiment.

Figure 44:
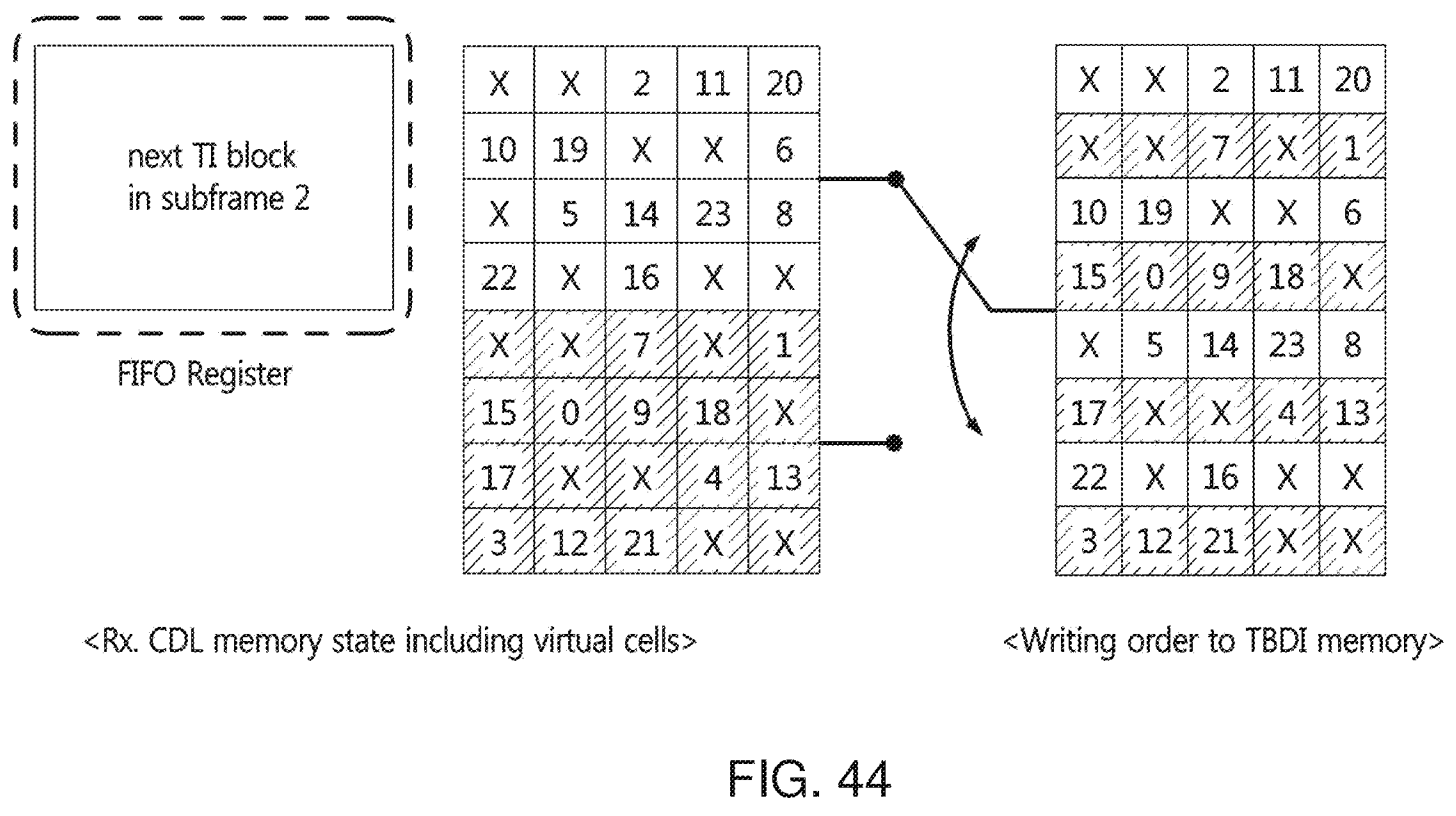

FIG. 44 is a view illustrating an example of a decoding process corresponding to the operation illustrated in FIG. 43.

Referring to FIG. 44, a time deinterleaver corresponding to a decoding process may restore the memory data illustrated in FIG. 44 (CDL memory state including virtual cells) from two subframes through a FIFO register. Further, the time deinterleaver may restore data input to a twisted block deinterleaver from the memory data (according to the writing order to TBDI memory).

As illustrated in FIG. 44, when virtual cells are transferred from the twisted block interleaver to the convolutional delay line, the virtual cells are dispersed in the receiver. Here, the receiver needs to know the process whereby the virtual cells were written.

That is, the inverse convolutional delay line of the receiver requires information about the positions of the virtual cells, which increases the complexity of the decoding process and the amount of memory required therefor.

Figure 45:
FIG. 45 is a view illustrating an example of a decoding process corresponding to the operation illustrated in FIG. 42.

FIG. 45 is a view illustrating an example of a decoding process corresponding to the operation illustrated in FIG. 42.

Referring to FIG. 45, it can be seen that twisted block deinterleaving can be correctly performed only when the positions of virtual cells are known. That is, in order for the time deinterleaver of a receiver to correctly perform twisted block deinterleaving, it is necessary to know the positions of the virtual cells, or at least the number of virtual cells that have to be included in each row.

As described above, because it is necessary for the time deinterleaver to know the positions of virtual cells in the embodiment described with reference to FIGS. 42 to 45, there is a problem in that decoding complexity is increased.

Figure 46:
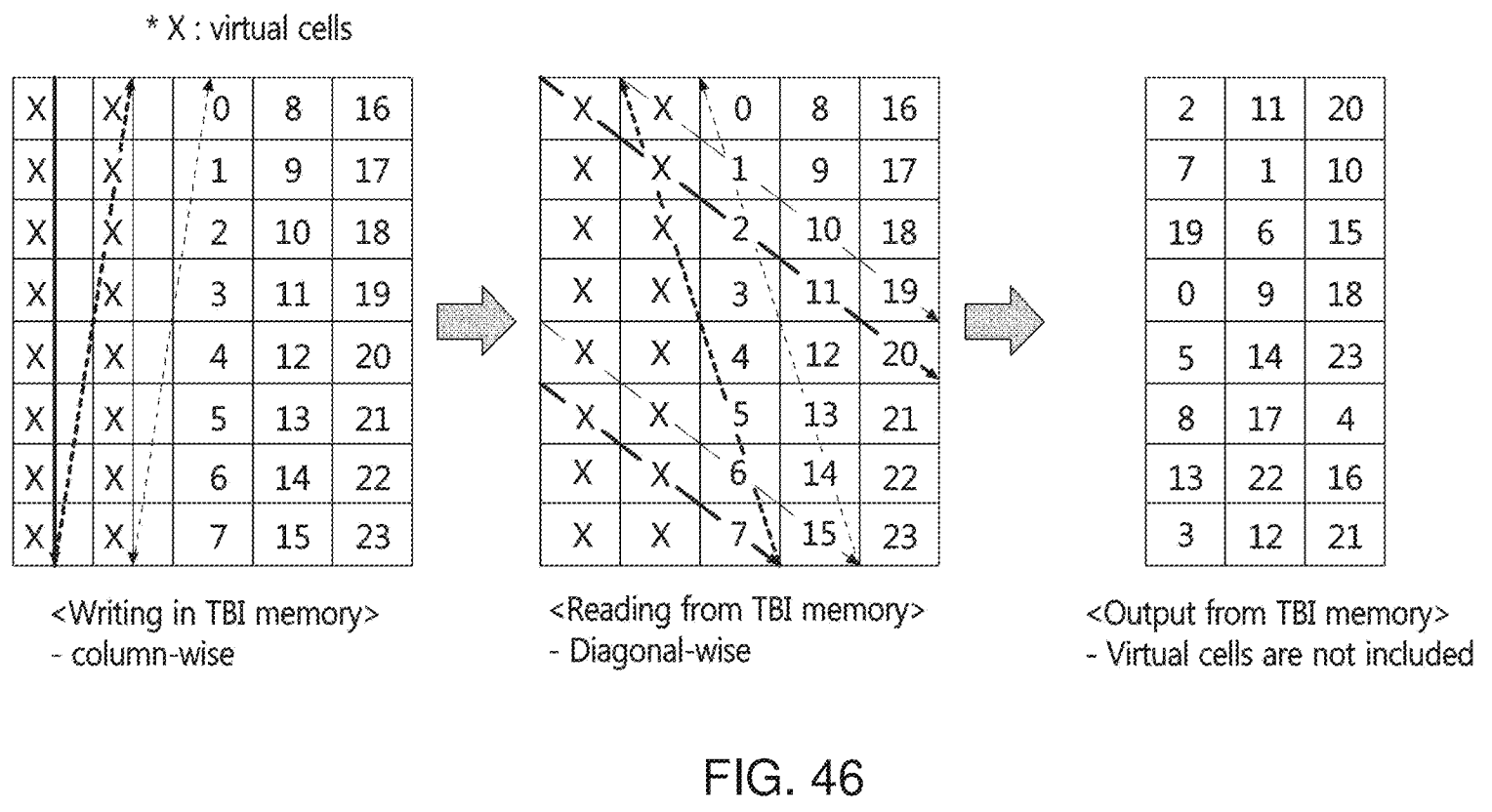

FIG. 46 is a view illustrating another example of operation of the twisted block interleaver illustrated in FIG. 38.

Referring to FIG. 46, it can be seen that virtual cells included in virtual FEC blocks are skipped during the process of reading from the twisted block interleaver in the example illustrated in FIG. 46, unlike the example illustrated in FIG. 42.

That is, in the example illustrated in FIG. 46, the twisted block interleaver outputs only data cells corresponding to data, and may not output virtual cells.

Figure 47:
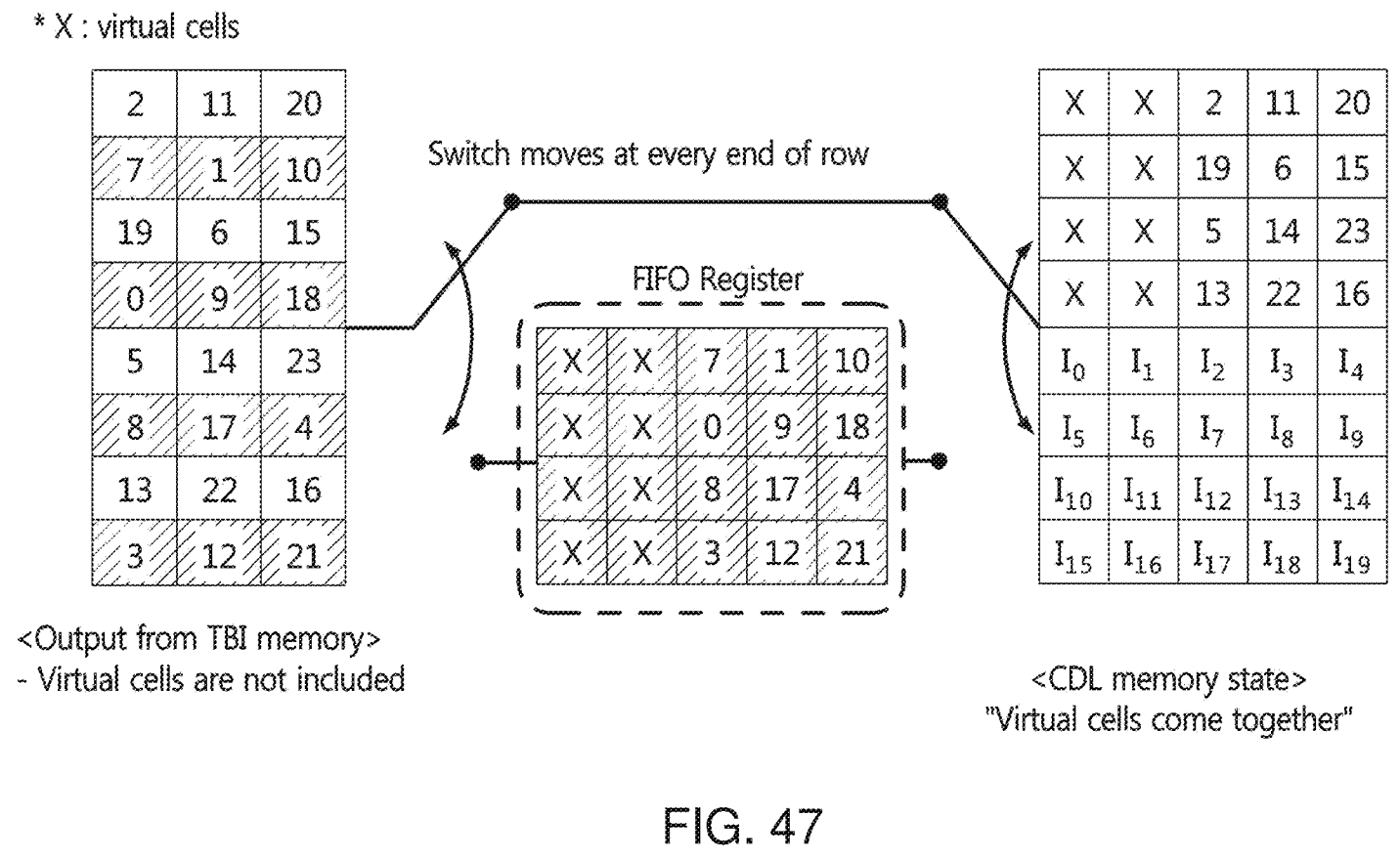

FIG. 47 is a view illustrating another example of operation of the convolutional delay line illustrated in FIG. 38.

Referring to FIG. 47, it can be seen that virtual cells in the twisted block interleaver are not written to the convolutional delay line in the example illustrated in FIG. 47.

That is, the convolutional delay line reads only the data cells, excluding the virtual cells, from the twisted block interleaver and stores the same, after which it generates virtual cells and stores the same, thereby preventing the virtual cells from being dispersed.

Here, when memory operates according to a First-In-First-Out (FIFO) method, the pieces of data illustrated in FIG. 47 can be seen as being read and written from the left side first. However, the virtual cells marked with X in the example illustrated in FIG. 47 may be written to the memory last. That is, the sequence in which data is written to the memory corresponding to the convolutional delay line may be 2, 11, 20, X, X, 19, 6, 15, X, X, 5, 14, 23, X, X, . . . in the example illustrated in FIG. 47.

Here, when the data cells read from the twisted block interleaver are written to the convolutional delay line, virtual cells may be stored in the leftmost column ($N_{FEC\_TI\_MAX}-N_{FEC\_TI}$) of the convolutional delay line.

Like FIG. 43, FIG. 47 illustrates the first subframe time when $N_{IU}$ is 2, and it can be seen that all of the pieces of data corresponding to the second branch at this time are values stored in the FIFO register.

Here, the virtual cells may not be included in a transmission signal.

Accordingly, assuming that writing and reading of data cells (excluding the virtual cells) start from the left side of the memory illustrated in FIG. 47, it can be seen that the first subframe (subframe #1) is used to transmit "2, 11, 20, 19, 6, 15, 5, 14, 23, 13, 22, 16", and the second subframe (subframe #2) is used to transmit "7, 1, 10, 0, 9, 18, 8, 17, 4, 3, 12, 21".

In the example illustrated in FIG. 47, $I_0, I_1, \ldots, I_{19}$, which are stored in the FIFO register at the previous time and are then output, are illustrated as being stored in the lower side (fifth to eighth rows) of the memory corresponding to the convolutional delay line, but may alternatively be stored in the second, fourth, sixth, and eighth rows of the memory corresponding to the convolutional delay line according to an embodiment.

In the examples illustrated in FIGS. 43 and 47, memory corresponding to the convolutional delay line is illustrated for convenience of description, but separate output memory may not be included in the convolutional delay line according to an embodiment.

Figure 48:
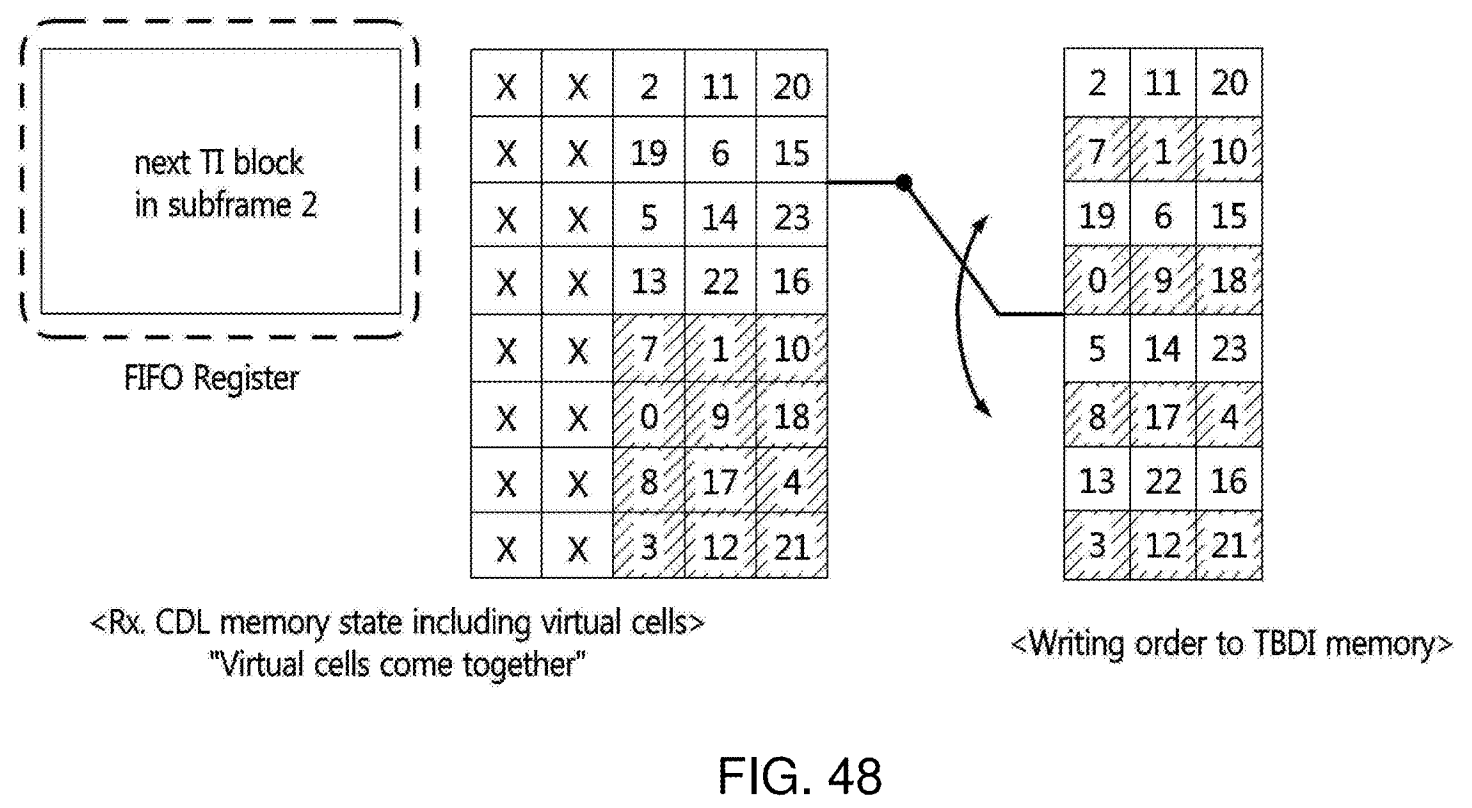

FIG. 48 is a view illustrating an example of a decoding process corresponding to the operation illustrated in FIG. 47.

Referring to FIG. 48, a time deinterleaver corresponding to a decoding process may restore the memory data (CDL memory state including virtual cells) illustrated in FIG. 48 from two subframes through a FIFO register. Further, the time deinterleaver may restore data input to the twisted block deinterleaver from the memory data (according to the writing order to TBDI memory). In the example illustrated in FIG. 48, it can be seen that the positions of the virtual cells are known in the decoding process in the inverse convolutional delay line and the virtual cells are not dispersed, unlike the case of FIG. 44.

Accordingly, decoding complexity becomes lower in the case of FIG. 48 than in the case of FIG. 44.

Figure 49:
FIG. 49 is a view illustrating an example of a decoding process corresponding to the operation illustrated in FIG. 46.

FIG. 49 is a view illustrating an example of a decoding process corresponding to the operation illustrated in FIG. 46.

Referring to FIG. 49, it can be seen that deinterleaving may be performed more simply than in the case of FIG. 45 because the inverse process of the column-wise write operation and the diagonal read operation of twisted block deinterleaving is performed while skipping virtual cells.

Figure 50:
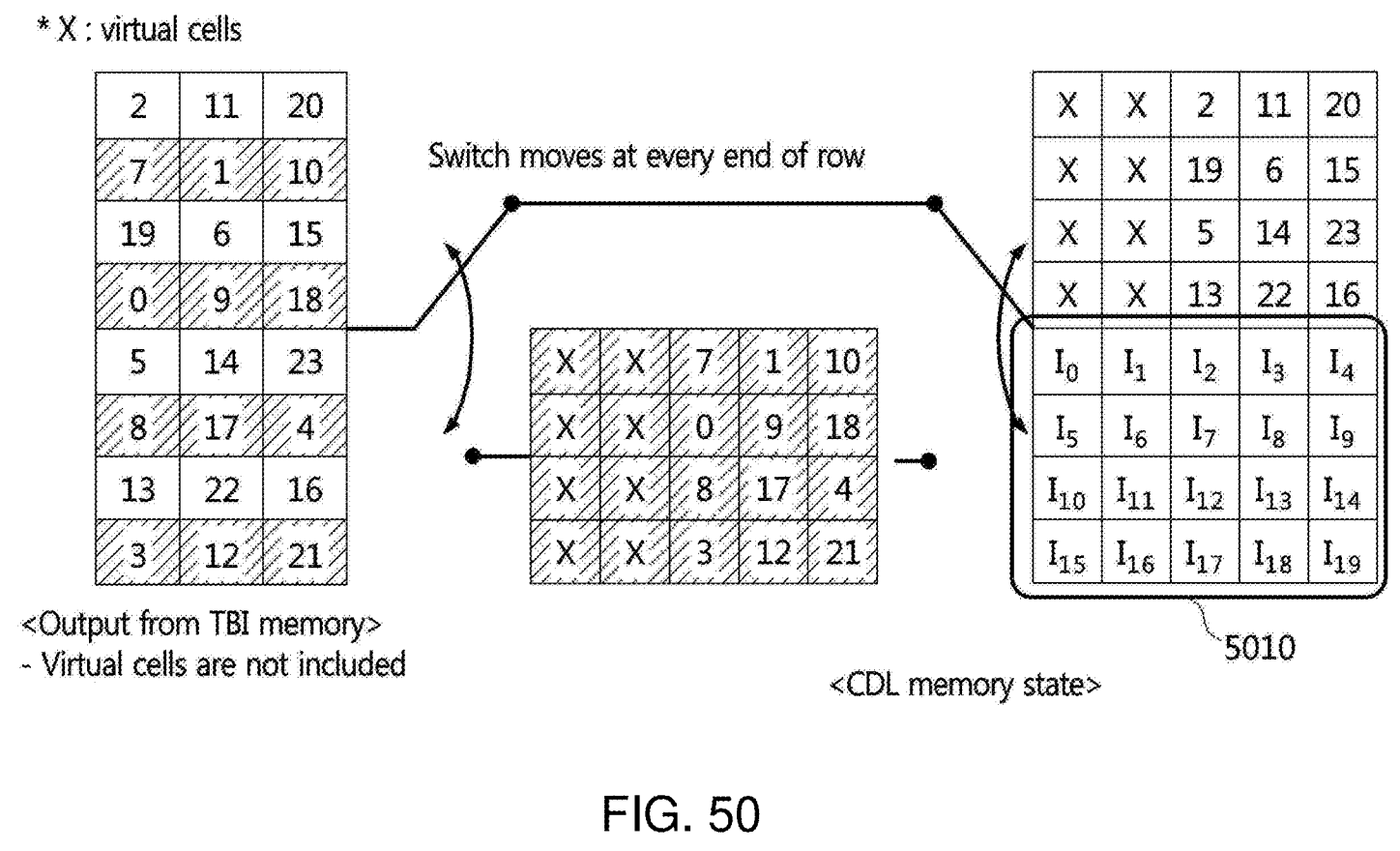

FIG. 50 is a view illustrating the initialization values of a FIFO register included in a convolutional delay line.

Referring to FIG. 50, it can be seen that, when $N_{IU}$ is 2, all pieces of data corresponding to the second branch at the first subframe time are values 5010 stored in a FIFO register.

Here, the convolutional delay line may output only some of the initialization values stored in the FIFO register.

Here, some of the initialization values may correspond to an initialization cell for each of remaining branches other than the first branch, among branches corresponding to the time-interleaving unit $N_{IU}$.

That is, among the values 5010 stored in the FIFO register, only one cell in each row is output, and the remaining cells may not be output.

According to an embodiment, memory corresponding to the twisted block interleaver (TBI) and memory corresponding to the convolutional delay line (CDL) operate according to a FIFO method, and reading from and writing to the memory may be performed from right to left. In this case, unlike what is illustrated in FIG. 50, the first row of the memory of the twisted block interleaver may store 2, 11, and 20 from right to left, the second row thereof may store 7, 1, and 10 from right to left, the third row thereof may store 19, 6, and 15 from right to left, the fourth row thereof may store 0, 9, and 18 from right to left, the fifth row thereof may store 5, 14, and 23 from right to left, the sixth row thereof may store 8, 17, and 4 from right to left, the seventh row thereof may store 13, 22, and 16 from right to left, and the eighth row thereof may store 3, 12, and 21 from right to left.

Here, reading from and writing to the FIFO register illustrated in FIG. 50 may be performed from right to left. Here, the first row of the FIFO register may be initialized to $I_0$, X, X, X, and X from right to left, the second row thereof may be initialized to $I_1$, X, X, X, and X from right to left, the third row thereof may be initialized to $I_2$, X, X, X, and X from right to left, and the fourth row thereof may be initialized to $I_3$, X, X, X, and X from right to left.

In the example illustrated in FIG. 50, the memory corresponding to the convolutional delay line may be a conceptual example for explaining the output of the convolutional delay line, and according to an embodiment, particular output memory may not be included in the convolutional delay line.

At the time corresponding to the first subframe, data (20, 11, 2) stored in the first row of the memory corresponding to the twisted block interleaver, data (15, 6, 19) stored in the third row thereof, data (23, 14, 5) stored in the fifth row thereof, data (16, 22, 13) stored in the seventh row thereof, and initialization values in the FIFO register may be stored in the memory corresponding to the convolutional delay line (CDL memory). Here, data that is initialized in the FIFO register may be stored in the memory corresponding to the convolutional delay line. That is, at the time corresponding to the first subframe, 2, 11, and 20 are stored from right to left in the first row of the memory corresponding to the convolutional delay line, and two new virtual cells X and X may be stored therein. In the third row of the memory corresponding to the convolutional delay line, 19, 6, and 15 are stored from right to left, and two new virtual cells X and X may be stored. In the fifth row of the memory corresponding to the convolutional delay line, 5, 14, and 23 are stored from right to left, and two new virtual cells X and X may be stored. In the seventh row of the memory corresponding to the convolutional delay line, 13, 22, 16, X, and X may be stored from right to left.

Here, in the second row of the memory corresponding to the convolutional delay line, one initialization cell $I_0$ is stored at the rightmost end and four virtual cells may be stored to follow the same. Here, in the fourth row of the memory corresponding to the convolutional delay line, one initialization cell $I_1$ is stored at the rightmost end and four virtual cells may be stored to follow the same. Here, in the sixth row of the memory corresponding to the convolutional delay line, one initialization cell $I_2$ is stored at the rightmost end and four virtual cells may be stored to follow the same. Here, in the eighth row of the memory corresponding to the convolutional delay line, one initialization cell 13 is stored at the rightmost end and four virtual cells may be stored to follow the same.

That is, at the time corresponding to the first subframe, the first row of the memory corresponding to the convolutional delay line may store 2, 11, 20, X, and X from right to left, the second row thereof may store $I_0$, X, X, X, and X from right to left, the third row thereof may store 19, 6, 15, X, and X from right to left, the fourth row thereof may store $I_1$, X, X, X, and X from right to left, the fifth row thereof may store 5, 14, 23, X, and X from right to left, the sixth row thereof may store $I_2$, X, X, X, and X from right to left, the seventh row thereof may store 13, 22, 16, X, and X from right to left, and the eighth row thereof may store $I_3$, X, X, X, and X from right to left. Here, X may denote a virtual cell. Here, the first row of the FIFO register illustrated in FIG. 50 may store 7, 1, 10, X, and X from right to left, the second row thereof may store 0, 9, 18, X, and X from right to left, the third row thereof may store 8, 17, 4, X, and X from right to left, and the fourth row thereof may store 3, 12, 21, X, and X from right to left.

Here, the virtual cells stored in the memory corresponding to the convolutional delay line may not be output as the output of the time interleaver. That is, the first subframe may be used to transmit "2, 11, 20, $I_0$, 19, 6, 15, $I_1$, 5, 14, 23, 12, 13, 22, 16, $I_3$", and the second subframe may be used to transmit " . . . , 7, 1, 10, . . . , 0, 9, 18, . . . , 8, 17, 4, . . . , 3, 12, 21". Here, "$I_0$, $I_1$, $I_2$, $I_3$," may correspond to some of the above-mentioned initialization values. Here, " . . . " may correspond to the subsequent time-interleaving block output from the twisted block interleaver.

Figure 51:
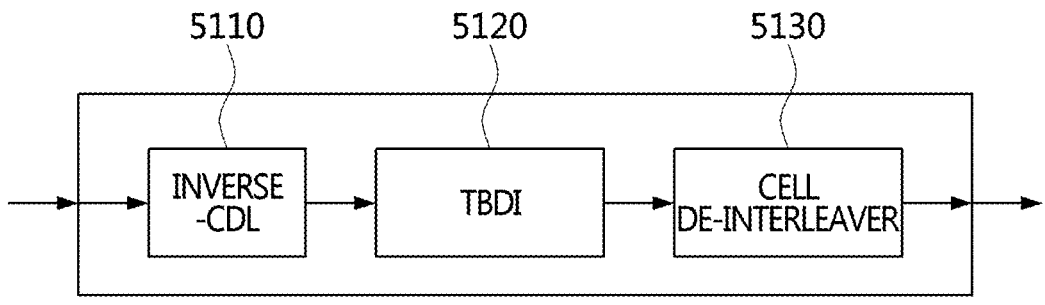
FIG. 51 is a block diagram illustrating an example of the time deinterleaver illustrated in FIG. 8 or FIG. 12.

FIG. 51 is a block diagram illustrating an example of the time deinterleaver illustrated in FIG. 8 or FIG. 12.

Referring to FIG. 51, the time deinterleaver includes an inverse convolutional delay line 5110, a twisted block deinterleaver 5120, and a cell deinterleaver 5130.

The inverse convolutional delay line 5110 performs the inverse process of the process performed by the convolutional delay line illustrated in FIG. 38.

Here, the inverse convolutional delay line 5110 predicts the positions of the virtual cells newly added in the convolutional delay line on the transmitter side, and may perform the inverse process based on the predicted positions of the virtual cells.

The twisted block deinterleaver 5120 preforms the inverse process of the process performed by the twisted block interleaver illustrated in FIG. 38.

Here, the twisted block deinterleaver 5120 may restore data cells and then newly generate and store virtual cells.

Here, the twisted block deinterleaver 5120 may predict the positions of virtual cells newly added in the convolutional delay line on the transmitter side, and may perform the inverse process in consideration of the predicted positions of the virtual cells.

Here, the twisted block deinterleaver 5120 may perform the inverse process of the column-wise write operation and the diagonal read operation of twisted block deinterleaving while skipping virtual cells.

The cell deinterleaver 5130 performs the inverse process of the process performed by the cell interleaver illustrated in FIG. 38.

Figure 52:
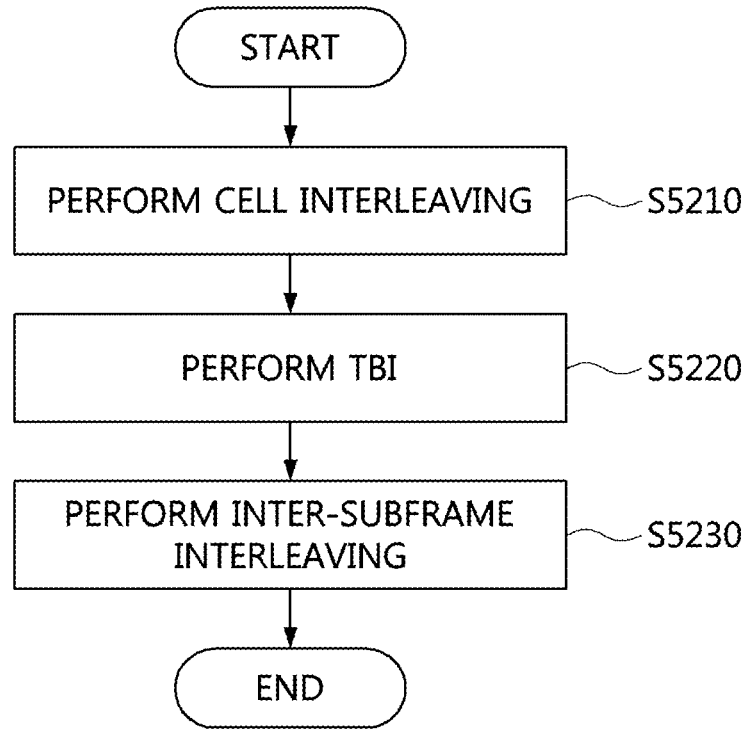
FIG. 52 is a flowchart illustrating a time-interleaving method according to an embodiment of the present invention.

FIG. 52 is a flowchart illustrating a time-interleaving method according to an embodiment of the present invention.

Referring to FIG. 52, in the time-interleaving method according to an embodiment of the present invention, cell interleaving, corresponding to cells within a time-interleaving block, is performed at step S5210.

According to an embodiment, step S5210 may be skipped.

Also, in the time-interleaving method according to an embodiment of the present invention, twisted block interleaving, corresponding to intra-subframe interleaving, is performed at step S5220.

Here, at step S5220, twisted block interleaving may be performed using a column-wise write operation and a diagonal read operation.

Also, in the time-interleaving method according to an embodiment of the present invention, inter-subframe interleaving is performed at step S5230 using the output of twisted block interleaving.

Here, step S5230 may be performed using a convolutional delay line.

Here, the convolutional delay line may read only data cells corresponding to twisted block interleaving, excluding virtual cells.

Here, the convolutional delay line may store new virtual cells after each row of the data cells from the output of twisted block interleaving is written and before switches move to the next branch.

Here, the number of new virtual cells may correspond to a value acquired by subtracting the number of FEC blocks ($N_{FEC\_TI}$) in a time-interleaving block of an interleaving frame from the maximum number of FEC blocks ($N_{FEC\_TI\_MAX}$) in the time-interleaving block of the interleaving frame in each branch.

Here, the new virtual cells may not be output as the output of inter-subframe interleaving.

Here, the convolutional delay line includes a number of branches corresponding to a time-interleaving unit $N_{IU}$, and remaining branches, excluding the first branch, among the branches, may include one or more FIFO registers.

Here, the convolutional delay line may output only some of initialization values stored in the FIFO register.

Here, some of the initialization values may correspond to one initialization cell for each of the remaining branches.

A time-deinterleaving method according to an embodiment of the present invention may be provided in a manner corresponding to FIG. 52.

For example, the time-deinterleaving method according to an embodiment of the present invention may include performing inter-subframe deinterleaving corresponding to the inverse process of step S5230 and performing twisted block deinterleaving corresponding to the inverse process of step S5220. Here, the time-deinterleaving method according to an embodiment of the present invention may further include performing cell deinterleaving corresponding to the inverse process of step S5210.

Size information and start position information of a physical-layer pipe may be generated after time interleaving. Here, the size information and the start position information can be seen as being considered within the current subframe.

When layered-division multiplexing is applied, core-layer cells and enhanced-layer cells are combined or superposed before a time-interleaving process. Here, calculating the position of an enhanced-layer physical-layer pipe relative to a core-layer physical-layer pipe before time interleaving may be advantageous for easy restoration of the enhanced-layer physical-layer pipe. In a decoder, the cancellation process performed on the core-layer data cells in the layered-division-multiplexed data cells is performed after time deinterleaving.

Both time interleaving and mapping to a subframe (cell multiplexing) may be applied only for a core-layer physical-layer pipe with which enhanced-layer physical-layer pipes are combined.

On the receiver side (demodulator), size information (L1D_plp_size) and start position information (L1D_plp_start) may be used in order to select a wanted core-layer physical-layer pipe. That is, the size information and the start position information may be used in order to locate the data cells of the core-layer physical-layer pipe to be used as the input of the time deinterleaver.

When inter-subframe interleaving, such as a convolutional delay line or the like, is used, the size information (L1D_plp_size) of a core-layer physical-layer pipe may have different values depending on whether it is calculated before time interleaving or after time interleaving.

Here, it is desirable to calculate the position of the core-layer physical-layer pipe after time interleaving.

FIG. 53 is a view illustrating layered-division-multiplexed physical-layer pipes before time interleaving.

Referring to FIG. 53, it can be seen that a single core-layer physical-layer pipe PLP #0 and two enhanced-layer physical-layer pipes PLP #1 and PLP #2 are layered-division-multiplexed.

In the case of FIG. 53, the start positions and the sizes of the enhanced-layer physical-layer pipes PLP #1 and PLP #2 are clearly identifiable.

FIG. 54 is a view illustrating layered-division-multiplexed physical-layer pipes after time interleaving.

Referring to FIG. 54, it can be seen that time interleaving (hybrid time interleaving using only a twisted block interleaver) is applied, whereby the start positions of the enhanced-layer physical-layer pipes PLP #1 and PLP #2 are changed. In the example of FIG. 54, the size information of the physical-layer pipes and the start position of the core-layer physical-layer pipe PLP #0 may not be changed even after time interleaving.

In the case of hybrid time interleaving in which a convolutional delay line is used with a variable bit rate (VBR), both the start position information and the size information of the enhanced-layer physical-layer pipe may be changed after time interleaving.

For example, when two physical-layer pipes PLP #A and PLP #B are time-division-multiplexed (TDM) and then time-interleaved using a convolutional delay line with a VBR, size information before/after time interleaving may differ as follows.

PLP #A: $N_{FEC\_TI\_MAX}=5$, $N_r=8$, $N_{IU}=2$->(time=0; $N_{FEC\_TI}=3$), (time=1; $N_{FEC\_TI}=1$)
PLP #B: $N_{FEC\_TO\_MAX}=4$, N, =10, $N_{IU}=2$->(time=0; $N_{FEC\_TI}=4$), (time=1; $N_{FEC\_TI}=2$)
time=0
 Before TI: plp_size(A)=3×8=24, plp_size(B)=4×10=40
 After TI: plp_size(A)=3×4+1×4=16, plp_size(B)=4×5+1×5=25
time=1
 Before TI: plp_size(A)=1×8=8, plp_size(B)=2×10=20
 After TI: plp_size(A)=1×4+3×4=16, plp_size(B)=2×5+4×5=30

That is, at the first time (time=0), the physical-layer pipe PLP #A has three FEC blocks and the number of cells included in each of the FEC blocks is 8, so the size information of the physical-layer pipe PLP #A before time interleaving is 3×8=24. At the first time (time=0), the physical-layer pipe PLP #B has four FEC blocks and the number of cells included in each of the FEC blocks is 10, so the size information of the physical-layer pipe PLP #B before time interleaving is 4×10=40.

At the second time (time=1), the physical-layer pipe PLP #A has one FEC block and the number of cells included in each FEC block is 8, so the size information of the physical-layer pipe PLP #A before time interleaving is 1×8=8. At the second time (time=1), the physical-layer pipe PLP #B has two FEC blocks and the number of cells included in each of the FEC blocks is 10, so the size information of the physical-layer pipe PLP #B before time interleaving is 2×10=20.

In the above example, $N_{FEC\_TI\_MAX}$, $N_r$, $N_{IU}$, and $N_{FEC\_TI}$ are as described above. In the above example, after time interleaving, one FEC block is transmitted over two subframes because $N_{IU}$ is 2.

That is, at the first time (time=0), the physical-layer pipe PLP #A has three FEC blocks, the number of cells included in each FEC block is 8, and a time-interleaving unit is 2, and assuming that initialization values corresponding to one FEC block are stored in a convolutional delay line, the size information of the physical-layer pipe PLP #A after time interleaving is (3×(8/2))+(1×(8/2))=16. At the first time (time=0), the physical-layer pipe PLP #B has four FEC blocks, the number of cells included in each FEC block is 10, and a time-interleaving unit is 2, and assuming that initialization values corresponding to one FEC block are stored in a convolutional delay line, the size information of the physical-layer pipe PLP #B after time interleaving is (4×(10/2))+(1×(10/2))=25. Here, because TDM is applied, the start position information of the physical-layer pipe PLP #A is 0, and the start position information of the physical-layer pipe PLP #B may be 16, which is the size information of the physical-layer pipe PLP #A.

At the second time (time=1), the physical-layer pipe PLP #A has one FEC block, the number of cells included in each FEC block is 8, and a time-interleaving unit is 2, and considering that only half the cells of the FEC block corresponding to the first time were transmitted using the previous frame, the size information of the physical-layer pipe PLP #A after time interleaving is (1×(8/2))+(3×(8/2))=16. At the second time (time=1), the physical-layer pipe PLP #B has two FEC blocks, the number of cells included in each FEC block is 10, and a time-interleaving unit is 2, and considering that only half the cells of the FEC block corresponding to the first time were transmitted using the previous frame, the size information of the physical-layer pipe PLP #B after time interleaving is (2×(10/2))+(4×(10/2))=30.

Here, the number of data cells mapped to the current subframe corresponds to the size information (plp_size) after time interleaving.

Consequently, when inter-subframe interleaving to which a variable bit rate is applied is performed as in the above-described example, both the start position information and the size information of the enhanced-layer physical-layer pipe may be changed.

In the above-described example, at the first time (time=0), a subframe includes 16 active cells of the physical-layer pipe PLP #A because the size of the physical-layer pipe PLP #A is 16, and includes 25 active cells of the physical-layer pipe PLP #B because the size of the physical-layer pipe PLP #B is 25.

If signaling is performed based on information before time interleaving (L1D_plp_size(A)=24, L1D_plp_start(A)=0), a receiver inputs the 16 data cells of the physical-layer pipe PLP #A and the 8 data cells of the physical-layer pipe PLP #B to a time deinterleaver in order to decode the physical-layer pipe PLP #A, whereby decoding fails. That is, the receiver inputs the 16 data cells of the physical-layer pipe PLP #A to the time deinterleaver in order to decode the physical-layer pipe PLP #A only when signaling is performed based on information after time interleaving (L1D_plp_size(A)=16, L1D_plp_start (A)=0), whereby decoding may succeed.

If signaling is performed based on information before time interleaving (L1D_plp_size(B)=40, L1D_plp_start (B)=24), a receiver inputs only 16 data cells (from 24 to 40) of the physical-layer pipe PLP #B to a time deinterleaver in order to decode the physical-layer pipe PLP #B, whereby decoding fails. That is, the receiver inputs the 25 data cells of the physical-layer pipe PLP #B to the time deinterleaver in order to decode the physical-layer pipe PLP #B only when signaling is performed based on information after time interleaving (L1D_plp_size(B)=25, L1D_plp_start (B)=16), whereby decoding may succeed.

That is, the signaling fields (L1D_plp_size and L1D_plp_start) for a core-layer physical-layer pipe have to be signaled based on the values after time interleaving.

Figure 55:
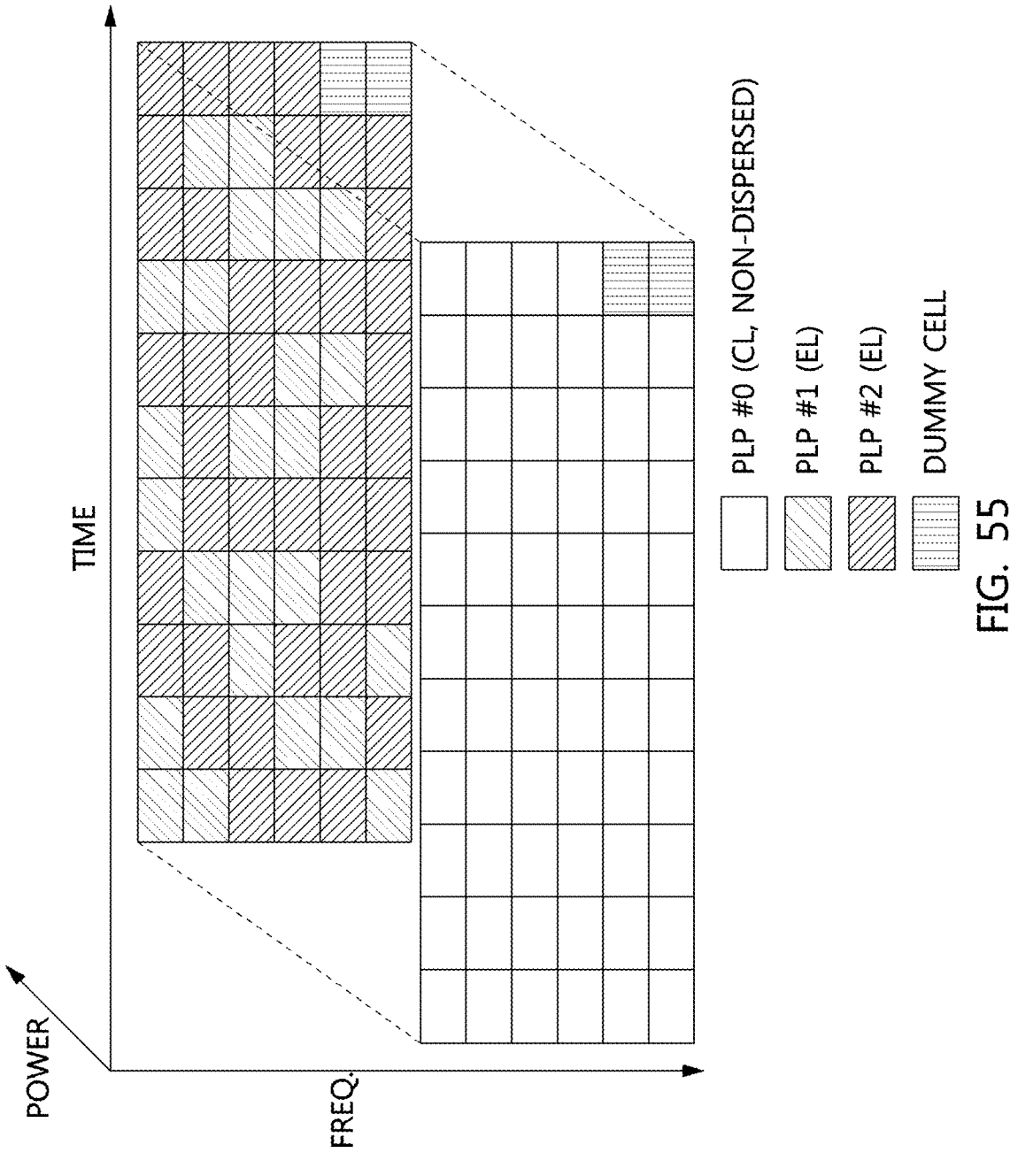
FIG. 55 is a view illustrating a subframe including layered-division-multiplexed physical-layer pipes.

FIG. 55 is a view illustrating a subframe including layered-division-multiplexed physical-layer pipes.

Referring to FIG. 55, it can be seen that a subframe is formed of a single core-layer physical-layer pipe PLP #0 and two enhanced-layer physical-layer pipes PLP #1 and PLP #2.

Because time interleaving is applied based on a core layer, the enhanced-layer physical-layer pipes PLP #1 and PLP #2 may be included in the subframe by being mixed with each other.

A receiver first extracts a subframe from a received signal and accesses core-layer data cells in the extracted subframe. However, because layered-division multiplexing is performed before time interleaving in a transmitter, access to the enhanced-layer physical-layer pipes is performed after time deinterleaving, which may reduce the complexity of the receiver.

Consequently, when layered-division multiplexing is applied, because core-layer physical-layer pipes are accessed in a subframe, it is desirable to calculate the sizes and the start positions of the physical-layer pipes based on information after time interleaving, but because enhanced-layer physical-layer pipes are accessed after time deinterleaving, it is desirable to calculate the sizes and the start positions of the physical-layer pipes based on information before time interleaving.

Figure 56:
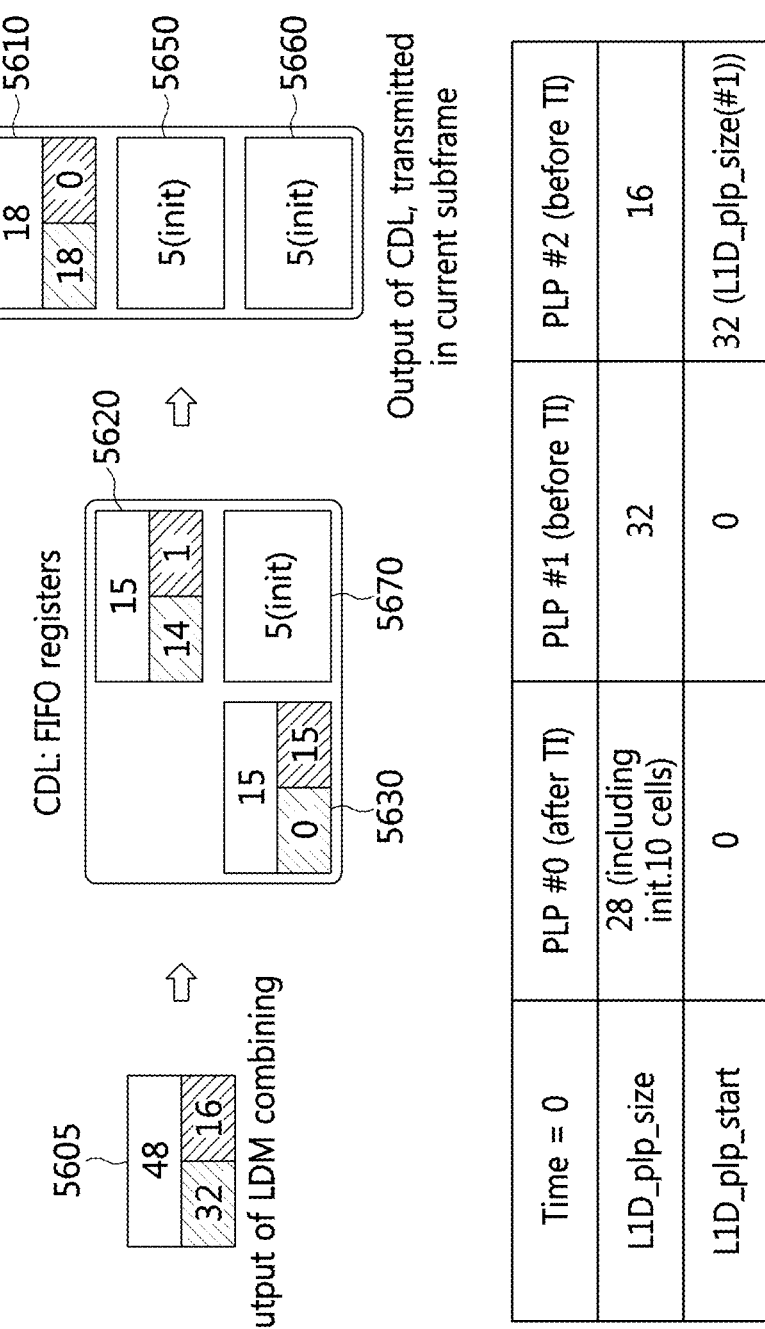
FIG. 56 is a view illustrating the first timing of a convolutional delay line for performing time interleaving corresponding to the physical-layer pipes illustrated in FIGS. 53 to 55.

FIG. 56 is a view illustrating the first timing of a convolutional delay line for performing time interleaving corresponding to the physical-layer pipes illustrated in FIGS. 53 to 55.

In the example illustrated in FIG. 56, the physical-layer pipe PLP #0 is a core-layer physical-layer pipe, and corresponds to $N_r=16$, $N_{FEC\_TI\_MAX}=3$, and $N_{IU}=3$. The physical-layer pipes PLP #1 and PLP #2 are enhanced-layer physical-layer pipes, and correspond to $N_r=8$ and $N_r=4$, respectively.

At the first time (Time=0), when the number of FEC blocks of the physical-layer pipe PLP #0 is 3 ($N_{FEC\_TI}=3$), the number of cells corresponding to the core-layer physical-layer pipe PLP #0 is 3 ($N_{FEC\_TI}$)×16 ($N_r$)=48, and the numbers of cells of the enhanced-layer physical-layer pipes PLP #1 and PLP #2, corresponding to the core-layer physical-layer pipe PLP #0, may be 4 ($N_{FEC\_TI}$)×8 ($N_r$)=32 and 4 ($N_{FEC\_TI}$)×4 ($N_r$)=16, respectively.

Accordingly, the output of LDM combining is as illustrated on the left side of FIG. 56.

Because a time-interleaving unit is 3 ($N_{IU}=3$), the output 5605 of LDM combining of the three physical-layer pipes PLP #0, PLP #1, and PLP #2 is split into three segments, after which the first segment 5610, corresponding to the first branch, may form the CDL output transmitted through a subframe corresponding to the first time, the second segment 5620, corresponding to the second branch, may be stored in a single FIFO register of the second branch, and the third segment 5630, corresponding to the third branch, may be stored in a first FIFO register, among two FIFO registers of the third branch.

Here, initialization values corresponding to one FEC block may be stored in the FIFO registers of the convolutional delay line, as described above, and each of the FIFO registers may be initialized to a number of initialization values corresponding to five core-layer cells.

The initialization values 5650 that are used to initialize the FIFO register corresponding to the second branch of the convolutional delay line and the initialization values 5660 that are used to initialize the second FIFO register of the FIFO registers corresponding to the third branch constitute the CDL output transmitted through a subframe at the first time, along with the first segment 5610 of the output of LDM combining.

Here, the initialization values 5670 used to initialize the first FIFO register of the two FIFO registers corresponding to the third branch of the convolutional delay line may be stored in the second FIFO register of the two FIFO registers.

Consequently, at the first time (Time=0), when the size information (L1D_plp_size) and the start position information (L1D_plp_start) of the core-layer physical-layer pipe PLP #0 are signaled based on information after time interleaving, L1D_plp_size is set to 18+5+5=28, and L1D_plp_start is set to 0. Also, at the first time (Time=0), when the size information (L1D_plp_size) and the start position information (L1D_plp_start) of the enhanced-layer physical-layer pipe PLP #1 are signaled based on information before time interleaving, signaling information is generated so as to match the output of LDM combining before CDL is applied, whereby L1D_plp_size is set to 32 and L1D_plp_start is set to 0. Also, at the first time (Time=0), when the size information (L1D_plp_size) and the start position information (L1D_plp_start) of the enhanced-layer physical-layer pipe PLP #2 are signaled based on information before time interleaving, signaling information is generated so as to match the output of LDM combining before CDL is applied, whereby L1D_plp_size is set to 16 and L1D_plp_start is set to 32, which is the size information of the physical-layer pipe PLP #1.

Figure 57:
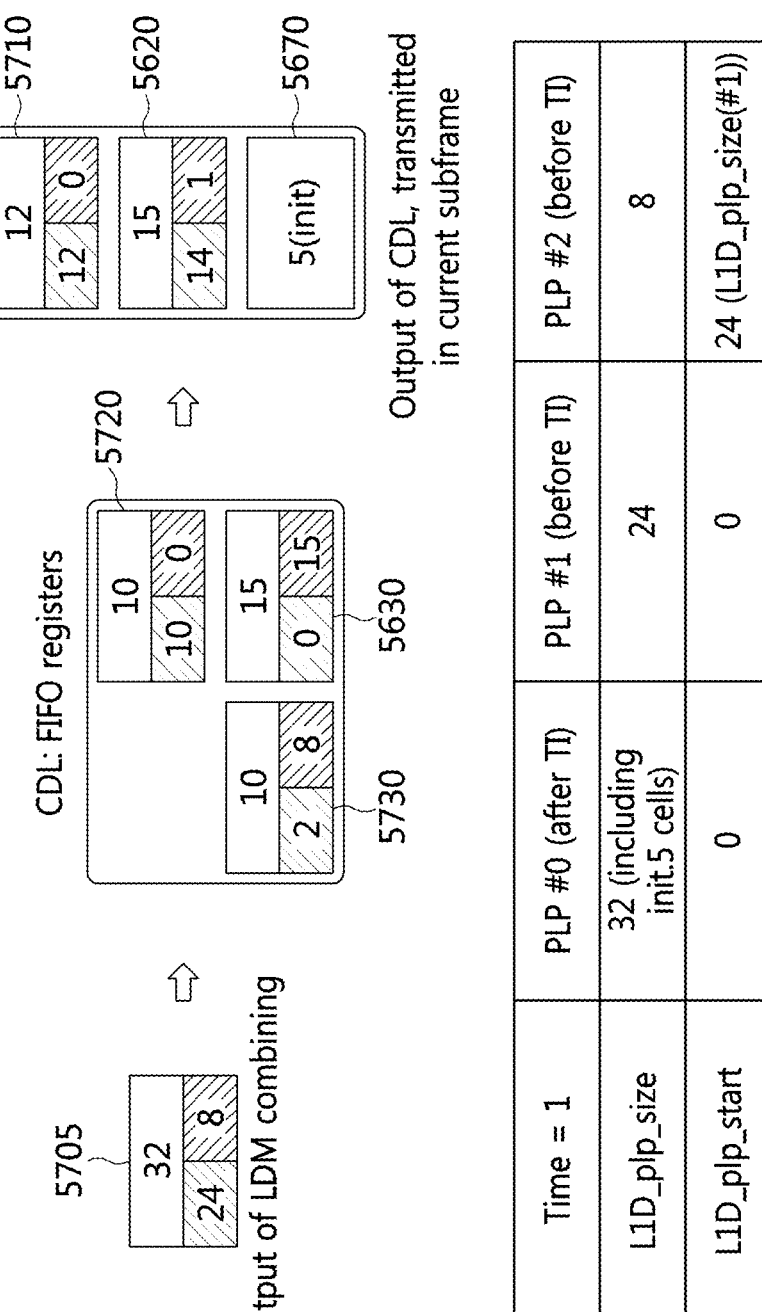
FIG. 57 is a view illustrating the second timing of a convolutional delay line for performing time interleaving corresponding to the physical-layer pipes illustrated in FIGS. 53 to 55.

FIG. 57 is a view illustrating the second timing of the convolutional delay line for performing time interleaving corresponding to the physical-layer pipes illustrated in FIGS. 53 to 55.

In the example illustrated in FIG. 57, the physical-layer pipe PLP #0 is a core-layer physical-layer pipe, and corresponds to $N_r=16$, $N_{FEC\_TO\_MAX}=3$, and $N_{IU}=3$. The physical-layer pipes PLP #1 and PLP #2 are enhanced-layer physical-layer pipes, and correspond to $N_r=8$ and $N_r=4$, respectively.

At the second time (Time=1), when the number of FEC blocks of the physical-layer pipe PLP #0 is 2 ($N_{FEC\_TI}=2$), the number of cells corresponding to the core-layer physical-layer pipe PLP #0 is 2 ($N_{FEC\_TI}$)×16 ($N_r$)=32, and the numbers of cells of the enhanced-layer physical-layer pipes PLP #1 and PLP #2, corresponding to the core-layer physical-layer pipe PLP #0, may be 24 and 8, respectively.

Accordingly, the output of LDM combining is as illustrated on the left side of FIG. 57.

Because a time-interleaving unit is 3 ($N_{IU}=3$), the output 5705 of LDM combining of the three physical-layer pipes PLP #0, PLP #1, and PLP #2 is split into three segments, after which the first segment 5710, corresponding to the first branch, forms the CDL output transmitted through a subframe at the second time, the second segment 5720, corresponding to the second branch, is stored in a single FIFO register of the second branch, and the third segment 5730, corresponding to the third branch, is stored in a first FIFO register of two FIFO registers of the third branch.

The second segment 5620 at the first time, which is stored in the FIFO register corresponding to the second branch of the convolutional delay line, and the initialization values 5670 (the number of which corresponding to five core-layer cells), which are stored in the second FIFO register of the FIFO registers corresponding to the third branch, constitute the CDL output to be transmitted through a subframe, along with the first segment 5710 of the output of LDM combining at the second time.

Here, the third segment 5630 at the first time, which is stored in the first FIFO register of the two FIFO registers corresponding to the third branch of the convolutional delay line, may be stored in the second FIFO register of the two FIFO registers.

Consequently, at the second time (Time=1), when the size information (L1D_plp_size) and the start position information (L1D_plp_start) of the core-layer physical-layer pipe PLP #0 are signaled based on information after time interleaving, L1D_plp_size is set to 12+15+5=32 and L1D_plp_start is set to 0. Also, at the second time (Time=1), when the size information (L1D_plp_size) and the start position information (L1D_plp_start) of the enhanced-layer physical-layer pipe PLP #1 are signaled based on information before time interleaving, signaling information is generated so as to match the output of LDM combining before CDL is applied, whereby L1D_plp_size is set to 24 and L1D_plp_start is set to 0. Also, at the second time (Time=1), when the size information (L1D_plp_size) and the start position information (L1D_plp_start) of the enhanced-layer physical-layer pipe PLP #2 are signaled based on information before time interleaving, signaling information is generated so as to match the output of LDM combining before CDL is applied, whereby L1D_plp_size is set to 8 and L1D_plp_start is set to 24, which is the size information of the physical-layer pipe PLP #1.

Figure 58:
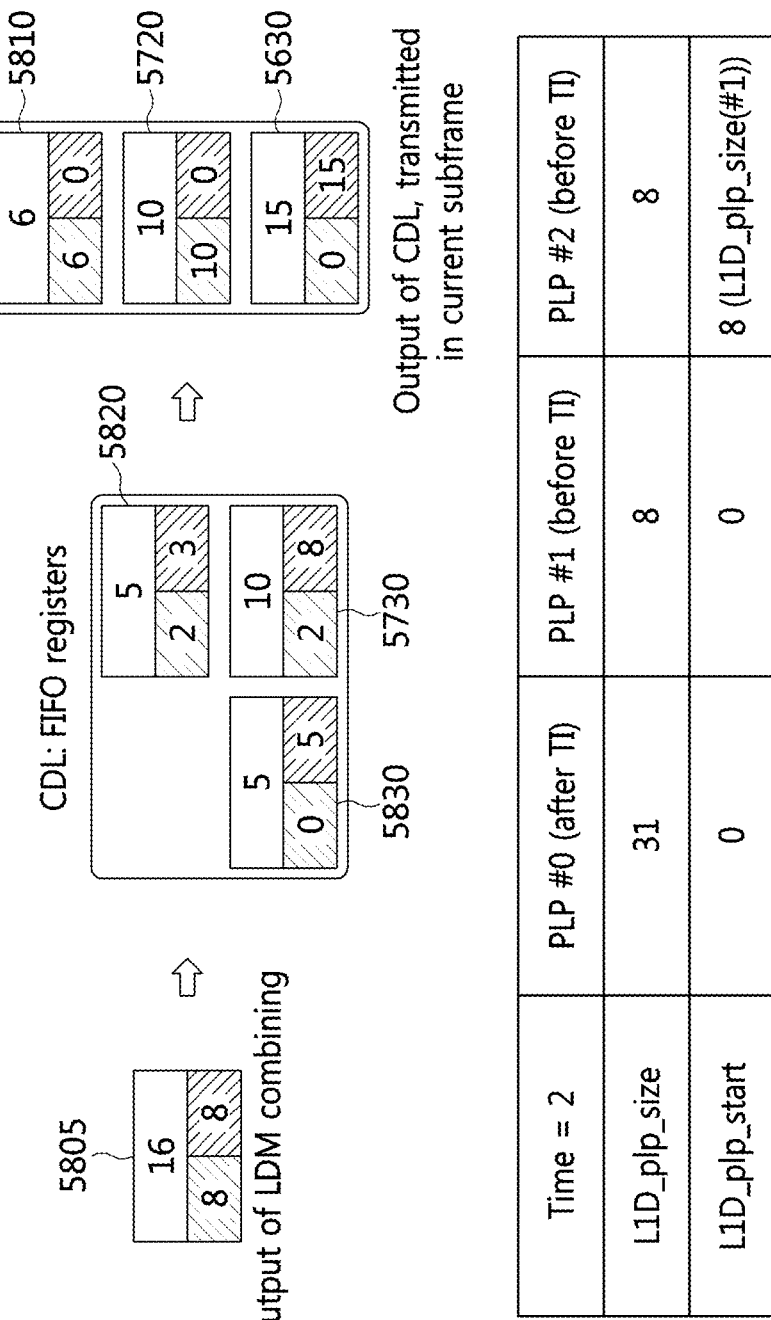
FIG. 58 is a view illustrating the third timing of a convolutional delay line for performing time interleaving corresponding to the physical-layer pipes illustrated in FIGS. 53 to 55.

FIG. 58 is a view illustrating the third timing of the convolutional delay line for performing time interleaving corresponding to the physical-layer pipes illustrated in FIGS. 53 to 55.

In the example illustrated in FIG. 58, the physical-layer pipe PLP #0 is a core-layer physical-layer pipe, and corresponds to $N_r=16$, $N_{FEC\_TI\_MAX}=3$, and $N_{IU}=3$. The physical-layer pipes PLP #1 and PLP #2 are enhanced-layer physical-layer pipes, and correspond to $N_r=8$ and $N_r=4$, respectively.

At the third time (Time=2), when the number of FEC blocks of the physical-layer pipe PLP #0 is 1 ($N_{FEC\_TI}=1$), the number of cells corresponding to the core-layer physical-layer pipe PLP #0 is 1 ($N_{FEC\_TI}$)×16 ($N_r$)=16, and the numbers of cells of the enhanced-layer physical-layer pipes PLP #1 and PLP #2, corresponding to the core-layer physical-layer pipe PLP #0, may be 8 and 8, respectively.

Accordingly, the output of LDM combining is as illustrated on the left side of FIG. 58.

Because a time-interleaving unit is 3 ($N_{IU}=3$), the output 5805 of LDM combining of the three physical-layer pipes PLP #0, PLP #1, and PLP #2 is split into three segments, after which the first segment 5810, corresponding to the first branch, forms the CDL output transmitted through a subframe at the third time, the second segment 5820, corresponding to the second branch, is stored in a single FIFO register of the second branch, and the third segment 5830, corresponding to the third branch, is stored in a first FIFO register of two FIFO registers of the third branch.

The second segment 5720 at the second time, which is stored in the FIFO register corresponding to the second branch of the convolutional delay line, and the third segment 5630 at the first time, which is stored in the second FIFO register of the FIFO registers corresponding to the third branch, constitute the CDL output to be transmitted through a subframe, along with the first segment 5810 of the output of LDM combining at the third time.

Here, the third segment 5730 at the second time, which is stored in the first FIFO register of the two FIFO registers corresponding to the third branch of the convolutional delay line, may be stored in the second FIFO register of the two FIFO registers.

Consequently, at the third time (Time=2), when the size information (L1D_plp_size) and the start position information (L1D_plp_start) of the core-layer physical-layer pipe PLP #0 are signaled based on information after time interleaving, L1D_plp_size is set to 6+10+15=31 and L1D_plp_start is set to 0. Also, at the third time (Time=2), when the size information (L1D_plp_size) and the start position information (L1D_plp_start) of the enhanced-layer physical-layer pipe PLP #1 are signaled based on information before time interleaving, signaling information is generated so as to match the output of LDM combining before CDL is applied, whereby L1D_plp_size is set to 8 and L1D_plp_start is set to 0. Also, at the third time (Time=2), when the size information (L1D_plp_size) and the start position information (L1D_plp_start) of the enhanced-layer physical-layer pipe PLP #2 are signaled based on information before time interleaving, signaling information is generated so as to match the output of LDM combining before CDL is applied, whereby L1D_plp_size is set to 8 and L1D_plp_start is set to 8, which is the size information of the physical-layer pipe PLP #1.

Figure 59:
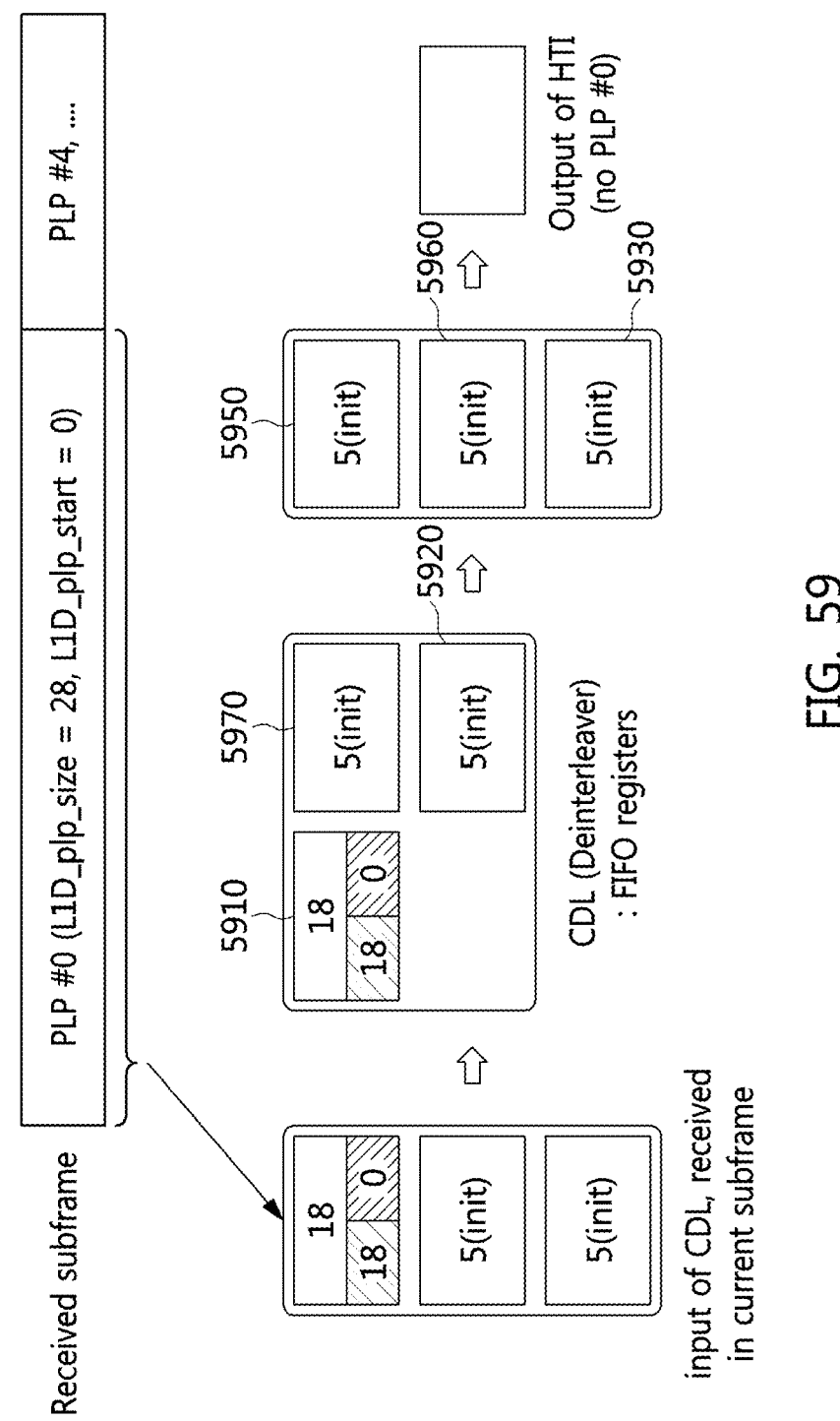
FIG. 59 is a view illustrating the first timing of an inverse convolutional delay line for performing time deinterleaving corresponding to the physical-layer pipes illustrated in FIGS. 53 to 55.

FIG. 59 is a view illustrating the first timing of an inverse convolutional delay line for performing time deinterleaving corresponding to the physical-layer pipes illustrated in FIGS. 53 to 55.

In the example illustrated in FIG. 59, information such as $N_{FEC\_TI}=[3\ 1\ 1]$ is signaled for a core-layer physical-layer pipe PLP #0, whereby a receiver is made aware that the number of FEC blocks corresponding to the core-layer physical-layer pipe PLP #0 at the first time (Time=0) is 3 (the number of FEC blocks initialized at the previous time is 1 and the number of FEC blocks initialized two iterations previously is 1).

The output of the convolutional delay line illustrated in FIG. 56 may be received as the input of the inverse convolutional delay line, as illustrated on the left side of FIG. 59.

The received data is split into three segments, after which the first segment 5910 is stored in a first FIFO register of two FIFO registers corresponding to the first branch of the inverse convolutional delay line, the second segment 5920 (initialization values) is stored in a FIFO register corresponding to the second branch of the inverse convolutional delay line, and the third segment 5930 (initialization values) corresponds to the third branch of the inverse convolutional delay line and is output as the output of the time deinterleaver.

Here, because L1D_plp_size=28 and L1D_plp_start=0 are signaled for the core-layer physical-layer pipe PLP #0 based on information after time interleaving, 28 cells may be extracted from the received data and used as the input of the inverse convolutional delay line. Here, among the 28 cells, data cells corresponding to three FEC blocks are written to the first branch, and data cells corresponding to one FEC block may be written to each of the second and third branches so as to correspond to $N_{FEC\_TI}=[3\ 1\ 1]$.

Here, each of the FIFO registers of the inverse convolutional delay line may also be initialized to initialization values corresponding to five core-layer cells. Here, the FIFO register corresponding to the first branch may be initialized using six initialization values, and the FIFO registers of the remaining branches may be initialized using five initialization values ($N_r=16$).

The initialization values 5950 used to initialize the second FIFO register of the two FIFO registers corresponding to the first branch of the inverse convolutional delay line and the initialization values 5960 used to initialize the FIFO register corresponding to the second branch constitute the output of the time deinterleaver at the first time, along with the third segment of the received data.

Here, the initialization values 5970, which are used to initialize the first FIFO register of the two FIFO registers corresponding to the first branch of the convolutional delay line, may be stored in the second FIFO register of the two FIFO registers.

Consequently, at the first time, the data of the physical-layer pipe PLP #0 is not output as the output of the time deinterleaver.

Figure 60:
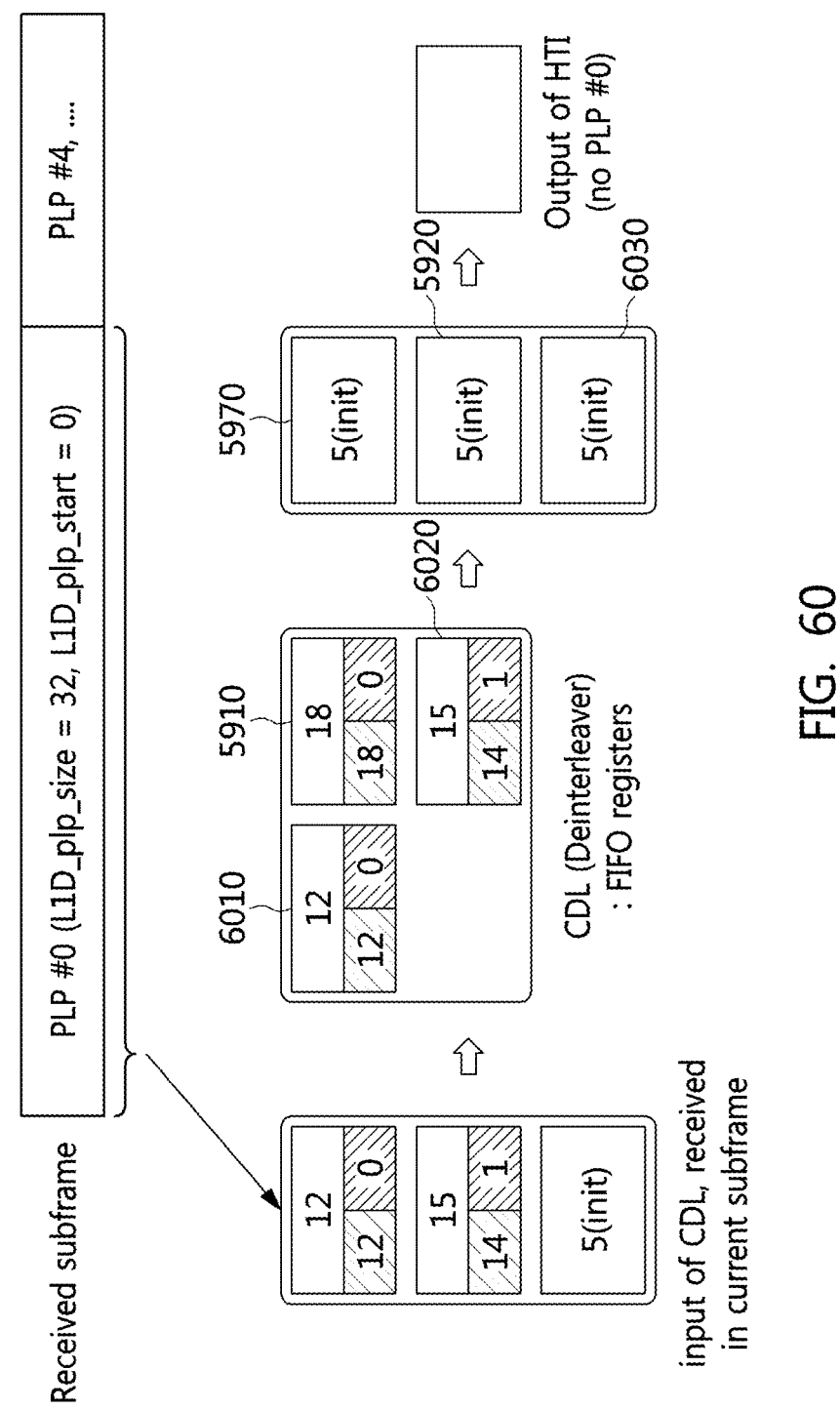
FIG. 60 is a view illustrating the second timing of an inverse convolutional delay line for performing time deinterleaving corresponding to the physical-layer pipes illustrated in FIGS. 53 to 55.

FIG. 60 is a view illustrating the second timing of the inverse convolutional delay line for performing time deinterleaving corresponding to the physical-layer pipes illustrated in FIGS. 53 to 55.

In the example illustrated in FIG. 60, information such as $N_{FEC\_TI}$=[2 3 1] is signaled for a core-layer physical-layer pipe PLP #0, whereby a receiver is made aware that the number of FEC blocks corresponding to the core-layer physical-layer pipe PLP #0 at the second time (Time=1) is 2 (the number of FEC blocks corresponding to the core-layer physical-layer pipe at the previous time was 3 and the number of FEC blocks initialized two iterations previously was 1).

The output of the convolutional delay line illustrated in FIG. 57 may be received as the input of the inverse convolutional delay line, as illustrated on the left side of FIG. 60.

The received data is split into three segments, after which the first segment 6010 is stored in a first FIFO register of two FIFO registers corresponding to the first branch of the inverse convolutional delay line, the second segment 6020 is stored in a FIFO register corresponding to the second branch of the inverse convolutional delay line, and the third segment 6030 (initialization values) corresponds to the third branch of the inverse convolutional delay line and is output as the output of the time deinterleaver.

Here, because L1D_plp_size=32 and L1D_plp_start=0 are signaled for the core-layer physical-layer pipe PLP #0 based on information after time interleaving, 32 cells may be extracted from the received data and used as the input of the inverse convolutional delay line. Here, among the 32 cells, data cells corresponding to two FEC blocks may be written to the first branch, data corresponding to three FEC blocks may be written to the second branch, and data cells corresponding to one FEC block may be written to the third branch so as to correspond to $N_{FEC\_TI}$=[2 3 1].

Here, the first segment 5910 of the data received at the first time, which is stored in the first FIFO register of the two FIFO registers corresponding to the first branch at the first time, may be stored in the second FIFO register of the two FIFO registers.

The initialization values 5970 stored in the second FIFO register of the two FIFO registers corresponding to the first branch of the inverse convolutional delay line at the first time and the initialization values 5920 used to initialize the FIFO register corresponding to the second branch constitute the output of the time deinterleaver at the second time, along with the third segment 6030 of the received data.

Consequently, the data of the physical-layer pipe PLP #0 is not output as the output of the time deinterleaver at the second time.

Figure 61:
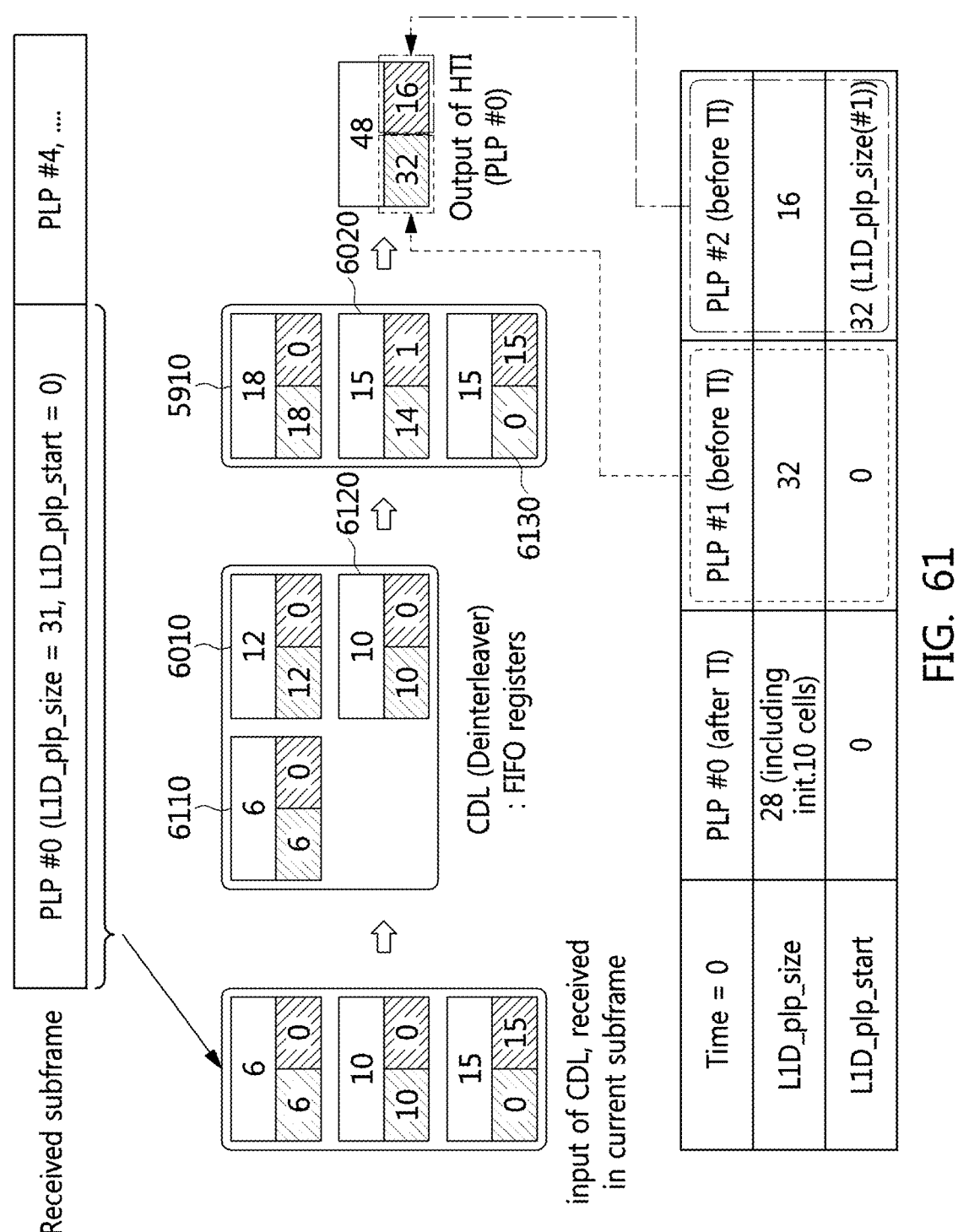
FIG. 61 is a view illustrating the third timing of an inverse convolutional delay line for performing time deinterleaving corresponding to the physical-layer pipes illustrated in FIGS. 53 to 55.

FIG. 61 is a view illustrating the third timing of the inverse convolutional delay line for performing time deinterleaving corresponding to the physical-layer pipes illustrated in FIGS. 53 to 55.

In the example illustrated in FIG. 61, information such as $N_{FEC\_TI}$=[1 2 3] is signaled for a core-layer physical-layer pipe PLP #0, whereby a receiver is made aware that the number of FEC blocks corresponding to the core-layer physical-layer pipe PLP #0 at the third time (Time=2) is 1 (the number of FEC blocks corresponding to the core-layer physical-layer pipe at the previous time was 2 and the number of FEC blocks corresponding to the core-layer physical-layer pipe two iterations previously was 3).

The output of the convolutional delay line illustrated in FIG. 58 may be received as the input of the inverse convolutional delay line, as illustrated on the left side of FIG. 61.

The received data is split into three segments, after which the first segment 6110 is stored in a first FIFO register of two FIFO registers corresponding to the first branch of the inverse convolutional delay line, the second segment 6120 is stored in a FIFO register corresponding to the second branch of the inverse convolutional delay line, and the third segment 6130 corresponds to the third branch of the inverse convolutional delay line and is output as the output of the time deinterleaver.

Here, because L1D_plp_size=31 and L1D_plp_start=0 are signaled for the core-layer physical-layer pipe PLP #0 based on information after time interleaving, 31 cells may be extracted from the received data and used as the input of the inverse convolutional delay line. Here, among the 31 cells, data cells corresponding to one FEC block may be written to the first branch, data cells corresponding to two FEC blocks may be written to the second branch, and data cells corresponding to three FEC blocks may be written to the third branch so as to correspond to $N_{FEC\_TI}$=[1 2 3].

Here, the first segment 6010 of the data received at the second time, which is stored in the first FIFO register of the two FIFO registers corresponding to the first branch at the second time, may be stored in the second FIFO register of the two FIFO registers.

The first segment 5910 of the data received at the first time, which is stored in the second FIFO register of the two FIFO registers corresponding to the first branch of the inverse convolutional delay line at the first time, and the second segment 6020 of the data received at the second time, which is stored in the FIFO register corresponding to the second branch, constitute the output of the time deinterleaver at the third time, along with the third segment 6130 of the data received at the third time.

Consequently, the 48 cells of the core-layer physical-layer pipe PLP #0, the 32 cells of the enhanced-layer physical-layer pipe PLP #1, and the 16 cells of the enhanced-layer physical-layer pipe PLP #2 are output as the output of the time deinterleaver at the third time.

That is, a complete time-interleaving block including three FEC blocks is output at the third time, and because each FEC block is formed of 16 data cells, it can be seen that 16×3=48 data cells of the core-layer physical-layer pipe are output at this time.

Here, because L1D_plp_size=32 and L1D_plp_start=0 are signaled for the enhanced-layer physical-layer pipe PLP #1 based on information after time interleaving, cells related to the enhanced-layer physical-layer pipe PLP #1 may be efficiently identified in the time-deinterleaved output.

Here, because L1D_plp_size=16 and L1D_plp_start=32 are signaled for the enhanced-layer physical-layer pipe PLP #2 based on information after time interleaving, cells related to the enhanced-layer physical-layer pipe PLP #2 may be efficiently identified in the time-deinterleaved output.

When LDM is used, the injection level of an enhanced-layer physical-layer pipe may be signaled using the L1D_plp_ldm_injection_level field in order to determine the power level of the enhanced-layer physical-layer pipe relative to core-layer physical-layer pipe(s) related thereto. Here, the injection level of the enhanced-layer physical-layer pipe(s) may change a value ranging from 0 dB to 25 dB so as to be lower than the power of the core-layer physical-layer pipe(s) related thereto.

Here, a lower injection level of the enhanced-layer physical-layer pipe indicates an increase in the transmission power of the enhanced-layer physical-layer pipe. Here, the enhanced-layer physical-layer pipe signal acts as additional noise that can affect the performance of the relevant core-layer physical-layer pipe(s).

Conversely, a higher injection level indicates that lower transmission power is assigned to the enhanced-layer physical-layer pipe, so the relevant core-layer physical-layer pipe(s) come(s) to have relatively high robustness.

Here, the total power after injection of the enhanced-layer physical-layer pipe may be normalized so as to be equal to the power of a single PLP configuration. Here, the required SNR of the core- and enhanced-layer physical-layer pipes after LDM combining may be set based not only on the injection level but also on the required SNR of the core- and enhanced-layer physical-layer pipes before LDM combining. Here, the required SNR may be the minimum value of the SNR that is required in order for the corresponding physical-layer pipe to be transmitted/received normally.

After LDM combining, the required SNR ($SNR_{CL\_AC}$) of the core-layer physical-layer pipe and the required SNR ($SNR_{EL\_AC}$) of the enhanced-layer physical-layer pipe may be set as shown in Equations (8) and (9) below:

$$SNR_{CL\_AC} = \tag{8}$$
$$SNR_{CL\_BC} + 10\log_{10}\left(1 + 10^{\frac{-IL}{10}}\right) - 10\log_{10}\left(1 - 10^{\frac{SNR_{CL\_BC}-IL}{10}}\right)$$

$$SNR_{EL\_AC} = SNR_{EL\_BC} + 10\log_{10}\left(1 + 10^{\frac{IL}{10}}\right) \tag{9}$$

Here, IL denotes the injection level in dB scale, $SNR_{CL\_BC}$ denotes the required SNR value in dB scale of the physical-layer pipe assigned to the core layer (required SNR before LDM combining), and $SNR_{EL\_BC}$ denotes the required SNR value in dB scale of the physical-layer pipe assigned to the enhanced layer (required SNR before LDM combining). When multiple enhanced-layer physical-layer pipes are associated with a single core-layer physical-layer pipe, it is necessary to use the same injection level for all of the multiple enhanced-layer physical-layer pipes. Accordingly, multiple required SNR values may not be present for the core-layer physical-layer pipe.

When the injection level of the enhanced-layer physical-layer pipe is set, it may be important to consider the required SNR of the core-layer physical-layer pipe(s) before LDM combining. Because the injected enhanced-layer physical-layer pipe acts as additional noise to the relevant core-layer physical-layer pipe(s), if the injection level is lower than the required SNR of the core-layer physical-layer pipe(s) before LDM combining, it may be impossible to decode the core-layer physical-layer pipe. Furthermore, if the injection level is slightly higher (e.g., 1 dB higher) than the required SNR of the core-layer physical-layer pipe(s) before LDM combining, it may still affect the SNR performance of the core-layer physical-layer pipe(s) after LDM combining. Therefore, in order to provide a sufficient margin between the injection level and the threshold of the required SNR of the core-layer physical-layer pipe(s), the injection level IL of the enhanced-layer physical-layer pipe(s) may be selected according to Equation (10) below:

$$IL \geq SNR_{CL\_BC} + 3 \tag{10}$$

Here, when multiple core-layer physical-layer pipes are associated with a single enhanced-layer physical-layer pipe, the least robust core-layer physical-layer pipe may be used to select the status of the injection level.

Depending on the injection levels of the enhanced layer, special attention may be required in order to select a combination of modulation and a code rate (ModCod) of the core layer. Here, it may be desirable for the core-layer physical-layer pipe to be configured with one of QPSK, 16 QAM, and 64 QAM constellation. When 64 QAM is used for the core-layer physical-layer pipe, it may be desirable to use a maximum of 7/15 as the code rate in order to prevent excessively high operation SNRs in the core layer.

When a single complete delivered product is formed using multiple physical-layer pipes and transmitted, these physical-layer pipes need to be simultaneously restored in an ATSC 3.0 receiver, and thus the maximum number of physical-layer pipes required to form the single complete delivered product may be limited to four while satisfying the condition of the maximum TI memory size of the receiver (that is, 219 cells).

According to the service intended to be provided by broadcasters, a single complete delivered product carried by multiple physical-layer pipes may include multiple different data streams, such as signaling, multiple audio streams, video, enhanced video, and application data. When such multiple data streams, which need to be simultaneously restored in receivers as the complete delivered product, are carried by multiple physical-layer pipes, it is necessary to take care of them. In principle, when broadcasters intend different robustness levels and different coverage areas, additional physical-layer pipe(s) is (are) required. If it is necessary for the multiple data streams to have the same robustness level and the same coverage area (e.g., multiple audio streams in multiple languages), it is desirable for these data streams to be carried by the same physical-layer pipe. Here, as long as the same robustness is intended for these multiple data streams, it may be advantageous to multiplex these multiple data streams before configuring a physical layer due to statistical multiplexing gain. Therefore, when all of the components of the delivered product are carried by multiple physical-layer pipes, the maximum number of physical-layer pipes for the product is limited to four at the transmitter, and these four physical-layer pipes may use the full TI memory size (219 cells) in order to maximize the time diversity of the individual physical-layer pipes. Even when a 4-PLP subset within the complete delivered product having more than four physical-layer pipes satisfies the TI memory requirement at a receiver, it is undesirable for all of the components of the delivered product to be carried by more than four physical-layer pipes at the transmitter.

IP-level signaling information, such as Low-Level Signaling (LLS), including a Service List Table (SLT) and Service-Layer Signaling (SLS), and a Link-Mapping Table (LMT), may be configured in a separate physical-layer pipe in order to provide a different level of robustness for the signaling information. In this case, the IP-level signaling information may be present in the most robust physical-layer pipe, among the multiple physical-layer pipes for transmitting a single complete delivered product. When LDM is used, the IP-level signaling information may be present in the most robust core-layer physical-layer pipe, among the multiple physical-layer pipes transmitting a single delivered product.

A single delivered product capable of being formed of one or more physical-layer pipes may include appropriate IP-level signaling information, including LLS and LMT. Here, the requirement for transmission of LLS and LMT may be repeated at least every five seconds. For fast service acquisition, LLS and LMT may be transmitted in every physical-layer frame. This may be achieved by setting L1B_lls_flag=1 (for LLS carried in the current frame) and L1D_plp_lls_flag=1 (for LLS carried in the corresponding PLP) in every frame.

When a single complete delivered product is carried by multiple physical-layer pipes, multiple subframes may be used. One example of such a service scenario is a robust audio service transmitted in an 8K or 16K FFT subframe and a video service transmitted in a 32K FFT subframe. Accordingly, ATSC 3.0 receivers are able to simultaneously restore multiple subframes carrying the single complete delivered product. Because a CTI mode is used when a single complete delivered product is formed of only a single core physical-layer pipe having a constant cell rate, the CTI mode may not be allowed in this case.

When LDM is used, multiple physical-layer pipes that are layered-division-multiplexed may share common subframe parameters, such as an FFT size, a pilot pattern, and a guard interval. Accordingly, it is desirable that a single complete delivered product be prevented from being transmitted in multiple subframes configured using LDM such that receivers do not have to simultaneously restore the multiple subframes configured using LDM.

Layered-Division Multiplexing (LDM) may be combined with TDM and/or FDM configurations in order to configure multiple physical-layer pipes within a single subframe. When LDM is configured with two or more physical-layer pipes, it may be configured as one of configurations such as Layered Time-Division Multiplexing (LTDM), Time Layered-Division Multiplexing (TLDM), Layered Frequency-Division Multiplexing (LFDM), and Frequency Layered-Division Multiplexing (FLDM).

Here, LTDM may be understood as time division after layered division, TLDM may be understood as layered division after time division, LFDM may be understood as frequency division after layered division, and FLDM may be understood as layered division after frequency division.

For implementation with low complexity and use of less memory, a time interleaver block including memory may be shared by all of core and enhanced physical-layer pipes.

Here, FLDM or LFDM configurations may be regarded as a special case in which dispersed core-layer physical-layer pipes of TLDM or LTDM are sub-sliced. Hereinafter, an example in which a maximum of four physical-layer pipes are used to form a single complete delivered product for simultaneous restoration at a receiver will be described.

L1D_plp_start and L1D_plp_size are signaling fields for determining the position and placement of each physical-layer pipe within a subframe. Regardless of whether LDM is used, these signaling fields of core-layer physical-layer pipe(s) may be defined based on information after time interleaving (CTI or HTI) and framing. However, when LDM is used, because LDM combining is performed after constellation mapping and before time interleaving, L1D_plp_start and L1D_plp_size of enhanced physical-layer pipe(s) may be defined based on information before time interleaving.

Figure 62:
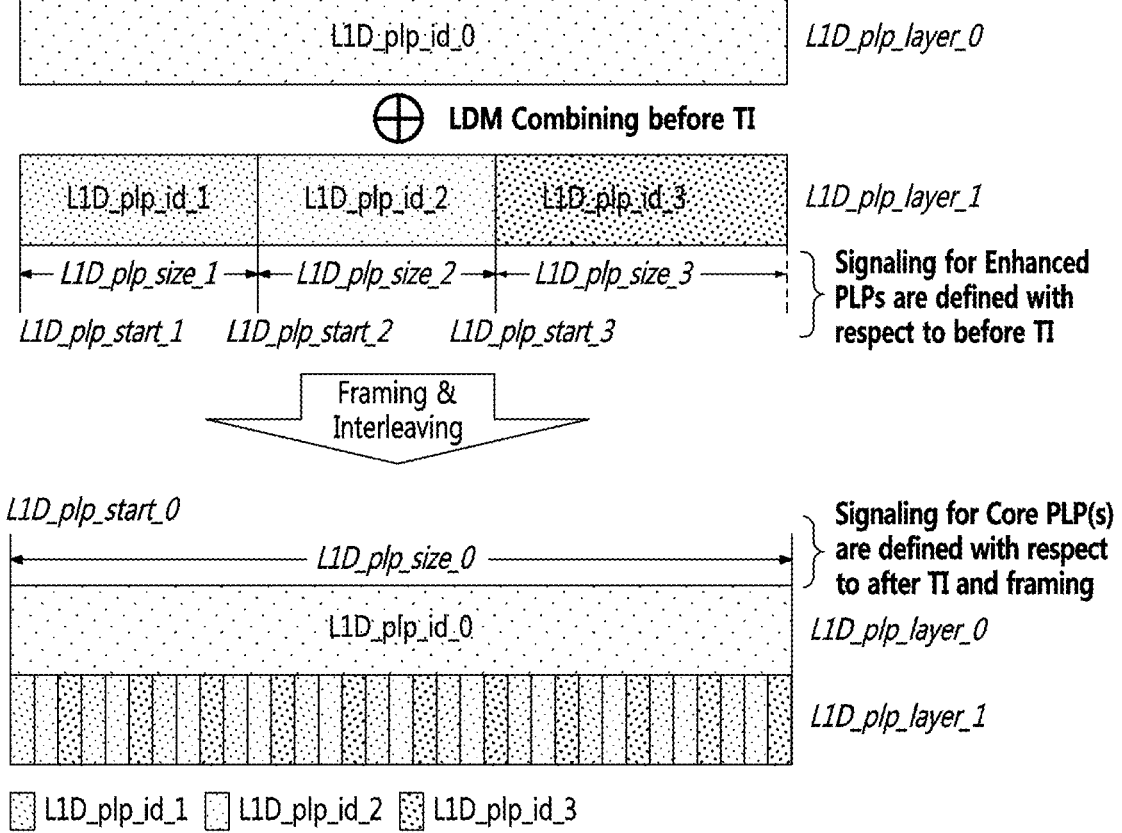
FIG. 62 is a view illustrating signaling definitions of L1D_plp_start and L1D_plp_size.

FIG. 62 is a view illustrating signaling definitions of L1D_plp_start and L1D_plp_size.

Referring to FIG. 62, cells indicated by the signaling fields of enhanced physical-layer pipes are spread over a subframe after time interleaving, and it can be seen that it is difficult to create meaningful information based on these cells at a framing stage.

At a receiver, enhanced physical-layer pipes that are decoded after time deinterleaving and cancellation of a core-layer physical-layer pipe may be restored based on corresponding L1D_plp_start and L1D_plp_size of the enhanced physical-layer pipes in L1-Detail.

When LDM is configured with multiple core physical-layer pipes, each of the core-layer physical-layer pipes represents a time-interleaving group (TI group).

Figure 63:
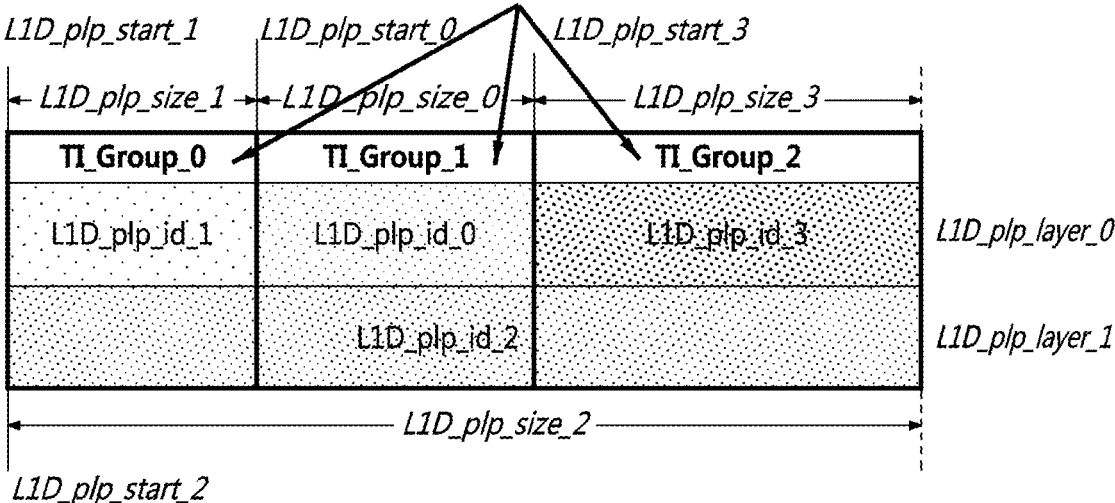
FIG. 63 is a view illustrating assignment of a time-interleaving group for multiple core physical-layer pipes.

FIG. 63 is a view illustrating assignment of a time-interleaving group for multiple core physical-layer pipes.

Referring to FIG. 63, it can be seen that each of three core-layer physical-layer pipes represents one time-interleaving group.

The time-interleaving groups may be implicitly indexed in ascending order according to the order in which the core-layer physical-layer pipes corresponding thereto appear in L1-Detail control signaling. In order to efficiently use the memory of a receiver, core-layer physical-layer pipes of each subframe may be arranged in ascending order within the subframe. That is, L1D_plp_start of the first core-layer physical-layer pipe indexed as TI_Group_0 in L1-Detail control signaling of the subframe may have the lowest cell index, among the L1D_plp_start values of all of the core-layer physical-layer pipes within the subframe. Also, L1D_plp_start of the second core-layer physical-layer pipe indexed as TI_Group_1 in the L1-Detail control signaling of the subframe may be greater than that of the first core-layer physical-layer pipe (TI_Group_0) and less than that of the third core-layer physical-layer pipe (TI_Group_2). Here, because L1D_plp_id of each of the physical-layer pipes is independent of TI_Group values, L1D_plp_id values do not have to be arranged in ascending order in L1-Detail control signaling, as shown in FIG. 63.

Figure 64:
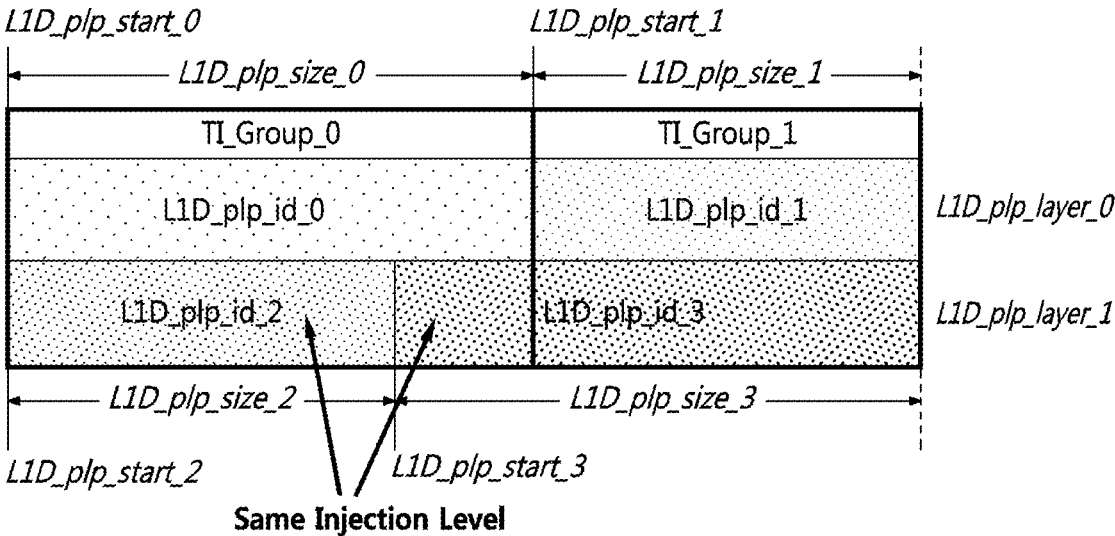
FIG. 64 is a view illustrating two enhanced-layer physical-layer pipes injected into a single core-layer physical-layer pipe.

FIG. 64 is a view illustrating two enhanced-layer physical-layer pipes injected into a single core-layer physical-layer pipe.

Referring to FIG. 64, it can be seen that, when multiple enhanced-layer physical-layer pipes are associated with a single core physical-layer pipe (e.g., L1D_plp_id_0), all of these enhanced-layer physical-layer pipes have the same LDM injection level signaled using L1D_plp_ldm_injection_level. If these enhanced-layer physical-layer pipes have different injection levels, portions of the core-layer physical-layer pipe (e.g., L1D_plp_id_0) associated with the two enhanced-layer physical-layer pipes have different degrees of robustness, which results in provision of different coverage areas for the same content.

When enhanced-layer physical-layer pipe(s) is (are) positioned in a single subframe and associated with core-layer physical-layer pipe(s) therein, L1D_plp_start and L1D_plp_size of the enhanced-layer physical-layer pipe(s) may be carefully set such that the cells of the enhanced-layer physical-layer pipe(s) are continuously associated with the cells of the core-layer physical-layer pipe(s).

Figure 65:
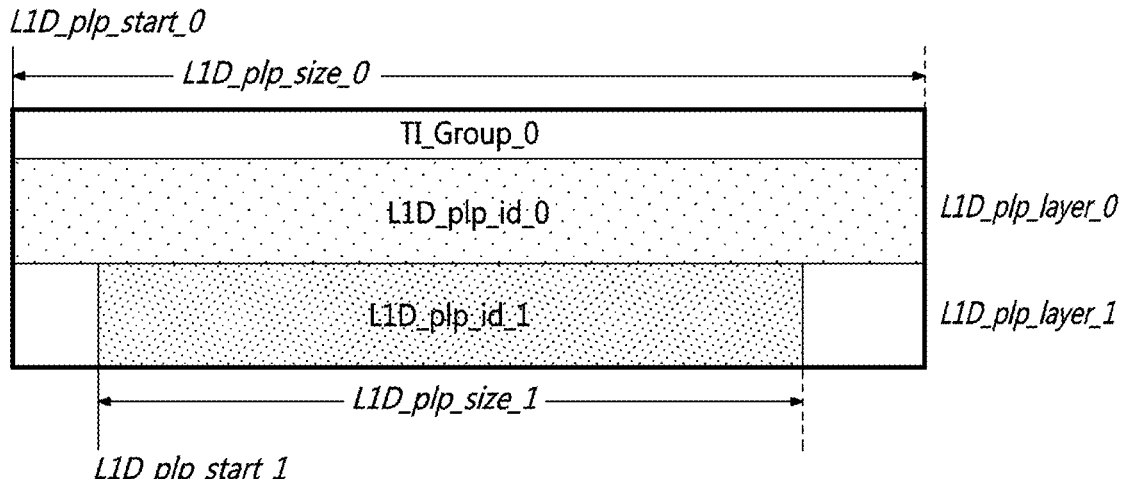
FIG. 65 is a view illustrating an example of an undesirable LDM configuration.

FIG. 65 is a view illustrating an example of an undesirable LDM configuration.

Referring to FIG. 65, it can be seen that L1D_plp_start of an enhanced physical-layer pipe (L1D_plp_id_1) is not the same as that of a core-layer physical-layer pipe (L1D_plp_id_0). Here, portions of the core-layer physical-layer pipe have different degrees of robustness, and this configuration may be undesirable. Further, L1D_plp_size of the enhanced-layer physical-layer pipe may not be allowed to be greater or less than that of the core layer. When an HTI mode (hybrid time-interleaving mode) is used, all of the physical-layer pipes configuring the HTI mode may use an integer number of FEC blocks. In this case, the number of actual data cells of the enhanced layer may be set less than or equal to the number of actual data cells of the core layer, and enhanced-layer dummy modulation values may be used if necessary.

Figure 66:
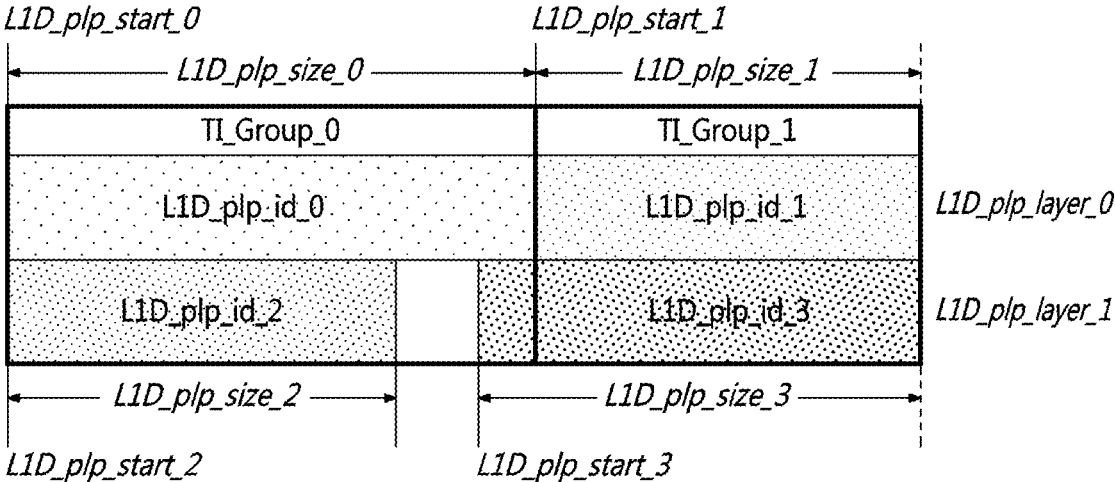
FIG. 66 is a view illustrating another example of an undesirable LDM configuration.

FIG. 66 is a view illustrating another example of an undesirable LDM configuration.

Referring to FIG. 66, it can be seen that there is a period during which nothing is layered-division-multiplexed with a core-layer physical-layer pipe (L1D_plp_id_0).

When multiple physical-layer pipes are configured in an enhanced layer, L1D_plp_start (L1D_plp_start_3) of an enhanced-layer physical-layer pipe within a single subframe may be set so as to correspond to the cell immediately following the preceding enhanced physical-layer pipe (L1D_plp_id_2) in order to prevent gaps between the enhanced-layer physical-layer pipes.

A CTI mode (convolutional time-interleaving mode) may be used when a single complete delivered product is formed of a single core physical-layer pipe having a constant cell rate. For example, the case in which a single core-layer physical-layer pipe and a single enhanced-layer physical-layer pipe have a constant cell rate and the same L1D_plp_start and L1D_plp_size may be a representative example of a CTI mode. When a CTI mode is used, each subframe does not have to be formed of an integer number of FEC blocks, and thus it is desirable that the data cells of all of the core layer and enhanced layer are completely filled in a single subframe.

Figure 67:
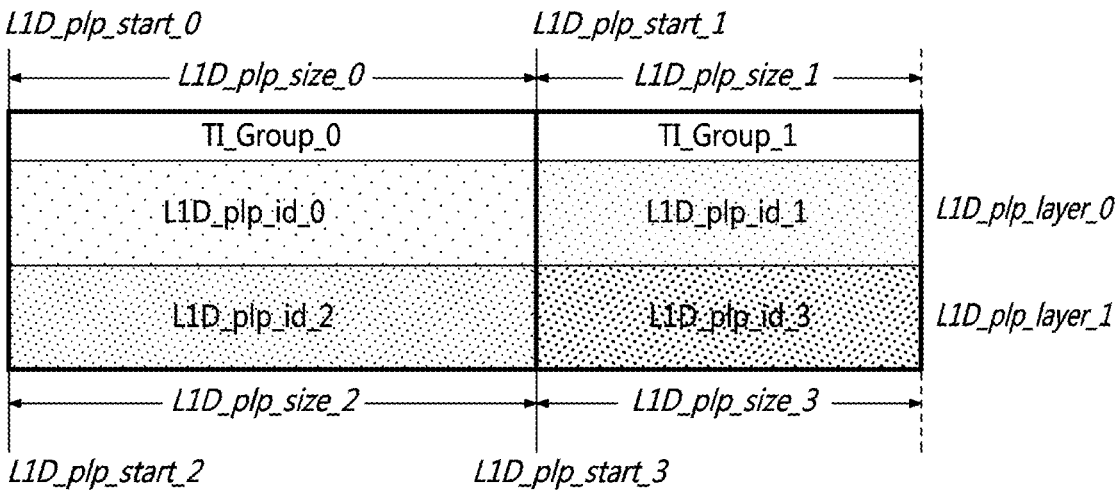
FIG. 67 is a view illustrating an example of an LDM configuration allowed in a CTI mode.

FIG. 67 is a view illustrating an example of an LDM configuration allowed in a CTI mode.

Referring to FIG. 67, when a subframe is formed of multiple core-layer physical-layer pipes (that is, multiple time-interleaving groups) representing different delivered products, each of the physical-layer pipes within the subframe should have a constant cell rate in order to configure a CTI mode. Furthermore, none of the enhanced-layer physical-layer pipes associated with the core-layer physical-layer pipes are allowed to be spread over the multiple time-interleaving groups. In the CTI mode, one incomplete FEC block of the last part of the core-layer physical-layer pipe is time-interleaved, and has to be buffered until the subsequent subframe is decoded at a receiver. In this case, the FEC block of the enhanced-layer physical-layer pipe associated with the incomplete FEC block of the core-layer physical-layer pipe also has to be buffered until the subsequent subframe. This means that, when one enhanced-layer physical-layer pipe is spread over multiple time-interleaving groups, any subsequent FEC blocks of the enhanced-layer physical-layer pipe associated with the subsequent time-interleaving group also have to be buffered, and a large amount of receiver memory may be consumed. For this reason, the LDM configurations illustrated in FIG. 63 and FIG. 64 in which one enhanced-layer physical-layer pipe is spread over multiple TI groups may not be allowed in the CTI mode. When the LDM configuration illustrated in FIG. 67 is used, building a single complete delivered product formed of physical-layer pipes included in different time-interleaving groups may not be allowed in the CTI mode. When a CTI mode is used, a single complete delivered product has to be formed of core and enhanced physical-layer pipes in the same time-interleaving group.

Figure 68:
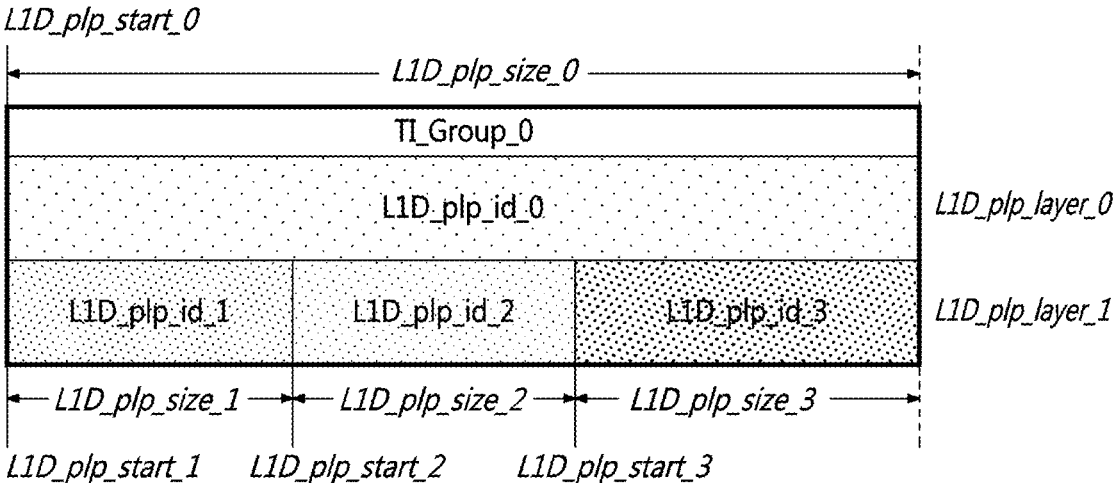
FIG. 68 is a view illustrating another example of an LDM configuration allowed in a CTI mode.

FIG. 68 is a view illustrating another example of an LDM configuration allowed in a CTI mode.

Referring to FIG. 68, a single core-layer physical-layer pipe associated with multiple enhanced-layer physical-layer pipes may be configured with a single CTI. When this configuration is used, each of the enhanced-layer physical-layer pipes associated with the single core-layer physical-layer pipe may have a constant cell rate. This means that L1D_plp_start and L1D_plp_size of each enhanced physical-layer pipe are maintained constant from one subframe to a subframe subsequent thereto, and thus a receiver may not be required to track these signaling values of the previous subframes.

When an HTI mode (hybrid time-interleaving mode) is used, because each of core- and enhanced-layer physical-layer pipes is formed of an integer number of FEC blocks, an enhanced-layer physical-layer pipe spreading over multiple time-interleaving groups may be implemented without the burden of providing additional memory in a receiver.

Figure 69:
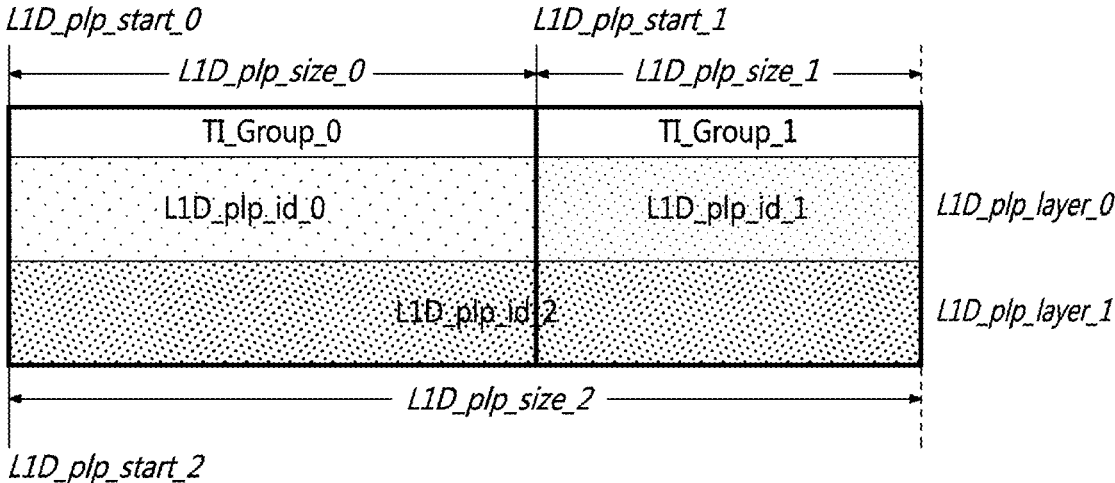
FIG. 69 is a view illustrating an example of an LDM configuration allowed in an HTI mode.

FIG. 69 is a view illustrating an example of an LDM configuration allowed in an HTI mode.

Referring to FIG. 69, it can be seen that two core-layer physical-layer pipes are associated with a single enhanced-layer physical-layer pipe in an HTI mode. The 4-PLP configurations illustrated in FIG. 63 and FIG. 64 in which a single enhanced-layer physical-layer pipe is spread over multiple time-interleaving groups may be allowed in the HTI mode. Here, different time-interleaving groups associated with the same enhanced physical-layer pipe may be disallowed from using different time-interleaving modes. When the HTI mode is used in the state in which a single enhanced-layer physical-layer pipe is spread over multiple time-interleaving groups, the use of a convolutional delay line (CDL) may not be allowed. If a convolutional delay line is used, the two core-layer physical-layer pipes may use different interleaving depths over multiple subframes, and portions of the single enhanced-layer physical-layer pipe associated with the two core-layer physical-layer pipes may have different decoding times, so a large amount of memory may be required by receivers.

Because the HTI mode requires an integer number of FEC blocks for each physical-layer pipe, the total number of cells of core-layer physical-layer pipe(s) may be different from that of enhanced physical-layer pipe(s) depending on a selection of a combination of modulation and a code rate (ModCod) for each physical-layer pipe. In this case, enhanced-layer dummy modulation values are used, whereby the core layer and the enhanced layer may have the same number of cells. Here, the enhanced-layer dummy modulation values may be inserted after the last enhanced physical-layer pipe of a PLP group. Furthermore, these dummy modulation values may have the same constellation mapping and the same injection level as the immediately preceding enhanced-layer physical-layer pipe such that the core-layer physical-layer pipe associated with the preceding enhanced-layer physical-layer pipe and the dummy modulation values has uniform robustness.

When a single enhanced-layer physical-layer pipe is spread over multiple time-interleaving groups (HTI-based LTDM or LFDM configurations), an extra frame buffer may be required when the time-interleaving depths of core-layer physical-layer pipes included in the multiple time-interleaving groups substantially differ from each other. For example, if the time-interleaving depth of the first core-layer physical-layer pipe is greater than that of the second core-layer physical-layer pipe, a portion of the enhanced-layer physical-layer pipe associated with the second core-layer physical-layer pipe has to be buffered due to the greater time-interleaving depth of the first core-layer physical-layer pipe. Here, in order to buffer the portion of the enhanced-layer physical-layer pipe, an extra frame buffer (e.g., DRAM) may be used, rather than consuming time-interleaving memory (e.g., SRAM). In order to avoid the use of an extra frame buffer for the enhanced-layer physical-layer pipe, the multiple core-layer physical-layer pipes associated with the single enhanced-layer physical-layer pipe may use the same time-interleaving depth or similar time-interleaving depths. This may be achieved when the numbers of FEC blocks for respective time-interleaving blocks are the same or similar for the multiple core-layer physical-layer pipes associated with the single enhanced-layer physical-layer pipe.

Figure 70:
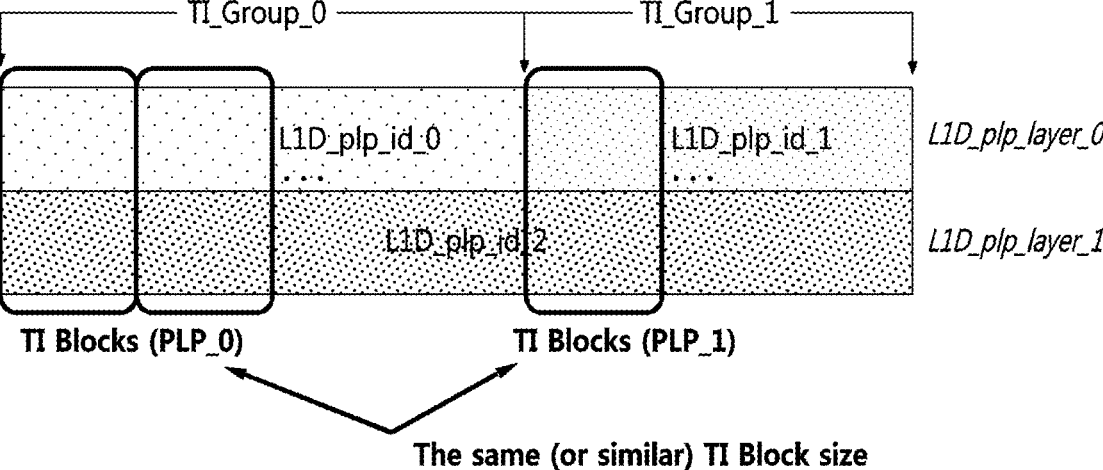
FIG. 70 is a view illustrating an example of the use of time-interleaving blocks for LTDM or LFDM configurations based on HTI.

FIG. 70 is a view illustrating an example of the use of time-interleaving blocks for LTDM or LFDM configurations based on HTI.

Referring to FIG. 70, it can be seen that multiple core-layer physical-layer pipes associated with a single enhanced-layer physical-layer pipe use the same time-interleaving block size or similar time-interleaving block sizes (having a difference therebetween less than a preset threshold value).

Using the same or similar time-interleaving block sizes may be intended to avoid the use of an extra frame buffer and to provide the same performance for the single enhanced physical-layer pipe.

A mode in which no time interleaving is performed (no TI mode) may be used regardless of whether LDM is used. When a mode in which no time interleaving is performed is used and when a single enhanced-layer physical-layer pipe is spread over multiple time-interleaving groups, core-layer physical-layer pipes associated with the single enhanced-layer physical-layer pipe may be required to have an integer number of FEC blocks.

FDM is realized by cell multiplexing, and may be combined with LDM, like FLDM or LFDM configurations. Here, cell multiplexing controlled based on physical-layer pipe type information (L1D_plp_type), physical-layer pipe subslice interval information (L1D_plp_subslice_interval), and information about the number of physical-layer pipe subslices (L1D_plp_num_subslices) may be applied only with respect to the core-layer physical-layer pipe(s). Here, the physical-layer pipe type information (L1D_plp_type), the physical-layer pipe subslice interval information (L1D_plp_subslice_interval), and the information about the number of physical-layer pipe subslices (L1D_plp_num_subslices) are all signaled only in the core-layer physical-layer pipe, and may not be signaled in the enhanced-layer physical-layer pipe.

The physical-layer pipe type information (L1D_plp_type) may be used to identify any one of a first type corresponding to a non-dispersed physical-layer pipe and a second type corresponding to a dispersed physical-layer pipe.

The physical-layer pipe subslice interval information (L1D_plp_subslice_interval) may be signaled only when L1D_plp_type is 1 (a dispersed physical-layer pipe), and may be set to be the same as the number of sequentially indexed data cells measured from the start of a subslice for a physical-layer pipe to the start of the subsequent subslice for the same physical-layer pipe.

For example, if L1D_plp_start=100 and L1D_plp_subslice_interval=250 are satisfied, the first data cell of the first subslice of the current PLP is located at an index of 100, and the first data cell of the second subslice of the current PLP is located at an index of 250 (100+250=250).

The information about the number of physical-layer pipe subslices (L1D_plp_num_subslices) may be signaled only when L1D_plp_type is 1 (a dispersed physical-layer pipe), and may be set to one less than the actual number of subslices used for the current PLP within the current subframe.

Figure 71:
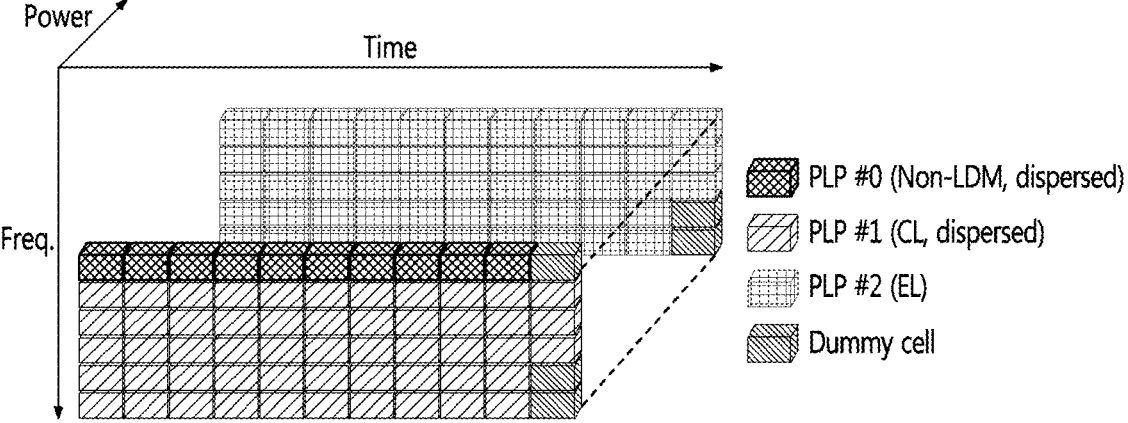
FIG. 71 is a view illustrating an example of an FLDM configuration.

FIG. 71 is a view illustrating an example of an FLDM configuration.

Referring to FIG. 71, the FLDM configuration may be relatively simple because core and enhanced physical-layer pipes corresponding to FDM cells have the same number of cells. When cell multiplexing for FDM is applied, the defined subslice interval (L1D_plp_subslice_interval) may not be an integer multiple of the total number of data cells, so dummy modulation values may be required. Here, cell multiplexing of FDM may not be applied to the data part of a preamble and SBS.

Another type of combination of LDM and FDM is an LFDM configuration.

Figure 72:
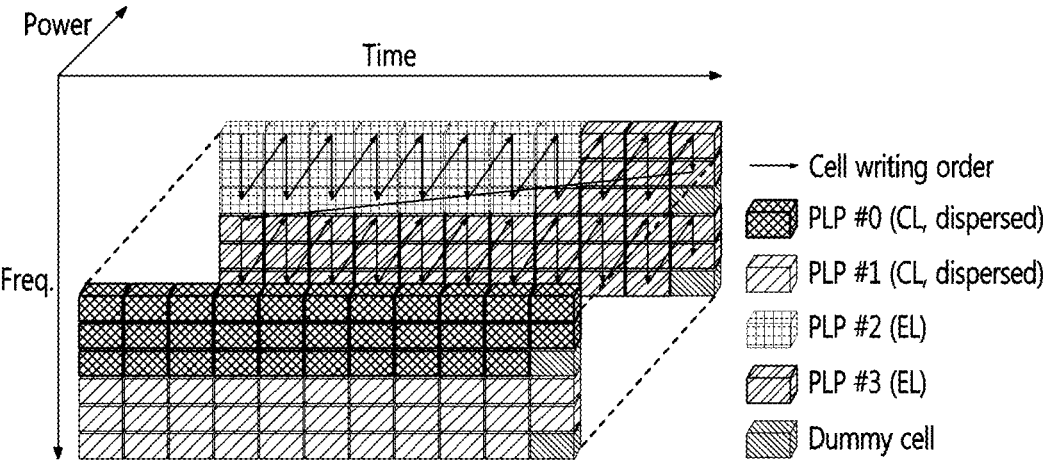
FIG. 72 is a view illustrating an example of an LFDM configuration.

FIG. 72 is a view illustrating an example of an LFDM configuration.

Referring to FIG. 72, it can be seen that, because sub-slicing parameters are applied only to core-layer physical-layer pipes, the cell-writing order of associated enhanced-layer physical-layer pipes follows the cell-writing order of the core-layer physical-layer pipes. When cell multiplexing for FDM requires a physical-layer pipe to span the whole subframe duration, the enhanced-layer physical-layer pipe (s) following the cell-writing order of the core-layer physi-cal-layer pipe(s) have to be reordered, so receivers may be required to buffer the enhanced-layer physical-layer pipe(s) for the whole subframe duration. Here, in order to buffer the enhanced-layer physical-layer pipe(s), an extra frame buffer (e.g., DRAM) may be used, rather than consuming TI memory (e.g., SRAM). Due to the necessity for such extra frame memory, the number of cells of the enhanced physi-cal-layer pipe(s) buffered in the frame memory may be equal to or less than 220 when the LFDM configuration is used. That is, in the example illustrated in FIG. 72, the sum of L1D_plp_size of PLP #0 and that of PLP #1 of the core layer (which is equal to the sum of L1D_plp_size of PLP #2 and that of PLP #3 of the enhanced layer) may not be allowed to exceed 220 cells due to the limitation of the frame buffer in receivers.

In the example illustrated in FIG. 72, the enhanced-layer physical-layer pipe PLP #3 is spread over multiple TI groups, so a CTI mode may not be allowed.

The demand for convergence of broadcast systems and communication systems is rapidly increasing. That is, in order to reconcile broadcast (a broadcast system), such as ATSC 3.0, with mobile broadband (a communication sys-tem), such as 4G, 5G or beyond 5G, it is necessary to flexibly define system bandwidth in a broadcast standard such as ATSC 3.0.

The current ATSC 3.0 standard defines 6 MHz, 7 MHz and 8 MHz bandwidths, but these differ from 5 MHz, 10 MHz, 15 MHz, 20 MHz, and the like defined in communi-cation standards such as 4G, 5G, and the like. For example, the LTE standard defines channel bandwidths of 1.4 MHz, 3 MHz, 5 MHz, 10 MHz, 15 MHz, and 20 MHz, and the 5G standard (5G Below-6 GHz) specifies 5 MHz, 10 MHz, 15 MHz, 20 MHz, 25 MHz, 30 MHz, 40 MHz, 50 MHz, 60 MHz, 80 MHz, 90 MHz, and 100 MHz.

It is inefficient for a broadcast network and a communi-cation network operating in conjunction with each other to use different frequency bands. For example, when an ATSC 3.0 broadcast network uses a 6 MHz bandwidth and when a 4/5G communication network uses a 5 MHz bandwidth in the same band, bandwidth inefficiency of 1 MHz occurs.

Figure 73:
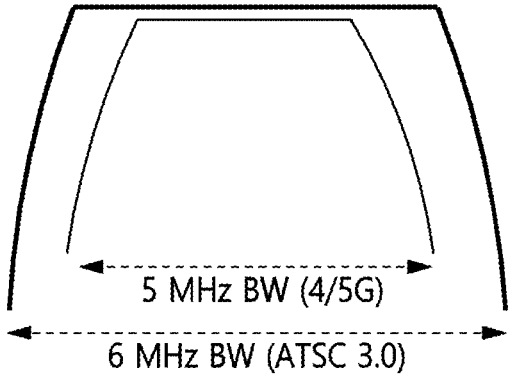
FIG. 73 is a view illustrating the case in which a communication network uses a 5 MHz frequency band and a broadcast network uses a 6 MHz frequency band.

FIG. 73 is a view illustrating the case in which a com-munication network uses a 5 MHz frequency band and a broadcast network uses a 6 MHz frequency band.

For example, when an ATSC 3.0 broadcast network uses an 8 MHz bandwidth and when a 4/5G communication network uses a 5 MHz bandwidth, bandwidth inefficiency of 3 MHz occurs.

For example, when an ATSC 3.0 broadcast network uses an 8 MHz bandwidth and when a 4/5G communication network uses a 10 MHz bandwidth, bandwidth inefficiency of 2 MHz occurs.

Therefore, in order to increase the efficiency of usage of a spectrum, the ATSC 3.0 broadcast network, which specifies a relatively narrow frequency bandwidth, needs to cover a frequency band used by the communication network by extending bandwidth options.

Figure 74:
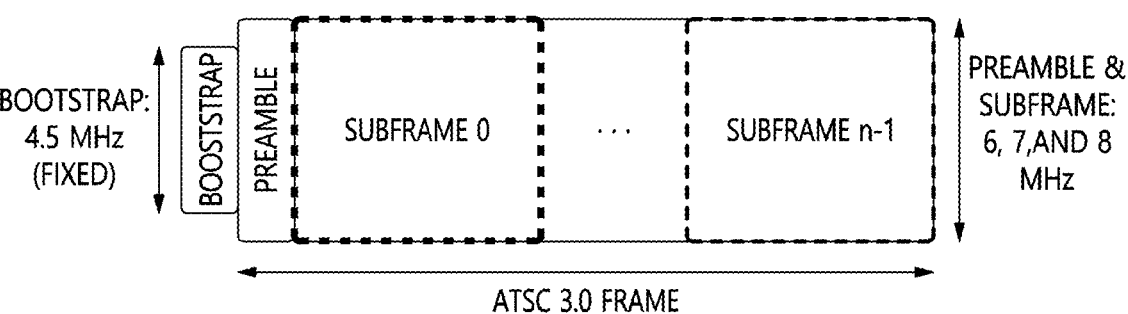
FIG. 74 is a view illustrating an example of a frequency band of a broadcast signal frame according to an embodiment of the present invention.

FIG. 74 is a view illustrating an example of a frequency band of a broadcast signal frame according to an embodiment of the present invention.

Referring to FIG. 74, it can be seen that the bootstrap of an ATSC 3.0 broadcast signal frame has a bandwidth fixed to 4.5 MHz.

The bootstrap is located at the beginning of each broadcast signal frame.

A preamble is located immediately following the bootstrap.

One or more subframes are located immediately following the preamble.

The preamble and the subframe(s), corresponding to a post-bootstrap, are not allowed to have a bandwidth less than 4.5 MHz. For example, the preamble and the subframe(s) may have a bandwidth of 6 MHz, 7 MHz or 8 MHz.

Therefore, it is desirable for the minimum bandwidth for an ATSC 3.0 broadcast signal frame to be set to 5 MHz. Furthermore, bandwidths of 10 MHz, 15 MHz, 20 MHz, 25 MHz, 30 MHz and the like, specified in a communication network such as 4/5G or the like, may be used in the broadcast network.

A system bandwidth field for signaling a system bandwidth in the ATSC 3.0 standard may be included in symbol 1 of the bootstrap (bootstrap_symbol_1( )). Here, the system bandwidth field may be system_bandwidth of 2 bits.

Here, system_bandwidth may be used to signal the system bandwidth for the post-bootstrap portion of the current physical layer frame.

For example, system_bandwidth=00 may indicate that the system bandwidth is 6 MHz, system_bandwidth=01 may indicate that the system bandwidth is 7 MHz, and system_bandwidth=10 may indicate that the system bandwidth is 8 MHz. Here, system_bandwidth=11 may indicate that the system bandwidth is greater than 8 MHz.

However, it is desirable to cover the case in which the system bandwidth is 5 MHz or the like in order to enable the broadcast system to cover the bandwidth of the communication system. Therefore, system_bandwidth=11 may indicate that a system bandwidth is less than 6 MHz or greater than 8 MHz, or may indicate a system bandwidth other than 6, 7 and 8 MHz.

In the ATSC 3.0 standard, a Baseband Sampling Rate (BSR) coefficient may be included in symbol 2 of the bootstrap (bootstrap_symbol_2 ( )). Here, the baseband sampling rate coefficient may be bsr_coefficient of 7 bits.

Here, bsr_coefficient may be used to signal a sample rate for the post_bootstrap of the current physical layer frame.

Here, various OFDM parameters, such as the elementary period of a broadcast system, the number of carriers (NoC), carrier spacing, and the like, may be set based on the sample rate.

For example, the sample rate may be set based on a sampling-rate-setting equation, such as (sample rate)=(N+

16)*0.384 MHz (N being a calculation variable that is an integer). Here, N may be the signaled bsr_coefficient in the range from 0 to 80. Here, the values from 81 to 127 may be reserved.

That is, the baseband sampling rate coefficient (bsr_coefficient) may correspond to the sample rate that is set based on the sampling-rate-setting equation defined using the calculation variable N, which is an integer, in at least one part (0~80) of the range (0~127) that is settable with assigned bits (e.g., 7 bits). Here, the baseband sampling rate coefficient (bsr_coefficient) may be equal to the calculation variable N in the at least one part (0~80) of the settable range (0~127).

However, when the broadcast system uses frequency bands of 5 MHz, 10 MHz, 20 MHz, and the like in order to cover the system bandwidth of the communication system, signaling of bsr_coefficient may become somewhat complicated. Particularly, the current ATSC 3.0 standard defines bsr_coefficient signaling only for 6 MHz, 7 MHz and 8 MHz, but a new bsr_coefficient signaling technique has to support bandwidths of 5 MHz, 10 MHz, 20 MHz, and the like while being compatible with the current version of the standard.

For example, the current ATSC 3.0 standard defines only the baseband sampling rate coefficients (bsr_coefficient) shown in Table 4 below, and these may be extended as shown in Table 5 below.

TABLE 4

| bsr_coefficient | Applicability |
|---|---|
| 2 | 6 MHz bandwidth |
| 5 | 7 MHz bandwidth |
| 8 | 8 MHz bandwidth |

TABLE 5

| bsr_coefficient | Applicability |
|---|---|
| 2 | 6 MHz bandwidth |
| 5 | 7 MHz bandwidth |
| 8 | 8 MHz bandwidth |
| 14 | 10 MHz bandwidth |
| 29 | 15 MHz bandwidth |
| 44 | 20 MHz bandwidth |
| 59 | 25 MHz bandwidth |
| 74 | 30 MHz bandwidth |

According to an embodiment, the sample rate may be set based on a sampling-rate-setting equation, such as (sample rate)=(N+16)*0.384 MHz (N being a calculation variable that is an integer). Here, N may be the signaled bsr_coefficient in the range from 0 to 104. Here, the values from 105 to 127 may be reserved. Here, bsr_coefficient may be extended as shown in Table 6 below.

TABLE 6

| bsr_coefficient | Applicability |
|---|---|
| 2 | 6 MHz bandwidth |
| 5 | 7 MHz bandwidth |
| 8 | 8 MHz bandwidth |
| 14 | 10 MHz bandwidth |
| 29 | 15 MHz bandwidth |
| 44 | 20 MHz bandwidth |
| 59 | 25 MHz bandwidth |

TABLE 6-continued

| bsr_coefficient | Applicability |
|---|---|
| 74 | 30 MHz bandwidth |
| 104 | 40 MHz bandwidth |

According to an embodiment, the baseband sampling rate coefficient (bsr_coefficient) may correspond to a sample rate that is set based on a sampling-rate-setting equation defined using a calculation variable, which is an integer, in at least one part (0~80 or 0~81) of the range (0~127) that is settable with assigned bits (e.g., 7 bits). Here, the baseband sampling rate coefficient (bsr_coefficient) may be equal to the calculation variable N in the at least one part (0~80) of the settable range (0~127). Here, in another part (81) of the settable range (0~127), the baseband sampling rate coefficient (bsr_coefficient) may be different from the calculation variable N. For example, the calculation variable N may be set to −1 for bsr_coefficient having a value of 81, and the values from 82 to 127 may be reserved. Here, bsr_coefficient may be extended as shown in Table 7 below.

TABLE 7

| bsr_coefficient | N | Applicability |
|---|---|---|
| 2 | 2 | 6 MHz bandwidth |
| 5 | 5 | 7 MHz bandwidth |
| 8 | 8 | 8 MHz bandwidth |
| 14 | 14 | 10 MHz bandwidth |
| 29 | 29 | 15 MHz bandwidth |
| 44 | 44 | 20 MHz bandwidth |
| 59 | 59 | 25 MHz bandwidth |
| 74 | 74 | 30 MHz bandwidth |
| 81 | −1 | 5 MHz bandwidth |

According to an embodiment, the baseband sampling rate coefficient (bsr_coefficient) may correspond to a sample rate that is set based on a sampling-rate-setting equation defined using a calculation variable, which is an integer, in at least one part (0~80 or 0~87) of the range (0~127) that is settable with assigned bits (e.g., 7 bits). Here, the baseband sampling rate coefficient (bsr_coefficient) may be equal to the calculation variable N in the at least one part (0~80) of the settable range. Here, in another part (81~87) of the settable range (0~127), the baseband sampling rate coefficient (bsr_coefficient) may be different from the calculation variable N. For example, the relationship between bsr_coefficient and the calculation variable N may be determined as shown in Table 8 below.

TABLE 8

| bsr_coefficient | calculation variable(N) |
|---|---|
| 0~80 | 0~80 |
| 81 | −1 |
| 82 | 104 |
| 83 | 134 |
| 84 | 164 |
| 85 | 224 |
| 86 | 254 |
| 87 | 284 |
| 88~127 | Reserved |

When the relationship between the baseband sampling rate coefficient (bsr_coefficient) and the calculation variable N is as shown in Table 8 above, bsr_coefficient may be extended as shown in Table 9 below.

TABLE 9

| bsr_coefficient | N | Applicability |
|---|---|---|
| 2 | 2 | 6 MHz bandwidth |
| 5 | 5 | 7 MHz bandwidth |
| 8 | 8 | 8 MHz bandwidth |
| 14 | 14 | 10 MHz bandwidth |
| 29 | 29 | 15 MHz bandwidth |
| 44 | 44 | 20 MHz bandwidth |
| 59 | 59 | 25 MHz bandwidth |
| 74 | 74 | 30 MHz bandwidth |
| 81 | −1 | 5 MHz bandwidth |
| 82 | 104 | 40 MHz bandwidth |
| 83 | 134 | 50 MHz bandwidth |
| 84 | 164 | 60 MHz bandwidth |
| 85 | 224 | 80 MHz bandwidth |
| 86 | 254 | 90 MHz bandwidth |
| 87 | 284 | 100 MHz bandwidth |

According to an embodiment, the baseband sampling rate coefficient (bsr_coefficient) may correspond to a sample rate that is set based on a sampling-rate-setting equation defined using a calculation variable, which is an integer, in at least one part (0~80 or 0~105) of the range (0~127) that is settable with assigned bits (e.g., 7 bits). Here, the baseband sampling rate coefficient (bsr_coefficient) may be equal to the calculation variable N in at least one part (0~104) of the settable range (0~127). Here, in another part (105) of the settable range (0~127), the baseband sampling rate coefficient (bsr_coefficient) may be different from the calculation variable N. For example, the calculation variable N may be set to −1 for bsr_coefficient having a value of 105, and the values from 106 to 127 may be reserved. Here, bsr_coefficient may be extended as shown in Table 10 below.

TABLE 10

| bsr_coefficient | N | Applicability |
|---|---|---|
| 2 | 2 | 6 MHz bandwidth |
| 5 | 5 | 7 MHz bandwidth |
| 8 | 8 | 8 MHz bandwidth |
| 14 | 14 | 10 MHz bandwidth |
| 29 | 29 | 15 MHz bandwidth |
| 44 | 44 | 20 MHz bandwidth |
| 59 | 59 | 25 MHz bandwidth |
| 74 | 74 | 30 MHz bandwidth |
| 104 | 104 | 40 MHz bandwidth |
| 105 | −1 | 5 MHz bandwidth |

According to an embodiment, the baseband sampling rate coefficient (bsr_coefficient) may correspond to a sample rate that is set based on a sampling-rate-setting equation defined using a calculation variable, which is an integer, in at least one part (0~104 or 0~110) of the range (0~127) that is settable with assigned bits (e.g., 7 bits). Here, the baseband sampling rate coefficient (bsr_coefficient) may be equal to the calculation variable N in the at least one part (0~104) of the settable range. Here, in another part (105~110) of the settable range (0~127), the baseband sampling rate coefficient (bsr_coefficient) may be different from the calculation variable N. For example, the relationship between bsr_coefficient and the calculation variable N may be determined as shown in Table 11 below.

TABLE 11

| bsr_coefficient | calculation variable(N) |
|---|---|
| 0~104 | 0~104 |
| 105 | −1 |

TABLE 11-continued

| bsr_coefficient | calculation variable(N) |
|---|---|
| 106 | 134 |
| 107 | 164 |
| 108 | 224 |
| 109 | 254 |
| 110 | 284 |
| 111~127 | Reserved |

When the relationship between the baseband sampling rate coefficient (bsr_coefficient) and the calculation variable N is as shown in Table 11 above, bsr_coefficient may be extended as shown in Table 12 below.

TABLE 12

| bsr_coefficient | N | Applicability |
|---|---|---|
| 2 | 2 | 6 MHz bandwidth |
| 5 | 5 | 7 MHz bandwidth |
| 8 | 8 | 8 MHz bandwidth |
| 14 | 14 | 10 MHz bandwidth |
| 29 | 29 | 15 MHz bandwidth |
| 44 | 44 | 20 MHz bandwidth |
| 59 | 59 | 25 MHz bandwidth |
| 74 | 74 | 30 MHz bandwidth |
| 104 | 104 | 40 MHz bandwidth |
| 105 | -1 | 5 MHz bandwidth |
| 106 | 134 | 50 MHz bandwidth |
| 107 | 164 | 60 MHz bandwidth |
| 108 | 224 | 80 MHz bandwidth |
| 109 | 254 | 90 MHz bandwidth |
| 110 | 284 | 100 MHz bandwidth |

The bootstrap for signaling the above-described system bandwidth field and baseband sampling rate coefficient may include symbol 1 (bootstrap_symbol_1( )), symbol 2 (bootstrap_symbol_2( )), and symbol 3 (bootstrap_symbol_3( )). The specific structure of the bootstrap including symbol 1 (bootstrap_symbol_1( )), symbol 2 (bootstrap_symbol_2( )), and symbol 3 (bootstrap_symbol_3( )) is published in detail in the ATSC 3.0 standard document A/321, System Discovery and Signaling.

In the ATSC 3.0 standard, the number of carriers (NoC) and occupied bandwidth depending on a reduced carrier coefficient $C_{red\_coeff}$ may be as shown in Table 13 below.

TABLE 13

| | Number of Carriers (NoC) | | | Occupied Bandwidth | | |
|---|---|---|---|---|---|---|
| $C_{red\_coeff}$ | 8K FFT | 16K FFT | 32K FFT | bsr_coefficient = 2 | bsr_coefficient = 2 | bsr_coefficient = 2 |
| 0 | 6913 | 13825 | 27649 | 5.832 | 6.804 | 7.777 |
| 1 | 6817 | 13633 | 27265 | 5.751 | 6.710 | 7.669 |
| 2 | 6721 | 13441 | 26881 | 5.670 | 6.615 | 7.561 |
| 3 | 6625 | 13249 | 26497 | 5.589 | 6.521 | 7.453 |
| 4 | 6529 | 13057 | 26113 | 5.508 | 6.426 | 7.345 |

Here, the number of carriers (NoC) may be calculated using Equation (11) below.

$$NoC = NoC_{max} - C_{red\_coeff} \times C_{unit} \qquad (11)$$

Here, the reduced carrier coefficient $C_{red\_coeff}$ may be an integer by which the value of a carrier control unit $C_{unit}$ is multiplied.

Here, the carrier control unit may be set to correspond to an FFT size. For example, it may be set to 96, 192, and 384 for 8K FFT, 16K FFT, and 32K FFT, respectively.

Here, the maximum number of carriers $NoC_{max}$ may be inferred using the number of carriers when the reduced carrier coefficient is 0 in Table 13 above. That is, the maximum number of carriers may be 6913 for an FFT having a size of 8K, 13825 for an FFT having a size of 16K, and 27649 for an FFT having a size of 32K.

Here, the reduced carrier coefficient may be an integer having a value from 0 to 4, and may be signaled using the L1B_preamble_reduced_carriers field, the L1B_first_sub_reduced_carriers field, and the L1D_reduced_carriers field of the preamble.

Here, the reduced carrier coefficient may be set based on the ratio of occupied bandwidth to system bandwidth (occupied bandwidth to channel width rate). Table 14 below shows the ratio of occupied bandwidth to system bandwidth depending on a reduced carrier coefficient when a system bandwidth is 6 MHz.

TABLE 14

| | Number of Carriers(NoC) | | | Occupied Bandwidth | Occupied Bandwidth/ |
|---|---|---|---|---|---|
| $C_{red\_coeff}$ | 8K FFT | 16K FFT | 32K FFT | (bsr_coefficient = 2) | Channel Width (6 MHz) |
| 0 | 6913 | 13825 | 27649 | 5.832 | 0.972 |
| 1 | 6817 | 13633 | 27265 | 5.751 | 0.9585 |
| 2 | 6721 | 13441 | 26881 | 5.670 | 0.945 |
| 3 | 6625 | 13249 | 26497 | 5.589 | 0.9315 |
| 4 | 6529 | 13057 | 26113 | 5.508 | 0.918 |

For example, the reduced carrier coefficient may be set such that the ratio of the occupied bandwidth to the system bandwidth (occupied bandwidth to channel width rate) is equal to or less than 0.972 and is equal to or greater than 0.918. That is, when the system bandwidth is 6 MHz, the reduced carrier coefficient may be set to 0, 1, 2, 3, or 4.

Also, the reduced carrier coefficient may be set such that the ratio of the occupied bandwidth to the system bandwidth (occupied bandwidth to channel width rate) is equal to or less than 0.98 and is equal to or greater than 0.91. However, the range for the ratio of the occupied bandwidth to the system bandwidth is not limited to the above-mentioned example, and may be variously set.

Table 15 below shows the ratio of occupied bandwidth to system bandwidth depending on a reduced carrier coefficient when the system bandwidth is 5 MHz.

TABLE 15

| $C_{red\_coeff}$ | Number of Carriers(NoC) | | | Occupied Bandwidth | Occupied Bandwidth/ |
| | 8K FFT | 16K FFT | 32K FFT | (bsr_coeffi-cient = 0) | Channel Width (5 MHz) |
| --- | --- | --- | --- | --- | --- |
| 0 | 6913 | 13825 | 27649 | 5.184 | 1.0368 |
| 1 | 6817 | 13633 | 27265 | 5.112 | 1.0224 |
| 2 | 6721 | 13441 | 26881 | 5.040 | 1.008 |
| 3 | 6625 | 13249 | 26497 | 4.968 | 0.9936 |
| 4 | 6529 | 13057 | 26113 | 4.896 | 0.9792 |

Here, when the reduced carrier coefficient is 0, 1, 2, and 3, the ratio of the occupied bandwidth to the system bandwidth has a value of 1.0368, 1.0224, 1.008, and 0.9936, respectively, so they are not accepted as valid options.

Therefore, in order to cover the case in which a system bandwidth is 5 MHz, the range of the reduced carrier coefficient may be extended as shown in Table 16 below. Here, a value of 7 may be reserved.

TABLE 16

| $C_{red\_coeff}$ | Number of Carriers (NoC) | | | Occupied Bandwidth | | |
| | 8K FFT | 16K FFT | 32K FFT | bsr_coefficient = 2 | bsr_coefficient = 2 | bsr_coefficient = 2 |
| --- | --- | --- | --- | --- | --- | --- |
| 0 | 6913 | 13825 | 27649 | 5.832 | 6.804 | 7.777 |
| 1 | 6817 | 13633 | 27265 | 5.751 | 6.710 | 7.669 |
| 2 | 6721 | 13441 | 26881 | 5.670 | 6.615 | 7.561 |
| 3 | 6625 | 13249 | 26497 | 5.589 | 6.521 | 7.453 |
| 4 | 6529 | 13057 | 26113 | 5.508 | 6.426 | 7.345 |
| 5 | 6433 | 12865 | 25729 | 5.427 | 6.331 | 7.236 |
| 6 | 6337 | 12673 | 25345 | 5.346 | 6.237 | 7.128 |
| 7 | | | | Reserved | | |

That is, 5 and 6 may be added as options in the L1D_reduced_carriers field of the preamble as shown in Table 16 above.

Table 17 below shows the ratio of occupied bandwidth to system bandwidth depending on the extended reduced carrier coefficient when the system bandwidth is 5 MHz.

TABLE 17

| $C_{red\_coeff}$ | Number of Carriers(NoC) | | | Occupied Bandwidth | Occupied Bandwidth/ |
| | 8K FFT | 16K FFT | 32K FFT | (bsr_coeffi-cient = 0) | Channel Width (5 MHz) |
| --- | --- | --- | --- | --- | --- |
| 0 | 6913 | 13825 | 27649 | 5.184 | 1.0368 |
| 1 | 6817 | 13633 | 27265 | 5.112 | 1.0224 |
| 2 | 6721 | 13441 | 26881 | 5.040 | 1.008 |
| 3 | 6625 | 13249 | 26497 | 4.968 | 0.9936 |
| 4 | 6529 | 13057 | 26113 | 4.896 | 0.9792 |
| 5 | 6433 | 12865 | 25729 | 4.824 | 0.9648 |
| 6 | 6337 | 12673 | 25345 | 4.752 | 0.9504 |
| 7 | | | | Reserved | |

Referring to Table 17, when the reduced carrier coefficient is 4, 5, and 6, the ratio of the occupied bandwidth to the system bandwidth has a value of 0.9792, 0.9648, and 0.9054, respectively, so they may be set as valid options.

Here, the bsr_coefficient field and the system_bandwidth field may be set to 0 and 00, respectively, for the case in which the system bandwidth is 5 MHz. Also, the bsr_coefficient field and the system_bandwidth field may be signaled through the bootstrap.

Figure 75:
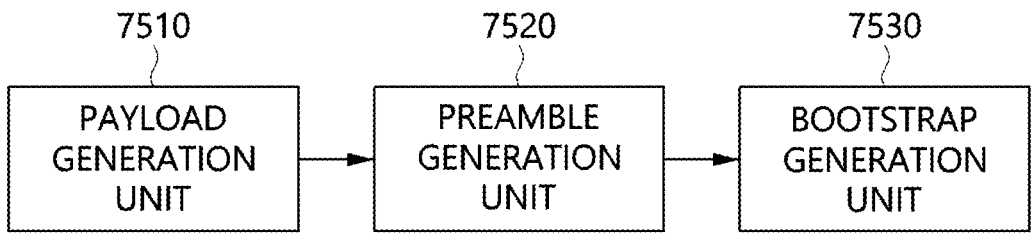
FIG. 75 is a block diagram illustrating an apparatus for transmitting a broadcast signal according to an embodiment of the present invention.

FIG. 75 is a block diagram illustrating an apparatus for transmitting a broadcast signal according to an embodiment of the present invention.

Referring to FIG. 75, the apparatus for transmitting a broadcast signal according to an embodiment of the present invention includes a bootstrap generation unit 7530, a preamble generation unit 7520, and a payload generation unit 7510.

The bootstrap generation unit 7530 generates a bootstrap that signals a system bandwidth field (system_bandwidth), corresponding to a system bandwidth for a post-bootstrap, and a baseband sampling rate coefficient (bsr_coefficient).

The preamble generation unit 7520 generates a preamble located immediately following the bootstrap in a broadcast signal frame.

The payload generation unit 7510 generates one or more subframes located immediately following the preamble in the broadcast signal frame.

Here, the preamble may include L1 signaling data, and the L1 signaling data may include a reduced carrier coefficient.

Here, the preamble generation unit 7520 may set the reduced carrier coefficient based on the ratio of occupied bandwidth to system bandwidth (occupied bandwidth to channel width rate).

Here, the reduced carrier coefficient may include 5 and 6 for the case in which the system bandwidth is 5 MHz.

Here, the reduced carrier coefficient may include an integer that is equal to or greater than 0 and is equal to or less than 6.

Here, the occupied bandwidth may be calculated based on the number of carriers, which is calculated by subtracting the product of the reduced carrier coefficient and a carrier unit from the maximum number of carriers.

Here, the bootstrap generation unit 7530 may assign 0 and 00 to the baseband sampling rate coefficient and the system bandwidth field, respectively, for the case in which the system bandwidth is 5 MHz.

Here, the bootstrap generation unit 7530 may assign 11 to the system bandwidth field for the case in which the system bandwidth is greater than 8 MHz.

Here, the bootstrap generation unit 7530 may assign 14 to the baseband sampling rate coefficient for the case in which the system bandwidth is 10 MHz, assign 29 to the baseband sampling rate coefficient for the case in which the system bandwidth is 15 MHz, assign 44 to the baseband sampling rate coefficient for the case in which the system bandwidth is 20 MHz, assign 59 to the baseband sampling rate coefficient for the case in which the system bandwidth is 25 MHz, and assign 74 to the baseband sampling rate coefficient for the case in which the system bandwidth is 30 MHz.

Figure 76:
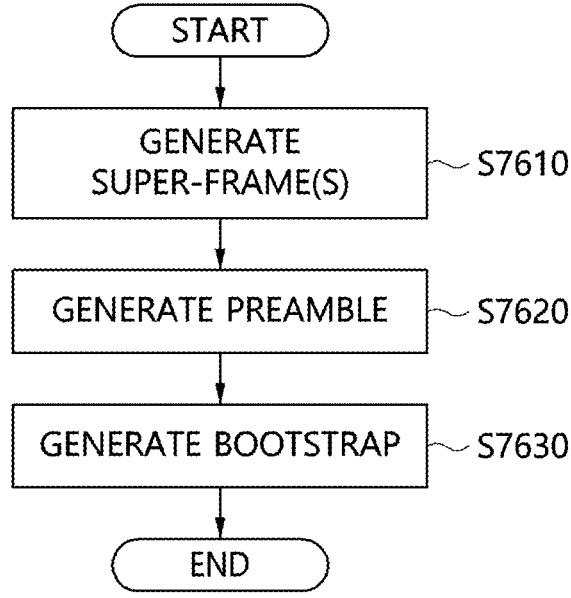
FIG. 76 is a flowchart illustrating a method for transmitting a broadcast signal according to an embodiment of the present invention.

FIG. 76 is a flowchart illustrating a method for transmitting a broadcast signal according to an embodiment of the present invention.

Referring to FIG. 76, in the method for transmitting a broadcast signal according to an embodiment of the present invention, one or more subframes are generated at step S7610.

Also, in the method for transmitting a broadcast signal according to an embodiment of the present invention, a preamble corresponding to the one or more subframes is generated at step S7620.

Also, in the method for transmitting a broadcast signal according to an embodiment of the present invention, a bootstrap, for signaling a system bandwidth field (system_bandwidth), corresponding to a system bandwidth for a post_bootstrap, and a baseband sampling rate coefficient (bsr_coefficient), is generated at step S7630.

Here, the preamble may include L1 signaling data, and the L1 signaling data may include a reduced carrier coefficient.

Here, at the step (S7620) of generating the preamble, the reduced carrier coefficient may be set such that the ratio of occupied bandwidth to system bandwidth (occupied bandwidth to channel width rate) is equal to or greater than 0.92 and is less than 0.98.

Here, the reduced carrier coefficient may include 5 and 6 for the case in which the system bandwidth is 5 MHz.

Here, the reduced carrier coefficient may include an integer that is equal to or greater than 0 and is equal to or less than 6.

Here, the occupied bandwidth may be calculated based on the number of carriers, which is calculated by subtracting the product of the reduced carrier coefficient and a carrier unit from the maximum number of carriers.

Here, at the step (S7630) of generating the bootstrap, 0 and 00 may be assigned to the baseband sampling rate coefficient and the system bandwidth field, respectively, for the case in which the system bandwidth is 5 MHz.

Here, at the step (S7630) of generating the bootstrap, 11 may be assigned to the system bandwidth field for the case in which the system bandwidth is greater than 8 MHz.

Here, at the step (S7630) of generating the bootstrap, 14 may be assigned to the baseband sampling rate coefficient for the case in which the system bandwidth is 10 MHz, 29 may be assigned to the baseband sampling rate coefficient for the case in which the system bandwidth is 15 MHz, 44 may be assigned to the baseband sampling rate coefficient for the case in which the system bandwidth is 20 MHz, 59 may be assigned to the baseband sampling rate coefficient for the case in which the system bandwidth is 25 MHz, and 74 may be assigned to the baseband sampling rate coefficient for the case in which the system bandwidth is 30 MHz.

Figure 77:
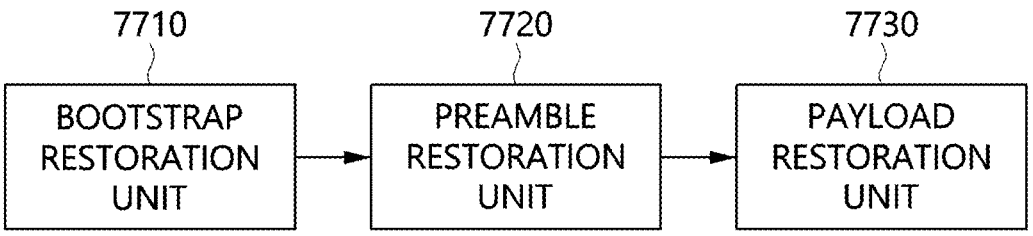
FIG. 77 is a block diagram illustrating an apparatus for receiving a broadcast signal according to an embodiment of the present invention.

FIG. 77 is a block diagram illustrating an apparatus for receiving a broadcast signal according to an embodiment of the present invention.

Referring to FIG. 77, the apparatus for receiving a broadcast signal according to an embodiment of the present invention includes a bootstrap restoration unit 7710, a preamble restoration unit 7720, and a payload restoration unit 7730.

The bootstrap restoration unit 7710 restores a bootstrap that signals a system bandwidth field (system_bandwidth), corresponding to a system bandwidth for a post-bootstrap, and a baseband sampling rate coefficient (bsr_coefficient).

The preamble restoration unit 7720 restores a preamble located immediately following the bootstrap in a broadcast signal frame.

The payload restoration unit 7730 restores one or more subframes located immediately following the preamble in the broadcast signal frame.

Here, the preamble may include L1 signaling data, and the L1 signaling data may include a reduced carrier coefficient.

Here, the reduced carrier coefficient may be set such that the ratio of occupied bandwidth to system bandwidth (occupied bandwidth to channel width rate) is equal to or greater than 0.92 and is less than 0.98.

Here, the reduced carrier coefficient may include 5 and 6 for the case in which the system bandwidth is 5 MHz.

Here, the reduced carrier coefficient may include an integer that is equal to or greater than 0 and is equal to or less than 6.

Figure 78:
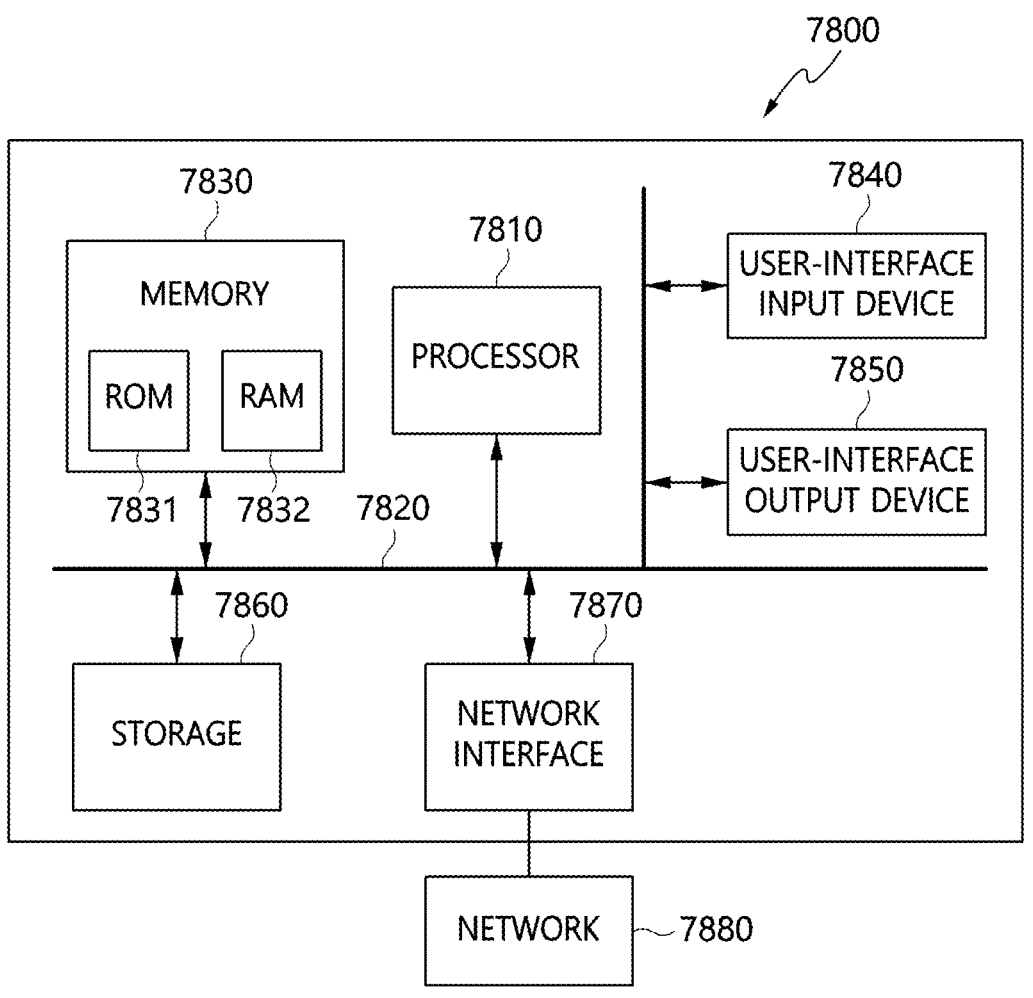
FIG. 78 is a view illustrating a computer system according to an embodiment of the present invention.

FIG. 78 is a view illustrating a computer system according to an embodiment of the present invention.

Referring to FIG. 78, the apparatus for transmitting a broadcast signal and the apparatus for receiving a broadcast signal according to an embodiment of the present invention may be implemented in a computer system 7800 such as a computer-readable recording medium. As illustrated in FIG. 78, the computer system 7800 may include one or more processors 7810, memory 7830, a user-interface input device 7840, a user-interface output device 7850, and storage 7860, which communicate with each other via a bus 7820. Also, the computer system 7800 may further include a network interface 7870 connected to a network 7880. The processor 7810 may be a central processing unit or a semiconductor device for executing processing instructions stored in the memory 7830 or the storage 7860. The memory 7830 and the storage 7860 may be various types of volatile or nonvolatile storage media. For example, the memory may include ROM 7831 or RAM 7832.

The apparatus for transmitting a broadcast signal or the apparatus for receiving a broadcast signal according to an embodiment of the present invention includes one or more processors 7810 and executable memory 7830 for storing at least one program executed by the one or more processors 7810, and the at least one program may be one for performing operations performed by the apparatus described with reference to FIG. 75 and FIG. 77.

As described above, the apparatus for transmitting a broadcast signal, the method therefor, and the apparatus for receiving a broadcast signal according to the present invention are not limitedly applied to the configurations and operations of the above-described embodiments, but all or some of the embodiments may be selectively combined and configured, so that the embodiments may be modified in various ways.

The invention claimed is:

1. An apparatus for transmitting a broadcast signal, comprising:

at least one processor; and memory for storing at least one program executed by the at least one processor, wherein the at least one program is configured to generate a bootstrap for signaling a system bandwidth field, corresponding to a system bandwidth for a post-bootstrap, and a baseband sampling rate coefficient;

generate a preamble located immediately following the bootstrap in a broadcast signal frame; and generate one or more subframes located immediately following the preamble in the broadcast signal frame, wherein:

the preamble includes L1 signaling data, and the L1 signaling data includes at least one signaling field for signaling a reduced carrier coefficient, and wherein the reduced carrier coefficient is set based on a ratio of an occupied bandwidth to a system bandwidth.

2. The apparatus of claim 1, wherein the reduced carrier coefficient includes 5 and 6 for a case in which the system bandwidth is 5 MHz.

3. The apparatus of claim 1, wherein the reduced carrier coefficient includes an integer that is equal to or greater than 0 and is equal to or less than 6.

4. The apparatus of claim 1, wherein the occupied bandwidth is calculated based on a number of carriers, which is calculated by subtracting a product of the reduced carrier coefficient and a carrier unit from a maximum number of carriers.

5. The apparatus of claim 1, wherein the at least one processor assigns 0 and 00 to the baseband sampling rate coefficient and the system bandwidth field, respectively, for a case in which the system bandwidth is 5 MHz.

6. The apparatus of claim 5, wherein the at least one processor assigns 11 to the system bandwidth field for a case in which the system bandwidth is greater than 8 MHz.

7. The apparatus of claim 6, wherein the at least one processor assigns 14 to the baseband sampling rate coefficient for a case in which the system bandwidth is 10 MHz,
    assigns 29 to the baseband sampling rate coefficient for a case in which the system bandwidth is 15 MHz,
    assigns 44 to the baseband sampling rate coefficient for a case in which the system bandwidth is 20 MHz,
    assigns 59 to the baseband sampling rate coefficient for a case in which the system bandwidth is 25 MHz, and
    assigns 74 to the baseband sampling rate coefficient for a case in which the system bandwidth is 30 MHz.

8. A method for transmitting a broadcast signal, comprising:
    generating one or more subframes;
    generating a preamble corresponding to the one or more subframes; and
    generating a bootstrap for signaling a system bandwidth field, corresponding to a system bandwidth for a post-bootstrap, and a baseband sampling rate coefficient,
    wherein:
    the preamble includes L1 signaling data, and the L1 signaling data includes at least one signaling field for signaling a reduced carrier coefficient,
    wherein the reduced carrier coefficient is set based on a ratio of an occupied bandwidth to a system bandwidth.

9. The method of claim 8, wherein the reduced carrier coefficient includes 5 and 6 for a case in which the system bandwidth is 5 MHz.

10. The method of claim 8, wherein the reduced carrier coefficient includes an integer that is equal to or greater than 0 and is equal to or less than 6.

11. The method of claim 8, wherein the occupied bandwidth is calculated based on a number of carriers, which is calculated by subtracting a product of the reduced carrier coefficient and a carrier unit from a maximum number of carriers.

12. The method of claim 8, wherein generating the bootstrap comprises assigning 0 and 00 to the baseband sampling rate coefficient and the system bandwidth field, respectively, for a case in which the system bandwidth is 5 MHz.

13. The method of claim 12, wherein generating the bootstrap comprises assigning 11 to the system bandwidth field for a case in which the system bandwidth is greater than 8 MHz.

14. The method of claim 13, wherein generating the bootstrap comprises assigning 14 to the baseband sampling rate coefficient for a case in which the system bandwidth is 10 MHz,
    assigning 29 to the baseband sampling rate coefficient for a case in which the system bandwidth is 15 MHz,
    assigning 44 to the baseband sampling rate coefficient for a case in which the system bandwidth is 20 MHz,
    assigning 59 to the baseband sampling rate coefficient for a case in which the system bandwidth is 25 MHz, and
    assigning 74 to the baseband sampling rate coefficient for a case in which the system bandwidth is 30 MHz.

15. An apparatus for receiving a broadcast signal, comprising:
    at least one processor; and
    memory for storing at least one program executed by the at least one processor,
    wherein the at least one program is configured to
    restore a bootstrap for signaling a system bandwidth field, corresponding to a system bandwidth for a post-bootstrap, and a baseband sampling rate coefficient;
    restore a preamble located immediately following the bootstrap in a broadcast signal frame; and
    restore one or more subframes located immediately following the preamble in the broadcast signal frame,
    wherein:
    the preamble includes L1 signaling data, and the L1 signaling data includes at least one signaling field for signaling a reduced carrier coefficient,
    wherein the reduced carrier coefficient is set based on a ratio of an occupied bandwidth to a system bandwidth.

16. The apparatus of claim 15, wherein the reduced carrier coefficient includes 5 and 6 for a case in which the system bandwidth is 5 MHz.

17. The apparatus of claim 15, wherein the reduced carrier coefficient includes an integer that is equal to or greater than 0 and is equal to or less than 6.

* * * * *